May 31, 1960 I. V. COLEMAN 2,938,957

AUTOMATIC TOLL TICKETING TELEPHONE SYSTEMS

Filed Feb. 11, 1955 29 Sheets-Sheet 1

INVENTOR.
IVAN V. COLEMAN
BY
Smith, Olsen, Baird & Gulbrandsen.
ATTYS.

May 31, 1960 I. V. COLEMAN 2,938,957

AUTOMATIC TOLL TICKETING TELEPHONE SYSTEMS

Filed Feb. 11, 1955 29 Sheets-Sheet 2

INVENTOR.
IVAN V. COLEMAN

BY

Smith, Olsen, Baird & Gulbrandsen

ATTYS.

May 31, 1960 I. V. COLEMAN 2,938,957

AUTOMATIC TOLL TICKETING TELEPHONE SYSTEMS

Filed Feb. 11, 1955 29 Sheets-Sheet 3

INVENTOR.
IVAN V. COLEMAN

BY

Smith, Olsen, Baird & Gulbrandsen.

ATTYS.

AUTOMATIC TOLL TICKETING TELEPHONE SYSTEMS

Filed Feb. 11, 1955 29 Sheets-Sheet 4

INVENTOR.
IVAN V. COLEMAN
BY
Smith, Olsen, Baird & Gulbrandsen.
ATTYS.

May 31, 1960 I. V. COLEMAN 2,938,957

AUTOMATIC TOLL TICKETING TELEPHONE SYSTEMS

Filed Feb. 11, 1955 29 Sheets-Sheet 5

INVENTOR.
IVAN V. COLEMAN

BY

Smith, Olsen, Baird & Gulbrandsen,

ATTYS.

INVENTOR.
IVAN V. COLEMAN
BY
Smith, Olsen, Baird & Gulbrandsen
ATTYS.

May 31, 1960 I. V. COLEMAN 2,938,957

AUTOMATIC TOLL TICKETING TELEPHONE SYSTEMS

Filed Feb. 11, 1955 29 Sheets-Sheet 7

INVENTOR.
IVAN V. COLEMAN
BY
Smith, Olsen, Baird & Gulbrandsen
ATTYS.

May 31, 1960 I. V. COLEMAN 2,938,957

AUTOMATIC TOLL TICKETING TELEPHONE SYSTEMS

Filed Feb. 11, 1955 29 Sheets-Sheet 8

INVENTOR.
IVAN V. COLEMAN

BY

Smith, Olsen, Baird & Gulbrandsen

ATTYS.

INVENTOR.
IVAN V. COLEMAN
BY
Smith, Olsen, Baird & Gulbrandsen
ATTYS.

INVENTOR.
IVAN V. COLEMAN
BY
Smith, Olsen, Baird + Gulbrandsen
ATTYS.

May 31, 1960 I. V. COLEMAN 2,938,957

AUTOMATIC TOLL TICKETING TELEPHONE SYSTEMS

Filed Feb. 11, 1955 29 Sheets-Sheet 11

INVENTOR.
IVAN V. COLEMAN
BY
Smith, Olsen, Baird & Gulbrandsen
ATTYS.

May 31, 1960 I. V. COLEMAN 2,938,957

AUTOMATIC TOLL TICKETING TELEPHONE SYSTEMS

Filed Feb. 11, 1955

29 Sheets-Sheet 12

INVENTOR.
IVAN V. COLEMAN

BY

Smith, Olsen, Baird & Gulbrandsen

ATTYS.

INVENTOR.
IVAN V. COLEMAN
BY
Smith, Olsen, Baird & Gulbrandsen
ATTYS.

May 31, 1960 I. V. COLEMAN 2,938,957

AUTOMATIC TOLL TICKETING TELEPHONE SYSTEMS

Filed Feb. 11, 1955 29 Sheets-Sheet 14

INVENTOR.
IVAN V. COLEMAN
BY
Smith, Olsen, Baird & Gulbrandsen
ATTYS.

May 31, 1960 I. V. COLEMAN 2,938,957

AUTOMATIC TOLL TICKETING TELEPHONE SYSTEMS

Filed Feb. 11, 1955

29 Sheets-Sheet 15

INVENTOR.
IVAN V. COLEMAN
BY
Smith, Olsen, Baird & Gulbrandsen
ATTYS.

AUTOMATIC TOLL TICKETING TELEPHONE SYSTEMS

Filed Feb. 11, 1955

INVENTOR.
IVAN V. COLEMAN
BY
Smith, Olsen, Baird & Gulbrandsen
ATTYS.

INVENTOR.
IVAN V. COLEMAN

BY

Smith, Olson, Baird & Gulbrandsen

ATTYS.

May 31, 1960 I. V. COLEMAN 2,938,957

AUTOMATIC TOLL TICKETING TELEPHONE SYSTEMS

Filed Feb. 11, 1955

29 Sheets-Sheet 18

INVENTOR.
IVAN V. COLEMAN

BY

Smith, Olsen, Baird & Gulbrandsen

ATTYS.

May 31, 1960 I. V. COLEMAN 2,938,957

AUTOMATIC TOLL TICKETING TELEPHONE SYSTEMS

Filed Feb. 11, 1955 29 Sheets-Sheet 19

INVENTOR
IVAN V. COLEMAN

Smith, Olsen, Baird & Gulbrandsen,
ATTYS.

May 31, 1960 I. V. COLEMAN 2,938,957

AUTOMATIC TOLL TICKETING TELEPHONE SYSTEMS

Filed Feb. 11, 1955 29 Sheets-Sheet 20

INVENTOR.
IVAN V. COLEMAN
BY
Smith, Olsen, Baird & Gulbrandsen
ATTYS.

May 31, 1960 I. V. COLEMAN 2,938,957

AUTOMATIC TOLL TICKETING TELEPHONE SYSTEMS

Filed Feb. 11, 1955

29 Sheets-Sheet 21

INVENTOR.
IVAN V. COLEMAN
BY
Smith, Olsen, Baird & Gulbrandsen
ATTYS.

INVENTOR.
IVAN V. COLEMAN
BY
Smith, Olsen, Baird & Gulbrandsen
ATTYS.

INVENTOR.
IVAN V. COLEMAN
BY
Smith, Olsen, Baird & Gulbrandsen.
ATTYS.

INVENTOR.
IVAN V. COLEMAN
BY
Smith, Olsen, Baird & Gulbrandsen
ATTYS.

INVENTOR.
IVAN V. COLEMAN
BY
Smith, Olsen, Baird & Gulbrandsen.
ATTYS.

May 31, 1960 I. V. COLEMAN 2,938,957

AUTOMATIC TOLL TICKETING TELEPHONE SYSTEMS

Filed Feb. 11, 1955

29 Sheets-Sheet 26

INVENTOR
IVAN V. COLEMAN
BY
Smith, Olsen, Baird & Gulbrandsen
ATTYS.

May 31, 1960 I. V. COLEMAN 2,938,957

AUTOMATIC TOLL TICKETING TELEPHONE SYSTEMS

Filed Feb. 11, 1955 29 Sheets-Sheet 27

INVENTOR
IVAN V. COLEMAN

BY Smith, Olsen, Baird & Gulbrandsen.
ATTYS.

May 31, 1960 I. V. COLEMAN 2,938,957

AUTOMATIC TOLL TICKETING TELEPHONE SYSTEMS

Filed Feb. 11, 1955 29 Sheets-Sheet 28

INVENTOR.
IVAN V. COLEMAN
BY
Smith, Olsen, Baird & Gulbrandsen.
ATTYS.

INVENTOR
IVAN V. COLEMAN
BY
Smith, Olsen, Baird & Gulbrandsen
ATTYS.

United States Patent Office 2,938,957
Patented May 31, 1960

2,938,957

AUTOMATIC TOLL TICKETING TELEPHONE SYSTEMS

Ivan V. Coleman, Naperville, Ill., assignor to General Telephone Laboratories, Incorporated, a corporation of Delaware Filed Feb. 11, 1955, Ser. No. 487,500

32 Claims. (Cl. 179—18)

Figure 1:
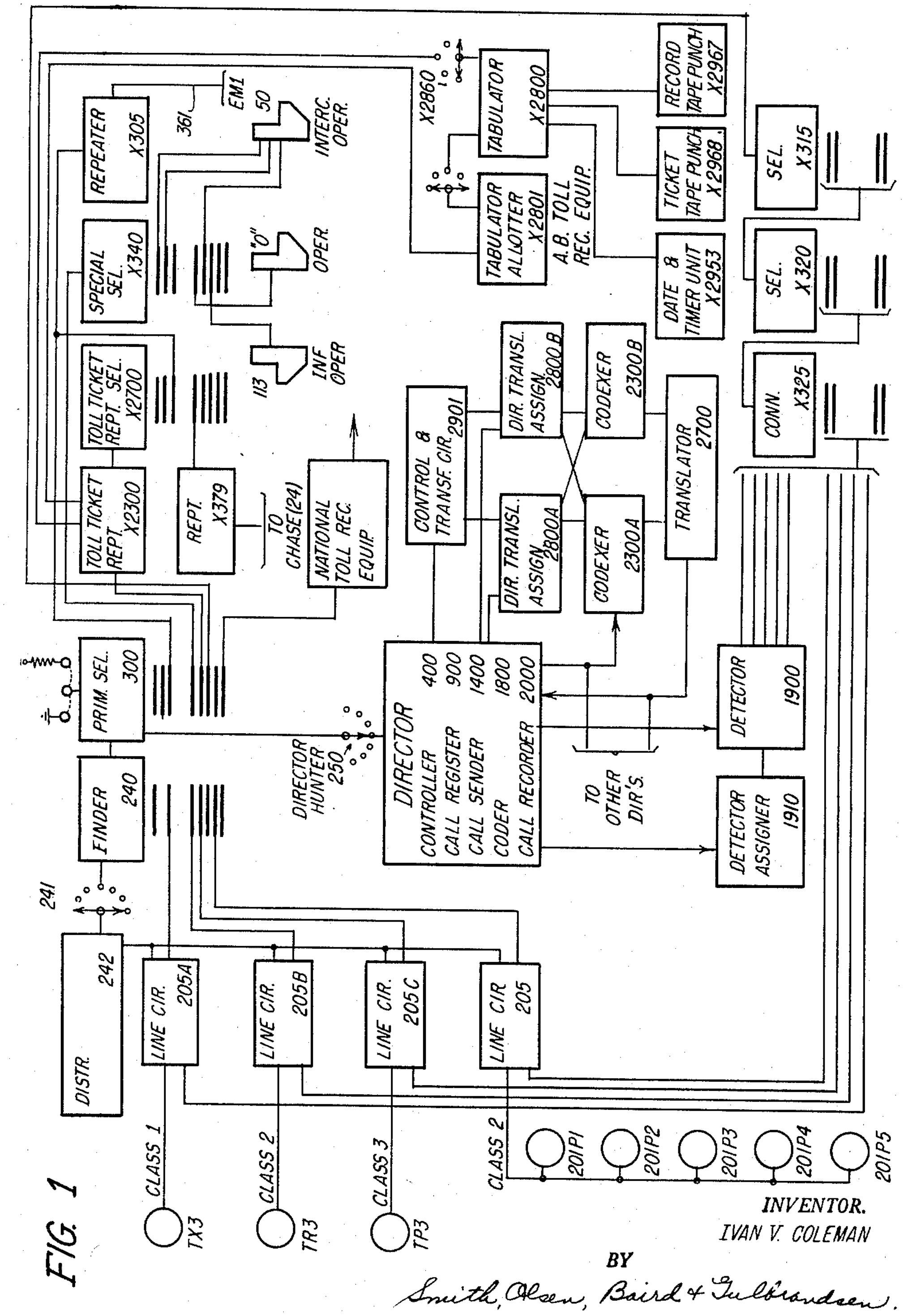

The present invention relates to automatic telephone systems in general and in particular to improvements in automatic toll ticketing telephone systems which are arranged to produce a record of certain of the items of information pertaining to each telephone connection. More particularly, the present invention relates to improvements in automatic toll ticketing telephone systems of the character disclosed in the John E. Ostline Patent No. 2,678,353, granted May 11, 1954.

An automatic toll ticketing telephone system of the type disclosed in the above mentioned Ostline patent is divided into a plurality of zones and each zone includes one or more telephone exchanges. Telephone connections that are established between the subscribers of the different exchanges in the different zones and between subscribers in the different exchanges in the same zones are handled on a toll basis so the charges for the connections may be assessed against the calling subscriber substation in accordance with the distance between the exchanges and the time duration of the connections. Each telephone connection is established automatically under control of a director or register sender and a record is produced containing the particulars concerning the connection including the office code digits identifying both the calling and called exchanges, the numerical digits identifying both the calling and the called subscriber lines, and other pertinent particulars including the duration of the connection, the date, and identity of certain of the apparatus that has been used in establishing the toll connection. The charge for the call can then be determined either by the toll ticketing equipment utilized in the connection or by means of the conventional business machines which are controlled in accordance with the recorded information.

The telephone connections in the above identified Ostline patent, and also in the present system, are automatically completed from a calling subscriber station to a desired called subscriber station under control of a register sender or director apparatus provided in the originating exchange. In extending a connection, the calling subscriber merely operates his calling device in accordance with the directory number of the desired called subscriber station including the office code portion of the number which comprises the first two letters of the called exchange name and a digit identifying the particular called exchange in the zone. The directory number dialed by the calling subscriber also includes a numerical portion comprising four digits designating the called subscriber substation in the particular called exchange. Consequently, each subscriber directory number normally constitutes a seven-digit number. Certain exchanges in the system, however, are identified by an office code portion comprising the first two letters of the called exchange name and a numerical portion comprising four digits designating the called subscriber substation. Therefore, directory numbers of the subscriber substations in the exchanges identified by a two-digit office code constitute a six-digit number, instead of a seven-digit number. In either event, the first three digits dialed by a calling subscriber are registered in the register sender and are translated into one or more routing digits so that the call will be properly routed to the particular called exchange.

The first three digits of a seven digit called number will always include the first two letters of the called exchange name and the digit identifying the particular called exchange and the first three digits of a six digit number will always include the first two letters of the called exchange name and the thousands-digit of the numerical portion of the particular called subscriber number. In addition to determining the routing digits to be transmitted by the register sender or director, the called office code will also control the sender to thereafter transmit certain of the first three digits identifying the called exchange and then all of the digits constituting the numerical portion of the called subscriber directory number. Thus, it will be understood that the register sender will first transmit the routing digits, then the determined digits of the called exchange code, whether two or three digits, and finally the four digits constituting the numerical portion of the called subscriber directory number.

In the above mentioned Ostline patent, as well as in the present system, an idle register sender or director is automatically associated with the calling subscriber line and the digits of the called subscriber directory number, as dialed by the calling subscriber, are registered therein. In response to the registration of the first three digits, a common translator mechanism is automatically associated with the register sender or director in order to perform the translation operations briefly noted above. In other words, the translator mechanism functions to translate the first three digits registered in the register sender into one or more routing digits and it registers these routing digits in the register sender or director. Thereafter, the translator mechanism is disconnected from the register sender and is thus rendered available to other register senders. Transmission of the routing digits is controlled by the register sender and, depending upon the selective control by the translator, certain of the digits of the called exchange code, as registered in the register sender, are then transmitted, and finally the four digits of the numerical portion of the called number are transmitted in order to control the switching apparatus to complete the telephone connection to the desired called subscriber. During the establishment of the above mentioned connection, various items of record information pertaining thereto, such as the calling subscriber directory number, the called subscriber directory number and other pertinent items of information are transmitted by the register sender and temporarily registered in a toll ticket repeater that is included in the connection. These items of information are subsequently utilized, upon the release of the telephone connection, to produce a record including the elapsed time of the connection.

In response to the release of the toll ticket repeater, an idle tabulator is associated therewith so that the items of record information may be transferred to the tabulator and temporarily stored therein until appropriate recording apparatus is associated with the tabulator to produce a record of the connection. The records produced by the recording apparatus may be utilized by the operating telephone company to control appropriate business machines to produce printed records of the various items of information pertaining to each toll call.

The main object of the present invention is to provide improved circuits and apparatus for an automatic toll ticketing system of the type noted above including register sender or director apparatus having facilities for handling national toll calls. National toll calls that are to be automatically handled by the exchange apparatus include either ten or eleven dialed digits. The first three digits of a national toll call identify the particular called area of the United States in which the called exchange is located. The next seven digits usually includes the three called office code digits and the four numerical digits identifying the called subscriber line in the particular called exchange. In some exchanges in the United States, the called subscriber number includes an additional digit that identifies the ringing frequency of the particular subscriber station on a party line. It is for this reason that the eleventh digit is required on certain national toll calls.

It is a further object of the present invention to provide improved circuit facilities in the register sender or director for analyzing the first three digits of a dialed number to determine whether they identify a national code zone or a called exchange and, depending upon the analyses made, for controlling the operation of the switching apparatus so that the call may be automatically completed under control of the register sender or director. In the event a determination is made that the call is a local call, then it may be completed under the direct control of the dial at the calling subscriber station and the register sender or director is released from the connection.

It is a further object of the invention to provide improved means for associating the register senders or directors with the common translator, which is selectively controlled in accordance with the first three digits registered in the register sender in order to determine the particular translation that must be made of the first three digits.

It is still another object of the present invention to provide an improved all-relay type director translator assigner for associating a translator with a particular calling director or register sender.

It is still another object of the invention to provide a codexer that may be individually associated with any calling director by means of the translator assigner, and is then selectively controlled to register the first three digits of either the national toll code or the called exchange code in order to selectively operate the translator and thereby determine the particular translation required to route the call to the proper destination.

It is a further object of the invention to provide for an automatic disconnect of the register sender or director whenever an all-trunks-busy condition is encountered by the switching apparatus during the setting-up of the connection.

It is still another object of the invention to provide improved timing facilities in the register sender or director so that predetermined signals or alarms are transmitted in the event certain fault conditions occur or do not occur within each of the predetermined elapsed time intervals. For example, when the assigner fails to assign a translator to the exclusive use of a calling register sender or director, an alarm is given and the call is automatically routed to an intercept operator position. Other conditions controlled by the timing facilities include the automatic routing of a call to an operator position (*a*) if a dialed digit is not registered in the register sender within a predetermined elapsed time interval; (*b*) if the detection cycle has not been completed by the calling line detector within a predetermined elapsed time interval; (*c*) if the call recorder portion of the register sender has not started to send the registered items of information pertaining to a connection within a predetermined elapsed time interval; and (*d*) if the register sender or director has failed to complete its operations in connection with processing the particular connection within a predetermined elapsed time interval.

Further objects and features of the present invention pertain to the particular arrangement of the circuit elements of the apparatus employed in the automatic toll ticketing system whereby the above outlined and additional operating features are attained.

Figure 16:
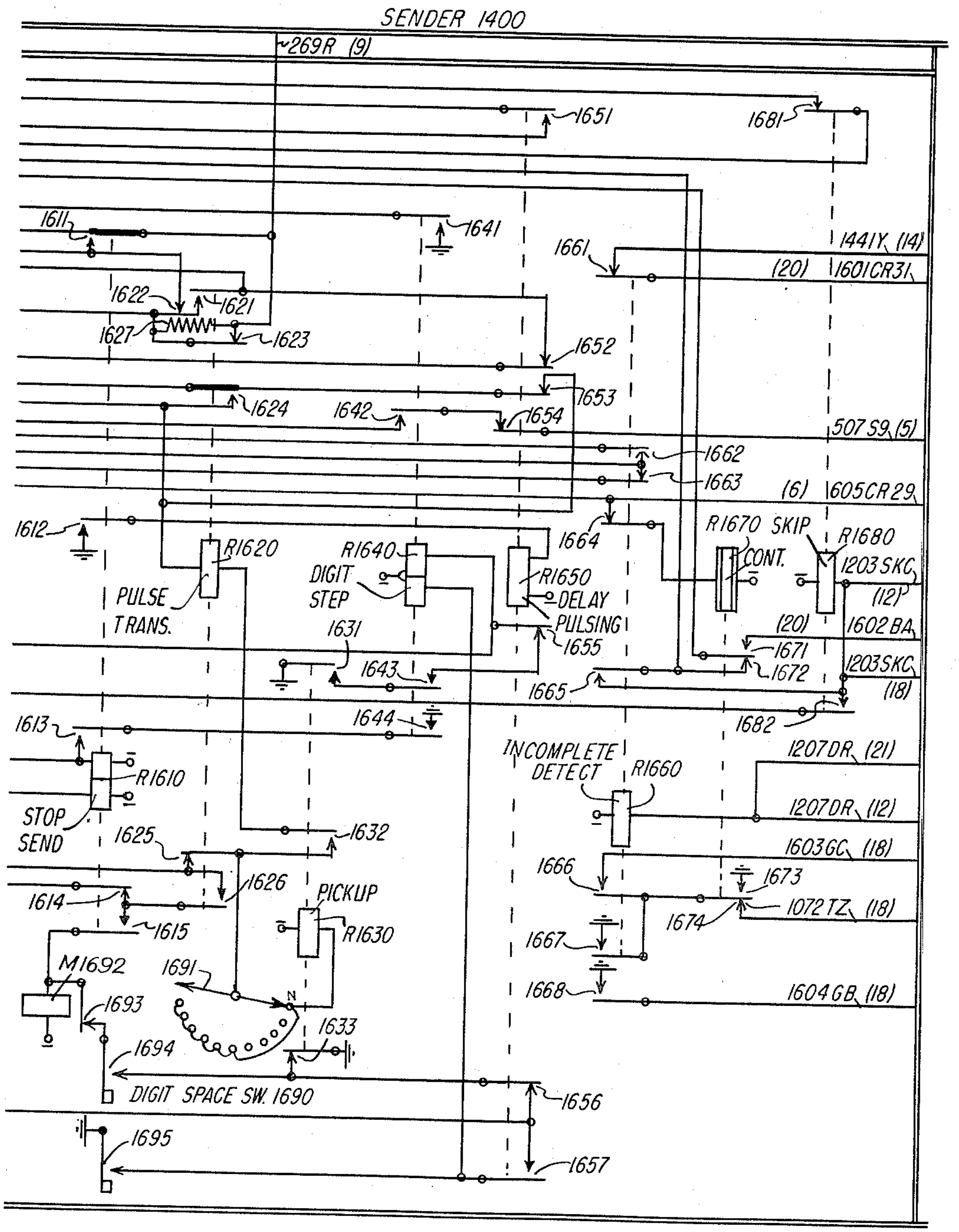
Figures 17, 30:
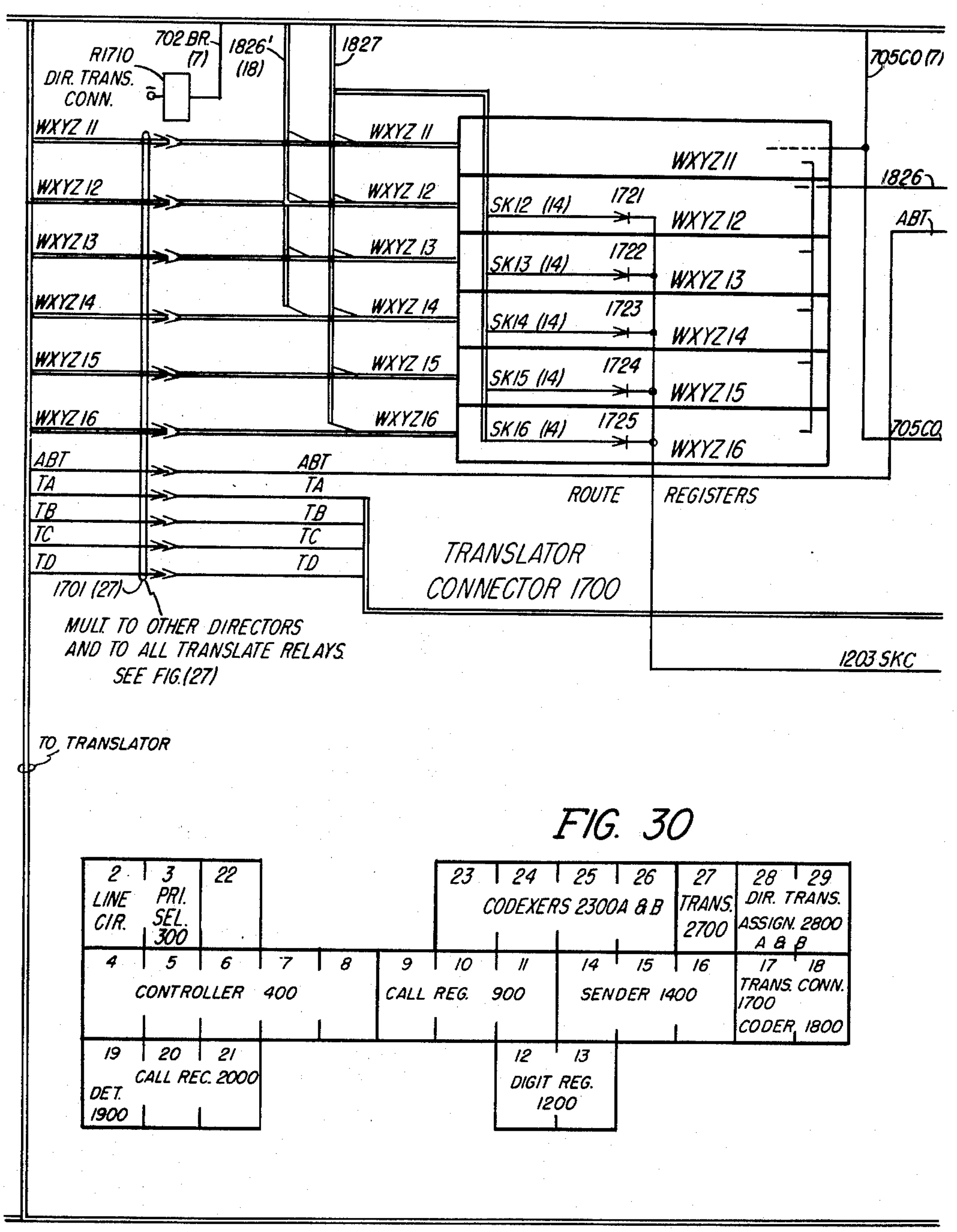

The invention, both as to its organization and method of operation, together with further objects and advantages thereof, will best be understood by reference to the following specification taken in connection with the accompanying drawings in which:

Fig. 1 is a trunking diagram illustrating the general arrangement of the switching apparatus incorporated in the FLorida 3 exchange of the present telephone system;

Figs 2 to 29, inclusive, when assembled together in the manner shown in Fig. 30, illustrates sufficient details of the switching apparatus included in the FLorida 3 exchange, to describe the apparatus having incorporated therein the features of the invention outlined above.

Certain of the apparatus schematically illustrated in the different drawings is identified by numerical designations, some of which are prefixed by the letter "X." The prefix X of the numerical designations will facilitate cross-referencing the corresponding equipment and apparatus shown in the previously mentioned Ostline patent wherein like equipment and apparatus is identified by the same numerical designations.

Figure 2:
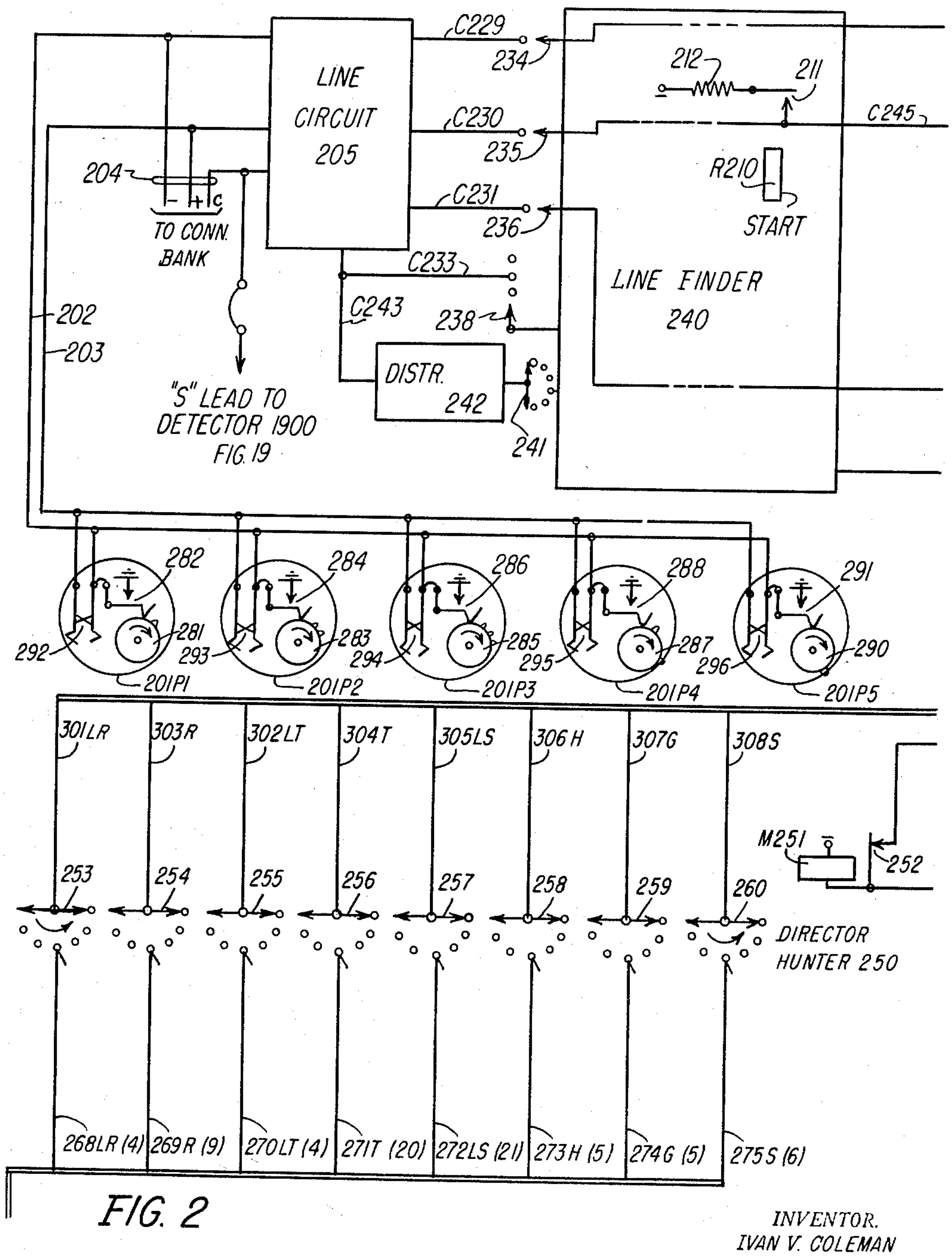

Referring now to the drawings, it will be seen that Fig. 2 schematically illustrates five subscriber substations 201–P1 to 201–P5, inclusive, on a five party line. These stations are connected by way of the line conductors 202 and 203 to the line circuit 205. This line circuit is schematically illustrated in block diagram form and is connected to the bank contacts of a plurality of line finders, including the line finder 240, each of which is individually associated with the primary selector, such as the primary selector 300 shown in Fig. 3. The line finder 240 illustrated in block diagram form may be of the type illustrated in the Bakker Patent No. 2,289,896, granted July 14, 1942, or of the type shown in the Saunders Patent No. 1,849,694, granted March 15, 1932.

In the present system, the line finder 240 has been modified so that the start relay R280 thereof, when operated to initiate the usual vertical and rotary stepping of the associated wiper set, also applies resistance battery to the conductor C245 in order to complete an operating circuit for the line relay R330 in the primary selector 300. The distributor 242 illustrated in Fig. 2 and its associated rotary switch 241 are utilized, to select an idle line finder selector link for use by the calling line circuit. The distributor 242 may also be of the type illustrated in the above noted patents to Bakker or Saunders.

In addition to the foregoing, Fig. 2 also illustrates the director hunter 250 which has access by way of its associated wipers 253 to 260, inclusive, to a plurality of directors or register senders.

Figure 3:
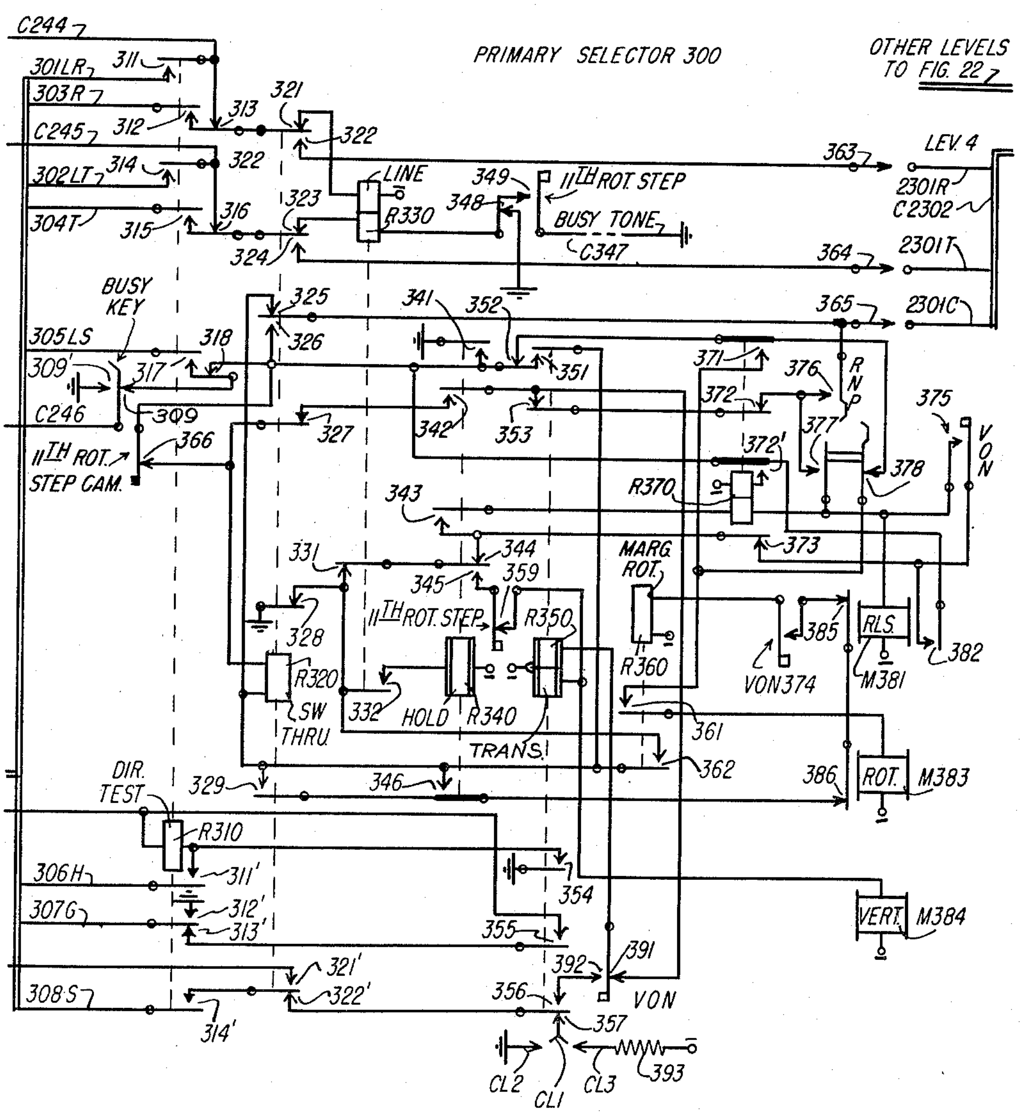

Fig. 3 shows the details of the primary selector 300 which forms the selector portion of the illustrated line finder selector link. This selector may be directly controlled by the dial at the calling subscriber substation when the director or register sender has determined that the call is a local call and it is also directly controlled by the director or register sender in setting up either short-haul toll calls or national toll calls.

Figure 9:
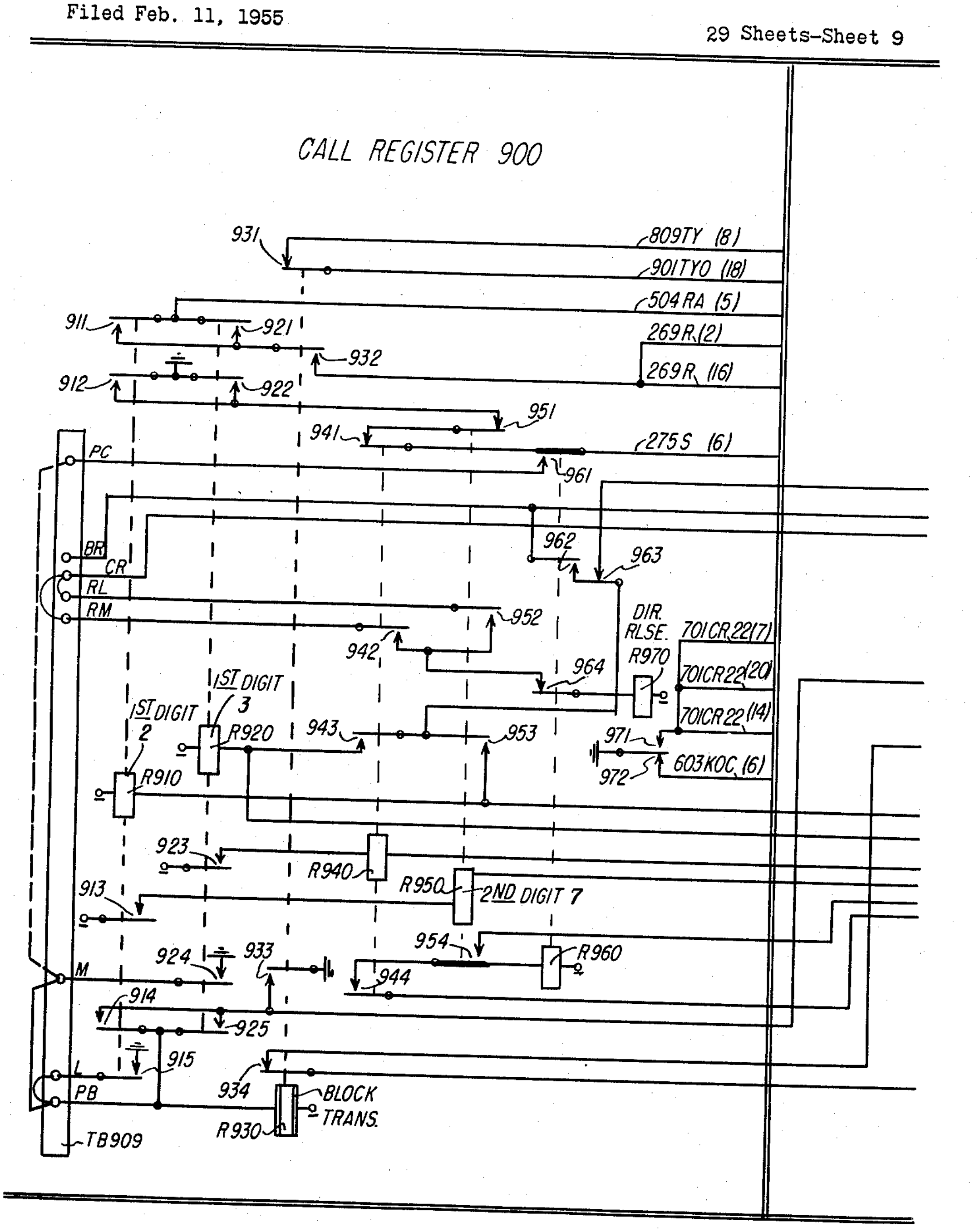
Figure 10:
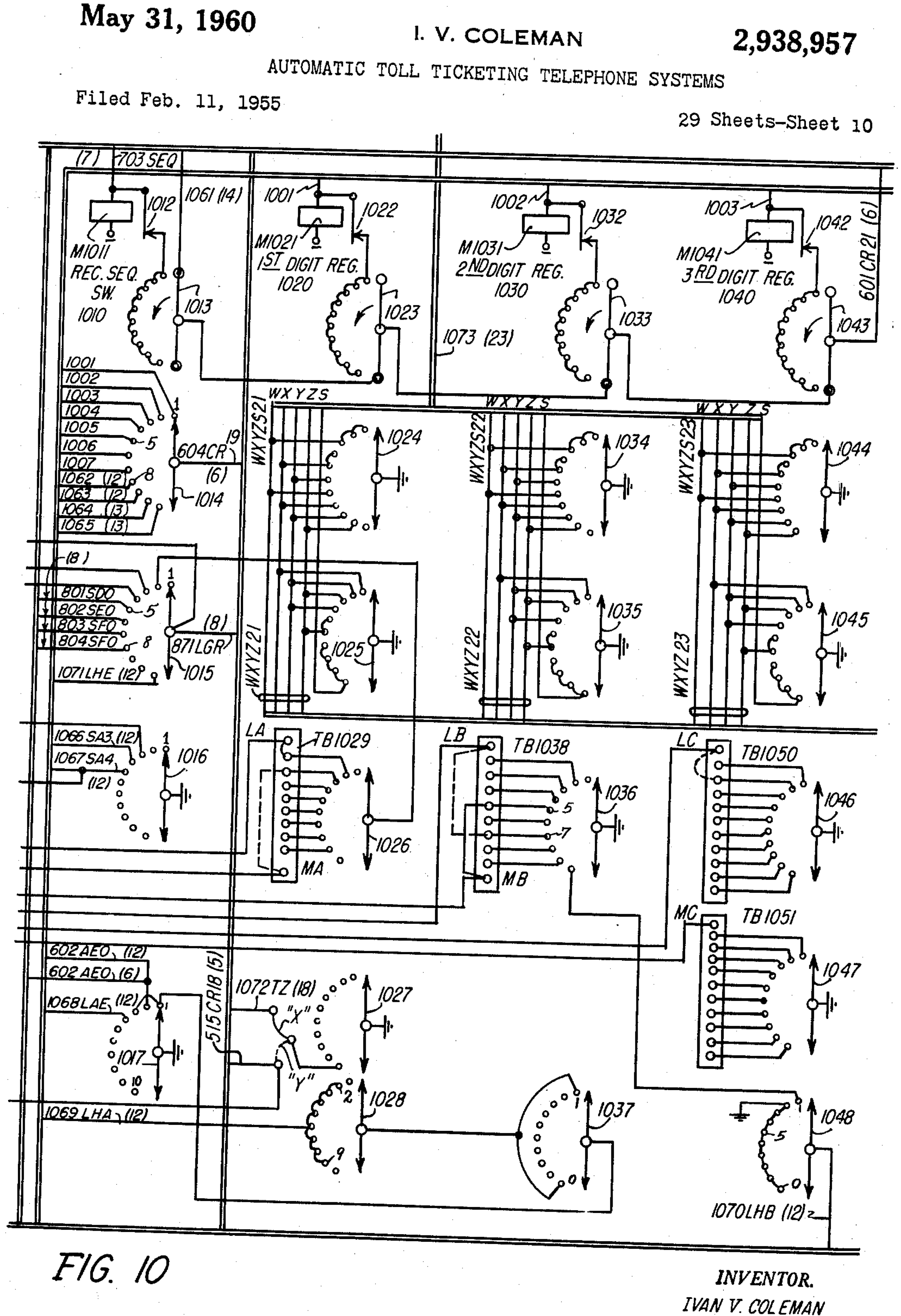
Figure 11:
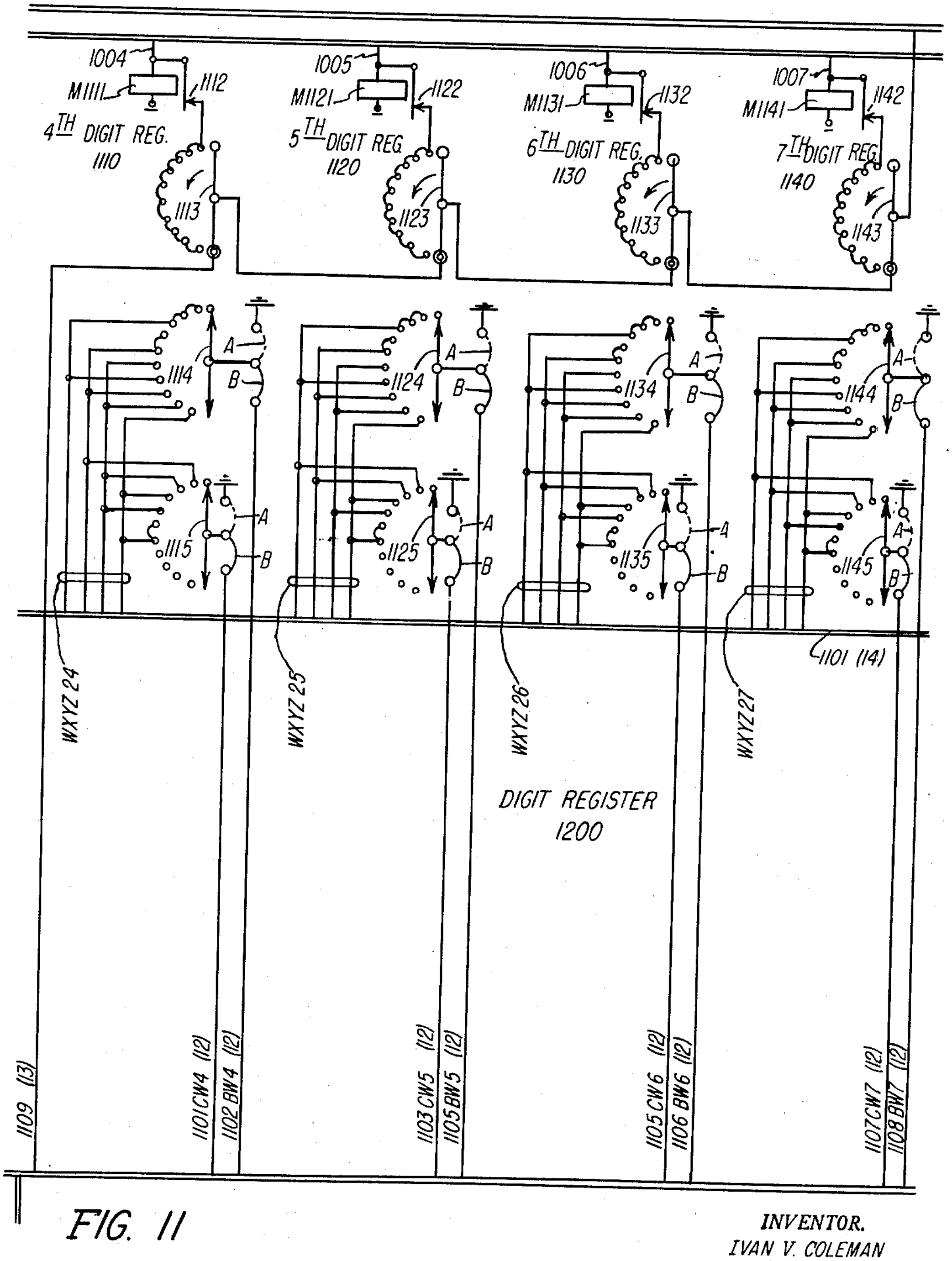
Figure 12:
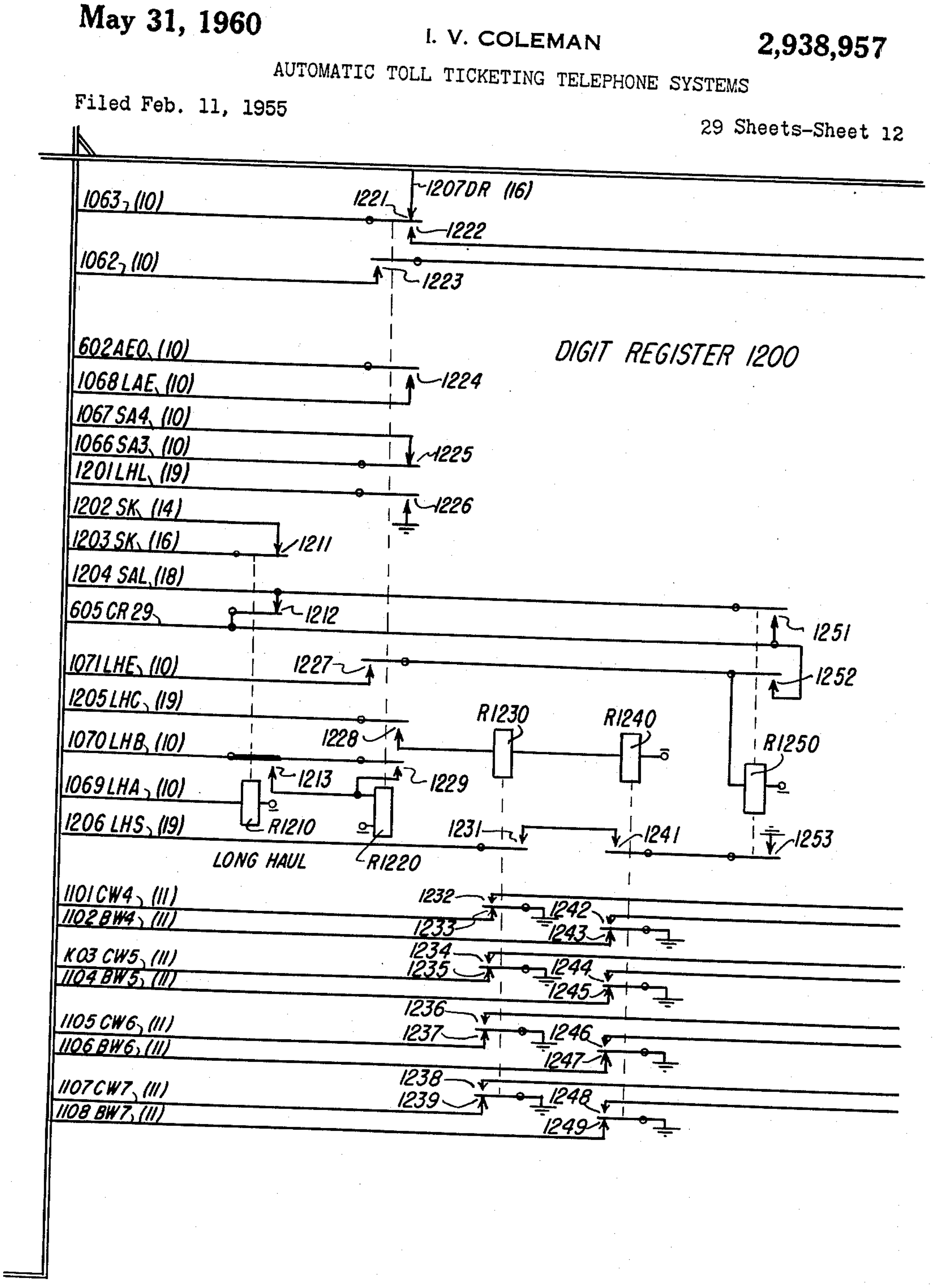
Figure 13:
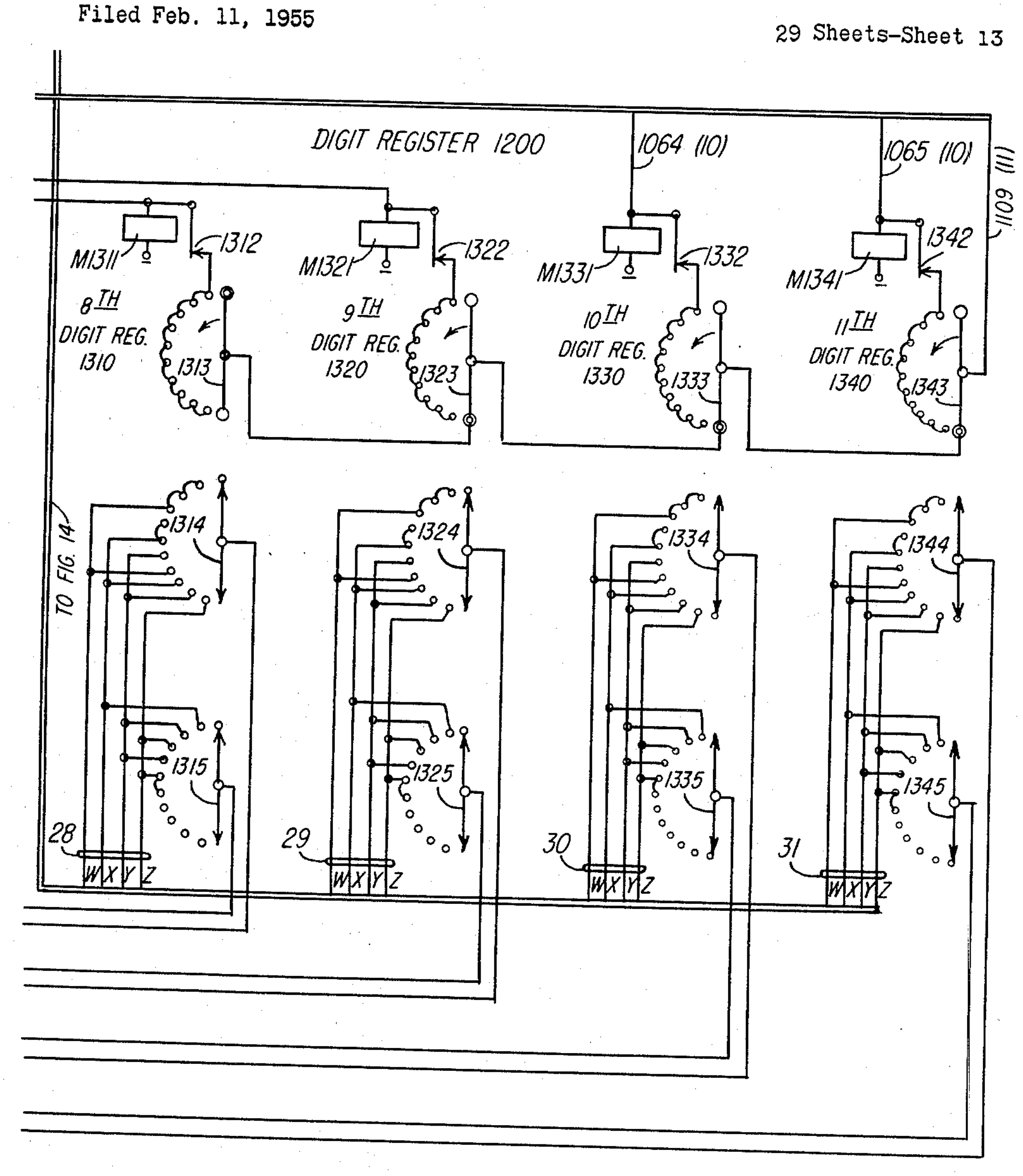
Figure 14:
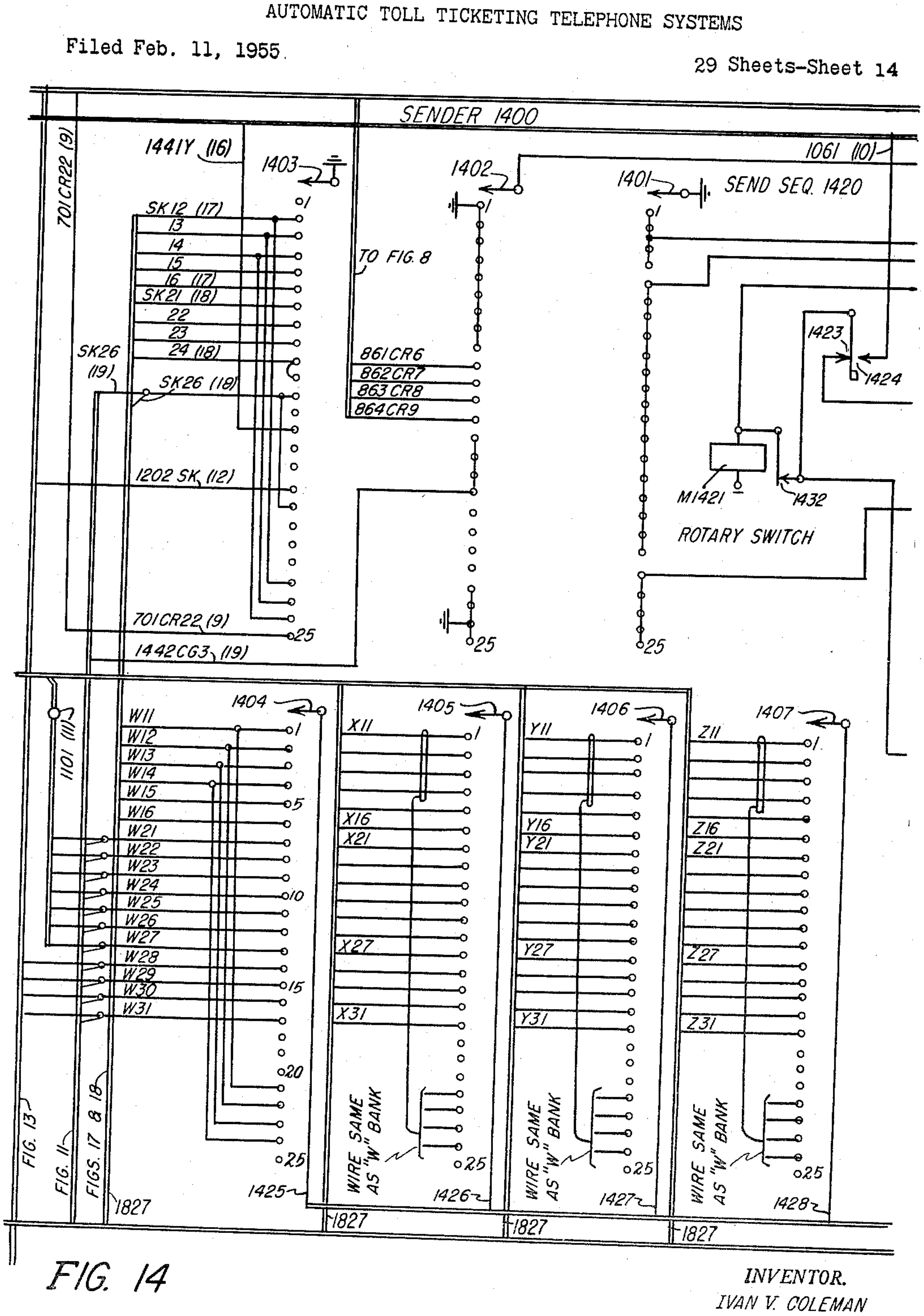
Figure 15:
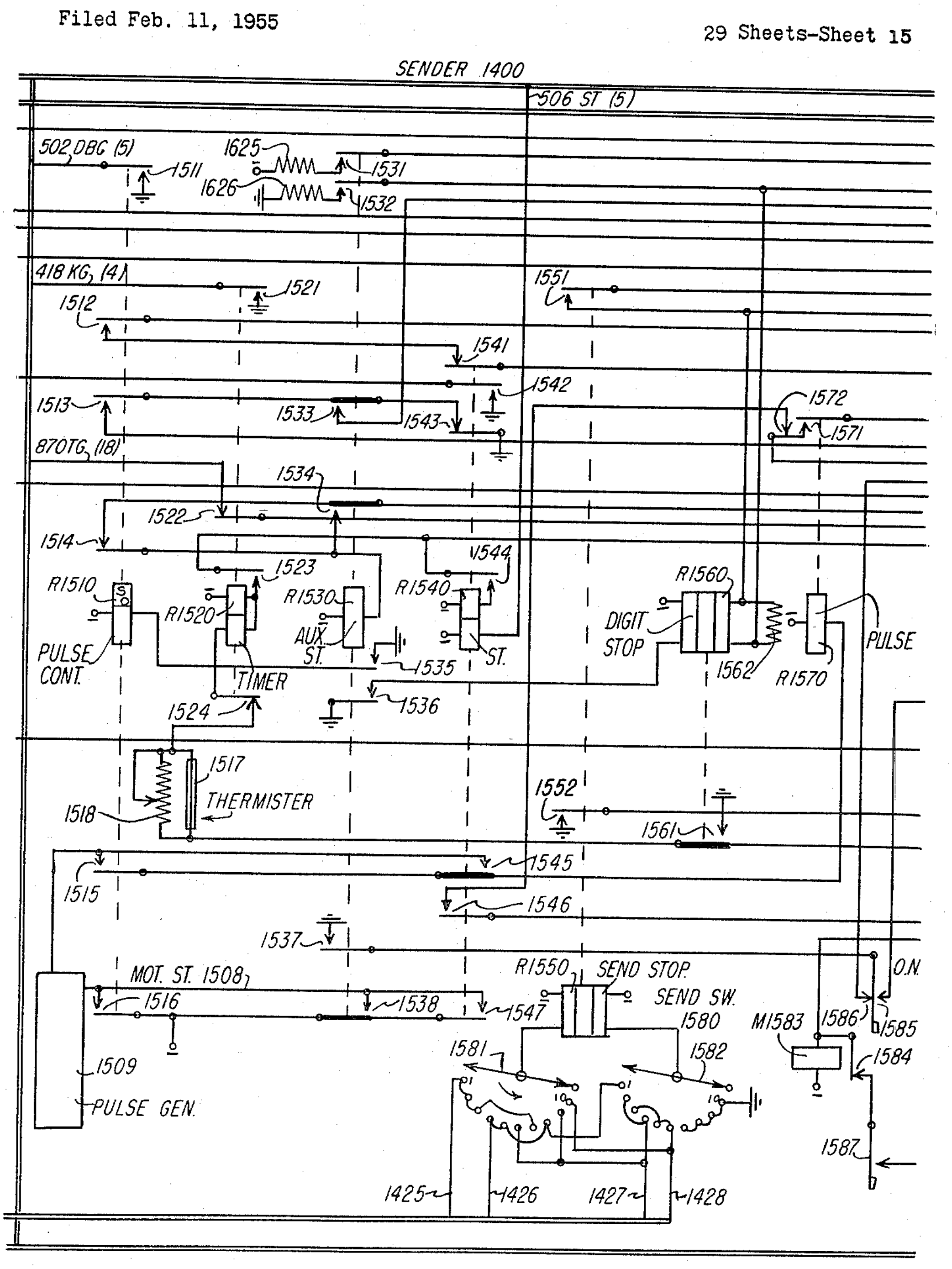
Figure 18:
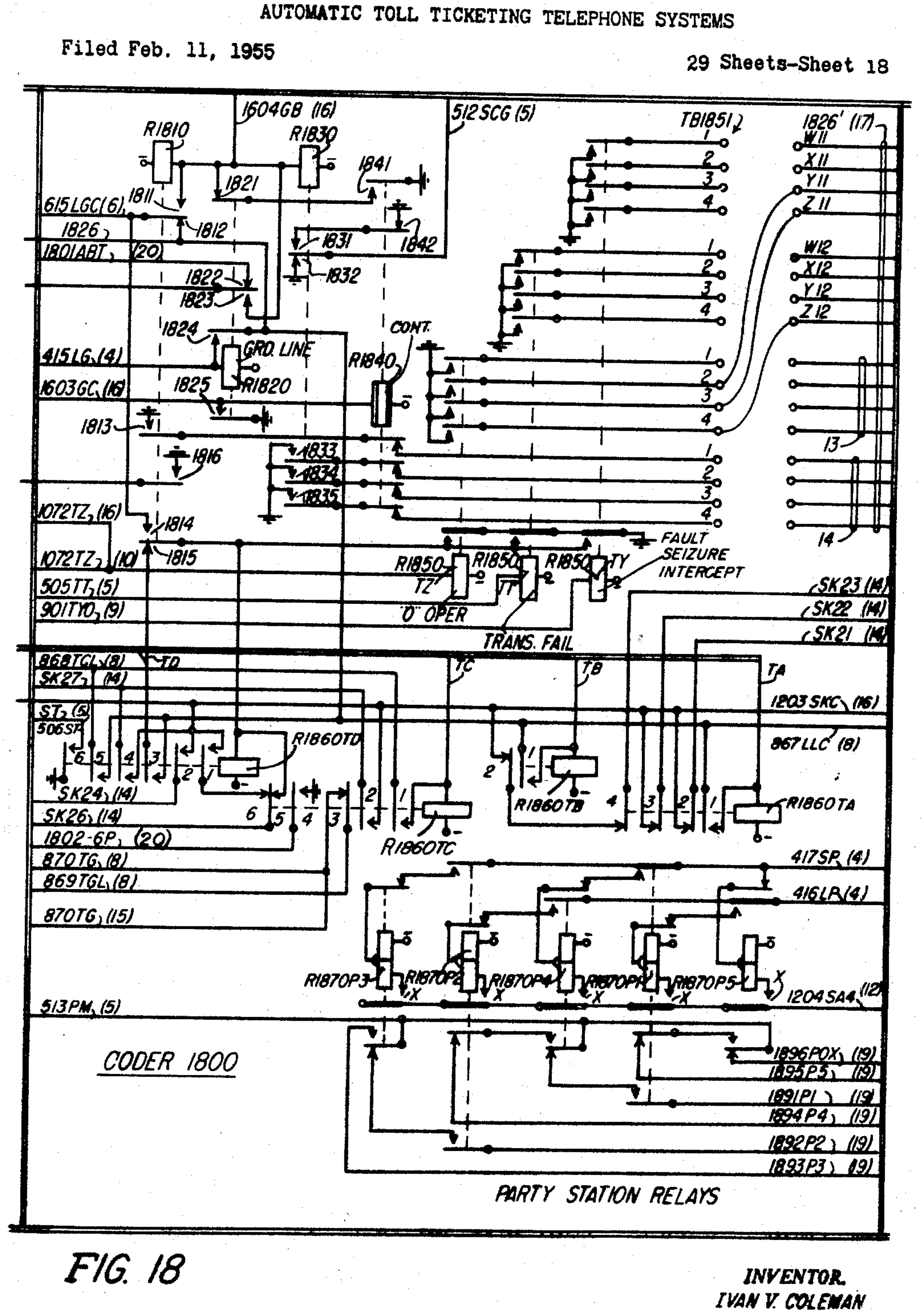
Figure 19:
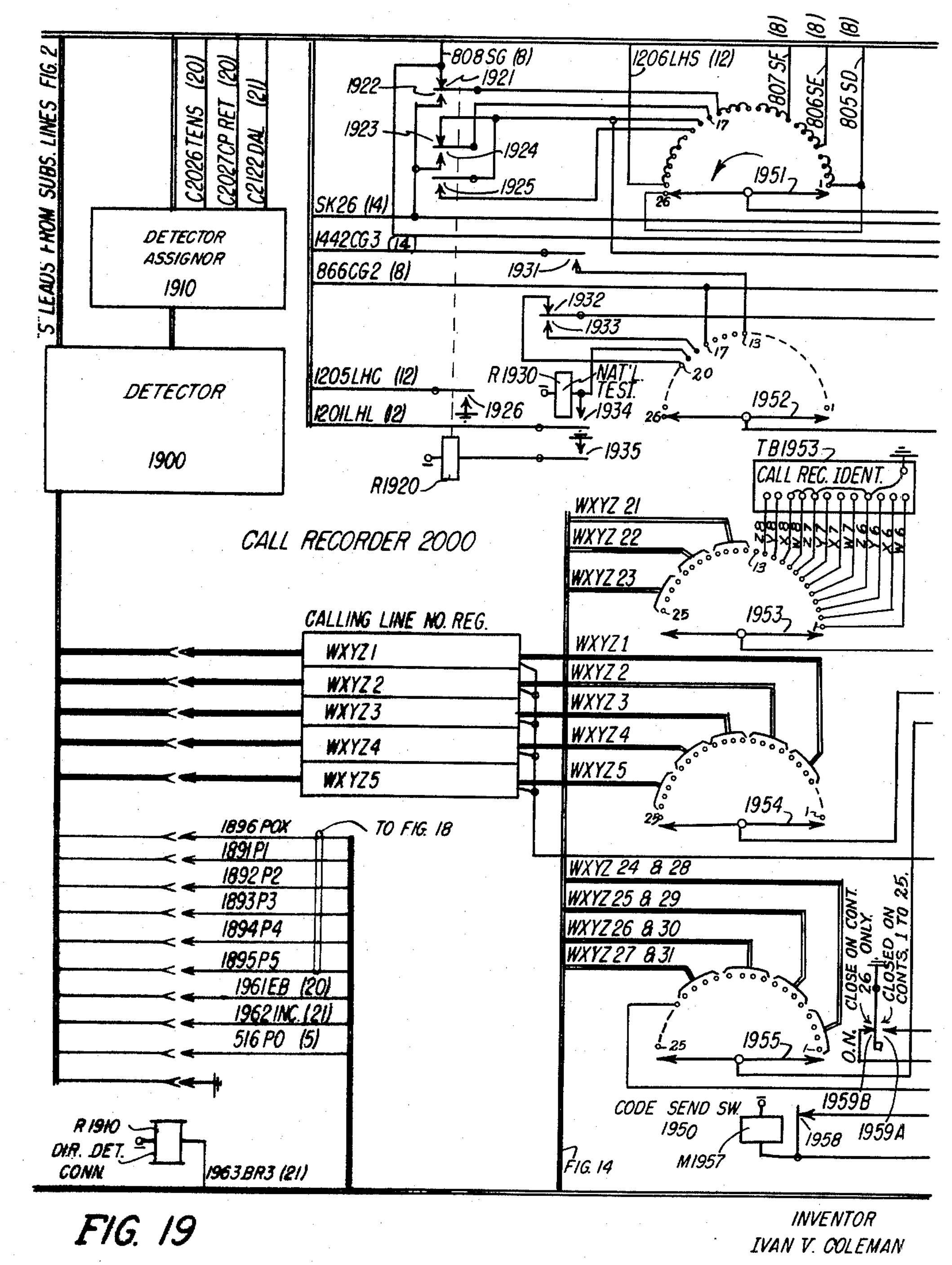
Figure 20:
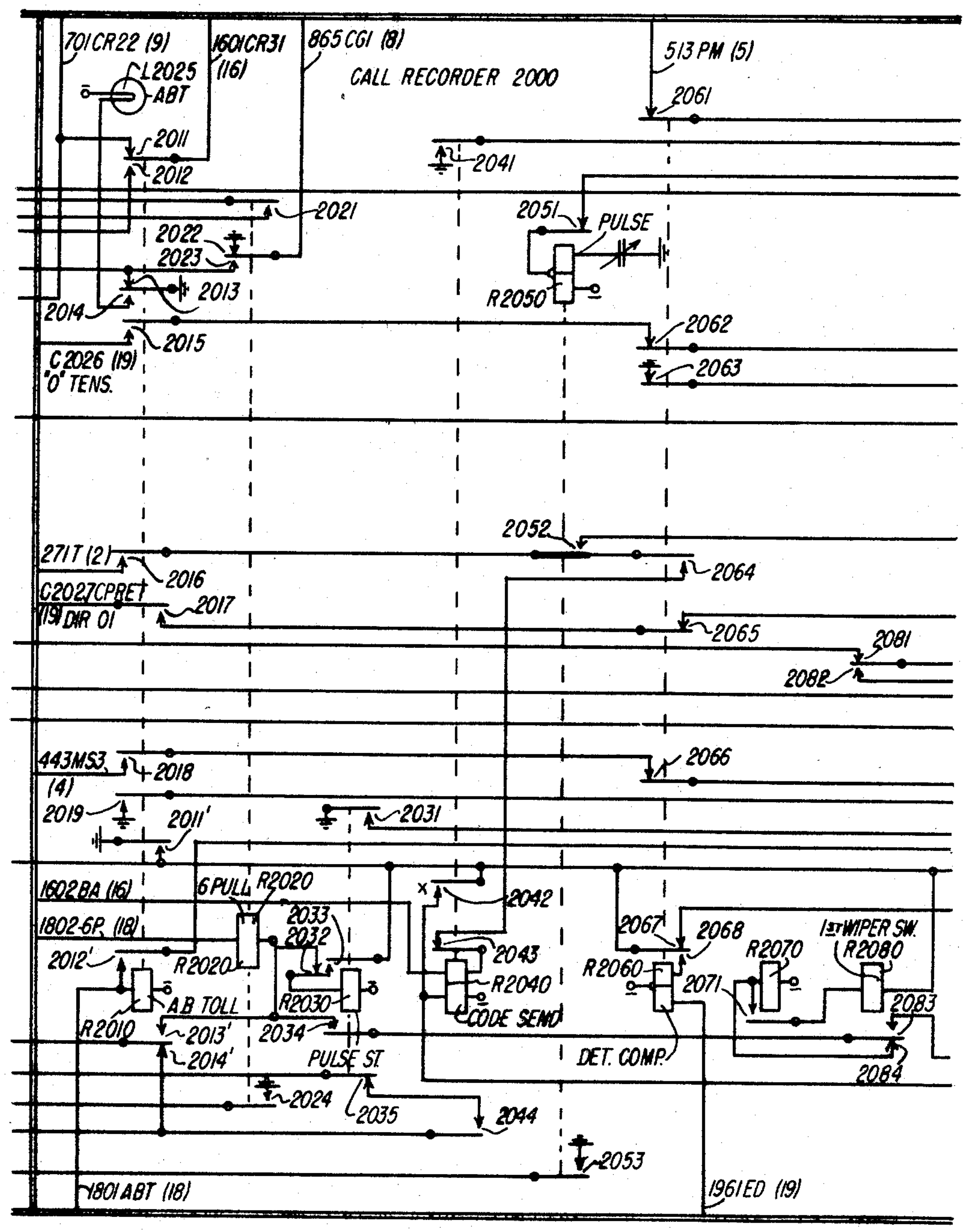
Figure 21:
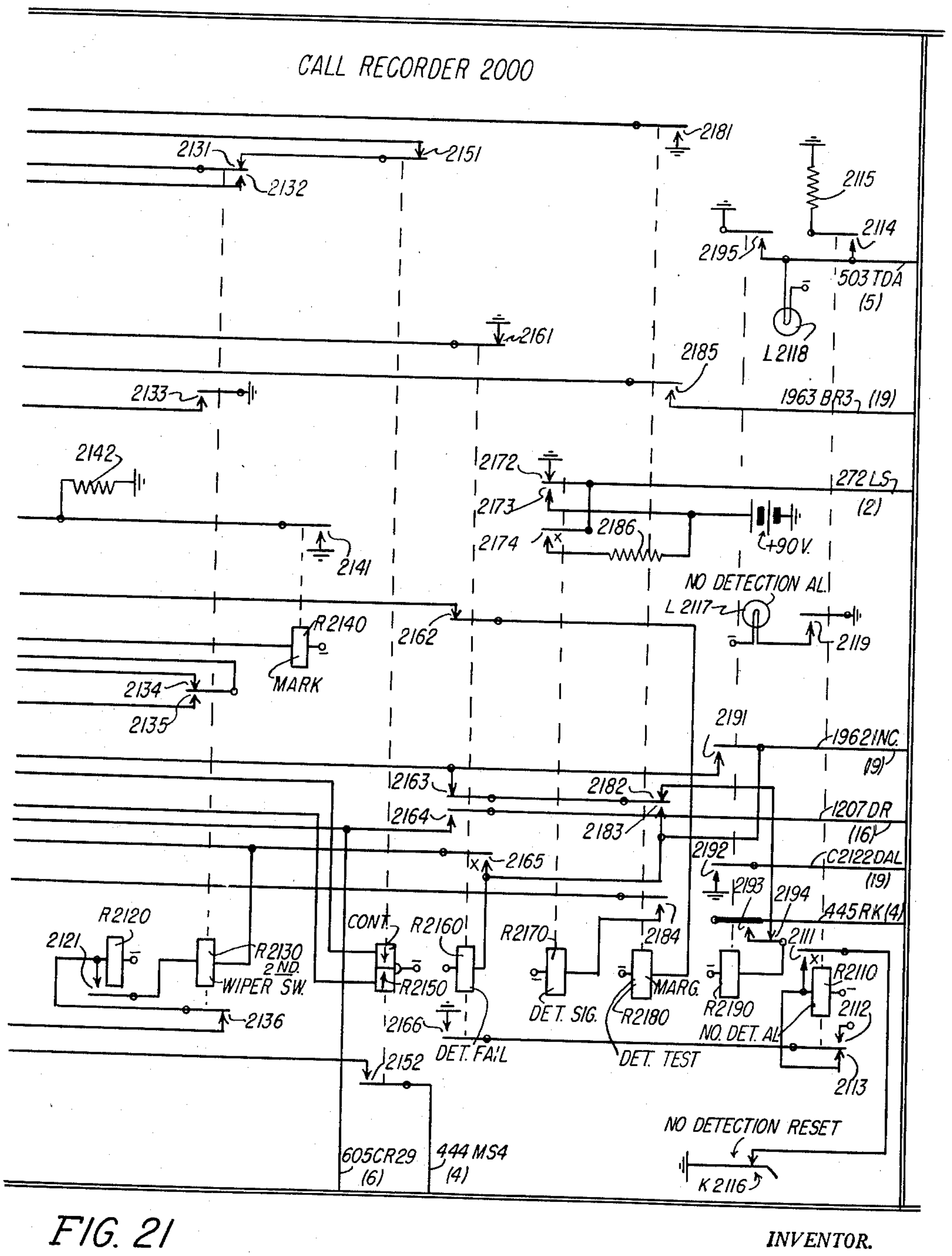

Figs. 4 to 8, inclusive, show the controller 400 portion of the director or register sender; Figs. 9 to 11, inclusive, show the call register 900 portion of the dirtctor; Figs. 12 and 13 show the digit register 1200 portion of the director which is utilized only when the call being handled by the director is a national toll call instead of a short-haul toll call; Figs. 14 to 16, inclusive, show the sender 1400 portion of the director and includes the send sequence switch 1420 that determines the sequence of transmission of the translated routing digits and registered digits; Figs. 17 and 18 show the translator connector 1700 and the coder 1800 portions of the director;

and, Figs. 19 to 21, inclusive, show the call recorder 2000 portion of the director. Thus, each director or register sender provided in the FLorida 3 exchange includes the details of the separate units illustrated in Figs. 4 to 21, inclusive.

The controller 400 portion of the director illustrated in Figs. 4 to 8, inclusive, is used primarily for controlling the various component parts of the director during the receipt of the switch setting impulses from the calling subscribers dial. The call register 900 portion of the director illustrated in Figs. 9 to 11, inclusive, show the various control relays which are used to determine the operation of the director based on the particular digits that have been registered in the first, second and third digit registers 1020, 1030 and 1040. The above mentioned digit registers are shown in Fig. 10 and four additional registers 1110 to 1140 are shown in Fig. 11 for registering the last four digits of a seven digit called number. A sequence switch 1010 is also illustrated in Fig. 10 to determine the sequence in which the different digits of the dialed number are to be stored in the respective registers of the call register 900 and in the respective registers of the digit register 1200. The seven digit registers shown in Figs. 10 and 11 are normally used on all six or seven-digit called numbers. Consequently, the called office code digits will normally be registered in the first three digit registers and the numerical portion of the directory number will be registered in the fourth to the seventh digit registers. However, whenever a national toll number is dialled, the first three registers will be utilized to register the three code digits of the national code, the next three digit registers will be utilized to register the called office code and the seventh to the tenth digit registers (Figs. 11 and 13) will be utilized to register the four numerical digits of the called number. The eleventh digit register 1340 shown in Fig. 13 is used whenever the numerical portion of the called directory number of a national toll call includes five instead of the usual four numerical digits. The fifth digit in this case is generally used to select the particular ringing frequency or the side of the line over which the selected ringing frequency is to be transmitted to ring the particular called station on a called party line.

The send sequence switch 1420 illustrated in Fig. 14 determines the order in which the routing digits registered in the coder 1800 (Figs. 17 and 18) are transmitted and the order in which the digits registered in the eleven digit registers in the call registers 900 and 1200 are to be transmitted by the director in the setting up of the connection. Figs. 17 and 18 show the translator connector 1700, including the six WXYZ11 to WXYZ16, inclusive, route registers; the control relays of the coder 1800 which are operated in accordance with the selective control of the translator so that the call will be properly routed to its designation; and the party station relays that are operated to register the position of a calling station on a party line. Figs. 19 to 21, inclusive, show the details of the call recorder 2000 which is called into use and associated with the director only in the event that the translator has determined that a record is to be produced of the particular call being handled. The call recorder 2000 is arranged so that it will control the sequence transmission of the various registered items of record information by means of the code send switch 1950, to the toll ticket repeater included in a connection for temporary storage. In addition to the foregoing, Fig. 19 schematically illustrates the detector 1900 and the detector assigner 1910 which may be of the type illustrated in Figs. 29 to 38, inclusive, of the Ostline Patent No. 2,586,704, granted February 19, 1952, and also shown in the Ostline Patent No. 2,639,330, granted May 19, 1953. Preferably, the detector assigner 1910 and the detector 1900 may be of the type shown in the Ivan V. Coleman application, Serial No. 487,572, filed November 11, 1955, now Patent No. 2,773,127, granted December 4, 1956.

Figure 22:
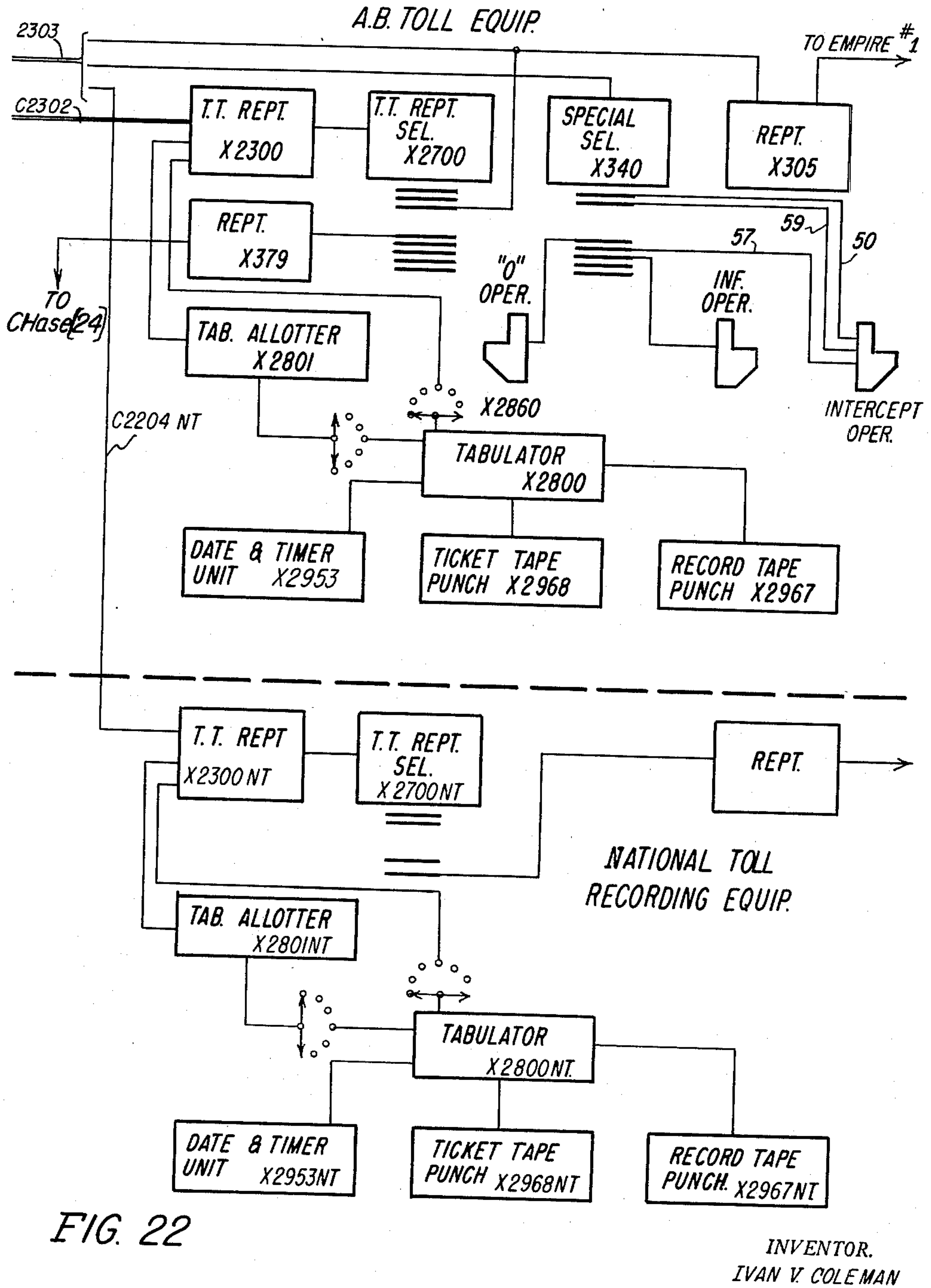

Fig. 22 illustrates in block diagram form the A.B. toll switching apparatus that is utilized in conjunction with the completion of any short-haul toll call and the recording apparatus that is temporarily associated with a toll ticket repeater for the purpose of making a record of the various items of information stored therein pertaining to a toll call. The details of the operations of the various schematically illustrated units of equipment for the purpose of storing and recording items of information pertaining to a telephone connection are shown and described in detail in the Ostline Patent No. 2,678,-353, granted May 11, 1954. Fig. 22 also illustrates in block diagram form, the national toll switching apparatus and the recording apparatus that is utilized in conjunction with the completion of any long-haul national toll call. This apparatus is substantially the same as that disclosed in the last-mentioned Ostline patent except that it is modified to store and to record the additional items of information forming the record of a national toll call.

Figs. 23 to 27, inclusive, show the details of the codexer 2300A and the translator 2700 which are temporarily associated with the coder 1800 portion of a calling director and with the call register 900 portion of the director to translate the first three digits of a called number into one, or as many as six appropriate routing digits and for registering the corresponding routing digits in the route registers of the coder 1800. In addition to the foregoing, the particular selected translate relay in the translator 2700 will call in the call recorder 2000 if a record is to be made of the call and to control the coder 1800 portion of the director so that whatever necessary digits of the called number will be transmitted by the director to complete the setting up of the connection to the desired called destination.

Figure 24:
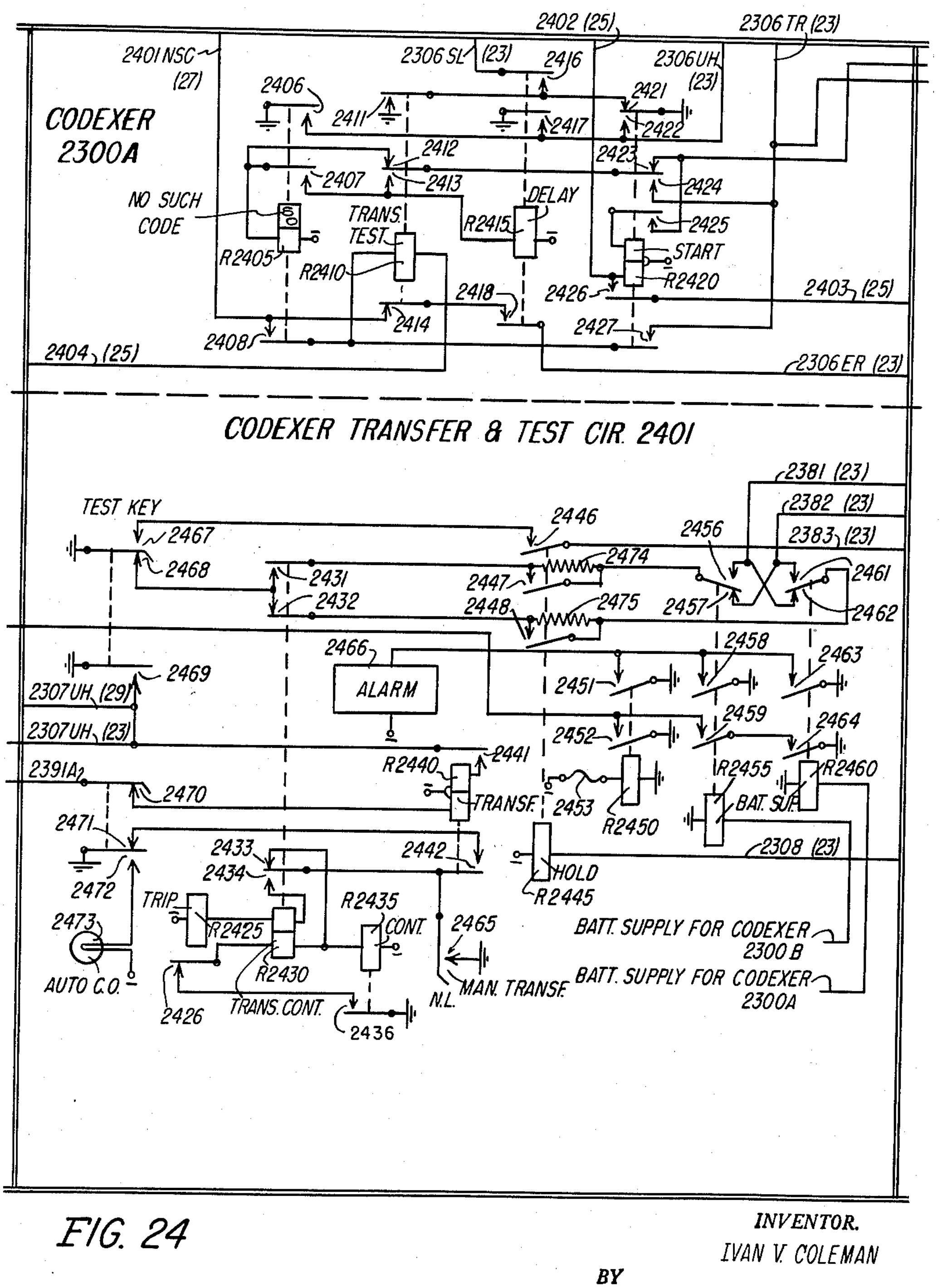

The codexer transfer and test circuit 2401 illustrated in Fig. 24 is utilized to either selectively or automatically substitute the codexer 2300B for the codexer 2300A whenever required so that any director may be connected to the translator 2700 by way of the codexer 2300B (schematically illustrated in Fig. 26) instead of the codexer 2300A.

Figure 28:
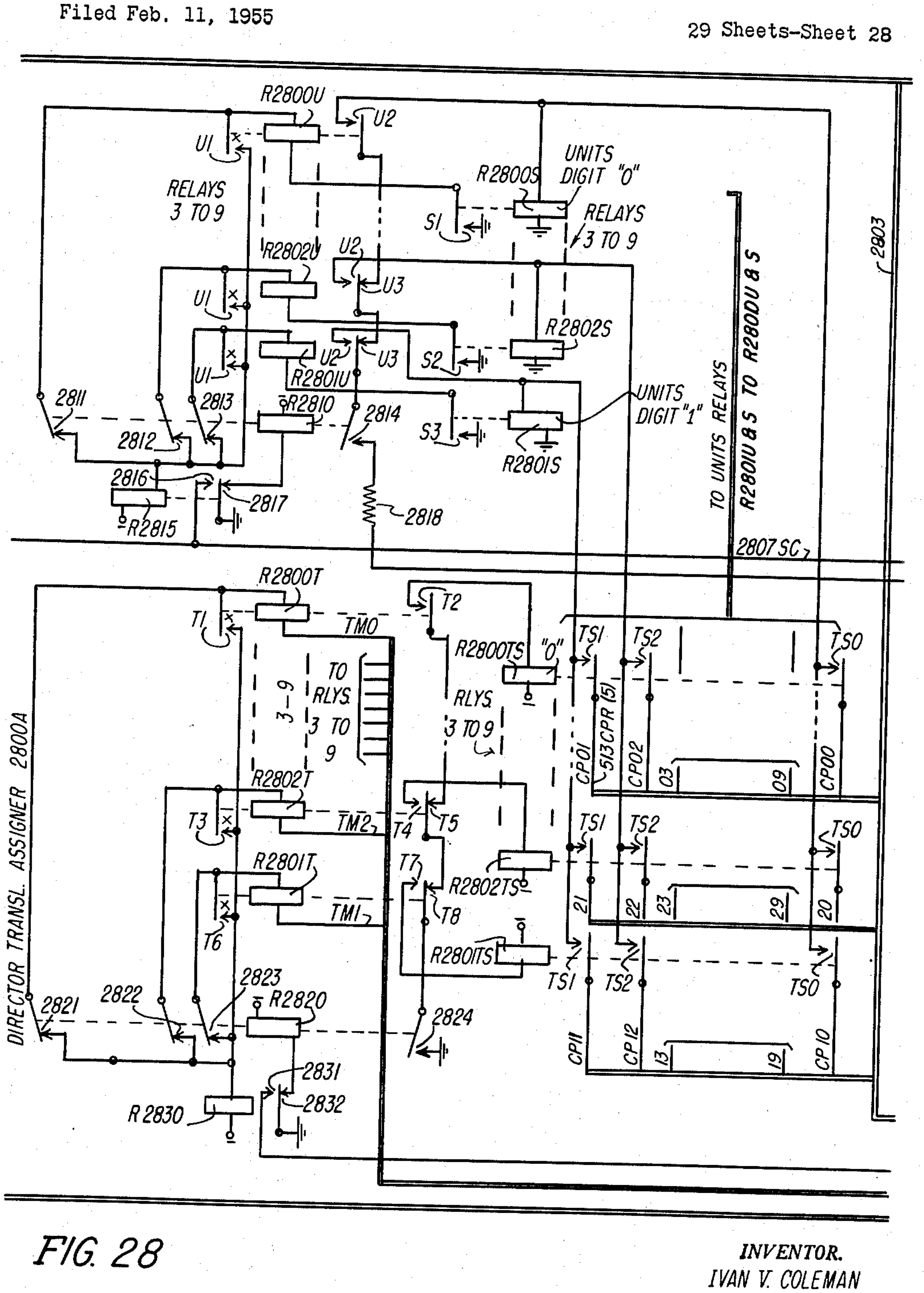
Figure 29:
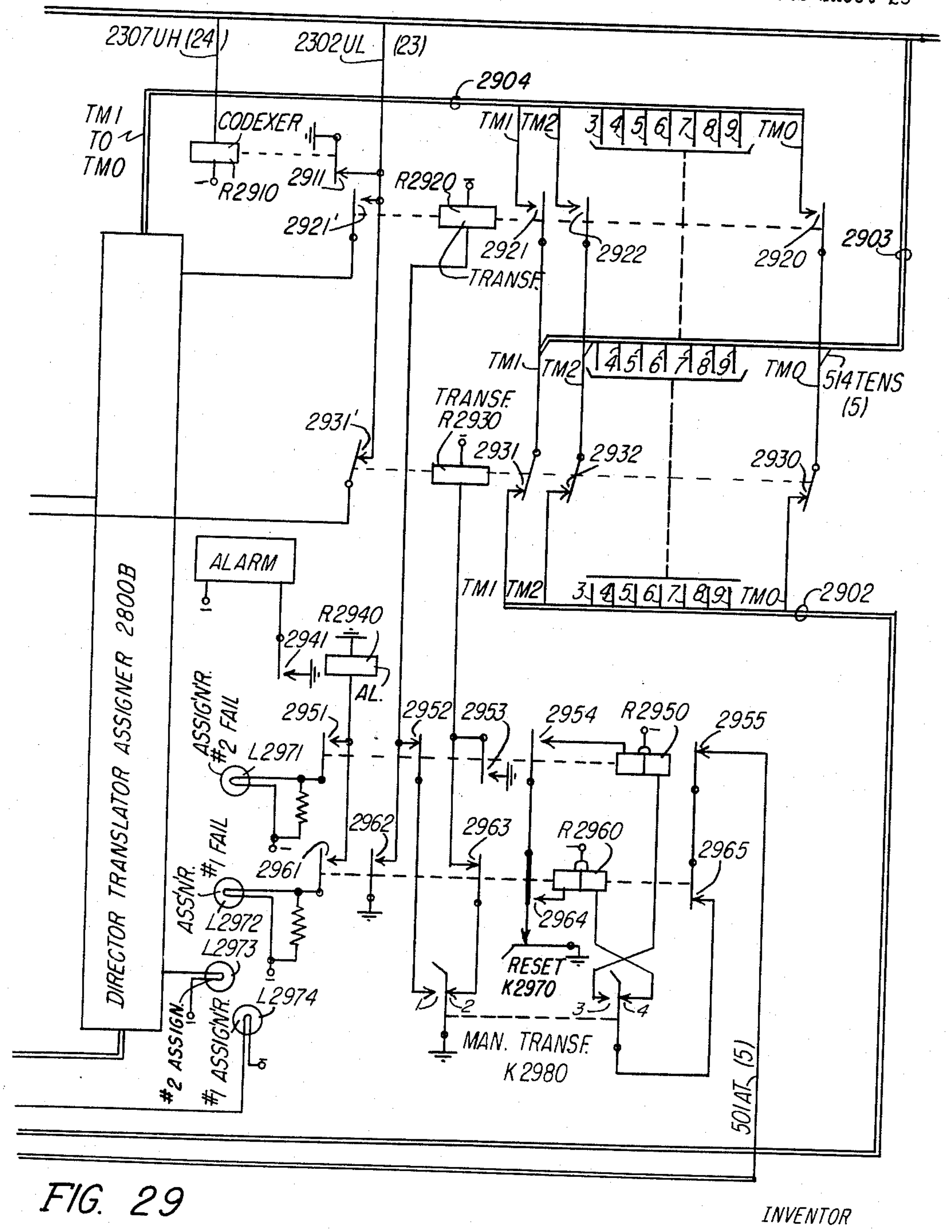

Figs. 28 and 29 show the details of the director assigner 2800A and a schematically illustrated stand-by director assigner 2800B. The assigner 2800A is provided for the purpose of associating the codexer 2300A (or 2300B) and the translator 2700 with any calling director so that the common codexer and translator may be temporarily associated with any calling director for its exclusive use.

Referring again to Figs. 1, 3 and 22, it will be seen that the primary selector 300 (Fig. 3), which corresponds to the schematically illustrated primary selector 300 of Fig. 1, has access by way of its associated bank contacts to various trunk lines extending to other switching apparatus included in the FLorida 3 exchange. As best shown in Figs. 1 and 22, level 1 of the primary selector 300 has access over cable C2204NT to ticket repeaters which are provided as a group to be used only in conjunction with calls that are to be completed on a national toll basis. The ticket repeaters included in the group accessible over level 1 of the primary selector 300, as well as the tabulating record producing apparatus are arranged so that they can record called exchange directory numbers that have been preceded by a three-digit national toll code. The national toll apparatus has been given the same reference characters as the corresponding apparatus provided for completing and recording short-haul A.B. toll calls except that the designations include the suffix N.T. to indicate apparatus used for national toll calls.

In Fig. 1, level 3 of the primary selector 300 has access to the local exchange switch train including the selectors X315 and X320 and the connectors, such as the connector X325, for completing local calls to other subscriber lines terminating in the illustrated FLorida 3 exchange.

As shown in Figs. 1 and 22, level 4 of the bank contacts of the primary selector 300 has access by way of cable C2302 to the regular short-haul A.B. toll ticketing apparatus including the toll ticket repeater X2300 and the associated ticket repeater selector X2700A for extending toll connections, by way of the repeater X305, to the EMpire 1 exchange and by way of the repeater 379 to the CHase exchange. All calls completed over the trunks including toll ticket repeaters, such as the toll ticket repeater X2300, are recorded by means of the apparatus including the ticket repeater finder X2860, the tabulator allotter X2801, the tabulator X2800, the ticket tape punch X2968, the record tape punch X2967 and the date and timer unit X2953.

In level 5 in the associated bank contacts, the primary selector 300 has access to trunk lines extending to the special selectors, such as X340, so that connections may be established through the latter selector to the intercept operator position 50, the "0" operator position and the information operator position 113.

Over level 8, the primary selector 300 has access to the repeaters, such as X305, so that calls may be extended to the EMpire 1 exchange without including any of the toll ticketing repeaters, such as X2300, or the associated recording apparatus. In other words, certain calls may be completed to the EMpire 1 exchange from certain subscriber lines in the FLorida 3 exchange without the use of the toll ticketing apparatus.

It may be well to point out at this time that the tabulator allotter X2801 is arranged to select an idle tabulator X2800 and to cause it to be associated with a particular calling toll ticket repeater X2300 by means of the ticket repeater finder X2860. When the tabulator X2800 is associated with a calling toll ticket repeater various items of record information pertaining to the telephone connection including the calling subscriber directory number, the called subscriber directory number, the time duration of the conversational connection and certain other items of information pertaining to the particular connection are transferred from the toll ticket repeater to the tabulator X2800. In the event that the national toll ticketing apparatus of Fig. 22 is included in the connection, then the information transferred as noted above includes the three digit national toll code. The toll ticket repeater involved is generally released as soon as all of the items of information have been transferred. If the record tape and ticket tape punch mechanisms X2967 and X2968 are available, then the tabulator X2800 will control these mechanism to perforate tapes in accordance with the items of record information that have been stored in the tabulator. Also, the date and time that the recording takes place is also registered by the punch mechanism. Thus, perforated tapes containing a record of the various items of information pertaining to each toll connection are produced for use by the telephone company.

All of the recording apparatus described above, including the ticket repeater X2300, the ticket repeater selector X2700, the tabulator allotter X2801, the tabulator X2800 and the ticket repeater finder X2860 are disclosed and described in detail in the above mentioned Ostline patent No. 2,678,353.

*The general arrangement of the telephone system*

The telephone system disclosed in the drawings and described herein, serves a large metropolitan area and the adjacent surburban areas which may be divided into a plurality of different zones, each zone including one or more different exchanges. The telephone equipment schematically illustrated in Fig. 1 is provided in the FLorida 3 exchange and certain of the apparatus is shown in greater detail in the remaining drawings. It should be understood, however, that each of the exchanges in the network of the telephone system may be substantially identical to the FLorida 3 exchange. It should also be understood that the equipment and apparatus provided in the FLorida 3 exchange is arranged so that it may be utilized in conjunction with the establishment of telephone connections on the national toll basis. In order to make a national toll call, the directory numbers of any desired called subscriber, for example, in the entire United States may be called without the aid of the toll operator by merely prefixing the desired called subscriber directory number (exchange name and line number) with a three digit national toll code assigned to the particular area in which the desired called exchange is located.

Each of the exchanges forming the network including the FLorida 3 exchange serves 10,000 subscriber lines. All of the directory numbers of the subscribers in the FLorida 3 exchange, as well as the directory numbers of the subscribers in other exchanges are usually seven-digit numbers including a three-digit office code designation and a four-digit numerical designation. Subscriber stations in certain exchanges, including the CHase exchange are identified by a two-digit office code, instead of the usual three-digit office code, and the usual four-digit numerical portion. Thus, it will be appreciated that the third digit of calls to subscribers in the CHase exchange will be the first digit of the numerical portion of the directory number, whereas, the third digit of calls to other exchanges will be the third digit of the office code.

At this point, it may be well to note that each of the subscriber dials or calling devices are arranged, in a conventional manner, with ten finger holes corresponding respectively to the digits 1 to 9 and 0, and that each of the digits have corresponding letters which may be dialed in accordance with the first two letters of any called exchange name. It should also be understood that if the office code of the called exchange includes three digits instead of the previously mentioned two letters and a digit, the called office code digits will correspond to the first three letters of the called exchange name. The ten digits of the dial and the corresponding letters for each of the digits are as follows.

| Digits: | Letters |
|---|---|
| 1 | ---- |
| 2 | ABC |
| 3 | DEF |
| 4 | GHI |
| 5 | JKL |
| 6 | MNO |
| 7 | PRS |
| 8 | TUV |
| 9 | WXY |
| 0 | Z (operator) |

*The apparatus incorporated in the FLorida 3 exchange*

Preferably, each exchange of the telephone system comprises apparatus substantially identical to that provided in the FLorida 3 exchange as best illustrated in Fig. 1. This apparatus serves the terminals respectively terminating the private subscriber lines TX3 and TR3, the pay station line TP3 and the terminals commonly terminating the party line serving the substations 201P1 to 201P5, inclusive. The switching equipment included in the FLorida 3 exchange comprises a number of line circuits individually associated with the above identified subscriber lines and including the line circuits 205, and 205A to 205C, inclusive. At this point it is noted that the private subscriber substation TX3 is rendered extended service facilities and is of the class 1 type. The private subscriber substation TR3 is rendered free local service and is of the class 2 type. The substation TP3 is a pay station and is of the class 3 type which is denied toll service. The five-party line is of the class 2 type. The ordinary private subscriber substations TR3 of the class 2 type and the party subscriber substation of the class 2 type are rendered free local service to all subscriber substations terminating in the FLorida 3 exchange and they are rendered automatic short-haul toll service to all other exchanges served by the network and they are rendered national toll service to all other exchanges that may be reached on a long-haul toll basis. The extended service subscriber substation TX3 of the class 1 type is rendered free automatic local service, free automatic toll service to certain nearby exchanges, automatic short-haul toll service to other exchanges of the network and automatic long-haul toll service on national toll calls. The pay station subscriber TP3 of the class 3 type is rendered automatic local service provided the necessary coins have been deposited in the telephone instrument, and toll service to any other exchange on either a short-haul or a long-haul toll basis by means of the manual operator at the "0" operator position.

The various line circuits individual to the above mentioned substations have been shown (Fig. 1) in a common group and terminate in the bank contacts accessible to the line finder 240. However, as previously noted, it should be understood that the different line circuits actually termniate in different groups of line finders corresponding to the different classes of lines. The switching equipment in the telephone exchange also includes the line finder 240 and the distributor 242 and a primary selector 300. As illustrated, the primary selector 300 may be utilized by any one of the subscriber lines regardless of the class of service, but as actually used, the primary selectors are divided into three groups serving, respectively, the three different classes of service. The particular class of service to be handled by any primary selector is governed by the X and Y strapping shown in the lower portion of Fig. 3.

The FLorida 3 exchange is also provided with a group of directors, sometimes referred to as register senders, including as many as 100 directors which are accessible to the various primary selectors by means of director hunters, such as 250, individual to each primary selector 300. Addititional groups of directors may also be provided if the amount of traffic to be handled through the exchange is too great to be handled by one group of directors. Furthermore, each director comprises a controller 400, a call register 900, a digit register for use in connection with national toll calls, a sender 1400, a coder 1800, and a call recorder 2000.

The translator 2700 is common to all of the directors in the exchange and may be associated with any calling director by means of the director translator assigner 2800A and the codexer 2300A. In the event that either the director translator assigner 2800A or the codexer 2300A fail to properly operate, the alternate translator assigner 2800B and codexer 2300B will be automatically substituted in order to connect the translator 2700 to the proper calling director.

The exchanger is also provided with a schematically illustrated detector 1900 and an associated detector assigner 1910 for associating the common detector with any calling director. The detector 1900 is provided to identify the directory number of any calling subscriber substation, whenever the director and the translator determine that a record is to be produced of the call, and to register the directory number in the call recorder 2000 of the particular director in use. The detector 1900 is common to all of the directors of the exchange and it may be of the type disclosed in the Ostline Patent No. 2,639,330, granted May 19, 1953, but preferably the detector 1900 should be of the type illustrated in the previously mentioned Coleman patent.

The FLorida 3 exchange is also provided with a local switch train including the local selectors X315 and X320 and a number of connectors, such as X325, for extending connections to the local subscribers in the FLorida 3 exchange. Additional local switches, including the special selector X340, are utilized to extend connections to the intercept, information, and "0" operator positions of the switchboard included in the exchange. It should be understood, however, that the connectors are of the party type and in the present system, such connectors may be utilized to extend connections to different party subscriber substations. If desired, the connectors may be regular individual type connectors but divided into separate groups corresponding to the five different stations on a party line wherein each group of connectors, in accordance with the different parties, will transmit different ringing frequencies selectively to signal the substation on a party line having ringers that will respond to the corresponding frequency.

Furthermore, the FLorida 3 exchange includes the AB toll recording equipment which is utilized to make a recording of each short-haul toll call. This equipment includes the toll ticketing repeater X2300 and the associated ticket repeater selector X2700 which has access to different groups of trunks or toll lines interconnecting the FLorida 3 exchange with other exchanges of the telephone network including the EMpire 1 exchange and the CHase exchange. The AB toll recording equipment also includes a tabulator allotter X2801 for associating an idle one of the tabulators X2800 with a calling one of the ticket repeaters X2300 through the ticket repeater finder X2860. In this manner, various items of record information pertaining to the telephone connection stored in the toll ticket repeater are transferred to the selected tabulator. Each of the tabulators is individually associated with a record tape punch X2967 and a ticket tape punch X2968 to produce perforated tapes containing a record of the various items of information transferred to the tabulator. The exchange is also provided with a number of groups of ordinary repeaters, including the repeaters X305 and X379, which are accessible to the ticket repeater selector X2700 to complete connections to other exchanges, such as the EMpire 1 exchange and the CHase exchange. All of the foregoing AB toll recording equipment, as illustrated in the present system, is accessible from the fourth level of the bank contacts of the primary selector 300. However, it should be noted that substantially identical ticketing apparatus is provided for the national toll recording equipment which is accessible from the first level of the primary selector 300. The national toll recording equipment is arranged to handle the additional three toll code digits identifying the different areas to which the long-haul toll calls may be extended.

Each subscriber substation in the exchange is provided with the usual substation apparatus including a telephone substation instrument, a ringer, and a calling device or dial. The calling device provided at each ordinary subscriber substation, at each extended service subscriber substation, and at each pay station is of conventional construction and arrangement. However, the calling device disposed at each of the party subscriber substations is of special construction and arrangement in that it is provided with a special station identifying cam of substantially the same type as that disclosed in the Ostline Patent No. 2,410,520, granted November 5, 1946. The calling device of the special construction shown in the above mentioned patent, in addition to the usual set of loop or switch controlling impulsing contacts, such as the contacts 292 (Fig. 2) also include a set of cam springs, such as 282. In each of the special calling devices, impulsing contacts are operated to transmit a variable number of series of switch control loop impulses in accordance with the digit selected on the pull of the finger plate of the dial. Each of the calling devices of the special construction also includes cam springs which are operated by an associated cam during the return movement of the dial finger plate to transmit a number of station identifying ground impulses just prior to the full restoration of the finger plate to its normal position. When the calling device at the first party subscriber substation 201P1 is pulled in accordance with a digit 2 or more, the associated cam 281 operates the set of cam springs 282 to transmit one station identifying ground impulses over the party line conductors 202 and 203, after all of the switch control loop impulses have been transmitted. The same operations will take place at the second party subscriber substation 201P2 except that the cam thereat is arranged so that it will control the cam springs 284 to transmit two station identifying ground impulses after all of the loop impulses have been transmitted. At the third party subscriber substation 201P3, the cam 285 thereat will control the cam springs 286 to transmit 3 station identifying ground impulses during the last portion of the return movement of the dial. In the last-mentioned case, the first of the series of three ground impulses is transmitted just prior to the transmission of the last switch control loop impulse and the remaining two ground impulses are transmitted after the transmission of the last switch control loop impulse. At the fourth party subscriber substation 201P4, the cam 287 thereat will control the cam springs 288 so that two station identifying ground impulses are transmitted, in the same positions during the return movement of the finger plate as the first and third impulses are transmitted by the cam 285 at the third party subscriber substation 201P3. At the fifth party subscriber substation 201P5, the cam 290 thereat is arranged so that it will control the cam springs 291 to transmit the single station identifying ground impulse in the same position as the third impulse transmitted by the cam 285 at the third party subscriber substation 201P3.

It should be noted that in the present telephone system, code storage registering apparatus and code marking conductors are employed for the purpose of registering various digits and for transferring registered digits from one unit to another. The combinational code employed is generally referred to as a four pulse or WXYZ code and is of the type wherein any digit from 1 to 9, inclusive, and 0 may be registered and transmitted by operating any one or any two of four relays or by marking any one or any two of four marking conductors in accordance with the following code.

| Digit: | Code |
|---|---|
| 1 | WX |
| 2 | WY |
| 3 | WZ |
| 4 | XY |
| 5 | XZ |
| 6 | YZ |
| 7 | W |
| 8 | X |
| 9 | Y |
| 0 | Z |

*Initiation of a call*

A description will now be given of the operation of the switching apparatus included in the FLorida 3 exchange and for this purpose it will be assumed that a call is initiated by a party subscriber at one of the substations on the party line shown in Fig. 2.

When a calling subscriber removes a receiver at his telephone instrument, the usual loop circuit, including the line conductors 202 and 203 and the impulsing springs at the calling station is completed for operating the line circuit 205. In response to the completion of the loop circuit the line circuit 205 initiates operations whereby the distributor 242 will select a line finder, such as 240, by way of the rotary switch 241 and the line circuit will mark the terminals of the calling party line in the bank contacts accessible to a group of line finders including the line finder 240.

It will be assumed that the rotary switch 241 selects the line finder 240 and as a result thereof completes a circuit including the start relay R210. This start relay corresponds to the relay R140 shown in Fig. 1 of the previously noted Bakker Patent No. 2,289,896 and reference may be had to this patent for the complete description of the operation of the line finder. As soon as the relay R210 operates, at its contacts 211, it applies battery potential by way of the resistor 212, conductor C245, contacts 316 and 323, the lower winding of the line relay R330, eleventh rotary step cam contacts 348 and ground. The line relay R330 in the primary selector 300 now operates to initiate operations whereby the director hunter 250 will search for an idle director.

In addition to the foregoing, the start relay R210 completes circuits (not shown) for controlling the line finder 240 to operate its wipers 234 to 238, inclusive, in a vertical direction to search for the level in the associated banks terminating the calling party line and then in a rotary direction to find and connect with the bank contacts terminating the calling line circuit 205 all in a well known manner. Thus, it is apparent that the start relay R210 in the line finder 240 simultaneously operates the line relay R330 in the primary selector 300 and it initiates the hunting operation of the line finder 240 to search for a calling line. As soon as the line relay R330 operates it completes a circuit including the contacts 328 and 332 for operating the hold relay R340. At its contacts 341, the hold relay R340 applies ground potential by way of the contacts 318, the busy key contacts 309 and the conductor C246 to the line finder 240 in order to retain the latter switch and the line circuit 205 in their operated positions after the line finder finds the calling line circuit. Also, at its contacts 341, the hold relay R340 applies ground potential by way of the eleventh rotary step cam contacts 366, contacts 327 and 342, vertical off-normal contacts 391 and the upper winding of the transfer relay R350 to battery. The relay R350 operates over this circuit and at its contacts 354 completes a circuit including a winding of the test relay R310, contacts 252 and the winding of the magnet M251 to battery. However, due to the circuit including the contacts 355, 313′, the conductor 307G and the wiper 259 on the director hunter 250, the above circuit for operating the director test relay R310 is short circuited as long as the wiper 259 encounters a grounded bank contact.

The ground potential encountered by the wiper 259 will complete a circuit for the magnet M251 which is independent of the previously traced circuit, including the winding of the relay R310, so that the magnet M251 can advance the wipers 253 to 260, inclusive, step-by-step to search for an idle director. An idle director will be indicated by an absence of ground on the conductor corresponding to the conductor 274G and, therefore, the stepping circuit for the magnet M251 is interrupted. When this occurs, the short circuit for the director test relay R310 is removed therefrom so that the previously traced circuit, including the contact 354, the relay R310 and the magnet M251 is completed. The relay R310 operates in series with the magnet M251 but due to the resistance of the relay R310, the magnet M251 does not operate at this time. As a further result of the operation of the director test relay R310, at its contacts 312′, it now applies ground potential to the conductor 307G in order to mark the seized director busy to all other director hunters, such as the director hunter 250, having access thereto. Furthermore, at its contacts 311 and 314, the relay R310 transfers the conductors C244 and C245 from the circuit including the windings of the line relay R330 to a circuit including the conductors 301LR and 302LT extending by way of the director hunter 250 to the controller 400 of Fig. 4. Simultaneously therewith, the relay R310, at its contacts 312 and 315, connects the circuit including the windings of the relay R330 to the conductors 303R and 304T of the director hunter 250 to the call register (Figs. 9 to 11, inclusive) and to the call recorder (Figs. 19 to 21, inclusive).

Figure 4:
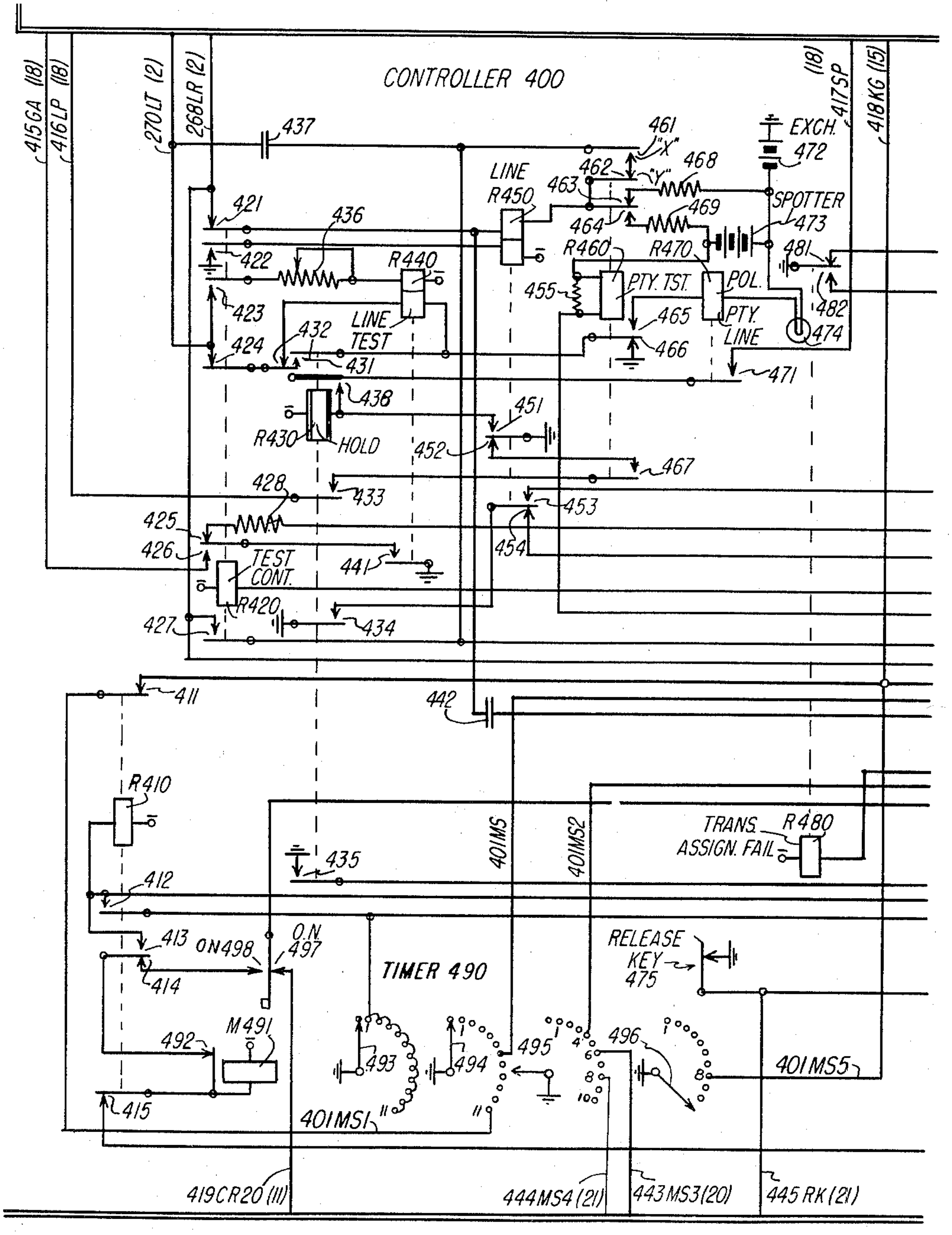

More specifically, the loop circuit from the calling subscriber line now extends over a first branch including the conductor C244, contacts 311, conductor 301LR, wiper 253, conductor 268LR extending to Fig. 4, contacts 421, the upper winding of the line relay R450, contacts 463, resistor 468 and the negative terminal of the 50 volt exchange battery 472 to ground. The other branch of the loop circuit from the calling subscriber line includes the conductor C245, contacts 314, conductor 302LT, wiper 255, conductor 270LT extending to Fig. 4, contacts 424 and 432, the lower winding of the line test relay R440 and ground at contacts 466.

It will be appreciated that during the time that the director hunter 250 is searching for an idle director, the line finder 240 is also searching for the calling subscriber line. If the director hunter 250 finds an idle director before the line finder 240 finds the calling line, then the resistance battery applied to the conductor C245 by the operated start relay R210 is extended by way of the contacts 314, conductor 302LT, wiper 255, conductor 270LT extending to Fig. 4, contacts 424 and 432, the lower winding of the test relay R440 to ground at contacts 466. This will cause the line test relay R440 to operate at this time and apply ground potential by way of its contacts 441, contacts 425, resistor 428, conductor 273H extending to Fig. 2, wiper 258, conductor 306H, contacts 311′, winding of the director test relay R310, contacts 252 and the winding of the magnet M251 to battery. This circuit will hold the director test relay R310 locked in its operated position under control of the director during the time that the line finder 240 continues to search for the calling subscriber line.

As soon as the line finder 240 finds the calling subscriber line, it switches through, in a conventional manner, and connects the calling subscriber loop circuit including the conductor C229 and C230 to the conductors C244 and C245. In addition to the foregoing, the line finder also dismisses the distributor 242 so that the latter mechanism is available for use in distributing line finders for use by other calling subscriber lines. Furthermore, the switch-through operation of the line finder 240 causes the restoration of the start relay R210 in order to remove the resistance battery potential from the conductor C245. This operation would normally cause the restoration of the line test relay R440 in the controller 400, but due to the fact that the line finder has switched through the calling subscriber loop circuit to the conductors C244 and C245, the above traced loop circuit is now completed for the upper winding of the line relay R450 in series with the circuit for the lower winding of the line test relay R440. Consequently, the line relay R450 now operates and completes at its contacts 451 an obvious circuit for operating the hold relay R430 and the latter relay, at its contacts 431 and 432, disconnects the lower winding of the line test relay R440 from the previously traced loop circuit including the upper winding of the line relay R450. The line test relay R440 now restores to normal and, at its contacts 441, will interrupt a point in the previously traced circuit for locking the director test relay R310 in its operated position, but a holding ground potential will be maintained on the conductor 273H as soon as the seizure relay R640 operates.

As a further result of the operation of the hold relay R430, at its contacts 435, it completes an obvious circuit for operating the seizure relay R640. The relay R640, at its contacts 644, now connects the hold relay R720 by way of the contacts 684 and 644, conductor 273H extending to Fig. 2, wiper 258, conductor 306H, contacts 311′, the winding of the director test relay R310, contacts 252 and the winding of the rotary magnet M251 to battery. In this circuit the relay R310 is retained in its locked position and the hold relay R720 operates in series therewith.

In view of the foregoing description, it will be understood that the line relay R450 in the controller 400 portion of the director operates as soon as the line finder 240 switches through to connect with the calling subscriber line. The latter relay in turn operates the hold relay R430 and the hold relay R430 in turn operates the seizure relay R640 and the latter relay causes the operation of the hold relay R720.

Referring again to the primary selector 300, it should be noted that as soon as the director test relay R310 operates and connects the line relay R330 to the conductors 303R and 304T, the line relay R330 restores to normal. As a result thereof, it interrupts at its contacts 332, the circuit for the hold relay R340 and the latter relay slowly restores to normal to interrupt, at its contacts 341, the previously traced circuit for the transfer relay R350 which also restores to normal. Consequently, the primary selector 300 is now fully restored to normal except for the operated director test relay R310. The holding ground potential that was applied to the conductor C246 by the contacts 341 on the primary selector 300 is now applied to the conductor C246 over a circuit including the busy key contacts 309, contacts 317, conductor 305LS, wiper 257, conductor 272LS extending to Fig. 21 and ground at contacts 2172. Thus, the line finder 240 and the line circuit 205 are held in their operated positions under control of the holding ground applied to the conductor C246 from the call recorder 2000 portion of the director.

Referring now to the controller 400 portion of the director, it will be recalled that the seizure relay R640 operated as described above in response to the completion of the circuit therefor by the operation of the hold relay R430. As soon as the seizure relay R640 operates, it prepares at its contacts 645, a point in the circuit for the digit relay R740 which will remain in its operated position during the transmission of the pulses under control of the contacts 454 on the line relay R450. At its contacts 641, the relay R640 completes a circuit for operating the director busy relay R510 and the latter relay, at its contacts 511, applies ground potential to the conductor 274G extending to Fig. 2 in order to mark the present director busy in the bank contacts of all of the director hunters, such as 250.

As a further result of the operation of the seizure relay R640, at its contacts 642′, it applies ground potential to the conductor 605CR29 extending to Fig. 16 in order to operate the relay R1670 in the sender portion of the director. Other contacts controlled by the operation of the seizure relay R640 provide various relay holding and locking ground potentials which need not be explained at the present time.

Finally, at the contacts 643′, the seizure relay R640 connects the two-second pulse conductor C656 to a circuit including the contacts 415 and the winding of the magnet M491 on the timer 490. A ground pulse of short duration is applied to the conductor C646 every two seconds by a time interrupter (not shown) so that the magnet M491 will operate and restore every two seconds as long as the above mentioned circuit is retained. Each time the magnet M491 operates and restores it advances its wipers 493 to 496, inclusive, one step in the clockwise direction. The timing circuit, as will be understood from a later description, allows approximately 24 to 36 seconds for the calling subscriber to dial a called number after the controller 400 portion of the director has been seized. Other controls are exercised under control of the timer 490 to determine whether or not the first digit has been dialed by the calling subscriber within 12 seconds, to determine whether or not the translator assigner has been operated to assign a translator within 22 seconds, and various other time controls to be described subsequently.

As soon as the hold relay R720 operates in the manner described, it locks itself by way of its contacts 722 to the previously traced circuit, including the conductor 273H, by way of a circuit that is independent of the contact 684. As a further result of the operation of the hold relay R720, at its contacts 723, it completes a circuit including the contacts 655 and 634 for operating the class test relay R620. The operation of the relay R620 initiates a test whereby a determination is made of the class of the calling line as is indicated by the particular potential applied to the conductor 308S in the primary selector 300 being used in the present call by the calling subscriber.

Figure 23:
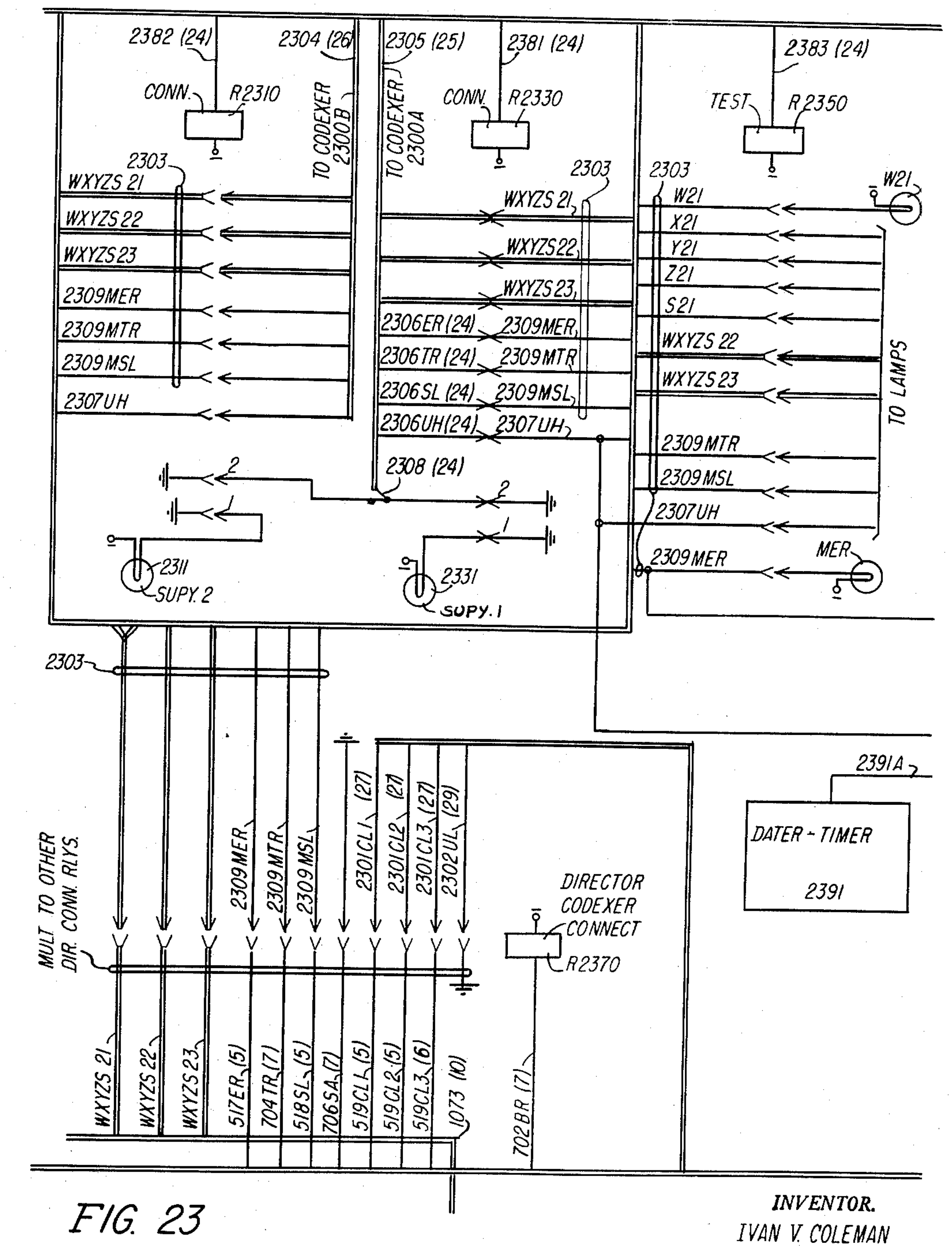

It was previously mentioned that the calling subscriber line may be provided with any one of three different classes of service. The class of service of the particular calling subscriber line is indicated to the director by a marking placed on the conductor 308S. Different groups of primary selectors will have different potentials applied to the conductor 308S to indicate corresponding different groups of lines of different classes. In the primary selector 300, the contacts 357 may be disconnected to indicate class 1; it may be connected to the ground potential to indicate class 2; and it may be connected to battery potential by way of the resistance 393 to indicate class 3. Thus three different classes of service may be indicated respectively by a connection of a ground potential, by the connection of a resistance battery potential or by the absence of any potential connected by way of the contacts 357, 322' and 314' to the conductor 308S and then by way of the wiper 260, conductor 275S extending to Fig. 6 and the contacts 622 and the winding of the class 2 test relay R580 to battery. A test is consequently made at this time to determine whether or not the ground potential of a class 2 calling line has been applied by the primary selector 300 to this circuit. If the class 2 test relay R580 operates, it will lock itself in its operated position over a circuit including its contacts 582 and ground at contacts 642. Also, at its contacts 583 a circuit including ground at contacts 614, conductor 519CL2 extending to Fig. 23 is prepared whereby the class indication is transmitted to the translator. A similar circuit may also be completed for illuminating a lamp (not shown) indicative of a class 2 call.

In the event that the calling line is not a class 2 line, the class 2 test relay R580 will remain in its restored position. Within a short period of time after the initial operation of the class test relay R620, the slow-to-operate control relay R630 operates and at its contacts 634 opens the circuit for the relay R620 which now restores to normal. As a result of the latter restoration, the class marking on the conductor 275S is now connected by way of the contacts 621, 631, and 611, winding of the class 3 test relay R610 and ground at contacts 642. If the calling line is of the class 3 type, the conductor 275S will have resistance battery potential thereon in order to operate the class 3 test relay R610. At its contacts 612, the relay R610 will lock itself by way of the resistance 615 to battery and, at its contacts 611, it will interrupt its initial energizing circuit. Furthermore, at its contacts 613, the class 3 test relay R610 will apply ground potential to the conductor 519CL3 extending to Fig. 23 in order subsequently to indicate the class of the calling line to the translator. Furthermore, the relay R610 may be provided with additional contacts, such as 613, to illuminate a lamp to indicate the class 3 calling subscriber line.

In the event that neither the class 2 test relay R580 nor the class 3 test relay R610 is operated due to the fact that no potential has been applied to the conductor 275S from the primary selector 300, a circuit including the contacts 614 and 584 would be completed for grounding the conductor 519CL1 extending to Fig. 23 to indicate that the call is of the class 1 type. Also, a similar circuit may be completed for illuminating a class 1 lamp individual to the calling director.

As a further result of the restoration of the class test relay R620 and before the restoration of the control relay R630, a circuit including the contacts 623 and 632 is completed for operating the class control relay R650 which locks itself by way of its contacts 651 to ground at contacts 642. Additional controls exercised in response to the operation of relay R650 will be described hereinafter.

In the above description, it was noted that the relay R630 operated under control of the class test relay R620. At its contacts 633, the relay R630 completes a circuit for operating the test control relay R420 in order to connect the upper winding of the line test relay R440 to the previously traced circuit including the conductor 270LT.

More specifically, as soon as the test control relay R420 operates it completes, at its contacts 422, an obvious circuit for energizing the lower winding of the line relay R450 in order to hold the latter relay operated when the circuit for the upper winding thereof is opened at contacts 421. As a further result of the operation of relay R420, at its contacts 421, it disconnects the battery potential from the exchange battery 472 through the line relay R450 from the conductor 268LR; and, at its contacts 424, it disconnects the ground potential at the contacts 466 from the conductor 270LT. At its contacts 423, the relay R420 connects battery potential by way of the upper winding of the relay R440 and the resistor 436 to the conductor 270LT to test the tip side of the calling subscriber line to determine whether or not the line has been falsely grounded. If there is a low resistance ground leak on either the tip conductor 203 of the calling subscriber line or the ring conductor 202 of the calling subscriber line, the line test relay R440 will now operate. As a result of the operation of relay R440, ground potential, at its contacts 441, will be extended by way of the contacts 426 and conductor 415GA extending to Fig. 18 to operate the grounded line relay R1820 in the coder 1800. This relay upon operating will lock itself by way of the contacts 1824, contacts 1812, conductor 615LGC extending to Fig. 6 to ground at contacts 641' on the operated seizure relay R640. The line test relay R440 is adjusted so that it will operate only when the ground resistance values of the resistance ground leak on a calling line is less than 10,000 ohms.

Shortly after the above traced circuit is completed for operating the test control relay R420, whereby the above described line test may be made by the relay R440, the slow-to-operate control relay R630 restores to normal and, at its contacts 633, opens the circuit for the test control relay R420. The relay R420 now restores to normal in order to reconnect the conductors 268LR and 270LT to the previously traced circuits including the upper winding of the line relay R450 to battery and to ground at contacts 466. Therefore, the line relay R450 is retained operated from ground at contacts 422 when the grounded line test is being made and it is retained operated over the loop circuit including the conductors 268LR and 270LT as soon as the test is terminated. Also, the restoration of the test control relay R420 will cause the restoration of the line test relay R440 in the event that the latter relay has been operated. It will be appreciated, however, that if no ground potential is found on the calling subscriber line at the time the relay R420 is operated to perform the test, the relay R440 will remain in its restored position and will thus prevent the registration of a false ground condition on the relay R1820 in the coder 1800.

After the foregoing class test and grounded line test has been made, the class control relay R650 is operated and locked in its operated position in the manner previously described. As soon as the latter relay operates, it interrupts, at its contacts 655, a point in the previously described initial operating circuit for the class test relay R620 thereby to prevent the latter relay from operating incident to the restoration of the control relay R630. Finally, at its contacts 654, the relay R650 connects the dial tone signal applied to the dial tone conductor C527 by way of the contacts 532, 654, 664, tone condenser 442 to the previously traced loop circuit, including the calling subscriber line. In this manner the dial tone signal is transmitted to the calling subscriber to indicate that the digits of the called subscriber number may be dialed.

*Dialing the called number*

When the calling subscriber hears the dial tone signal, he may manipulate the dial at his substation in accordance with the code portion and the numerical portion of the called subscriber directory number. More specifically the calling subscriber may dial the first two letters of the desired called exchange, then the numerical digit of the particular called exchange followed by the four digits of the numerical portion of the called number. The two letters and the digit designating the called exchange are referred to as the called office code and are sometimes identified as the ABC digits of the called number.

From the above description, it will be understood that each subscriber number comprises seven digits and in certain instances, as previously pointed out, certain exchanges are identified by only a two digit code instead of the usual three digit code. In other words, the called subscriber will then be identified by a six digit instead of a normal seven digit number.

When the first digit is dialed by the calling subscriber, the line relay R450 (Fig. 4) follows the pulses of the digit in the well known manner to register this digit in the call register 900.

In response to the interruption of the calling subscriber loop circuit by the impulsing contacts, such as the contacts 292, the line relay R450 (Fig. 4) will restore and reoperate the same number of times as the number of interruptions of the digit dialed. On the first interruption of the loop circuit, that is the first impulse, the line relay R450 will momentarily restore to normal to complete, at its contacts 454, a circuit for operating the first digit register 1020 of the call register 900. This circuit may be traced from ground, and then by way of the contacts 434, 454, 662 and 686, conductor 604CR19 extending to Fig. 10, wiper 1014 of the receive sequence switch 1010 in engagement with the contact 1 in the associated contact bank, conductor 1001 and the winding of the magnet M1021 of the first digit register 1020 to battery. In this circuit, particular attention is directed to the fact that the sequence switch 1010 is arranged so that it will transfer the above mentioned impulsing circuit, including the conductor 604CR19 to each of the digit registers 1020 to 1140, inclusive, so that the seven digits dialed by a calling subscriber will be registered respectively in each of the seven digit registers over the conductors 1001 to 1007, respectively. The conductors 1062 to 1065, inclusive, are utilized whenever more than seven digits have been dialed by the calling subscriber and in particular when a ten or an eleven digit national toll call is dialed.

The above mentioned impulsing circuit includes a branch circuit which is completed from ground at contacts 434, 454, 662 and 645, rectifier 733 and the winding of the digit relay R740 to battery, whereby, the latter relay is operated and maintained operated during the dialing of each digit and restores to normal during the interdigital pause between the transmission of successive digits. As soon as the digit relay R740 operates, it completes, at its contacts 741, an obvious circuit for operating the sequence control relay R730. Since the digit relay R740 is of the slow-to-release type, it remains in its operated position during the pulsing of each digit and, consequently, retains the sequence control relay R730 operated during the dialing of each digit.

In view of the impulsing circuit traced above for controlling the magnet M1021 of the first digit register 1020, it will be understood that each time the line relay R450 restores it will cause the restoration of the magnet M1021 a corresponding number of times. Therefore, the impulses of the first digit will control the magnet M1021 to register the first dialed digit in the first digit register 1020. In other words, the wipers 1023 to 1028, inclusive, will be advanced step-by-step in a counterclockwise direction to a position corresponding to the number of impulses constituting the first digit.

At the end of the dialing of the first digit, the line relay R450 remains in its operated position to interrupt at the contacts 454 the above described impulsing circuit to the magnet of the first digit register 1020. Also it will open the multiple circuit for the digit relay R740 which slowly restores to normal and, at its contacts 741, causes the restoration of the sequence control relay R730.

It will be recalled that the sequence control relay R730 operated as soon as the first impulse was transmitted to the register 1020 under control of the line relay R450. At its contacts 732, the relay R730 completes a circuit for operating the tone control relay R530. Also at its contacts 731 the sequence control relay R730 applies ground potential to the conductor 703SEQ extending to Fig. 10 in order to operate the magnet M1011 of the receive sequence switch 1010. This magnet is retained in its operated position during the dialing of each digit and is restored at the end of the dialing of each digit to advance its wipers 1013 to 1017, inclusive, one step in a counterclockwise direction.

Referring now to the tone control relay R530, it will be seen that in response to its operation it interrupts, at its contacts 532, the previously described circuit whereby dial tone is transmitted to the calling subscriber. Also, at its contacts 531, the relay R530 interrupts a point in the circuit including the conductor 401MS from the timer 490 to prevent the timer from transmitting the signal at the end of 12 seconds indicative of the failure of a calling subscriber to dial the first digit within this period of time.

Finally, at its contacts 533, the relay R530 locks itself to ground potential at the contacts 643 on the operated seizure relay R640.

At the end of the dialing of the first digit, the digit relay R740 and the sequence control relay R730 restore to normal, as noted above, and at its contacts 731, ground is removed from the conductor 703SEQ to permit the receive sequence switch 1010 to advance its wipers into engagement with the contacts 2 in the associated contact banks. The wiper 1014 of the receive sequence switch 1010 is now in a position to cause the impulses of the second digit dialed by the calling subscriber to be transmitted over the conductor 1002 to the second digit register 1030. When the wiper 1017 of the receive sequence switch 1010 engages contact 2 in the associated contact bank, ground potential is extended by way of the conductors 602AEO to Fig. 6 and then by way of the contacts 652 and the winding of the relay R460 in multiple with the resistor 455 to the negative terminal of the 50 volt spotter battery 473 in series with the negative terminal of the exchange battery 472. The party test relay R460 is operated over this circuit to prepare the controller 400 to receive the loop digits constituting the second digit dialed by the calling subscriber and also the special ground pulses identifying the particular calling station on the party line.

The party test relay R460 quickly operates over the above traced circuit to prepare, at its contacts 465, a point in the circuit for controlling the party line relay R470. Also, the relay R460 closes its X contact 461 before the Y contacts 462 are opened in order to bridge the condenser 437 across the line relay R450 by way of the conductors 270LT and 268LR. The condenser discharges through the winding of the relay R450 to retain the same in its operated position during the momentary interruption of its initial circuit by the opening of contacts 463 before contacts 464 close. At its contacts 463 and 466, the party test relay R460 disconnects the exchange battery 472 and the ground potential from the previously traced loop circuit, including the calling subscriber line and, at its contacts 464 and 465, it now connects the subscriber's loop to a circuit including in series, high speed polarized party line relay R470, lamp 474, the 50 volt spotter battery 473 and the resistor 469.

Attention is directed to the fact that the party line relay R470 is connected in the calling subscriber line loop only after the dialing of the first digit and it will be disconnected from the loop circuit after the second digit has been dialed. The direction of current flow through the party line relay R470, however, is in a direction that will prevent operation of the relay until a ground pulse is transmitted from the calling subscriber substation on a party line.

Since each party station is provided with a special calling device of the type disclosed in the previously noted Ostline Patent No. 2,410,520 having the special cams of the type schematically illustrated in Fig. 2, ground pulses indicative of the particular station on the party line will be transmitted during the return movement of the calling device as a second digit is transmitted.

If the calling subscriber substation involved in the present connection happens to be one that is provided with a regular calling device having conventional construction without the station identifying cam contacts, then the pulses transmitted by the impulsing springs, such as 292, will only control the line relay R450 over the above mentioned loop circuit, but no control will be exercised over the party line relay R470. In other words, impulses corresponding to the second digit dialed will be repeated by the line relay R450, at its contacts 454, to the second digit register 1030 (Fig. 10) in substantially the same manner that the first digit was transmitted to the first digit register 1020. The pulses of the second digit will also be repeated by way of the contacts 452, 467 and 433 to the conductor 416LP but these pulses will be disregarded.

*Dialing the second digit from the party station*

If the calling station is provided with a special calling device, as previously noted, then the party line relay will respond to the ground pulses transmitted during the return movement of the dial.

More specifically, the dial, for example, at the substation 201P1 during its return movement will cause the cam 281 to close the contacts 282 to transmit a single ground pulse over the line conductors 202 and 203 and the previously traced loop circuit to the conductors 268LR and 270LT (Fig. 4). The ground pulse on the conductor 270LT will be transmitted by way of the contacts 424, 431, 465, winding of the party line relay R470, lamp 474 and the negative terminal of the exchange battery 472 to ground. The current flow in the winding of the relay R470 will be in a direction to quickly operate the same. The ground pulse appearing on the conductor 268LR will retain the line relay R450 operated by way of a circuit including the contacts 421, 464, resistor 469 and the negative terminal of the spotter battery 473. At the end of the transmission of the single ground pulse over the above traced circuit, the party line relay R470 will restore because the direction of the current flow through the relay will be such that it will immediately restore to normal.

It should be understood from the foregoing description of the transmission of a station identifying ground pulse by the dial at the party station 201P1 that the ground pulses transmitted from the dials provided respectively at the remaining party subscriber substations will control the party test relay R460 and also the line relay R450 in substantially the same manner.

Each time the party line relay R470 operates it completes, at its contacts 471, a circuit that includes ground at contacts 451, contacts 438 and 471, conductor 417SP extending to Fig. 18, upper break contact and upper winding of relay R1870P5 to battery. The relay R1870P5 operates and locks itself by way of its lower X contact to the conductor 1204SAL extending to Fig. 12, contacts 1212, conductor 605CR29 extending to Fig. 6 and contacts 642' to ground.

During the return movement of the calling subscriber dial, the above mentioned single station identifying ground impulse is transmitted just prior to the time that the loop impulsing contacts 292 are opened to transmit the next to the last loop impulse.

The next to the last loop impulse controls the line relay R450 in the usual manner and, at its contacts 452, will complete a circuit including the contacts 452, 467, 433, conductor 416LP extending to Fig. 18, inner upper make contacts on the operated relay R1870P5, inner upper break contact and upper winding of the relay R1870P1 to battery in order to operate the last mentioned relay. At its inner X make contact, the relay R1870P1 also locks itself to the grounded conductor 1204SAL. The last loop impulse transmitted by the calling subscriber dial will control the relay R450 in the usual manner but inasmuch as the conductor 416LP is not connected to any of the party station relays in Fig. 18, only the relays R1870P1 and P5 will be in their operated positions at the end of the dialing of the second digit to identify station 1 as the calling station on a party line.

The relays R1870P1 to R1870P5, inclusive, shown in Fig. 18, are operated in a predetermined sequence by the pulses transmitted over the conductors 416LP and 417SP under control of the different party subscriber dials. The R1870 relays are operated by the different pulses to identify the different stations on a five-party line as follows:

| Pulses | First Ground | Next to to Last Loop | Second Ground | Last Loop | Third Ground |
|---|---|---|---|---|---|
| Station: | | | | | |
| 1 | P5 | P1 | -------- | -------- | -------- |
| 2 | P5 | P1 | P4 | P2 | -------- |
| 3 | P5 | P1 | P4 | P2 | P3 |
| 4 | P5 | P1 | -------- | -------- | P4 |
| 5 | -------- | -------- | -------- | -------- | P5 |

From the foregoing, it will be seen that station 1 is identified in response to the operation of relay R1870P5 by the first ground pulse and the operation of relay R1870P1 by the following loop pulse, which is the next to the last loop impulse transmitted during the return movement of the dial. Station 2 is identified by the transmission of two ground pulses and two loop pulses which cause the operation of relays R1870P5, R1870P1, R1870P4 and R1870P2 in the order named. Station 3 is identified by the transmission of three ground pulses and two loop pulses which cause the operation of relays R1870P5, R1870P1, R1870P4, R1870P2 and R1870P3 in the order named. Station 4 is identified by the transmission of two ground pulses and one loop pulse, with the second ground pulse being transmitted after the last loop impulse during the return movement of the dial to operate relays R1870P5, R1870P1 and R1870P4 in the order named. Finally, the station 5 is identified by the transmission of a single ground pulse immediately after the last loop impulse during the return movement of the dial to operate only the relay R1870P5.

With the different party station relays R1870P1 to R1870P5 operated as shown above, the different station identifying marking conductors 1891P1 to 1895P5 will be marked to identify the different stations. Also, the conductor 1896P0X will be marked if all of the party station relays R1870P1 to R1870P5, inclusive, remain in their restored positions. These conductors extend to Fig. 19 where the markings thereon are utilized to control the operation of the detector 1900.

After the impulses constituting the second digit of the called subscriber directory number have been transmitted from the calling station, the line relay R450 and the hold relay R430 are retained in their operated positions and cause the digit relay R740 and sequence control relay R730 to restore to normal in the same manner previously described. The sequence control relay R730, at its contacts 731, removes the ground potential from the conductor 703SEQ extending to Fig. 10 so that the magnet M1011 of the receive sequence switch 1010 will restore to normal and advance its wipers 1013 to 1017, inclusive, from engagement with the contacts 2 into engagement with the contacts 3 in the associated bank. The disengagement of the wiper 1017 from the second bank contact, including the conductor 602AE0 extending to Fig. 6, interrupts the previously traced circuit for the party test relay R460. This relay now restores to normal and disconnects the party line relay R470 from the subscriber loop circuit and it re-establishes, at its contacts 466 and 463, the original loop circuit for the line relay R450.

Incident to the advancement of the wiper 1014 into engagement with the contacts 3 in the associated bank, a circuit is prepared including the conductor 1003 for controlling the magnet 1041 of the third digit register 1040.

The above described arrangement for identifying the particular calling station on a calling party line is disclosed and claimed in the copending divisional application of Ivan V. Coleman, Serial No. 813,742, filed May 18, 1959.

*Dialing the third digit*

The third digit of the called subscriber number dialed by the calling subscriber will now control the line relay R450 in the same manner as previously described in connection with the operations resulting from the first dialed digit, to register the third digit of the called number in the third digit register 1040.

At the present time, the called office code digits are registered in code form in the first, second and third digit registers 1020, 1030 and 1040. For this purpose, the wipers 1024 and 1025 of the first digit register 1020 are arranged so that they will ground the conductors WXYZ21 in the cable 1101 extending to Fig. 14 in accordance with the previously described WXYZ code.

The wipers 1034 and 1035 of the second digit register will mark the WXYZ22 conductors in accordance with the second digit and the wipers 1044 and 1045 will mark the WXYZ23 marking conductors in the cable 1101 in accordance with the third dialed digit. The same code markings are also applied to the conductor WXYZS21 to WXYZS23, inclusive, extending in the cable 1073 to Fig. 23 where they will be further extended in the manner to be described hereinafter to register the first three dialed digits in the register relays provided in Fig. 23 of the codexer 2300A.

In the description thus far of the operation of the call register 900, it has been assumed that each of the first three digits dialed by the calling subscriber have been registered respectively in the three digit registers 1020, 1030 and 1040. However, Fig. 9 shows a plurality of control relays and a terminal block that are utilized in conjunction with the above noted registers so that various controls may be exercised over the primary selector 300 involved in the connection depending upon the values of the different digits registered in the above noted registers.

By means of suitable strappings on the terminal block TB909, and responsive to certain of the called office code numbers which are used only in completing local calls in the FLorida 3 exchange and which never require a translation, the primary selector 300 can be controlled to operate during the dialing of the second or during the dialing of the third digit and the director will be released from the director hunter 250 after the primary selector 300 has been stepped to the level corresponding to the controlling digit.

Another condition that may exist, involves the operation resulting when the called office code digits are shared with other exchanges and in which it is not necessary to make a translation of the registered code digits to complete a connection. Under this condition, the primary selector 300 may be controlled during the dialing of the second or during the dialing of the third digit but the director will be released only after the dialing of the third digit. In this type of operation, the primary selector 300 may be stepped during the dialing of the second digit and as a result thereof will seize a subsequent switch train whereupon a switch in the latter switch train will be controlled during the dialing of the third digit.

Under still other conditions, it may be necessary to translate the called office code and at the same time operate the primary selector 300 during the dialing of the second digit or the dialing of the third digit. Under this condition the primary selector will be released at the end of the third digit, but the director is retained in its operated condition until all subsequent digits are registered therein and the call is processed with the regular translation to complete the connection to the desired destination.

In order to describe the operation of the primary selector 300 to control its wipers during the dialing of the second digit and its subsequent action depending upon the value of the third digit dialed, it will be assumed that the called office code digits dialed by the calling subscriber are included in the code block "27."

Referring now to Fig. 10 it will be seen that if the first digit 2 of the code block 27 is registered in the first digit register 1020, the wiper 1026 will be in engagement with the contact 2 and the terminal 2 on the terminal block TB1029 will be strapped to the LA terminal on the terminal block to complete a circuit for operating the first digit 2 relay R910. To complete the operating circuit for this relay, it will be recalled that the receive sequence switch 1010 during the dialing of the first digit 2 has its wipers in engagement with the contacts 1 and during the interdigital pause between the dialing of the first and second digits, the sequence switch 1010 advances its wipers into engagement with the contact 2. When this occurs, ground potential applied to the wiper 1015 over the conductor 871LGR is now connected by way of the engaged contact 2, wiper 1026 of the first digit register 1020, engaged contact 2 in the associated contact bank and then over the above traced circuit to operate the relay R910. As soon as the relay R910 operates it prepares, at its contacts 914, a point in a circuit traced hereinafter for locking the block translation relay R930 in its operated position and it also prepares, at its contacts 913, a point in the circuit for operating the relay R950 in the event that the second digit 7 is dialed.

Figure 6:
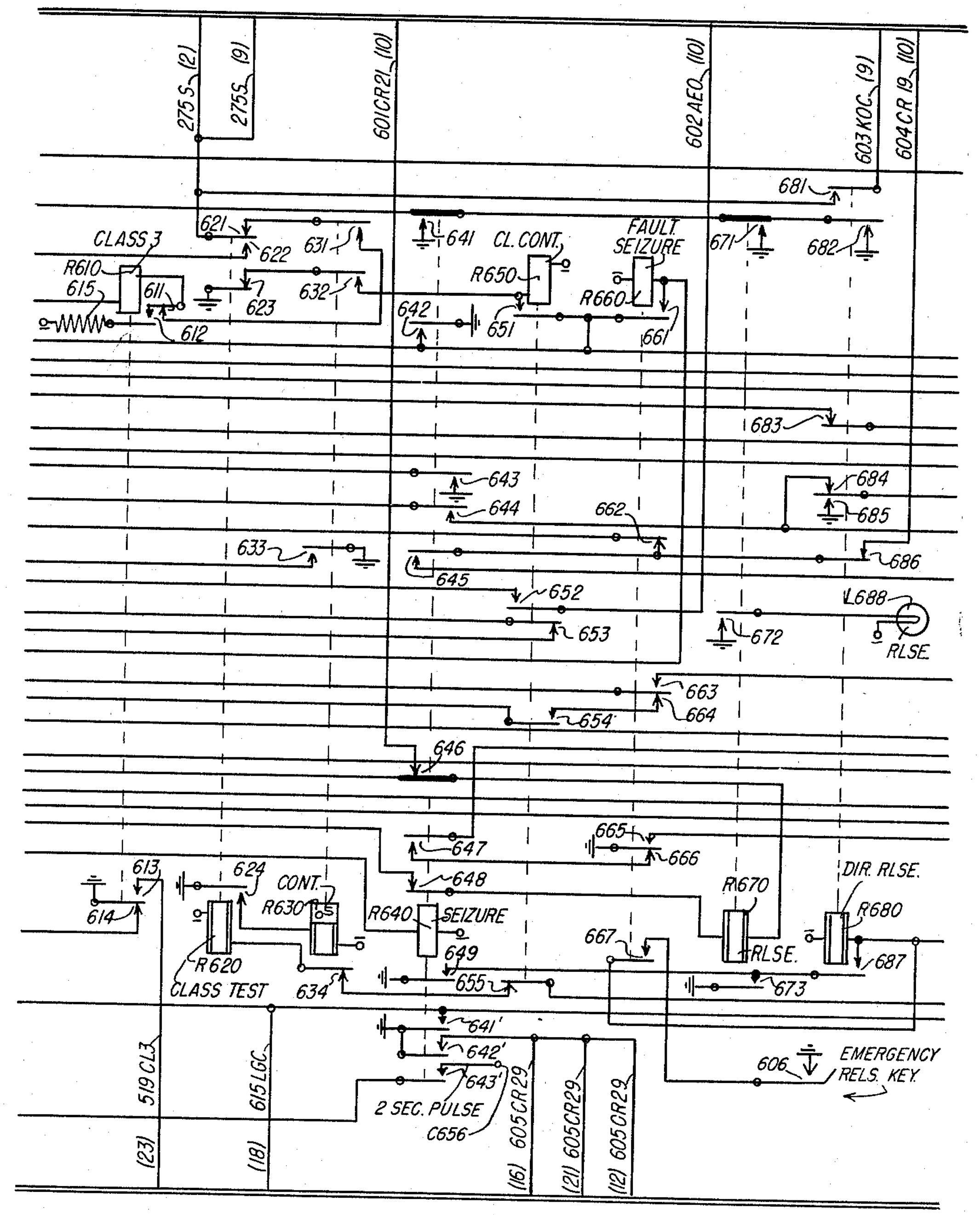

At its contacts 912, the relay R910 applies ground potential by way of the contacts 951, 941 and conductor 275S extending to Fig. 6, the conductor 275S extending to Fig. 2, wiper 260, conductor 308S, contacts 314' and 322' to prepare a point in the circuit for controlling the transfer relay R350 in the primary selector 300 so that the latter relay will remain in its operated position and prevent rotation of the wipers 363 to 365, inclusive.

As a further result of the operation of relay R910, at its contacts 915, the ground as applied to the conductor which is connected to the terminal L on the terminal block TB909 that in turn is jumpered to the terminal PB thereon to complete a circuit for operating the block translation relay R930. The latter relay upon operating completes, at its contacts 933, a locking circuit for itself which includes the contacts 914. Also, at its contacts 934, it interrupts a point in the circuit including respectively, the conductors 515CR18 and 1067SA4 in order to prevent the director from requesting the use of a translator 2700. Also, at its contacts 931, the relay R930 interrupts a point in the circuit including the conductor 809TY and 901TY0 to prevent the operation of the relay R1850TY in the coder 1800 portion of the director.

Finally, at its contacts 932, the relay R930 connects the pulsing circuit including the conductor 504RA to the conductor 269R so that the primary selector 300 will be controlled during the dialing of the second digit. This pulsing circuit can best be traced by referring to the upper winding of the line relay R330 in the primary selector 300 (Fig. 3). It will be seen that the circuit for operating the line relay R330 includes battery, the upper winding of the relay, contacts 321 and 312, conductor 303R, wiper 254, conductor 269R extending to Fig. 9, contacts 932 and 911, conductor 504RA extending to Fig. 5, resistor 535, contacts 554, 453 and 434 to ground. Since the line relay R450 in the controller 400 is in its operated position during the interdigital pause between the dialing of the first and the dialing of the second digits, the line relay R330 in the primary selector 300 immediately operates when the above traced circuit is completed.

At its contacts 332, the relay R330 completes an obvious circuit for operating the hold relay R340 and the latter relay compeltes, at its contacts 341, a circuit including the contacts 366, 327, 342 and vertical off-normal contacts 391 to operate the transfer relay R350 over its upper winding. The relay R350 in turn, at its contacts 351, prepares a point in the circuit for operating the marginal rotary stepping relay R360. The latter relay, however, does not operate at this moment.

The second digit dialed by the calling subscriber will control the line relay R450 in the controller 400, whereby the contacts 453 will repeat the impulses to the line relay R330 of the primary selector 300 at the same time the contacts 454 are repeating the impulses over the previously traced circuit to the second digit register 1030.

In response to the registration of the second digit 7 in the second digit register 1030, the wipers 1033 to 1037, inclusive, will be in engagement with the contacts 7 in the associated contact banks. The grounded wiper 1036 in engagement with the contact 7 will complete a circuit including the terminal LB of the terminal block TB1038, the winding of the relay R950 and battery at contacts 913 in order to operate the relay R950.

At its contacts 953, the relay R950 connects the circuit including the winding of the relay R910 by way of the contacts 963 to the grounded conductor 871LGR in order to hold the relay R910 in its operated position after the wiper 1015 on the receive sequence switch 1010 is advanced into engagement with the contacts 3 at the end of the interdigital pause between the dialing of the second and the third digits. As a further result of the operation of relay R950, at its contacts 952, it prepares a point in the circuit traced hereinafter for controlling the director release relay R970 and it also prepares, at its contacts 954, a point in the circuit for the relay R960. Finally, at its contacts 951, it will remove ground potential from the conductor 275S to permit the primary selector to hunt for an idle trunk in the selected seventh level. This circuit control, however, will be explained shortly in connection with the operation of the primary selector 300 by the dialing of the second digit 7.

Referring to the primary selector 300, it was pointed out above that the line relay R330 will be controlled by the impulses repeated thereto by the contacts 453 on the line relay R450. At the contacts 331, the line relay R330 will transmit seven impulses to the vertical magnet M384 over a circuit including, in series, the contacts 328, 331, 345, 359 and, in multiple, the lower winding of the transfer relay R350 and the vertical magnet M384. On the first vertical stepping of the wipers 363 to 365, inclusive, under control of the vertical magnet M384, the vertical off-normal contacts 391 are opened and the vertical off-normal contacts 392, 374 and 375 are closed. Consequently, the ground potential applied to the conductor 308S, as previously explained, is now connected by way of the contacts 314′, 322′, 356 and 392 to hold the transfer relay R350 operated by way of the circuit including its upper winding. Inasmuch as the transfer relay R350 is of the slow-to-release type, it is retained operated by the intermittent pulses transmitted thereto by the contacts 331 on the line relays R330.

At the vertical off-normal contacts 374, the marginal stepping relay R360 is operated over a circuit including contacts 385, 386, 346, 351 and 341. The latter relay now locks itself in its operated position over a circuit including battery, winding of the relay R360, vertical off-normal contact 374, contacts 385, 386, 346, 362 and 328 to ground. As a further result of the operation of relay R360, at its contacts 361, it prepares a point in the circuit for operating the rotary magnet M383. The last-mentioned circuit, however, is not completed until the transfer relay R350 restores to normal at the end of the transmission of the impulses to the vertical magnet M384.

In the present example, however, the transfer relay R350 is retained operated during the dialing of the seven impulses to the vertical magnet M384 which raises the wipers 363 to 365, inclusive, to the seventh level.

It will be recalled that in response to the registration of the digit 7 in the second digit register 1030, the relay R950 operated to remove, at its contacts 951, the ground potential applied to the conductor 275S. As a result thereof, the transfer relay R350 in the primary selector 300 will restore to normal and complete, at its contacts 352, a circuit including contacts 341, 378 and 361 for operating the rotary magnet M383. The rotary magnet M383 upon operating, steps the wipers 363 to 365, inclusive, in a rotary direction into engagement with the first contact set in the selected seventh level and, at its contacts 386, it interrupts a point in the above traced circuit for the relay R360 which now restores to normal and, at its contacts 361, opens the circuit for the magnet M383 which also restores to normal. The restoration of the magnet M383, at its contacts 386, now connects the winding of the rotary stepping relay R360 to the C wiper 365 so that a circuit will be completed for operating the relay only in the event that the contact engaged by the wiper 365 is grounded to indicate that the corresponding trunk is busy. In other words, the ground potential encountered by the wiper 365 will be extended by way of the contacts 325 to short circuit the winding of the switch-through relay R320 and to complete a circuit including the contacts 346, 386, 385 and VON374 for again operating the relay R360. The relay R360 again operates and, at its contacts 361, recompletes the circuit for the rotary magnet M383. The latter magnet, at its contacts 386, interrupts a circuit for the relay R360 and the latter relay, at its contacts 361, interrupts the circuit for the rotary magnet M383 so that it will again restore to normal to complete, at its contacts 386, the circuit for reoperating the relay R360 in the event that another busy contact is engaged by the wiper 365. The rotary stepping of the wipers 363 to 365, inclusive, under control of the rotary magnet M383 in conjunction with the stepping control of the relay R360 will continue until the wiper 365 engages an ungrounded contact in the associated contact bank or until the wipers have been stepped to the eleventh rotary step position because all of the ten trunks in the selected level are busy.

An idle trunk in the selected level will be indicated to the primary selector 300 by an absence of ground potential upon the bank contact engaged by the wiper 365. When this occurs, the switch-through relay R320 will operate in series with the relay R360 over a circuit which includes battery, the winding of the relay R360, vertical off-normal contacts 374, contacts 385, 386 and 346, winding of the switch-through relay R320, eleventh rotary step cam contacts 366 and contacts 341 to ground. In this circuit, the winding of the switch-through relay R320 is no longer short circuited by a busy marking ground potential on the wiper 365 and, consequently, the relay R320 operates. However, the relay R360 does not operate at this time due to the high resistance of the relay R320. At this time, the relay R320 at the contacts 321 and 323 disconnects the line relay R330 and, at its contacts 322 and 324, it connects the control circuit including the conductors 303R and 304T from the director by way of the wipers 363 and 364 to the next switch in the switch train that is selectable over a trunk in the seventh level of the selector 300. The extension of the foregoing circuit to the next switch will cause the latter switch to return a holding ground potential over the circuit including the wiper 365 and contacts 326 for holding the switch-through relay R320 operated in series with the relay R360 over a circuit which is independent of the ground potential at the contacts 341.

The line relay R330 restores to normal as a result of being disconnected at the contacts 321 and 323 and it interrupts, at its contacts 332, the circuit for the hold relay R340 which also restores to normal. The only relays in the primary selector 300 that remain in their operated position after the above described switch-through operation is the switch-through relay R320 and the director test relay R310. It should be noted, however, that the circuit for holding the switch-through relay R320 in its operated position in series with the rotary stepping relay R360 now includes the contacts 329. Also, at the contacts 321', the relay R320 prepares a point in the circuit for connecting the conductor 308S to the magnet M251.

In the foregoing description, it was assumed that the primary selector 330 switched through to seize an idle trunk to the next switch in the train when an absence of ground potential is encountered by the wiper 365. If all ten trunks in a selected level are busy, the interaction of the rotary magnet M383 and the rotary stepping relay R360 will cause the wipers 363 to 365, inclusive, to be rotated into engagement with the eleventh rotary step cam position. When this occurs, the eleventh rotary step cam contacts 349 are closed to transmit the busy tone signal on the conductor C347 to the winding of the line relay R330 and the ground potential at the cam contacts 348 is removed from this circuit. Also, at the eleventh rotary step cam contacts 366, a point in the previously traced circuit for operating the switch-through relay R320 is interrupted in order to prevent operation of this relay. Finally, at the eleventh rotary step cam contact 359, a point in the stepping circuit for the vertical magnet M384 is interrupted so that the transmission of any subsequent digits to the line relay R330 will merely be absorbed. After the director is disconnected from the primary selector 300, the busy tone signal on the conductor C347 will be transmitted to the calling subscriber as an indication that the connection should be released.

Under certain conditions, the primary selector 300 may be operated to absorb a digit transmitted thereto if the digit is one that raises the wipers to a critical level. For example, the left-normal post springs 377 and 378 may be arranged to actuate when a critical level is reached during the vertical stepping of the wipers 363 to 365. If, for example, these contacts are actuated when the seventh level of the selector is dialed, the left-normal post springs 378 will interrupt a point in the stepping circuit for the rotary magnet M383 to prevent any rotary stepping of the wipers from taking place. Also, the transfer relay R350 will restore to normal after the last pulse of the digit 7 has been transmitted to operate the release magnet M381 over a circuit which includes the winding of the magnet, the left-normal post springs 377, contacts 372, 353, 342, 327, 366 and 341.

Operation of the magnet M381, at its contacts 385, interrupts a point in the circuit for the relay R360 so that the latter relay restores to normal and, at its contacts 382, the release magnet M381 completes a locking circuit for itself which includes its windings, the vertical off-normal contacts 375, contacts 382 and ground at contacts 341. As soon as the wipers of the switch are restored to normal as a result of the operation of the release magnet M381, the vertical off-normal contacts 375 will be opened to interrupt the locking circuit for the magnet M381. However, as soon as the vertical off-normal contacts 375 are opened, a short circuit is removed from the lower winding of the relay R370 so that a circuit is now completed from ground at contacts 341, contacts 382, 373, 343, lower winding of the relay R370 and the winding of the release magnet M381 to battery. The relay R370 closes its X contacts 372' to lock the relay R370 over a circuit including its upper winding to ground at contacts 341. Also, at its contacts 373, it interrupts a point in the locking circuit of the release magnet M381 which now restores to normal. It should be understood, however, that in connection with the above operation, the left-normal post springs 377 are opened as soon as the wipers 363 to 365, inclusive, start to fall away from the seventh or critical level. Thus, the initial operating circuit for the release magnet M381 is opened as soon as the wipers start to drop from the seventh level, but the magnet is retained operated first over the circuit including the vertical off-normal circuit 375 which are opened when the wipers reach their normal rest position and, thereafter, the release magnet M381 is retained operated until the relay R370 is operated and locked. In this manner, the primary selector 300 has absorbed the digit 7 and has restored its wipers to normal. The relay R370, however, remains in its locked position during the time that the next digit is transmitted to the primary selector 300.

If the succeeding digit transmitted to the selector 300 happens to be another critical digit 7, the left-normal post springs will be operated when the seventh level is reached, but inasmuch as the contacts 372 are opened by the relay R370, the release magnet M381 can not be operated. Also, at the contacts 371, at the end of the vertical stepping in response to the second digit 7, the relay R370 will complete a circuit including the contacts 341, 352, 371 and 361, whereby the rotary stepping relay R360 and the rotary magnet M383 will cause the wipers of the selector to be rotated over the bank contacts of the seventh level. It should be apparent from the foregoing description that if the left-normal post springs 377 and 378 are arranged to operate on the critical level 7, the switch will restore its wipers to normal to absorb the first digit 7 but it will respond to any succeeding digit, including the digit 7, and will rotate its wipers over the selected level to seize the idle trunk line in the selected level in the manner previously described.

Before leaving the operation of the primary selector 300, attention is directed to the fact that it is also provided with right-normal post contacts 376 which are adjusted so that they will operate on the particular level corresponding to a particular second digit dialed into the selector 300. It should be understood that the second digit dialed into the selector need not be the same digit 7 that was suggested above in the illustrated example. If the right-normal post springs are arranged, for example, to close on the eighth level, the receipt of the digit 8 as a second digit dialed into the selector 300, after the first digit is absorbed, it will raise the wipers 363 to 365, inclusive, in the conventional manner to the eighth level, at which point the right-normal post springs 376 are operated. Inasmuch as the first digit 7 has been absorbed, the relay R370 is in its operated position to render the closing of the contacts 376 ineffective. The normal operations resulting from the digit 8 dialed into the primary selector 300 will cause the wipers to be rotated over this level in the manner previously explained. However, the provision of the right-normal post contacts 376 will prevent the selector 300 from ever responding to a first digit 8. Whenever, a first digit 8 is received by the selector 300 the right-normal post contacts 376 will be closed and ground potential at the contacts 341 will be connected by way of the contacts 366, 327, 342, 353, 372 and 376 to the wiper 365 to simulate an all-trunks busy condition to this wiper. Consequently, the restoration of the transfer relay R350 at the end of the dialing of the first digit 8 will automatically cause the rotary magnet M383 and the stepping relay R360 to rotate the wipers 363 to 365 step-by-step over the selected eighth level until they reach the eleventh rotary step position. This will prevent any dialing short cuts from being performed to skip, for example, a digit that must be absorbed by the primary selector 300.

In the foregoing description it was pointed out that as a second digit 7 of the called number is registered in the digit register 1030, the impulses are also repeated to the primary selector 300 so that it will raise its wipers to the seventh level. At the end of the dialing of the second digit, the magnet M1011 of the receive sequence switch 1010 will advance its wipers 1013 to 1017, inclusive, an additional step in the counterclockwise direction into engagement with the contacts 3 so that the third digit 2 dialed by the calling subscriber will now be registered in the third digit register 1040 and it will also be repeated to the primary selector 300 or to a succeeding switch seized by the primary selector 300.

At the end of the dialing of the third digit, but before the receive sequence switch 1010 advances its wipers from the third bank contact into engagement with the fourth bank contact, it will be understood that the digits 272 are registered respectively in the digit registers 1020, 1030 and 1040; that the primary selector 300 has its wipers in engagement with an idle selector in the seventh level and that an additional selector (not shown) is seized over the seventh level. When the wiper 1046 of the third digit register 1040 engages contact 2 in the associated contact bank, it completes a circuit including the terminal LC on the terminal block TB1050 and contacts 954 for operating the control relay R960. At its contacts 964, the relay R960 interrupts a point in the circuit for the relay R970 thereby to prevent at this time, operation of the relay R970 and the resulting release of the director. As a further result of the operation of relay R960, it transfers the locking circuit for the relay R910 at the contacts 963 from the grounded conductor 871LGR to a circuit including its contacts 962, the BR conductor and the contact 3 engaged by the wiper 1015 on the receive sequence switch 1010 and the grounded conductor 871LGR.

During the interdigital pause following the dialing of the third digit, the receive sequence switch 1010 will advance its wipers from engagement with the third contacts into engagement with the contacts 4 in the associated contact banks. Consequently, the wiper 1015 removes ground potential from the BR conductor thereby causing the relay R910 now to restore to normal. At its wipers 1016, the receive sequence switch 1010 applies ground potential to the conductor 1066SA3 extending to Fig. 12, contacts 1225, conductor 1067SA4 extending to Fig. 10 to the contacts 934 on the slow-to-release relay R930.

In response to the restoration of the relay R910 as noted above, at its contacts 911, it disconnects the impulsing conductor 504RA from the circuit including the conductor 269R so that the line relay in the subsequent selector seized by the primary selector 300 will restore to normal and thereby release the said selector. The last-mentioned selector in turn will remove the holding ground potential from the wiper 365 of the primary selector 300 so that the switch-through relay R320 thereat will restore to normal and cause the full release of the primary selector 300.

As a further result of the restoration of the relay R910 (Fig. 9) it will interrupt at its contacts 914 and 915, points in the circuit for the relay R930 which slowly restores to normal. As soon as the latter relay restores, it closes its contacts 934 thereby to further extend the ground potential applied thereto from the wiper 1016 by way of the conductor 515CR18 extending to Fig. 5, contacts 572, 713 and 683 in order to operate the assigner start relay R550. The operation of the latter relay will complete circuits whereby the translator 2700 is associated with the calling director to translate the called office code digits 272 registered in the first, second and third digits 1020 to 1040, inclusive (Fig. 10), into appropriate routing digits so that the director can control the setting-up of the connection in accordance with the said routing digits.

From the foregoing, it will be apparent that if the digits 272 of a called office code are registered in the director, the primary selector 300 will be operated in accordance with the digit 7 as it is registered in the director and a subsequent switch will be operated in accordance with the third digit 2 as it is registered in the third digit register of the director. However, due to the strapping arrangements on the terminal blocks associated with the first, second and third digit registers 1020, 1030 and 1040, the operated primary selector 300 and the associated selector will be restored to normal and the translator assigner relay R550 will be operated so that a translation will be obtained of the office code digits 272.

Before continuing with the operations controlled by the assigner start relay R550, further controls of the director, depending upon the office code digits registered therein, will first be described.

In accordance with the office code block 27, if the third digit of the code is 0, 1 or 3 to 9, inclusive (instead of the third digit 2), the primary selector 300 will be stepped in a vertical direction in accordance with the second digit 7 in the same manner as previously described and another selector will be seized by the primary selector 300 and it will respond to any one of the third digits. However, the third digit (except the digit 2) will cause the director to be released from the primary selector 300 so that all subsequent digits dialed by the calling subscriber will directly control the switch train.

Referring to the call register 900 (Figs. 9, 10 and 11) it should be understood that the digits 2 and 7 registered respectively in the digit registers 1020 and 1030 will cause the operations of the relays R910, R930 and R950 all in the manner previously described. Also, the primary selector 300 will be operated in accordance with the second digit 7 in the manner previously described to seize a trunk line extending to a subsequent selector.

If it is assumed for the purpose of describing the present operation of the director that a local office code, for example 276, is dialed and the digit 6 registered in the the third digit register 1040 (instead of the digit 2 as previously described) the digit will control the selector seized by the primary selector 300. At the end of the dialing of the third digit, the receive sequence switch 1010 will advance its wipers from engagement with the third contacts in the associated contact banks into engagement with the fourth set of contacts. When this occurs, ground potential on the conductor 871LGR is connected by way of the CR conductor, terminals on the terminal block TB909 and strapping thereon, to the RL conductor, contacts 952 and 964 and the winding of the director release relay R970, to battery. This relay, at its contacts 971, applies ground potential to the conductor 701CR22 extending to Fig. 7 in order to operate the director release relay R680. The director release relay R680 will cause the restoration and ultimate disconnection of the director from the primary selector 300 so that all of the remaining digits of the called number that are dialed by the calling subscriber will be transmitted directly from the calling subscriber dial through the line finder circuit 240 and the primary selector 300 to the switches in the local exchange to complete the connection to the called subscriber line. The manner in which the director is released will be described subsequently.

In the foregoing description of the operation of the primary selector 300 wherein the left-normal post contacts 377 and 378 and the right-normal post contacts 376 are utilized in connection with the digit absorbing features of the switch, it was assumed that the operation resulted during the control of the primary selector 300 by the director. However, it should be specifically noted that the digit absorbing features controlled by the right and left-normal post contacts are never utilized when the primary selector 300 is controlled from the director. Under the latter condition, the left and right-normal post contacts are provided as part of the switch but they are not actuated on any level to which the wipers of the switch may be operated. The primary selector of the type noted will be installed in an exchange that is non-director operated but which contemplates the installation of director operation within the near future. The primary selector 300 will accordingly be dial-operated until the director is installed and from then on the primary selector 300 may be operated under control of the director.

In order to complete the description of the primary selector 300, the release thereof, as a result of a dismissal of the connection by the interconnected subscribers will now be explained. When, for example, the calling subscriber places his receiver on the switch hook of the associated instrument, the primary selector 300 will be released in a conventional manner in response to the removal of the holding ground potential from the wiper 365 by one of the succeeding switches utilized in the established connection. This ground potential, as previously noted, retains the switch-through relay R320 operated, in series, with the rotary stepping relay R360. However, the latter relay remains in its restored position. All other relays in the primary selector will be in their restored position at the time the holding ground potential is removed from the above mentioned circuit. Consequently, the switch-through relay R320 will restore to normal when the connection is dismissed and complete, at its contacts 328, a circuit including contacts 331, 344, 373 and the vertical off-normal contacts 375 for operating the release magnet M381. Upon its energization, the magnet M381 will cause the wipers 363 to 365, inclusive, to restore to normal, first in a rotary direction and then by gravity in a vertical direction. As soon as the wipers are restored to normal, all of the vertical off-normal contacts are restored to the positions illustrated in the drawings, at which time the vertical off-normal contacts 375 interrupt the operating circuit for the magnet M381 to complete the restoration of the primary selector 300.

In the previous description regarding the operation of the director and the associated primary selector 300, it was pointed out that these units of equipment cooperated in a predetermined manner when the digits 27 of a first code block were registered in the director. It was also pointed out that if the third digit dialed was the digit 2, the primary selector 300 and the next succeeding switch, which responded to the last digit 2, would restore to normal so that the director would control the setting-up of the entire connection. If any other digit but the digit 2 is dialed as the third digit of the code block 27, then the primary selector and any subsequent switch would remain in its operated position and the director would be automatically released.

The call register 900 portion of the director may also be arranged with special strapping for a second code block, for example, corresponding to the digits 35. These digits when dialed into the call register 900 portion of the director are registered respectively in the first digit register 1020 and in the second digit register 1030. Since the terminal block TB1029 associated with the wiper 1026 is strapped so that the registration of the digit 3 will interconnect the wiper 1026 with the MA terminal on the block, a circuit is completed for operating the first digit 3 relay R920. At this point, it should be noted that the control relays shown on Fig. 9 that form a part of the call register 900 include the first code block relays R910 and R950 which are selectively operative under certain conditions to selectively control the relays R930, R960 and R970. Also, the control relays include the second code block relays R920 and R940 which also may be utilized to selectively control the relays R930, R960 and R970. Additional sets of code block relays, such as those named above, may be provided, if desired, to also selectively control the relays R930, R960 and R970.

In view of the foregoing, it will be apparent that if the relay R920 responds by the registration of the digit 3 in the first digit register 1020, it will perform the same operations that were heretofor performed by the operation of the relay R910 by the registration of the digit 2. The registration of the second digit 5 in the second digit register 1030 completes a circuit from ground at the wiper 1036 by way of appropriate strapping on the terminal block TB1038 to the MB terminal on the block so that the relay R940 is operated. This relay performs the same functions as those described above in connection with the operation of relay R950 as a result of the dialing of the second digit 7. The remaining operations whereby the relays R930, R960 and R970 are selectively controlled are substantially the same as those previously described in connection with the operations resulting from the dialing of the different third digits of the code block 27. Accordingly, the dialing of the code block 35 followed by any one of the third digits 1 to 9 and 0 will control the primary selector 300 in the same manner as the code block 27 followed by any one of the third digits 1 to 9 and 0.

In the foregoing description of the operation of the primary selector 300 and the call register 900 portion of the director, it was assumed that when either the code block 27 or the code block 36 are used, the L and M strapping on the terminal block TB909 (Fig. 9) are strapped to the PB terminal so that the block translation relay R930 would be operated. The operation of the relay R930 controlled the primary selector 300 so that it will step its wipers in a vertical direction simultaneously with the registration of the second digit dialed by the calling subscriber in the second digit register 1030. In some exchanges of a telephone network, it may be desirable to have the primary selector, such as 300, step in a vertical direction during the dialing of the third digit of a called number. When this type of operation is desired, the M terminal and the L terminal on the terminal block TB909 may be disconnected from the PB terminal and instead connected to the PC terminal. This will control the primary selector, such as 300, to step in a vertical direction during the dialing of the third digit instead of during the dialing of the second digit.

In order to describe this operation, it will be assumed that the L terminal remains connected to the PB terminal so that the primary selector 300 will respond to the second digit whenever the first digit of a called office code is the digit 2. It will also be assumed that the terminal M is disconnected from the terminal PB and instead is connected to the terminal PC.

In order to describe the operations under the foregoing circumstances, it will again be assumed that the calling subscriber has dialed the digits 352 designating a particular called office. The digit 3, as previously noted, will be registered in the first digit register 1020 to complete the previously described circuit for operating the first digit 3 relay R920. At its contacts 922, the latter relay will prepare a circuit including contacts 951, 941, conductor 275S extending to Fig. 6, conductor 275S extending to Fig. 2, wiper 260, conductor 308S, contacts 314', 322', 356, VON392 and the upper winding of the transfer relay R350, to battery. This prevents the relay R350 from permitting automatic rotation of the wipers of the selector after the selector has been raised in a vertical direction to close the vertical off-normal contacts VON392.

Also, at the contacts 924, the relay R920 applies ground potential to the M terminal on the terminal block TB909. In the previous description it was assumed that this terminal was interconnected with the terminal PB in order to operate the relay R930. However, in the present description it is now assumed that the terminal M is instead connected to the terminal PC. Consequently, the relay R930 remains in its restored position even though the critical first digit 3 has been dialed. Also, at its contacts 923, the relay R920 prepares a point in the circuit for the relay R940 so that the latter relay can operate if the second digit 5 is dialed by the calling subscriber. The subscriber now dials the second digit of the called office code which is assumed to be the digit 5. As a result thereof, the second digit 5 is registered in the second digit 1030 in the manner previously explained. However, the impulses of the second digit are not repeated to the line relay of the primary selector 300 inasmuch as the contacts 932 on the relay R930 are in an open position at this time. The registration of the digit 5 in the second digit register 1030 applies ground potential at the wiper 1036 to the MB terminal on the terminal block TB1038 in order to complete the operating circuit for the relay R940.

As soon as the relay R940 operates, it locks the relay R920 in its operated position over a circuit including the winding of the relay R920, contacts 943 and 963 and the grounded conductor 871LGR. Also, at the contacts 942, the relay R940 prepares a point in the circuit for controlling the director release relay R970. At its contacts 941, the relay R940 removes ground potential from the conductor 275S and at its contacts 944 it prepares a point in the circuit for the relay R960 so that the latter relay may be operated, if desired, if the digit 2 is registered in the third digit register 1040.

During the interdigital pause between the dialing of the second digit 5 and the dialing of the third digit of a called office code, the receive sequence switch 1010 advances its wipers into engagement with the contacts 3 in the associated contact banks. When this occurs, the wiper 1016 completes a circuit including the contacts 925 for operating the relay R930. The latter relay, at its contacts 933, locks itself in its operated position, at its contacts 931 it disconnects the conductor 809TY from the conductor 901TYO; and at its contacts 932 it completes the pulsing circuit including the conductors 504RA and 269R so that the primary selector 300 can respond to the impulses of the third digit.

The third digit dialed by the calling subscriber will be registered in the third digit register 1040 and, as previously described, the impulses will be transmitted over the impulsing circuit including the conductors 504RA and 269R to the primary selector 300.

If the third digit dialed by the calling subscriber is a critical digit that causes the ground potential on the wiper 1047 to be extended by way of the MC terminal on the terminal block TB1051, the relay R960 will be operated to cause the release of the relays R920, R930, R940 and R960 in the manner previously described so that the primary selector 300 will be restored to normal. It should be noted, however, that if the M terminal and the PC terminal on the terminal block TB909 are interconnected, the ground potential at the contacts 924 will be extended by way of the contacts 961 to the conductor 275S. The grounding of this conductor will prevent the release of the transfer relay R350 in the primary selector 300 after the later selector responds to the critical digit 2 registered in the third digit register 1040. Thus, the selector 300 is prevented from rotating its wipers over the selected level in the associated contact bank. The grounding of the conductor 275S has been previously explained in considerable detail and will not be repeated. In the latter event, the director will select the translator 2700 to receive a translation of the called office code digits 352.

If no critical digit is included in the third digit of the called office code, the bank contacts accessible to the wiper 1047 will not be jumpered to the MC terminal on the terminal block TB1051. Therefore, the relay R960 will not operate as a result of the registration of the third digit in the register 1040. However, as soon as the receive sequence switch 1010 advances its wipers from engagement with the contacts 3 in the associated contact banks into engagement with the contacts 4, ground potential on the wiper 1015 will be extended by way of the CR terminal and RM terminal on the terminal block TB909 and then by way of contacts 942 and 964 to operate the director release relay R970. The associated primary selector 300 will respond to the third digit and will raise its wipers to the corresponding level. The operation of the relay R970, however, will cause the director to be released from the primary selector 300 so that the subsequent digits dialed by the calling subscriber will now be dialed directly through the line circuit 205, line finder 240 and the primary selector 300 to the subsequent switch in the switch train that has been seized by the primary selector 300.

If it is desired to always release the director from the primary selector whenever the digits 35 of a called office code block are dialed, it is merely necessary to strap the RM terminal on the terminal block TB909 to the BR terminal thereon instead of to the CR terminal as is illustrated. Under this condition, and assuming further that the M terminal is strapped to the PB terminal, the relays R920 and R930 will be operated as a result of the registration of the first digit 3; the second digit 5 will be repeated to the primary selector 300 and simultaneously registered in the second digit register 1030 to complete the circuit for operating the relay R940.

After the registration of the digit 5, the receive sequence switch 1010 will advance its wipers into engagement with the contacts 3 in the associated contact banks, as previously described, and will complete a circuit which may be traced from the grounded conductor 871LGR, wiper 1015, contact 3 in the associated contact bank, the BR terminal strapped to the RM terminal on the terminal block TB909, contacts 942 and 964 and the winding of the director release relay R970 to battery. This will cause the release of the director in the manner noted hereinbefore and the primary selector 300 will be connected directly to the calling subscriber line so that each of the remaining digits of a called number dialed by a calling subscriber will be transmitted to the primary selector 300 to the subsequent switches.

In the foregoing description of the operation of the call register 900 (Figs. 9 to 11, inclusive) it may be appreciated that by means of the various terminal blocks TB1029, TB1038, TB1050, TB1051 and TB909 and the various control relays shown in Fig. 9, the primary selector, such as 300, associated with the director can be controlled so that it will be operated either as the second digit of the called number is registered in the second digit register 1030 or as the third digit is registered in the third digit register 1040. In addition to the foregoing, the operated selector may be released at the end of the second digit or at the end of the third digit depending on the value of the digit that is registered in the call register 900. Also, it will be appreciated that the director release relay R970 may be operated to cause the director to be disconnected from the associated primary selector, such as 300, after the dialing of a second critical or after the dialing of the third critical digit.

In order to continue the description of the operation of the system, it will be assumed that the called office code digits registered respectively in the first, second and third digit registers 1020, 1030 and 1040 are of such values that they do not in any way cause any control of the relays shown in Fig. 9 or cause any control of the associated primary selector 300. Under the foregoing conditions, the receive sequence switch 1010 will, during the interdigital pause between the dialing of the third digit and the dialing of the fourth digit, step its wipers into engagement with the contacts 4 in the associated contact banks. In this position the wiper 1016 will apply ground potential over the previously described circuit including the conductor 1066SA3 in order to operate the assigner start relay R550 in the controller 400 portion of the director. Also, the wiper 1014 transfers the impulsing circuit including the conductor 604CR19 from the conductor 1003 extending to the third digit register 1040 to the conductor 1004 extending to the fourth digit register 1110. It will accordingly be appreciated that the fourth digit dialed by the calling subscriber will control the magnet M1111 to register the fourth dialed digit in the register 1110. The fifth, sixth, and seventh digit registers 1120, 1130 and 1140 will be respectively controlled to register the corresponding dialed digits as the receive sequence switch 1010 advances its wipers during the interdigital pause between the dialing of the successive digits to select the conductors 1005 to 1007, inclusive.

As noted above, the receive sequence switch 1010 will advance its wipers after each digit is registered in the respective digit registers 1010 to 1040, inclusive. When the wiper 1015 advances from the fourth contact to the fifth contact in the associated contact bank at the end of the dialing of the fourth digit, the ground potential on the conductor 871LGR will be connected to the conductor 801SDO extending to Fig. 8 in order to operate the first numerical send relay R820. Furthermore, as the wiper 1015 advances over the sixth, seventh and eighth contacts in the associated contact banks, the conductors 802SEO, 803SFO, and 804SGO will be sequentially grounded to operate respectively the second, third and fourth numerical send relays R830, R840 and R850.

Figure 8:
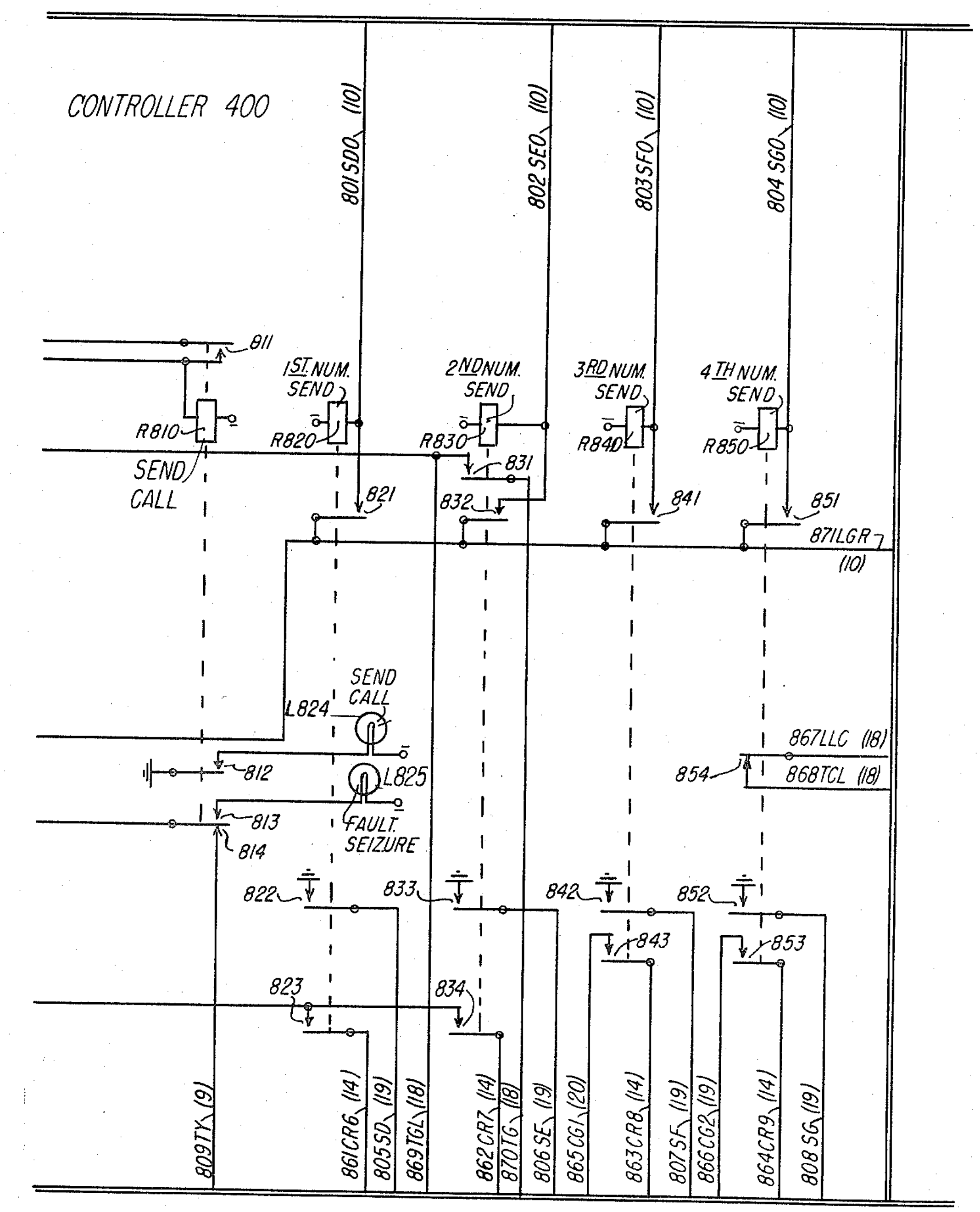

By referring to Fig. 8 it will be seen that as each of the above mentioned relays R820 to R850, inclusive, are operated, they immediately lock themselves by way of the respective contacts 821, 832, 841 and 851 to the circuit including contacts 647 on the operated seizure relay R640 and contacts 666 to ground on the deenergized fault seizure relay R660. It will be appreciated that these relays will ground respectively the conductors 805SD, 806SE, 807SF and 808SG extending to Fig. 19 at the respective contacts 822, 833, 842 and 852 as an indication of the respective fourth, fifth, sixth and seventh dialed digits.

In Fig. 19 these conductors terminate in the bank contacts accessible to the wiper 1951 so that the pulsing relay R2050 can only be operated in the event that the corresponding digits have been registered in the respective digit registers of the call register 900.

After the seventh dialed digit has been registered in the seventh digit register 1140, the receive sequence switch 1010 will advance its wipers from engagement with the contacts 7 into engagement with the contacts 8 in the associated contact bank to cause the operation of the relay R850 over the conductor 804SGO as noted above. Thus, a seven digit called number has now been registered in the digit registers of the call register 900 portion of the director.

*Registration of a national toll code*

The present system is arranged so that it may be utilized in conjunction with a national automatic toll dialing telephone network so that a calling subscriber may by means of the dial at his instrument establish a telephone connection with any subscriber within, for example, the United States, who also is connected to an automatic telephone exchange. For this purpose, the United States has been divided into different zones, each identified by a three digit national toll code. Also, each of the telephone exchanges located within each of the national toll code areas is provided with the usual seven digit number comprising the three digits identifying the called office within an identified zone and four or five digits identifying the particular subscriber station in the identified zone and exchange.

When different types of systems, that is, systems manufactured and designed by different manufacturers, are interconnected to form the national toll network, each manufacturer must provide facilities to transmit the necessary control signals to the next type of system installed by another manufacturer. These signals must be arranged so that they will control the switching apparatus in the different tandem related systems to set-up the desired connection to whatever called zone, exchange and subscriber line that is identified by the originating or calling subscriber. As previously noted, the subscriber directory numbers will include, in addition to the three digit office code designation, either four or five digits forming the numerical portion of the directory number.

In the present system, facilities are provided for registering the three digits identifying the particular national toll zone followed by three digits identifying the called exchange within the zone followed by either a four or a five digit identifying the particular called subscriber station in the particular exchange. Thus, at least as many as eleven digits may be necessary to identify the called subscriber on a national toll call basis which digits must be dialed and registered in the digit registers provided in the present system.

In the description thus far, it has been assumed that a seven digit number has been registered in the first to the seventh digit registers 1020 to 1140, inclusive. It has also been assumed that the first three digits dialed by the calling subscriber identified a particular exchange which could be reached on what has been referred to as a short haul toll call. In calls of this character it is not necessary to prefix the called number with the national toll code comprising three digits. Whenever it is necessary to prefix a called subscriber directory number with a national toll code, additional registers must be available to register at least the last four digits of the maximum of eleven digits to be dialed by the calling subscribers.

In the present system, these registers have been designated as the eighth, ninth, tenth and eleventh digit registers 1310 to 1340, inclusive, and have been illustrated in Fig. 13. The transfer relays of the call register 1200, shown in Fig. 12, are utilized whenever the first three digits dialed by a calling subscriber correspond to one of the special codes identifying a national toll call. On ordinary short haul toll calls, however, the call register 1200 shown in Figs. 12 and 13 will not be utilized.

The national toll codes as assumed in the present system are three digits and the first of the three digits may be any one of the digits 2 to 9, inclusive; the second digit may be either the digit 1 or 0 and the third digit may be any one of the digits 2 to 9 and 0. Under certain conditions, the digit 1 may also be used as the third digit of a national toll code provided, however, that the second digit is the digit 0 and the first digit is any one of the digits 2 to 9, inclusive. The digits 1 and 0 have been selected as a second digit of the national toll code because all office or exchange codes identifying the different exchanges of the different networks never use the digits 1 or 0 as the second digit. Consequently, all national toll codes can be identified by the fact that the second digit is the digit 1 or the digit 0. It will be appreciated, however, that there are some special codes, for example, using the digits X11 that may be used in connection with special service calls to special service operator positions in a local exchange. The letter X, noted above, is representative of any digit 1 to 9 and 0.

In order to test the first three digits dialed by a calling subscriber and registered in the call register 900 to see whether or not they correspond to a national toll code, the first, second and third digit registers 1020, 1030 and 1040 are provided respectively with the wipers 1028, 1037 and 1048 and associated bank contacts which are interconnected in a predetermined manner to control the relays in the digit register 1200 (Figs. 12 and 13)

so that the eighth, ninth, tenth and eleventh digit registers 1310, 1320, 1330 and 1340 are rendered available. To describe this operation, it will be assumed that a three digit national toll code is registered in the first three registers 1020, 1030 and 1040, inclusive.

The operation of the receive sequence switch 1010 during the dialing of the first three digits is exactly the same as has been previously described. However, it should be noted that during the dialing of the first digit to register the same in the digit register 1020, the wipers of the receive sequence switch 1010 will be in engagement with the contacts 1. During the interdigital pause, the wipers of the receive sequence switch 1010 will be advanced into engagement with the contacts 2 whereupon the ground at the wiper 1017 will be applied to the conductor 602AEO extending to Fig. 6 to control the party test relay R460 in the controller 400 in the previously described manner. In other words, the party test relay R460 is operated so that during the dialing of the second digit, the ground or spotter pulses from the special dials at party subscriber substations will control the party line relay R470 in the manner previously described to indicate the particular position of the calling station on a calling party line.

In connection with the identification of a calling station on a party line by means of the special ground pulses, as previously described, it is essential that the second digit of a called number be the digit 2 or greater. This limitation is based on the proposition that all office or exchange codes have a second digit that is any one of the digits 2 to 9, inclusive. This can be verified by referring to a standard calling device where it will be found the finger holes 2 to 9, inclusive, are provided with the different letters of the alphabet in the manner shown in the previously illustrated table. Accordingly, if the second digit is based on a regular exchange code, the appropriate pulses of the dial for registering the position of a calling station on a party line will be transmitted and registered in the manner previously described. In the event the second digit is the digit 1 of a national toll code and the calling subscriber happens to be at a party station, then the station identifying pulses may be mutilated inasmuch as only a single loop pulse indicative of the digit 1 will be transmitted from the calling subscriber dial to register the second digit 1 in the second digit register 1030. Of course, if the second digit of the national toll code dialed by the calling subscriber is the digit 0 instead of the digit 1, then the proper registration of the identity of the calling station on the party line will be made in exactly the same manner as described hereinbefore.

After the dialing of the second digit and the registration thereof in the second digit register 1030, the receive sequence switch 1010 will advance its wipers into engagement with the contacts 3 in the associated contact banks. When this occurs, the ground potential on the wiper 1017 will be extended by way of the wiper 1037 in engagement with either the contact 1 or the contact 10 (depending upon whether the second digit is 1 or 0), wiper 1028 in engagement with any one of the contacts 2 to 9, inclusive (depending upon the registration of any one of the digits 2 to 9, inclusive, in the first digit register 1020), conductor 1069LHA extending to Fig. 12 and the winding of the long haul relay R1210 to battery. The operation of this relay is an indication that the first two digits dialed by the calling subscriber are indicative of a national toll code. Upon operating, the relay R1210, at its contacts 1213, prepares a point in the circuit for operating the relay R1220 provided the third digit dialed by the calling subscriber is that of a national toll code. Finally, at the contacts 1212, the relay R1210 disconnects the grounded conductor 605CR29 (grounded at contacts 642' on the operated seizure relay R640) from the conductor 1204SAL extending to Fig. 18.

Referring to Fig. 18 it will be seen that the conductor 1204SAL provides the locking ground potential for any one of the operated party station relays R187OP1 to R187OP5, inclusive. In other words, whatever party relay has been operated in Fig. 18 as a result of pulses transmitted from the calling subscriber dial during the dialing of the second digit will now restore to normal. This is done at this time inasmuch as the second digit on a national toll code may be the digit 1, as previously noted, and thus mutilates the pulses that are necessary to accurately register the identity of the different calling stations on a party line. The registration of the party station on a calling party line will, in the case of national toll code, be again registered during the dialing of the fourth digit by the calling subscriber.

The calling subscriber will now dial the third digit which in this case may be any one of the digits 2 to 9 and 0 and if the second digit has been the digit 0 the third digit may also include the digit 1. In any event, if the digit 2 to 9 or 0 is registered in the third digit register 1040, ground potential encountered by the wiper 1048 will be extended by way of the conductor 1070LHB extending to Fig. 12 and then by way of contacts 1213 in order to operate the relay R1220. Upon operating, the latter relay, at its contacts 1229, will lock itself over a circuit that is independent of the contacts 1213. It should be noted that if the second and third digits of the national toll code are respectively the digits 0 and 1, the circuit for operating the relay R1220 will instead include ground at wiper 1036, the engaged tenth contact, contact 1 engaged by the wiper 1048 and conductor 1070LHB extending to Fig. 12.

As soon as the relay R1220 operates it closes its contacts 1223 and 1222 in order to connect the eighth and ninth digit registers 1310 and 1320 to the conductors 1062 and 1063 extending to Fig. 10 which terminate respectively in the contacts 8 and 9 accessible to the wiper 1014 on the receive sequence switch 1010. In other words, the above noted eighth and ninth digit registers will now be connected to the impulsing circuit through the wiper 1014 when the eighth and ninth digits of the number are dialed by the calling subscriber. Also, at the contacts 1224, the relay R1220 interconnects the conductor 602AEO and 1068LAE. These conductors will be utilized as soon as the receive sequence switch 1010 advances its wipers into engagement with the contacts 4 during the interdigital pause between the dialing of the third and the fourth digit, and will complete the circuit for operating the party test relay R460 in the manner to be described hereinafter. As a further result of the operation of the relay R1220, at its contacts 1225, it disconnects the conductor 1066SA3 from the conductor 1067SA4 in order to delay the operation of the assigner start relay R550 until after the fourth digit is dialed by the calling subscriber instead of after the third digit as is the usual procedure.

At its contacts 1226, the relay R1220 applies ground potential to the conductor 1201LHL extending to Fig. 19 to provide a locking potential for the relay R1930 when the latter relay is subsequently operated.

Finally, at its contacts 1227 and 1228, the relay R1220 prepares points in circuits for subsequently operating the relay R1250 and, in series, the relays R1230 and R1240. The operation of the latter relays, however, is delayed until the code switch 1950 in the call recorder 2000 (Figs. 19 to 21, inclusive) is operated.

During the interdigital pause following the registration of the third digit in the third digit register 1040, the receive sequence switch 1010 will advance its wipers into engagement with the contacts 4 in the associated contact banks. Thus, the wiper 1014 will connect with the bank contact terminating the conductor 1004 so that the impulses of the fourth digit (the first digit of a called office code) may now be registered in the fourth digit register 1110. Also, the wiper 1017 now applies ground potential to the conductor 1068LAE extending to Fig. 12, then by way of the contacts 1224, the conductor 602AEO extending to Fig. 10, conductor 602AEO extending to Fig. 6, contacts 652, winding of the party test relay R460 and, in series, the spotter battery 473 and the exchange battery 472. In this manner, the controller 400 is now conditioned so that the fourth digit dialed by the calling subscriber will be registered in the fourth digit register 1110 in the usual manner and in addition thereto, the party line relay R470 may be controlled so that the party station relays R187OP1 to R187OP5, inclusive (Fig. 18), may be controlled in the manner previously described to register the position of the particular calling station on a party line. However, in order again to provide the locking circuit to retain the operated ones of the party relay R187OP1 to R187OP5, inclusive, in their operated positions to maintain the registration of the particular calling station on any calling line, the conductor 1204SAL must again be grounded. This is accomplished as a result of the advancement of the wipers of the receive sequence switch 1010 from engagement with the contacts 3 into engagement with the contacts 4.

By referring to wiper 1017, it will be seen that when the wiper leaves the associates contact 3, it removes ground potential from the previously traced circuit for operating the long haul relay R1210 (Fig. 12). Consequently, during the interdigital pause between the dialing of the third and fourth digits, the relay R1210 will restore to normal to interconnect, at its contacts 1212, the conductor 605CR29 and 1204SAL. In this manner the ground potential on the conductor 605CR29 will retain any operated party relay (Fig. 18) in its operated position to register the identity of the particular calling station on a party line.

From the foregoing it should be clearly understood that during the dialing of the fourth digit, the fourth digit register 1110 will be operated to register the corresponding digit and that the party relays R187OP1 to R187OP5, inclusive, will also operate to register the identity of the calling station on a party line. In this connection it may be well to note the fact that the calling device at the different calling stations on the party lines are arranged so that they will transmit the station identifying ground pulses during the dialing of each digit but the party test relay R460 is selectively controlled so that the station identifying ground pulses are only registered during the dialing of the second digit if the first, second and third digits of a called number correspond to a called office or exchange code. However, if the first, second and third digits correspond to a national toll code, then the station identification made during the dialing of the second digit is canceled and the party test relay R460 is again operated during the dialing of the fourth digit so that the station identification is again registered in the party station relays of Fig. 18.

As a subscriber continues to dial the digits of the desired called station, they are registered respectively in the fourth, fifth, sixth and seventh digit registers 1110, 1120, 1130 and 1140 as the receive sequence switch 1010 advances over the contacts 4 to 7, inclusive. As the wipers engage the respective eighth, ninth and tenth contacts of the receive sequence switch 1010, the impulses of the eighth, ninth and tenth dialed digits will be transmitted respectively to the magnet M1311 of the eighth digit register 1310, the magnet M1321 of the ninth digit 1320 and to the magnet M1331 of the tenth digit register 1330. Thus, the last three digits of a ten digit call will be registered in the eighth, ninth and tenth digit registers. Under certain conditions it may be necessary to dial an additional eleventh digit which will be registered in the manner noted above in the eleventh digit register 1340 as soon as the receive sequence switch 1010 has advanced its wipers into engagement with the contacts 11 in the associated contact banks.

At the present time the three digits of a national toll code are registered respectively in the first, second and third digit registers 1020, 1030 and 1040; the three digits of a called office code are registered respectively in the fourth, fifth and sixth digit registers 1110, 1120 and 1130; and the four digits of the numerical portion of a called subscriber directory number are now registered respectively in the seventh, eighth, ninth and tenth digit registers 1140, 1310, 1320 and 1330. If the additional fifth digit of the numerical portion of a subscriber number is necessary, it is registered in the eleventh digit register 1340.

When the receive sequence switch 1010 advances from engagement with the tenth contact into engagement with the eleventh contact during the interdigital pause between the dialing of the tenth and eleventh digits, the ground potential applied to the wiper 1015 over the conductor 871LGR is extended by way of the conductor 1071LHE to Fig. 12 where it completes a circuit including the contacts 1227 for operating the relay R1250. This relay immediately locks itself by way of its contacts 1252 to the grounded conductor 605CR29 and at the same time, at its contacts 1251, it applies the ground potential on the conductor 605CR29 to the conductor 1204SAL in order to retain the locking circuit for the operated ones of the party relays (Fig. 18). In view of the foregoing, it will be appreciated that the relay R1250 will be operated immediately after the tenth digit is registered in the tenth digit register 1330.

If an additional eleventh digit is dialed by the calling subscriber and registered in the eleventh digit register 1340, then during the interdigital pause following the eleventh digit, the receive sequence switch 1010 will again advance its wipers an additional step.

In the switch illustrated in the drawings, the wipers 1013 to 1017 are shown as double ended wipers and it should be understood that when the wipers leave the eleventh contacts in the associated contact banks to take the additional step, the opposite ends of the wipers will reengage the initial contact 1. As soon as the wiper 1017 reengages the associated contact 1, it will recomplete the previously traced circuit including the wipers 1037 and 1028, the conductor 1069LHA extending to Fig. 12 in order to reoperate the long haul relay R1210. This relay upon being reoperated will again interrupt the point in the circuit including its contacts 1211 to indicate to the sender 1400 (in the manner to be described hereinafter) that the national toll call being handled by the director is one in which eleven digits have been dialed instead of the usual ten digits. The fact that the contacts 1212 are opened at this time by the relay R1210 is of no importance since the contacts 1251 are closed.

The control of the relays R1230 and R1240 in the digit register 1200 will be exercised subsequently when the call recorder 2000 portion of the director is placed in operation. These relays will transfer the marking ground potentials at their respective contacts from the registers in the call register 900 to the register in the digit register 1200 at the appropriate time.

*Operation of the director translator assigner 2800A*

In the description previously given, it was pointed out that the conductor 515CR18 was grounded by the wiper 1016 of the receive sequence switch 1010 at the end of the dialing of the third digit on seven digit called numbers and at the end of the dialing of the fourth digit on national toll calls in which ten or eleven digits are dialed. The grounding of the foregoing conductor completed the previously described circuit for operating the assigner start relay R550 in the controller 400 portion of the director. The assigner start relay R550 is operated whenever it is necessary to obtain a translation of the first three digits registered in the call register 900. Since the translator 2700 and the codexer 2300A are common to all of the directors in the exchange, it is necessary to assign the combined codexer 2300A and translator 2700 to the exclusive use of the particular calling director. This is accomplished by means of the director translator assigner 2800A shown in Figs. 28 and 29.

Referring now to the assigner start relay R550, it will be seen that as soon as the relay operates, it locks itself over a circuit including the winding of the relay, contacts 683, 713, 572, 555 and ground at contacts 643 to retain the relay in its operated position after its initial operating circuit is interrupted. At its contacts 551, the relay R550 applies ground potential to the conductor 514TENS extending to Fig. 29 to mark the particular tens marking conductor in the director translator assigner corresponding to the particular tens group which includes the particular calling director.

Facilities are provided in the director translator assigner 2800A to assign any one of 100 different directors to the exclusive use of the combined codexer 2300A and translator 2700. For the purpose of this description, it will therefore be assumed that the particular calling director has been arbitrarily assigned the number 01, although it should be understood that it may be assigned any other number from 01 to 99 and 00. The ground potential applied to the conductor 514TENS is further extended by way of the contacts 2930, to the conductor TM0 which is connected to the winding of the relay R2800T, contacts 2821 and the winding of the relay R2830 to battery. This circuit will cause the tens relay R2800T and the common relay R2830 in the assigner 2800A to operate.

As a further result of the operation of the assigner start relay R550, at its contacts 552, it connects the winding of the relay R560 to the conductor 513CPR extending to Fig. 28. In Fig. 28 the conductor 513CPR terminates in the contacts TS1 on the relay R2800TS. However, the relay R560 does not operate at this moment.

At the contacts 554, the assigner start relay R550 interrupts a point in the previously traced impulsing circuit including the conductor 504RA in order to release the primary selector, such as 300, or any other switch that has been operated over this conductor. In other words, the fact that a translation is being requested by the director, will cause any of the switches that have been operated during the dialing period to be restored to normal.

At its contacts 556, the assigner start relay R550 connects the timer conductor 401MS2 to a circuit including the winding of the relay R520 and to a circuit including the winding of the relay R480.

At its contacts 557, the relay R550 connects the contacts accessible to the wiper 493 on the timer 490 to the circuit including the winding of relay R410.

Finally, at the contacts 558, the assigner start relay R550 applies ground potential to the conductor 506ST extending to Fig. 15 in order to complete the operating circuit for the lower winding of the relay R1540 in the sender 1400 (Figs. 14 to 16, inclusive). The latter circuit prepares the sender 1400 to send out the routing digits that are subsequently stored in the registers of the coder 1800 (Fig. 17).

The director translator assigner 2800A shown in Figs. 28 and 29 is an all relay type unit which is arranged to individually connect a calling director to the common translator 2700 through a codexer 2300A. The director translator assigner 2800A has a capacity for individually connecting any one of 100 directors to the common codexer-translator equipment but only one director is connected to the codexer-translator at a time. Two director translator assigners, 2800A and 2800B, are provided and in the drawing the director translator assigner 2800B is schematically illustrated by means of a block diagram. It is contemplated, however, that the assigner 2800A be normally used except when it is defective or when it is to be routined and in either event, the assigner 2800B is then used. A control and transfer circuit 2901 is provided to automatically or, if desired, manually switch either assigner 2800A or 2800B in service and in either case, the remaining assigner is used as an auxiliary standby unit.

As noted above, the conductor 514TENS is a tens conductor in the 0 group and is, therefore, multipled to the controller 400 portion of each of the ten directors in the 0 group. The remaining conductors TM1, TM2 to TM9, inclusive, connected respectively to the armature springs of the contacts 2931, 2932, etc., on the relay R2930 are also multiply connected to the controller portions of each of the directors in each of the tens groups having the tens digits 1 to 9, inclusive. The transfer relay R2930 is normally operated, as is illustrated, to connect the above tens conductors TM1 to TM9 and TM0 to the translator assigner 2800A. If the relay R2930 is restored and the transfer relay R2920 is operated, the above noted tens conductors will instead be connected to the director translator assigner 2800B. The 100 different CP (units) conductors which are individual respectively to each of the 100 directors have been designated with the digits corresponding to the number arbitrarily assigned to the corresponding director. Thus, the CP01 conductor (Fig. 28) is individual to the controller portion of the director 01 and for purposes of identification has been designated 513CPR. The remaining ten directors 02 to 00, inclusive, are also provided with the individual conductors terminating in the armature springs of the contacts TS2 to TS0, inclusive, on the 0 tens relay R2800TS. There are ten relays corresponding to R2800TS but only three of the relays have been illustrated. The remaining relays are connected and arranged in substantially the same manner as has been shown in Fig. 28.

Actually, each of the director translator assigners 2800A and 2800B utilizes a decimal cross point system for assigning directors. This is accomplished, as noted above, by providing each translator assigner with ten pairs of tens relays R2800T and R2800TS and two common relays R2820 and R2830 to mark the tens digit of the particular calling director. Also each director assigner is provided with ten pairs of unit relays, such as R2800U and R2800S, and two common units relays R2810 and R2815 to mark the units digits of the calling director.

As previously noted and to simplify the explanation of the operation of the director assigner 2800A, it will be assumed that only the director 01 requires the routing translation. As a result thereof, the conductor 514TENS (Fig. 29) is grounded in the manner previously stated to complete a circuit including the contacts 2930, the TM0 conductor in the cable 2902, the winding of the 0 tens relay R2800T, contacts 2821 on the normally operated relay R2820 and the winding of the relay R2830 to battery. This causes the 0 tens relay R2800T to operate in series with the relay R2830. At its "X" contacts T1, the relay R2800T locks itself in series with the winding of the relay R2830 before the initial operating circuit traced above has been interrupted. Also, at its contacts T2, the relay R2800T prepares a point in the circuit for the 0 tens relay R2800TS.

As soon as the relay R2830 operates it interrupts, at its contacts 2832, the circuit for the slow-to-release relay R2820 and, at its contacts 2831, it completes an obvious circuit for illuminating the number 1 assigner lamp L2974. This will indicate to the exchange attendant that the assigner 2800A is now in use. The relay R2820 now restores to normal and, at its contacts 2821, 2822 and 2823, it opens the original circuits that include the windings of the three illustrated relays R2800T, R2801T and R2802T representing the three tens groups 0, 1 and 2. It should be understood, however, that the relay R2820 is provided with additional contacts, such as illustrated, to include the remaining seven tens groups of relays corresponding to the relay R2800T. The restoration of the relay R2820 accordingly will prevent any other tens marking relays, such as the relay R2800T, from being operated by calls handled by a director in any of the remaining tens groups. The relay R2800T in the 0 tens group, however, remains locked in its operated position in series with the relay R2830.

As a further result of the restoration of the relay R2820, at its contacts 2824, it now completes a circuit including the contacts T8 on the relay R2801T, the contacts T5 on the relay R2802T and corresponding contacts on the remaining tens relays (not shown) contacts T2 on the operated 0 tens relay R2800T and the winding of the 0 tens relay R2800TS to battery. The latter relay, at its ten contacts TS1 to TS0, inclusive, will now connect the ten cross-point return conductors CP01 to CP00 of the ten directors in the 0 tens group having the corresponding units digit 1 to 9 and 0. This group of conductors includes the conductor 513CPR which designates the cross-point conductor CP01 individual to the particular calling director 01. A circuit is now completed which may be traced from ground by way of the winding of the units digit 1 relay R2801S, contacts TS1 on the operated tens digit 0 relay R2800TS, conductor 513CPR in the cable 2903 extending to Fig. 5, contacts 552 and the winding of the relay R560 to battery. The resistance of the relay R2801S in the above described circuit is such that it will prevent the relay R560 from operating at this time but the relay R2801S now operates and completes, at its contacts S3 a circuit including the winding of the relay R2801U, contacts 2813 and the winding of the relay R2815. Consequently, the relays R2801U and R2815 operate in series. These relays perform substantially the same functions in substantially the same manner as the above described relays R2800T and R2830.

More specifically, the relay R2801U closes its "X" contacts U1 to lock itself in its operated position in series with the relay R2815. At its contacts U2, the relay R2801U prepares a point in the circuit for operating the relay R560 in the controller 400 portion in the 01 calling director.

Figure 27:
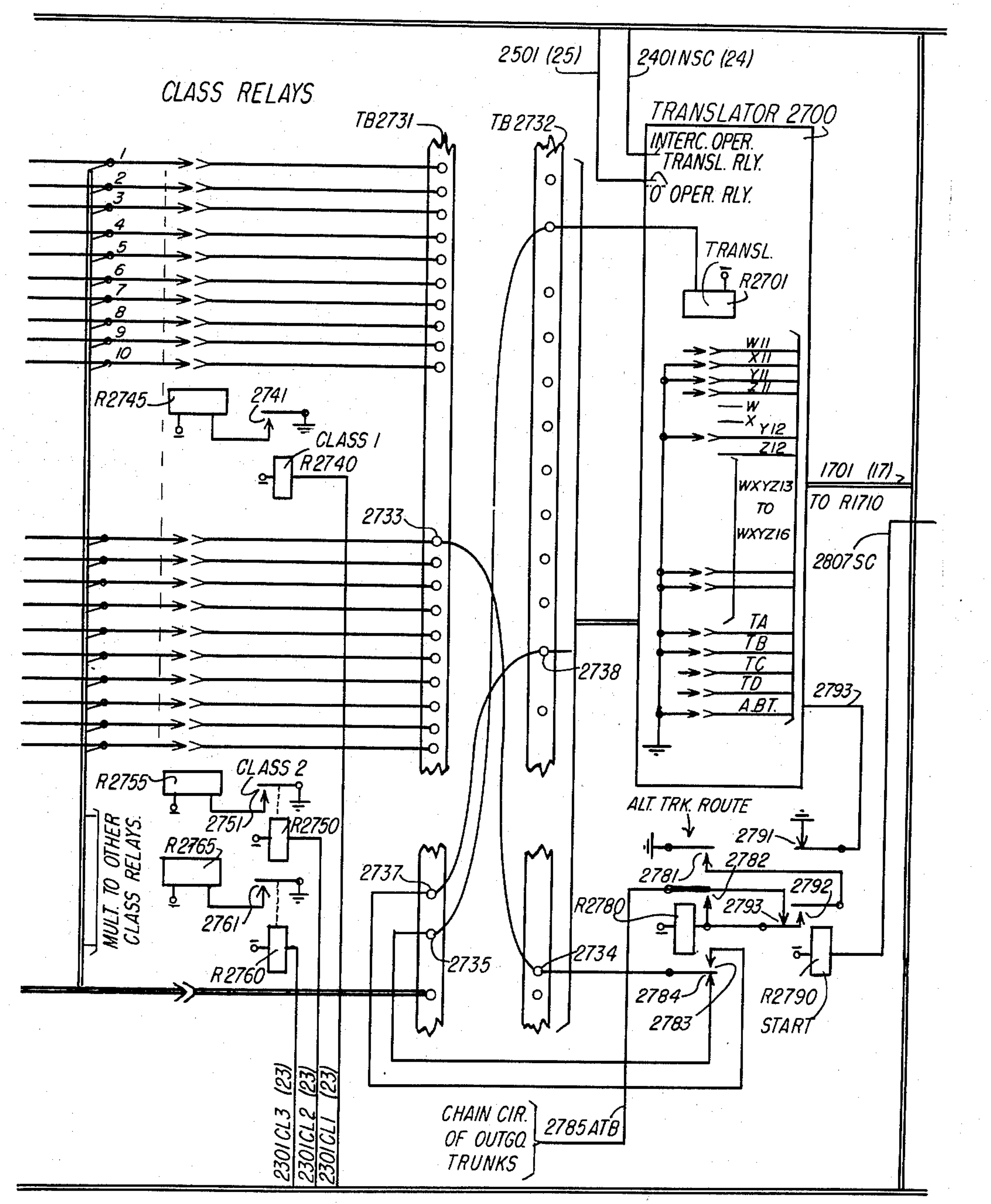

Referring now to the relay R2815, which operated in series with the relay R2801U, it will be seen that, at its contacts 2817, it interrupts a point in the operating circuit for the slow-to-release relay R2810. Also, at its contacts 2816, the relay R2815 now applies ground potential to the conductor 2807SC extending to Fig. 27 in order to operate the start relay R2790 (Fig. 27).

Incident to the restoration of the relay R2810, at its contacts 2811, 2812, 2813 and the remaining seven contacts, not shown, interrupts the initial operating circuits for the ten units relays R2800U, etc. The relay R2801U, however, is retained in its operated position over the locking circuit including its X contacts U1 and the winding of the relay R2815. The opening of the energizing circuits for the remaining units relays R2800U, etc., will prevent such relays from operating in the event one of the corresponding pairs of relays, such as R2800S is operated by any one of the directors in the 0 tens group.

Finally, at its contacts 2814, the relay R2810 will connect the ground potential at the contacts 2911 to the previously described circuit in order now to operate the relay R560 in the controller 400 portion of the director. However, the latter circuit can not be completed if the associated codexer 2300A (or B) has not as yet released from a preceding translation operation. If this is true, the codexer relay R2910 will be in its operated position to remove ground potential from the conductor 2302UL so that the circuit for operating the relay R560 can not be completed.

Figure 5:
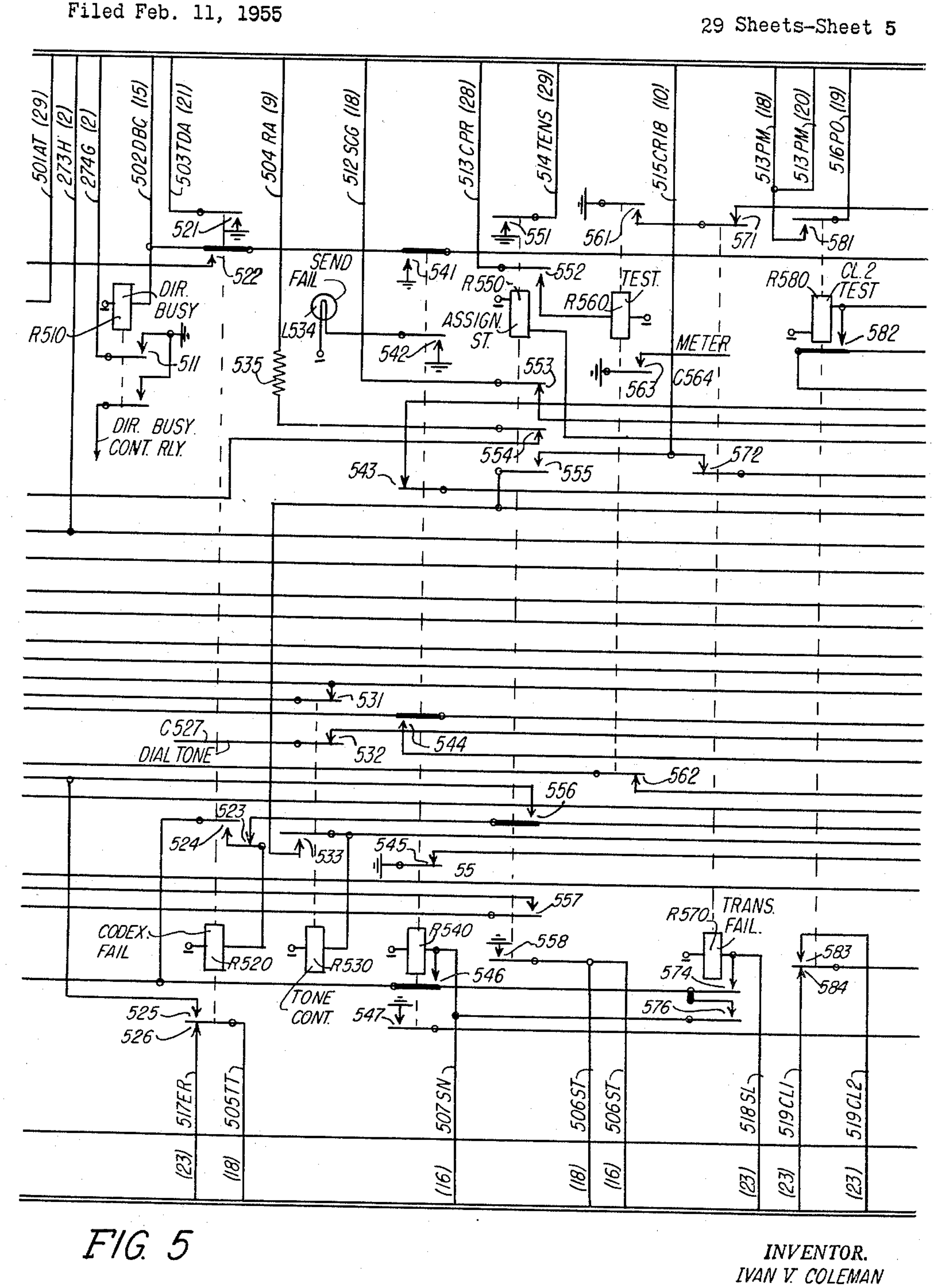

It will be assumed, however, that the codexer relay R2910 is in its restored position and, at its contacts 2911, ground potential is extended by way of the contacts 2931', resistor 2818, contacts 2814 and contacts U2 on the operated "1" units relay R2801U in multiple with the grounded winding of the relay R2801S (which remains in its operated position), contacts TS1 on the operated "0" tens relay R2800TS, conductor 513CPR extending to Fig. 5, contacts 552, and the winding of relay R560 to battery. The relay R560 operates over this circuit due to the increase of current flow through its winding. The operation of relay R560 is a signal to the controller 400 portion of the 01 director that it may now be associated with the codexer 2300A and the translator 2700 in order to obtain the appropriate translation of the digits registered in the first three digit registers 1020, 1030 and 1040 of the call register 900 portion of the director.

Referring now to the controller 400 portion of the director, it will be seen that the relay R560 (Fig. 5) upon operating opens, at its contacts 562, a point in the initial operating circuit for the translation assigner failure relay R480. Also, at its contacts 563, the relay R560 completes a circuit including the conductor C564 for operating a peg count meter (not shown) in order to produce a count of the number of times the director is associated with the translator.

Finally, at its contacts 561, the relay R560 completes a circuit including the contacts 571 and 711 and in multiple, the conductors 702BR extending respectively to Figs. 17 and 23. In Fig. 17, it will be seen, that the director translator connect relay R1710 is operated when the conductor 702BR is grounded and in Fig. 23 it will be seen that the director codexer connect relay R2370 is operated when the conductor 702BR is grounded. The relay R1710 is a multicontact relay which is individual to the coder 1800 portion of the 01 director and connects the coder 1800 to the conductors included in the cable 1701 which are multiply connected to all of the individual translator relays, such as the relay R2701, in the translator 2700 (Fig. 27). The coder portion of each of the directors provided in the exchange is provided with a multicontact relay, such as the relay R1710, so that each of the other directors may be individually connected to all of the translator relays, such as 2701, provided in the common translator 2700.

Referring now to Fig. 23, it will be seen that the director codexer connect relay R2370 is also individual to the call register portion 900 of the 01 director. This relay is of the multicontact type and in additon to providing contacts for connecting all of the marking conductors in the cable 1073 from the digit registers 1020, 1030 and 1040 to the codexer 2300A, the relay also is provided with contacts for interconnecting certain of the conductors in the controller 400 portion of the director to the translator 2700 and to the codexer 2300A.

Referring again to Fig. 23, it should be noted that the director codexer connect relay R2370, at its contact 1, applies ground potential to the conductor 2302UL extending to Fig. 29 in order to maintain a marking ground potential on the latter conductor even though the codexer relay R2910 may subsequently be operated. At the contacts 2, 3 and 4, the multicontact relay R2370 connects the class conductors 519CL1 to 519CL3, inclusive, from the controller 400 portion of the 01 director to the conductors 2301CL1 to 2301CL3, inclusive, extending to Fig. 27. These conductors terminate in corresponding class relays which will be selectively operated in accordance with the particular class of the calling line that has been registered by the class test relays in the controller 400 portion of the director.

Figure 7:
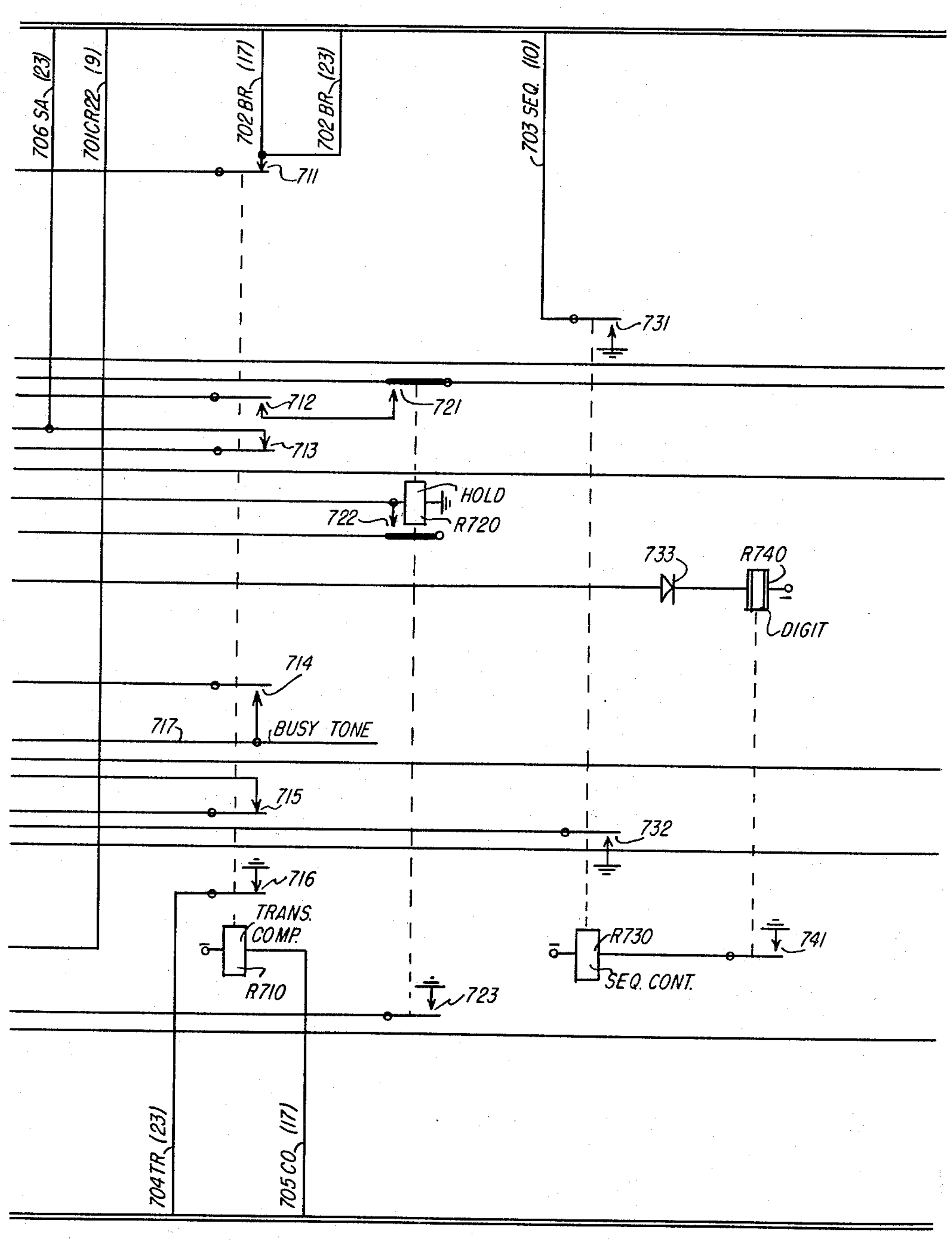

At its contacts 5, the relay R2370 applies ground potential to the conductor 706SA extending to Fig. 7 to complete a holding circuit by way of the contacts 683 for the assigner start relay R550. In other words, the relay R550 will now be retained operated over the conductor 706SA from the director codexer connect relay R2370 instead of from ground potential applied to the conductor 515CR18. The latter conductor will have ground potential removed therefrom as the calling subscriber continues to dial the remaining digits of the called subscriber number.

At the contacts 9 to 13, inclusive, the relay R2370 connects the WXZYS23 conductors in the cable 1073 to the corresponding conductors in the cable 2303. Also, the contacts 14 to 18, inclusive, connect the WXYZS22 conductors in the cable 1073 to the corresponding conductors in the cable 2303. Finally, the contacts 19 to 23, inclusive, connect the WXYZS21 conductors in the cable 1073 to the corresponding conductors in the cable 2303.

It should be noted in Fig. 23 that the conductors in the cable 2303 terminate in corresponding contacts in the multicontact code connect relay R2330. The latter relay is normally operated to connect the codexer 2300A to any calling director. Alternatively, however, the relay R2310 may be selectively operated to connect the director to the second codexer 2300B (schematically illustrated in block diagram form) whenever the first codexer 2300A is either disabled or disconnected. Accordingly, in the present disclosure the WXYZS21, WXYZS22 and WXYZS23 code marking conductors in the cable 2303 are shown multiply connected to the contacts on the multicontacts R2310 and R2330. Since the code relay R2330 is assumed to be in its operated position, these marking conductors are now extended by way of the cable 2305 to Fig. 25 where they terminate respectively in the correspondingly designated register relays to register in code form the first three digits that are registered in the digit registers 1020, 1030 and 1040 of the call register 900. The three sets of five register relays WXYZS21, WXYZS22 and WXYZS23 may be operated in code combinations in accordance with the digit registers, as noted above, in the following order.

| Digit: | Relay operated |
|---|---|
| 1 | WX |
| 2 | WY |
| 3 | WZ |
| 4 | XY |
| 5 | XZ |
| 6 | YZ |
| 7 | WS |
| 8 | XS |
| 9 | YS |
| 0 | ZS |

Based on the foregoing code, the relays WXYZS21, WXYZS22 and WXYZS23 may be operated in any combinations of two out of five operated relays to register any one of the digits 1 to 9 and 0. Consequently, whatever digits have been registered respectively in the first, second and third digit registers 1020, 1030 and 1040 will be transferred to the corresponding registers (Fig. 25) of the codexer 2300A (or B if connected) as soon as the director is associated with the codexer by the operation of the connect relay R2370.

At the present time the first digit registered in the first digit register 1020 of the call register 900 is now transferred in accordance with the markings applied to the conductor WXYZS21 by the wipers 1024 and 1025 to the WXYZS register relays in the hundred register 2505 in the codexer 2300A. The second digit registered in the second digit register 1030 is transferred in a like manner to the register relays in the tens register 2506 of the codexer 2300A and the third digit registered in the third digit register 1040 is transferred to the register relays in the units register 2507 of the codexer 2300A.

As noted previously, these relays are operated in code combinations to register any one of the digits 1 to 10 and when any digit is registered, the various contacts on the respective relays will complete circuits to mark one of ten conductors indicative of the numerical designation of the registered digit. If the digit registered in the hundreds digit 2505 corresponds to the above mentioned digit code a circuit will be completed for operating the check relay R2510. For example, if the digit 2 is registered, the W and Y relays in the hundreds register 2505 will be operated. Accordingly, a circuit may be traced for operating the check relay R2510 which includes the winding of the relay, contact A on the operated Y relay, contact B on the operated W relay, contacts C, D and E on the restored S, X and Z relays, conductor 2306T extending to Fig. 23, contacts on the operated connect relay R2300, conductor 2309MTR extending to contacts 7 on the operated director-codexer connect relay R2370, conductor 704TR extending to Fig. 7, and ground at contacts 716 on the restored translation complete relay R710. The check relay R2510 operates over this circuit to complete, at its contacts 2511, a locking circuit for any one of the operated WXYZS21 relays in the hundreds register 2505. Also, at the contacts 2513, the check relay R2510 will apply ground potential to the set of pyramid contacts on the relays of the hundreds register 2505 whereby a marking ground potential will be applied to one of the ten conductors corresponding to the numerical value of the digit registered. At the contacts 2512, the check relay R2510 completes a circuit including the contacts 2423 and 2412 for operating the relay R2405. However, inasmuch as the relay R2405 is of the slow-to-operate type, the operation of the relay is somewhat delayed.

The second digit registered in the tens register 2506 performs substantially the same operations as described above whereby the check relay R2520 is operated if the register relays correctly register a digit. The contacts 2521 on the relay R2520 perform the same function as the contacts 2512 and also the contacts 2523 performs the same functions as contacts 2513. In other words, the second digit registered in the tens digit 2506 is marked on one of ten conductors corresponding to the numerical value of the digit.

The units register 2507 operates in the same manner and if the relays in the register are correctly operated to register a digit, the check relay R2530 will be operated. This relay applies a multiple holding ground at its contacts 2531 to the previously traced circuit for controlling the relay R2405. Also, at its contacts 2532, the relay R2530 prepares a point in the circuit including the contacts 2522 and conductor 2402 extending to Fig. 24 for operating the relay R2420. This circuit, however, will not be completed until one of the hundreds relay, such as the relay R2610–1 in the codexer 2300A (Fig. 26) has been operated in accordance with the first digit registered in the register 1020 in the call register 900.

In the previous description of the operation of the codexer 2300A (Figs. 23 to 27, inclusive) it was pointed out that the hundreds register 2505, the tens register 2506 and units register 2507 are respectively controlled by the first, second and third registers 1020, 1030 and 1040 of the call register 900 to register the corresponding first, second and third digits dialed by the calling subscriber. The registration of the foregoing digits in the registers 2505, 2506 and 2507 will complete circuits whereby a single translate relay, such as the relay R2701, will be operated to register in the coder 1800 portion of the 01 director the routing digits and other controls necessary to route the particular call in the proper direction to reach the called destination.

Figure 26:
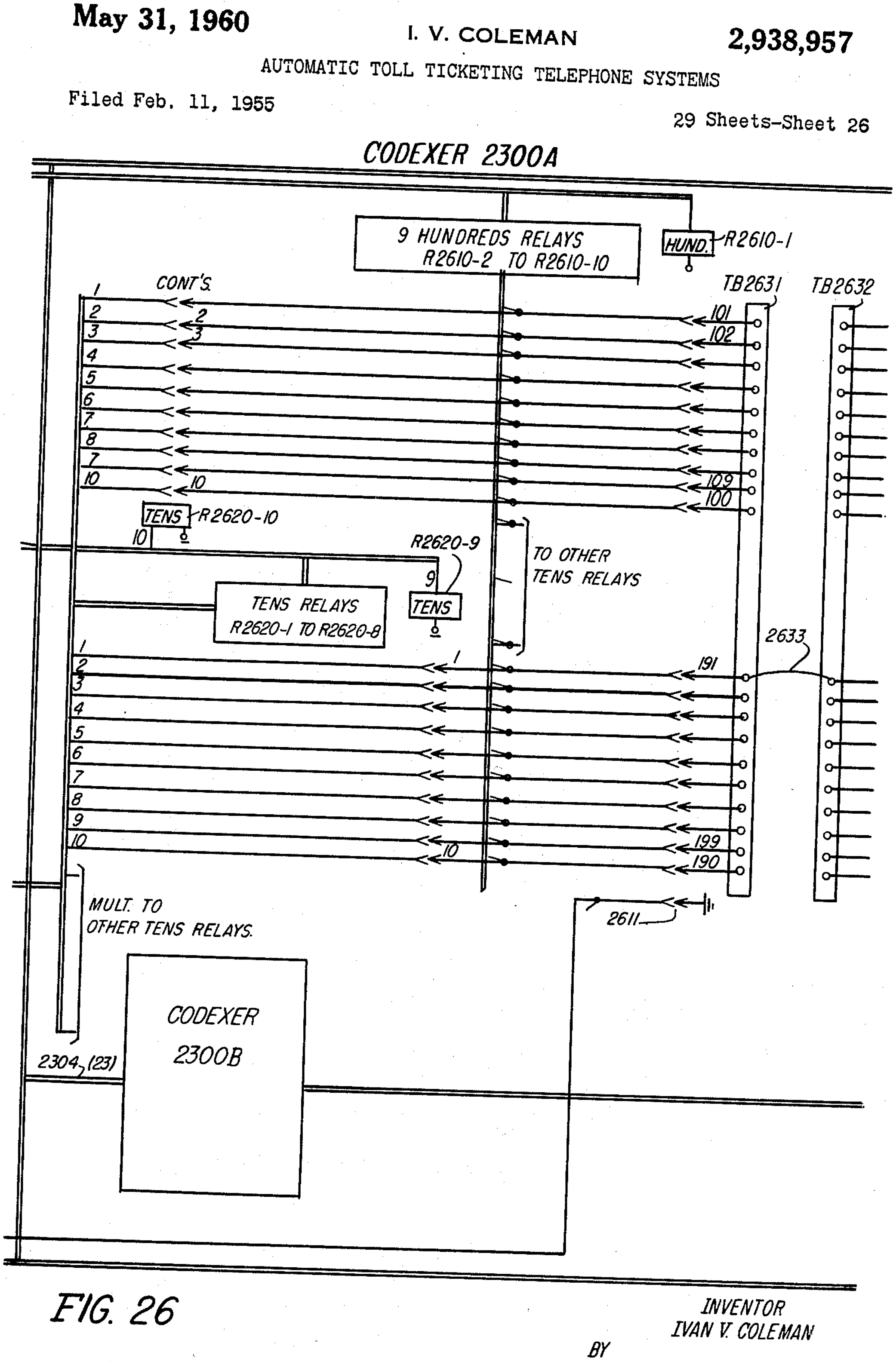

Referring now to Fig. 26 it should be understood that the hundreds relays provided in the codexer 2300A include ten relays 1 to 10, inclusive, such as the relay R2610–1. The hundreds relay R2610–1 is assumed to be a multicontact relay having sufficient contacts thereon to interconnect 100 conductors in a hundreds group to the terminal block TB2631. Although only one hundreds relay has been illustrated for connecting with 100 terminals on the terminal block TB2631, it should be understood that as many as nine additional hundreds relays R2610–2 to R2610–10, inclusive, may be provided to connect with 900 additional terminals on the terminal block TB2631. Furthermore, the hundreds relay R2610–1 is shown as a single relay with 100 make contacts, but it should also be understood that it is merely schematically illustrated and may instead comprise ten individual relays, each having ten make contacts thereon and all ten relays being simultaneously operated when desired.

In Fig. 26 there is also provided ten tens relays, such as R2620–1 to 10, inclusive, wherein each tens relay is provided with ten make contacts for connecting with ten of the conductors in a corresponding tens group of contacts on any one of the hundred relays, such as R2610–1 to 10, inclusive. It should be noted that each of the ten conductors terminating in the ten make contacts on any tens relay is multiply connected to the corresponding tens group of ten contacts on all hundreds relays.

In order to more clearly illustrate the manner in which the conductors and contacts on the different hundreds and tens relays of the codexer 2300A and shown in Fig. 26 are connected, it will be assumed that the hundreds register 2505 (Fig. 25) has been operated to register the digit 1. As a result thereof, the ground potential at the contacts 2513 is connected by way of make contacts on the operated W21 and X21 register relays to the marking conductor 1 in the cable 2590 to complete the operating circuit for the first hundreds relay R2610–1. At its 100 contacts 100 to 199, inclusive the relay R2610–1 prepares circuits for the corresponding terminals on the terminal block TB2631. As soon as the above mentioned hundreds relay R2610–1 operates, it completes, at its contacts 2611, a circuit including the contacts 2532, 2522, conductor 2402 extending to Fig. 24 and the lower winding of the relay R2420 to battery in order to operate the latter relay. It should be noted, however, that each of the other nine hundreds relay R2610–2 to R2610–10 are each provided with a make contact, such as 2611, to complete the above mentioned circuit for the relay R2420 in the event that any other hundreds relay is operated.

Figure 25:
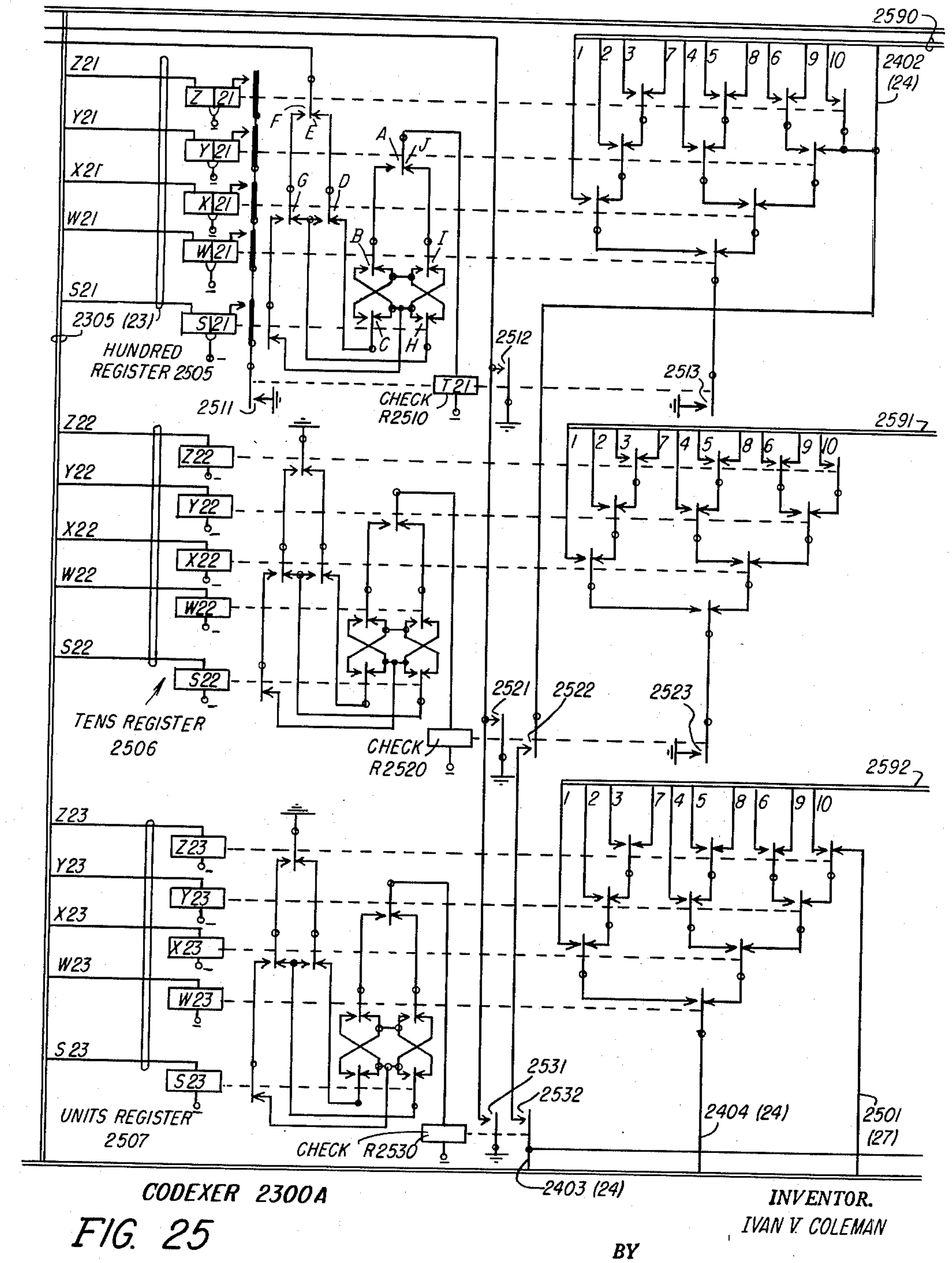

As soon as the relay R2420 operates, it completes, at its contacts 2426, a locking circuit for itself which includes the conductor 2403 extending to Fig. 25 and the ground potential at the contacts 2611 on the operated first hundreds relay R2610–1. As a further result of the operation of relay R2420, at its contacts 2425, it completes an operating circuit for its upper winding from ground potential at any one of the multiple contacts 2512, 2521, and 2531 on the respective check relays R2510, R2520 and R2530. Also, at its contacts 2423 and 2424, the relay R2420 transfers the previously described energizing circuit for the slow-to-operate relay R2405 from ground potential at the multiple contacts 2512, 2521 and 2531 to the grounded conductor 2306TR. As a further result of the operation of relay R2420, at its contacts 2427, it connects the ground potential on the conductor 2306TR to the winding of the relay R2410 to prepare a circuit hereinafter for operating the relay R2410 in series with one of the selected translator relays, such as R2701, in the translator 2700. Finally, at its contacts 2422, the relay R420 applies ground potential to the conductor 2306UH extending to Fig. 23, one of the make contacts on the operated multicontact code relay R2330, conductor 2307UH extending to Fig. 24 and then by way of conductor 2307UH extending to Fig. 29 in order to operate the codexer relay R2910 in the director translator assigner 2808. The operation of the latter relay will busy the translator assigner to all other directors in the system until the connected director has received all the necessary routing digits and other controls from the translator 2700.

Referring again to the codexer 2300A, it will be seen that the second digit dialed by the calling subscriber that has been registered by the register 2506 will selectively operate one of the tens relays R2620–1 to 10, inclusive, depending upon the value of the dialed second digit. Thus, if the second digit dialed by the calling subscriber should be, for example the digit 9, then the ground potential at contacts 2523 will complete a circuit by way of the pyramid contacts on the register relays of the tens register 2506 to the numer 9 marking conductor in the cable 2591 to thereby complete the operating circuit for the ninth tens relay R2620–9. As soon as the latter relay operates it closes its contacts 1 to 10, inclusive, so that the ten terminals on the terminal block TB2631 having the tens digit 9 and which have been selected by the operated hundreds relay R2610–1 will be connected to the ten marking conductors 1 to 10, inclusive, in the cable 2592. It should be understood at this time that the ten contacts 1 to 10, inclusive, on the operated ninth tens relay R2620–9 are also multiply connected to all the make contacts in the ninth group of all of the other hundreds relays R2610–1 to R2610–10, inclusive. The latter relays, however, are not operated at this time and, consequently, the corresponding terminals on the terminal block TB2631 are not selected.

The third digit dialed by the calling subscriber is registered in the units register 2507, since it was transferred thereto from the third digit register 1040, and the pyramid set of contacts on the relays will select the marking conductor in the cable 2592 corresponding to the numerical value of the registered digit. In the present example it may be assumed that the digit 1 has been registered in the units register 2507 to select the marking conductor 1 in the cable 2592. Accordingly, a circuit is now completed which may be traced from the grounded conductor 2606TR (Fig. 23), then by way of the contacts 2427, the winding of the relay R2410, conductor 2404 extending to Fig. 25, the make contacts on the respective W23 and X23 register relays in the units register 2507, marking conductor in the cable 2592, make contact on the operated ninth tens relay R2620–9, contacts on the first hundreds relay R2610–1 to terminal 191 on the terminal block TB2631. This terminal is the particular terminal that has been selected as a result of the registration of the assumed digits 191 in the hundreds, tens and units registers 2505, 2506 and 2507. In other words, these are the first three digits that have been dialed by the calling subscriber and although particular digits have been selected by way of illustration, it should be understood that these digits may be any combination of the digits 1 to 9 and 0, inclusive. Thus, it should be clearly understood that whenever a combination of three digits has been registered in the codexer 2300A, a single terminal out of a maximum possibility of 1000 terminals may be selected on the terminal block TB2631. Of course, the number of terminals provided on this terminal block may be reduced in the event that certain of the digits in the possible three digit codes are not to be used.

In order to complete the above described circuit that has been extended to the terminal 191 on the terminal block TB2631, it will be assumed that this terminal is jumpered to the corresponding terminal 191 on the terminal block TB2632. This terminal, as well as all of the other terminals on the terminal block TB2632, may be connected to the make contacts on the class 1, class 2 or class 3 relays shown in Fig. 27. It will be recalled that the calling subscriber lines in the present exchange were divided into three different classes and that the class of the particular calling line was determined immediately after the subscriber initiated the call by removing his receiver from the switchhook of the associated telephone instrument. The class of the particular calling subscriber line was registered in the controller 400 portion of the director and grounded one of the class conductors 2301CL1, 2301CL2 or 2301CL3 in accordance with the registered class.

In Fig. 27 it will be seen that the three conductors named above are respectively connected to the class 1 relay R2740, the class 2 relay R2750, the class 3 relay R2760. The class 1 relay R2740, for example, is provided with one or more make contacts, such as the contacts 2741, to control one or more multicontact relays, such as the relay R2745 so that all of the conductors representative of called office codes that may be dialed by calling subscribers of the class 1 type will be interconnected between the terminals on the terminal block TB2632 and the terminals on the terminal block TB2731. Thus, it will be apparent that the multicontact relay R2745 may, as a maximum number, be provided with as many as 1000 make contacts. If less than 1000 different called office codes or national toll dialing codes are available to subscribers of the class 1 type, then the number of make contacts on the multicontact relay R2745 may be correspondingly reduced in number. It should be apparent, however, that the relay R2745 although illustrated as a single relay having by way of example, 1000 make contacts, may be instead a plurality of relays each having a predetermined number of contacts thereon to simultaneously close the necessary circuits between the terminals on the respective terminal blocks TB2632 and TB2731. The class 2 relay R2750 is also provided with a make contact 2751 for operating a multicontact relay R2755. The make contacts for this multicontact relay are not shown and it should be understood that they are exactly the same as those schematically shown for the multicontact relay R2745. Therefore, if the multicontact relay R2755 is operated because the particular calling subscriber is of the class 2 type, then it would be possible to interconnect the 1000 terminals on the terminal block TB2632 to 1000 additional terminals (not shown) on the terminal block TB2731. The class 3 relay combination, including the relay R2660, contacts 2761 and the multicontact relay R2765 is exactly the same as the combination shown for the class 1 group of subscriber lines. Accordingly, it will be appreciated that the 1000 terminals on the terminal block TB2631 may be connected to 1000 additional terminals on the terminal block TB2731.

In view of the foregoing, it may be well to mention at this time that the called office codes which may be selectively called by subscribers of the class 1 type would be available provided the corresponding class 1 relays R2740 and R2745 are operated. These same codes may be available to certain of the subscribers of the class 2 type in which event the class 2 relays R2750 and R2755 would interconnect the terminals corresponding to all the codes available to class 2 subscriber lines to the corresponding terminals on the terminal block TB2731. The same facilities would be provided for subscribers of the class 3 type. The various terminals on the terminal block TB2731 may be selectively jumpered to whatever terminals are necessary on the terminal block TB2732 so that a single translate relay, such as the relay R2701, corresponding to the particular code dialed by the calling subscriber will be selected.

In the foregoing description, it was noted that the circuit extended to the terminal 191 on the terminal block TB2631 includes the winding of the relay R2410. If the terminal 191 is jumpered by means of the jumper 2633 to a terminal, such as 191, on the terminal block TB2632, the circuit will be completed through contacts on the operated class 1 relay R2745 to the terminal 2733 on the terminal block TB2731. At this point it may be well to note that if a class 2 or a class 3 line has initiated the described call, then a separate circuit will be selected through the multicontacts on the operated one of the class 2 or class 3 relays R2755 or R2765 to a terminal on the terminal block TB2731. Since it is assumed in the present example that the class 1 calling line initiated a call, the circuit completed to the terminal 2733 will further be extended by the connected jumper to the terminal 2734 on the terminal block TB2732 and then by way of contacts 2784 to terminal 2735 jumpered to terminal 2736 and the winding of the translate relay R2701 to battery. Thus a circuit is now completed between ground and battery in series with the translate relay R2701 and the translator test relay R2410 in the codexer 2300A. The operation of the translate relay R2701 will, by its multicontacts, complete circuits for controlling the registers in the coder 1800 and for operating certain control relays therein. However, before describing the controls performed as a result of the operation of the translate relay, such as R2701, and the controls performed by the operation of the translator test relay R2410, it is advisable to first describe the functions of the start relay R2790 and the alternate trunk relay R2780 in the translator 2700.

It will be recalled that the start relay R2790 operated as soon as the director translator assigner 2800A associated the calling director with the translator 2700. At its contacts 2793, the relay R2790 interrupts a point in the circuit for controlling the alternate trunk route relay R2780 and, at its contacts 2791, it interrupts a point in a locking circuit including the conductor 2793 for a multiple guard relay (not shown) provided in the translator 2700. The last-mentioned circuit, including the conductor 2793, is normally completed when the translator 2700 is in an idle condition so that the multiple guard relay (not shown) will normally connect a plurality of lamps in all of the contacts of each of the translate relays, such as R2701, provided in the translator. For a complete description of the operation and control of the multiple guard relay, reference should be had to the relay R1440 shown in Fig. 14 of the Ostline Patent No. 2,678,-353. This patent clearly shows the manner in which all of the contacts on the multiple guard relay R1440 may be multiply connected with the various conductors of all of the translate relays, such as R1410 shown in the Ostline patent. The same facilities are provided in the present translator 2700.

If it is assumed that the translate relay R2701 and all other translate relays in the translator 2700 are provided with make contacts for terminating the 24 WXYZ11 to WXYZ16 marking conductors and the 5 control conductors TA, TB, TC, TD and ABT, all of the contacts may be multiply connected together by the corresponding conductors and extended by means of the cable 1701 to Fig. 17 where they terminate in corresponding contacts on the director translator connect relay R1710 (Fig. 17). These conductors should also be multipled to all of the other director translator connect relays of all other directors. With this arrangement, whenever a translate relay is operated to mark the conductors in accordance with a preregistered set of routing digits and controls, the preregistered routing digits and controls will be automatically transferred to the coder portion 1800 of the director in use.

In view of the foregoing, it will be appreciated that the translate relays provided in the translator 2700 are permanently wired in accordance with the WXYZ code to register in the coder 1800 portion of the director, as many as six different routing digits may be registered in the WXYZ11 to WXYZ16 route registers (Fig. 17) to route a connection from the originating exchange over a predetermined route or routes to extend a call in the direction of the desired called exchange. In addition to registering the necessary routing digits, the particular translate relays may be permanently wired to mark the control conductors TA, TB, TC and TD to control the sender portion of the director to send out the registered routing digits in a predetermined order and then to send out one or more of the dialed digits that have been registered in the call register 900 portion of the director. The ABT control conductor provided in each translate relay, such as R2701, may be grounded by a translate relay whenever the information pertaining to the particular call must be recorded and it is necessary to ascertain the directory number of the particular calling subscriber. Each translate relay, such as R2701, may be of the type described in the above mentioned Ostline Patent No. 2,678,353 and it may be of the particular construction shown and described in the Ostline Patent No. 2,632,814.

In the above described circuit for operating the translate relay R2701, it was assumed that the alternate trunk route relay R2780 was in its restored position. Consequently, the routing digits or directive for setting up the particular connection will route the call by way of the most direct trunk route to reach the called destination. As long as the called destination indicated by the operation of the relay R2701 can be reached over a direct trunk route, the alternate trunk route relay R2780 will be in its restored position. However, if all of the direct trunk routes are busy, the conductor 2785ATB will be grounded to complete the operating circuit for the relay R2780 through the contacts 2793 on the start relay R2790. Obviously, the relay R2780 can not be operated after the start relay R2790 has been selected to control the translator 2700. However, if the alternate trunk route relay R2780 is operated before the start relay R2790 is operated, then the relay R2780 will lock itself by way of its contacts 2782 and will, therefore, prepare a circuit whereby a different translate relay will be operated. In other words, the alternate trunk route relay R2780 may be operated and locked as a result of an all-trunks-busy condition prior to the initiation of the call being described. If the call is then made in the manner explained above and causes the completion of the circuit to the terminal 2734 on the terminal block TB2732, the circuit for operating a translate relay will be further extended by way of the contacts 2783, terminal 2737 and terminal 2738 to a translate relay (not shown) which may be wired in such a manner that the routing digits preregistered therein will cause the associated director to route the particular call by way of an alternate trunk route to the desired destination. The alternate trunk route facilities described generally above, are disclosed in detail in the above mentioned Ostline Patent No. 2,678,353.

Referring again to the translator test relay R2410 (Fig. 24) it will be recalled that it operated in series with the selected translate relay, such as R2701. At its contacts 2412, the relay R2410 disconnects the ground potential on the conductor 2306TR from the circuit including the winding of the slow-to-operate relay R2405. If the codexer 2300A is operating normally, the sequence of operations of the relays R2420 and R2410 as described previously will be completed before the slow-to-operate relay R2405 has had sufficient time to operate. As a further result of the operation of the translator test relay R2410, at its contacts 2413, it now connects the ground on the conductor 2306TR by way of the contacts 2424 to the winding of the slow-to-operate delay relay R2415 to battery. At its contacts 2411, the relay R2410 prepares a point in the circuit for subsequently grounding the conductor 2306SL. Finally, at its contacts 2414, the relay R2410 interrupts a point in the circuit extending to the conductor 2306ER in order to prevent a set of routing digits from being registered in the coder 1800 portion of the director that would route the call to an intercept operator position.

As will subsequently be described, the translate relay R2701 or any other translate relay that has been selected in accordance with the code dialed by the calling subscriber will transfer the routing digits to the coder 1800 portion of the director. When this occurs, the coder 1800 will complete a circuit for operating the translation complete relay R710 in the controller 400 portion of the director in the manner to be described hereinafter. This relay in turn will remove ground potential from the conductor 704TR extending to Fig. 23 through the various multicontact relays such as R2370 and R2330 so that ground potential is removed from the conductor 2306TR (Fig. 24) in the codexer 2300A. Also, the above mentioned translation complete relay R710 will remove ground potential from the conductor 702BR extending to Fig. 23 in order to restore the director codexer connect relay R2370. In the codexer 2300A, all of the operated register relays in the hundreds register 2505, the tens register 2506 and the units register 2507 will restore to normal and also the associated check relays R2510, R2520 and R2530 will restore to normal. The removal of the holding ground potential from the conductor 2306TR will permit the translator test relay R2410 and also the operated translate relay, such as R2701, to restore to normal. Finally, the start relay R2420 in the codexer 2300A will restore to normal and will remove the busy marking ground potential on the conductor 2306UH so that the director translator assigner 2800A may again be utilized to associate the translator 2700 with another calling director.

In the description thus far, regarding the operation of the codexer 2300A and the translator 2700, it was pointed out that the translator test relay R2410 operated in series with the particular translate relay that is selected by the combined operations of the hundreds, tens and units register 2505, 2506 and 2507. The latter relays, it will be recalled, were operated in accordance with the first three digits, either a called office code or a national toll code that has been dialed by a calling subscriber. In the event that a translate relays, such as R2701, is not selected as a result of the registration of the three digit code in the register relays of the codexer 2300A, it will normally mean there has been no assignment of such a code to either a called exchange or a national toll zone or it may mean that there has been some failure in the operation of the codexer 2300A and the translator 2700. In either event, the translator test relay R2410 will not operate in series with a selected translate relay. Accordingly, when a nonexistent office or national toll code is dialed, the ground potential applied to the conductor 2306TR and extended by way of the contacts 2427 and the winding of the translator test relay R2410 does not complete a circuit for operating the latter relay in series with a selected translate relay.

In view of the fact that the relay R2410 fails to operate within a predetermined elapsed time interval, the circuit from the grounded conductor 2306TR which has been completed by way of the contacts 2424 and 2412 for the winding of the slow-to operate relay R2405 causes the latter relay now to operate. Normally, this circuit is interrupted by the operation of the translator test relay R2410 before the relay R2405 has had sufficient time to operate. At its contacts 2408, the relay R2405 completes a circuit including the grounded conductor 2306TR, contacts 2427 and conductor 2401NSC extending to Fig. 27 in order to operate a translate relay (not shown) which may be similar to the translate relay R2701. However, this translate relay will have a special set of routing digits permanently wired therein so that upon its operation it will mark the conductors in the cable 1701 extending to Fig. 17 so that a predetermined set of routing digits will be registered respectively in the different route registers WXYZ11 to WXYZ16, inclusive, shown in Fig. 17. Actually, the routing digits registered in this manner should be of predetermined values so that the sender 1400 portion of the director will control the switching apparatus in the instant exchange to route the call to an intercept operator position.

In response to the registration of one or more routing digits in the coder 1800 portion of the director which will cause the connection to be routed to an intercept operator position and thus indicate the fact that the subscriber has dialed a non-existent office or national toll zone code will cause the release of the codexer 2300A and the translator 2700 from the associated director. In this connection, it should be noted that as soon as the no-such code relay R2405 operates as described above it completes, at its contacts 2406, a circuit whereby ground potential is extended by way of the conductor 2306UH to Fig. 23, make contacts of the operated code relay R2330, conductor 2307UH extending to Fig. 23, conductor 2307UH extending to Fig. 29 and the winding of the codexer relay R2910 to battery. The operation of the latter relay will remove ground potential at the contacts 2911 from the conductor 2302UL so that another director can not be connected by the director assignor 2800A to the codexer 2300A until the latter circuit has been fully released.

The above mentioned release of the director codexer and translator is all based on the assumption that an appropriate set of routing digits has been correctly registered in the coder 1800 portion of the director. When this occurs, the translation complete relay R710 in the controller 400 portion of the director is operated to initiate the above mentioned release. If the routing digits are not registered in the coder 1800 portion of the director to cause the release, as noted above, the no-such code relay R2405 at the contacts 2407 will extend its initial operating ground potential to the delay relay R2415 which slowly operates. As soon as the latter relay operates, it will extend the ground potential on the conductor 2306TR by way of the contacts 2427, 2408, 2414 and 2418 to the conductor 2306ER extending to Fig. 23, then by way of contacts on the operated code relay R2330, conductor 2309MER in the cable 2303, contact 8 on the operated director codexer connect relay R2370, conductor 517ER extending to Fig. 5, contacts 526, conductor 505TT extending to Fig. 18 and the winding of the relay R1850TT to battery. The operation of the relay R1850 over the above described circuit is an indication that the translator 2700 has failed to appropriately register routing digits in the coder 1800. The translation failure relay R1850TT is provided with four make contacts which will apply ground potential to the terminals 1, 2, 3, 4 on the terminal block TB1851. These contacts may be jumpered to any one of the WXYZ11, 12, 13 and 14 marking conductors that extend to the corresponding register relays of Fig. 17 so that at least one and a maximum of four routing digits for routing the call to an intercept operator position may be registered.

As a further result of the operation of the translation failure relay R1850TT, at its inner make contact, it completes a circuit for operating the relay R1860TD. Operation of the latter relay will control the sender 1400 portion of the director so that it will skip any and all digits that have been registered in the call register 900 portion of the director. The selective controls of the control relays R1860TA, R1860TB, R1860TC and R1860TD to control the skipping action of the sender in skipping the different digits that have been registered in the call register 900 and digit register 1200 portion of the director will be described in detail hereinafter.

The release of the director codexer 2300A and translator 2700 will take place in the usual manner as a result of the registration of the routing digits in the above noted routing registers in the coder 1800.

There is still another failure condition that should be explained in connection with the description of the operation of the codexer 2300A. In the previous description it was pointed out that the start relay R2420 completed the circuit whereby the translation test relay R2410 normally operated in series with a selected translate relay, such as the relay R2701, when an appropriate set of code digits has been registered in the hundreds, tens and units registers 2505, 2506 and 2507. However, even though these circuits may be properly operated there may be some fault in the operation which would fail to register any routing digits in the routing registers WXYZ11 to WXYZ16, inclusive, in the coder 1800 portion of the director. When this occurs, the translation complete relay R710 can not be operated and, therefore, the ground potential will be retained on the conductor 2306TR to maintain the start relay R2420 and the translation test relay R2410 in their operated positions for a longer interval of time than is normally allotted. Therefore, the ground potential on the conductor 2306TR will be extended by way of the contacts 2424 and 2413 to the winding of the slow-to-operate delay relay R2415. This relay will operate after a short delay to apply ground potential at the contacts 2417 to the conductor 2306UH for the same purposes as has been described hereinbefore. Also, at its contacts 2416, the relay R2415 extends ground potential at the contacts 2411 (relay R2410 operated) conductor 2306SL extending to Fig. 23, contacts on the operated code relay R2330, conductor 2309MSL in the cable 2303, contact 6 on the operated codexer connect relay R2370, conductor 518SL extending to Fig. 5 and the winding of the translation failure relay R570 to battery.

At its contacts 574, the relay R570 locks itself in its operated position to ground at contacts 475 on the release key. As a further result of the operation of the relay R570, at its contacts 574 and 576, it extends its initial operating ground and also its locking ground to the winding of the sender failure relay R540. The latter relay now operates and immediately locks itself by way of its contacts 546 to ground at the contacts 475 on the release key.

At the contacts 571, the relay R570 opens the circuit for the director codexer connect relay R2370 and the director translator connect relay R1710 so that the codexer 2300A and the translator 2700 are disconnected from the particular calling director and thus rendered available for use by other directors. The operations which are controlled by the sender failure relay R540 will be described hereinafter in connection with the sender failure operation. However, the relay is also operated under the condition which exists as a result of a translation failure as described above in connection with the relay R570. If desired, the translation failure relay R570 may be provided with an additional set of make contacts for completing a circuit for a signal lamp (not shown) which will indicate that the director has been locked out of service as a result of the translation failure condition.

Referring again to the above described circuit for operating the delay relay R2415 (Fig. 24) it will be recalled that in this case the relay R2415 operated over a circuit including the contacts 2424 on the operated start relay R2420. A condition may exist, however, wherein the circuit for operating the circuit R2420 is faulty although one or more digits may have been registered in the hundreds, tens or units registers 2505, 2506 and 2507. Normally, at least one of the check relays, such as R2510, R2520 or R2530 will be operated to apply ground potential to the contacts 2423 on the non-operated start relay R2420 to first cause the operation of relay R2405 and then to cause the operation of relay R2415. The slow-to-operate characteristics of both the relays R2405 and R2415 wil cause some delay but as soon as relay R2415 operates, it completes, at its contacts 2416, a circuit including ground at contacts 2421 and the conductor 2306SL extending to Fig. 23 and then over the previously described circuit in order to operate the translation failure relay R570. Under the last mentioned condition, the operation of the translation failure relay R570 actually occurs as a result of a failure in the codexer circuit 2300A in that the start relay R2420 has failed to operate. In any event, the director will be locked out of service in the manner described above so that the exchange attendant may ascertain the number of the director involved in the failure condition and may communicate with the calling subscriber to inform him that the particular connection cannot be completed or a busy tone signal may be transmitted to the calling subscriber to indicate a busy condition.

The registration of the single digit 0 to complete a call to the 0 operator position will now be described. In the above description of the mode of operation of the director, the codexer 2300A and the translator 2700, it was pointed out that the director is associated with the codexer 2300A and the translator 2700 in response to the registration of three digits in the first, second and third digit registers 1020, 1030 and 1040 identifying a called office code or in response to the registration of four digits in the event that the first three digits corresponded to a national toll code.

In either event the ground potential at the wiper 1016 on the receive sequence switch 1010 would be extended by way of the conductor 515CR18 extending to Fig. 5 to complete the previously described circuit for operating the assigner start relay R550. This relay in turn caused the director assigner 2800A, the codexer 2300A and the translator 2700 to operate in the manner previously described whereby the routing digits corresponding to the translation of the three registered digits would be stored in the route registers of the coder 1800. The important fact to note with regard to this operation is that the codexer 2300A and the translator 2700 are associated with the particular calling director as the result of the registration of at least three digits of a called office code.

In the event that a single digit 0 is registered in the first digit register 1020 to identify a call to the 0 operator position some facilities must be provided for causing the assigner start relay R550 to operate immediately after the registration of the first digit instead of after the registration of the third or fourth digit. In the present system, this is accomplished by connecting the conductor 515CR18 by way of the "Y" strap (Fig. 10) to the tenth contact accessible to the wiper 1027 on the first digit register 1020. Consequently, when the calling subscriber dials the single digit 0 the digit will be registered in the first digit register 1020 and the wipers 1023 to 1028, inclusive, of the register will be stepped into engagement with the tenth contacts in the associated contact banks. Thus, ground will be applied to the conductor 515CR18 to operate the assigner start relay R550 as a result of the registration of the single digit 0 as the first and only dialed digit.

The next step in the operation involving the registration of a single digit 0 is to transfer the single digit 0 to the hundreds register 2505 in the codexer 2300A. It will be assumed that the codexer 2300A is associated with the calling director in the manner previously explained and it will be appreciated that the registration of the single digit 0 in the first digit register 1020 will apply ground potential to the marking conductors Z21 and S21 of the WXYZS21 conductors in the cable 1073 extending to Fig. 23. These conductors are further connected by way of contacts on the operated director codexer connect relay R2370 and the operated code relay R2330 to the windings of the WXYZS21 register relays in the hundreds register 2505. Since the Z21 and S21 marking conductors have ground potential applied thereto to register the single digit 0, the corresponding relays will be operated. Ground potential which is now applied to the conductor 2306TR will be extended by way of the contacts F to J, inclusive, and the winding of the check relay R2510 to battery. Operation of the relay R2510, at its contacts 2511, will complete the locking circuits for the Z21 and S21 relays. At its contacts 2512, the relay R2510 will apply ground potential to the previously traced circuit including the winding of the slow-to-operate relay R2405 so that the latter relay will slowly operate. At its contacts 2513, the relay R2510 will now complete a circuit for operating the 0 operator translate relay (not shown) in the translator 2700. This 0 operator translate relay is substantially the same as the translate relay R2701 except that it will be prewired to register routing digits in the route registers of the coder 1800 portion which will cause the director to route the call to the 0 operator position.

The circuit whereby the 0 operator translate relay is selected includes ground at the contacts 2513, the normally closed break contacts on the W, X and Y21 register relays in the hundreds register 2505, conductor 2402 extending to Fig. 24 and the winding of the start relay R2420 to battery. This relay now operates in the manner previously described and locks itself in its operated position to ground potential at the contacts 2512 of the operated check relay R2510. As a result of the operation of the start relay R2420, a circuit is completed by way of its contacts 2427 whereby the ground potential on the conductor 2306TR is extended by way of the winding of the translator test relay R2410, conductor 2404 (extending to Fig. 25) normally closed break contacts on the WXYZ23 relays in the units register 2507, conductor 2501 extending to Fig. 27 and the winding of the 0 operator translator relay (not shown) in the translator 2700. The operation of the last mentioned relay will register appropriate routing digits in the route registers of the coder 1800 in the manner previously described. The translator test relay R2410 will operate in series with the selected 0 operator translate relay and it will perform the same operations that have been described previously. It should be noted at this time that the registration of the routing digits in the coder 1800 portion of the director will operate the translation complete relay R710 in the controller 400 portion of the director to indicate that the translation operation, as a result of the dialing of a single digit 0, has been completed. The relay R710 upon operating will cause the director translator assigner 2800A to disconnect and release the codexer 2300A and the translator 2700 from the particular calling director.

In the foregoing description of the apparatus involving the registration of a single digit 0, it was assumed that it was necessary to associate the codexer 2300A and the translator 2700 with the calling director through the medium of the director translator assigner 2800A. If it is desired to register the appropriate routing digits of a 0 operator call in the coder 1800 portion of the director without associating the codexer 2300A and the translator 2700 with the calling director, this may be done by utilizing the "X" strapping instead of the "Y" strapping of the terminals shown immediately to the left of the bank contacts accessible to the wiper 1027 (Fig. 10). As described above, the Y strapping was used so that the dialing of the single digit 0 would cause the wiper 1027 to ground the conductor 518CR18 and operate the assigner start relay R550 as soon as the single digit 0 was registered. If the "X" strapping is used instead of the "Y" strapping, then the ground potential at the wiper 1027 will be applied to the conductor 1072TZ extending to Fig. 18 to cause the operation of the 0 operator relay R1850TZ as soon as the single digit 0 is registered. Thus, no circuit is completed for operating the assigner start relay R550 and, consequently, the director translator assigner 2800A can not associate the codexer 2300A and the translator 2700 with the coder 1800 portion of the director.

Referring now to the coder 1800 (Fig. 18) it will be seen that as soon as the relay R1850TZ operates, at its inner-upper make contact it completes an obvious circuit for operating the control relay R1860TD in the usual manner. The operation of the latter relay will cause the sender 1400 portion of the director to skip the transmission of any of the digits that are registered in the call register 900. As a further result of the operation of relay R1850TZ it completes, at its four upper make contacts, circuits for applying ground potential to four terminals on the terminal block TB1851. These terminals may be jumpered to appropriate terminals terminating the WXYZ11 to WXYZ14, inclusive, marking conductors so that as many as four routing digits may be registered in the WXYZ11 to WXYZ14 route registers. In other words, the route registers will now have routing digits stored therein which will route the particular call to the 0 operator position under control of impulses transmitted by the sender 1400 as will be described hereinafter.

A description will now be given of the codexer transfer and test circuit 2401 shown in Fig. 24. In the description thus far it has been assumed that the codexer 2300A is in service. Accordingly, the code relay R2330 (Fig. 23) which is of the multicontact type is operated over a circuit including battery, the winding of the connect relay R2330, conductor 2381 extending to Fig. 24, contacts 2462 on the normally operated battery supply relay R2460, resistor 2475, contacts 2432 and the test key contacts 2468 to ground. The normal operated condition of the connect relay R2330 selects the codexer 2300 through the associated multicontacts of the relay.

At the contact 1 on the operated relay R2330, an obvious circuit is completed for the supervisory 1 lamp 2331 to illuminate the same and indicate that the codexer 2300A has been selected. At the contact 2, the operated relay R2330 extends ground by way of the conductor 2308 extending to Fig. 24 and the winding of the hold relay R2445 to battery. Accordingly, the hold relay R2445 is normally held in its operated position as long as the connect relay R2330 is operated. Actually, the contacts 2448 on the relay R2445 will remove the shunt circuit around the resistor 2475 so that the current flow over the above circuit for the connect relay R2330 is somewhat reduced but not sufficiently to permit the relay R2330 to restore to normal.

It also should be noted in the above described circuit for retaining connect relay R2330 in its operated position, the battery supply relays R2455 and R2460 are normally retained operated from the battery supply sources for the respective codexer. If the battery supply for either the codexer 2300A or 2300B should fail because the fuse is blown or the circuit is accidently open or the power fails, the corresponding battery supply relay will restore to normal, but ordinarily the relays R2455 and R2460 for the respective codexers will remain in their operated positions.

The codexer transfer and test circuit 2401 is arranged so that it will automatically transfer its control from the codexer 2300A to the codexer 2300B at stated time intervals. In the present disclosure, the dater timer 2391 schematically illustrated by block diagram form in Fig. 23 will ground the conductor 2391A, for example, for the first hour only of each 24 hour interval. Therefore, at the beginning of the hour, a circuit is completed by way of the key contacts 2470 on the manually operated automatic transfer cut-off key to operate the transfer relay R2440. This relay locks itself by way of a circuit including its upper winding, contacts 2441 to the conductor 2307UH. This conductor is grounded whenever the connected codexer 2300A is in use.

As a further result of the operation of the transfer relay R2440, at its contacts 2442, it completes a circuit for operating the control relay R2435 from ground at the key contacts 2471, then by way of the contacts 2442 and 2433 and the winding of the relay R2435 to battery. The latter relay upon operating completes a locking circuit for itself which includes ground at the contacts 2436, contacts 2426, the lower winding of the transfer control relay R2430 and the winding of the relay R2435 to battery. However, the circuit for the lower winding of the relay R2430 is short-circuited by the ground potential applied to the initial operating circuit for the relay R2435. At the end of the first hour in the 24 hour interval, ground potential is removed from the conductor 2391A to cause the restoration of the transfer relay R2440 if no translation is in progress. The fact that no translation is in progress is indicated by the absence of ground potential on the conductor 2307UH. However, if the conductor is grounded at the time the circuit is interrupted for the lower winding of the relay R2440, the relay is temporarily retained in its operated position over the locking circuit including its upper winding until ground is removed from the conductor 2307UH. Incident to the restoration of the relay R2440, the circuit is interrupted at contacts 2442 to remove the shunt circuit from around the lower winding of the transfer control relay R2430. When this occurs, the relay R2430 operates in series with the relay R2435. As a result of the operation of relay R2430, at its contacts 2433 and 2434, it transfers the initial operating circuit for the control relay R2435 to a circuit including the upper winding of the transfer control relay R2430 and in series therewith, the winding of the trip relay R2425. As a further result of the operation of relay R2430, at its contacts 2432 and 2431, it transfers the ground potential at the contacts 2468 on the test key from the previously described circuit including the conductor 2381 to a circuit including the resistor 2474, contacts 2457, conductor 2382 extending to Fig. 23 in order to prepare a circuit for the connect relay R2310 and to restore the connect relay R2330.

Inasmuch as the above described circuit for the connect relay R2310 includes the resistor 2474, the connect relay R2310 does not operate at this time to select the codexer 2300B. However, incident to the restoration of the connect relay R2330, at its contacts 1, it interrupts the previously described circuit illuminating the supervisory 1 lamp 2331 and, at its contacts 2, it removes ground potential from the conductor 2308 extending to Fig. 24 in order to restore the hold relay R2445. As soon as the relay R2445 restores, it closes its contacts 2446 to 2448, inclusive. The closing of the contacts 2446 and 2448 perform no controls at this time because the circuits including these contacts have been interrupted at some other points. However, contacts 2447 will short circuit the resistor 2474 thereby to increase the current flow in the above mentioned circuit for the connect relay R2310 sufficiently to cause the relay now to operate. The relay R2310 in turn, at its contacts 2, will reapply ground potential to the conductor 2308 extending to Fig. 24 in order to again operate the hold relay R2445. Reoperation of the latter relay will open the contacts 2446 to 2448, inclusive, whereupon the resistor 2474 is again included in the circuit for the connect relay R2310. However, the relay having been operated over the circuit without the resistor 2474 will remain in its operated position after the resistor is included in the circuit.

At the contacts 1, the connect relay R2310 completes an obvious circuit for illuminating the supervisory 2 lamp 2311 thereby to indicate that the second codexer 2300B is now in service instead of the first codexer 2300A. The remaining contacts on the connect relay R2310 are utilized to interconnect all of the conductors (multipled with the corresponding conductors on the relay R2330) to the codexer 2300B instead of to the codexer 2300A.

In view of the foregoing, it will be appreciated that with the relays of the codexer transfer and test circuit 2401 in the condition illustrated in the drawing, the codexer 2300A is in use because of the operated condition of the connect relay R2330. However, when the transfer relay R2440 is operated and then subsequently restored during an interval of time when the codexer 2300A is not in use, the transfer control relay R2430 will be operated to disconnect the codexer 2300A and to connect the codexer 2300B. The disconnection of the codexer 2300A occurs as a result of the restoration of the connect relay R2330 whereas the connection of the codexer 2300B occurs as a result of the operation of the connect relay R2310. It should be noted at this time that although the codexer 2300B (Fig. 26) is schematically illustrated in block diagram form, it is exactly the same as the codexer 2300A and is connected and arranged in identically the same manner to connect any calling director with the common translator 2700.

The codexer transfer and test circuit 2401 remains in the present condition with the relays R2430, R2435, R2445, R2450, R2455 and R2460 in their operated positions to retain the codexer 2300B in service and to disconnect the codexer 2300A from service. Accordingly, the codexer 2300B will remain in service until the conductor 2391A is again grounded by the dater timer unit 2391 or until the battery supply relay R2455 restores to normal.

After an elapse of, for example, a 24 hour period, the dater timer 2391 will again ground the conductor 2391A to recomplete the operating circuit for the lower winding of the transfer relay R2440. Upon operating the relay R2440 by way of its contacts 2441, it will lock itself to the conductor 2307UH if the coder 2300B is being used in connection with the process of translating a registered called office code. Also, at its contacts 2442, the relay R2440 will complete a circuit from ground at the key contacts 2471, contacts 2442 and 2434, the upper winding of the transfer control relay R2430 and the winding of the trip relay R2425 to battery. The latter relay operates in series with the upper winding of the transfer relay R2430 and interrupts, at its contacts 2426 the previously described locking circuit for the winding of the control relay R2435 to restore the latter relay. The transfer control relay R2430, however, remains in its operated position over the circuit including, in series, its upper winding and the winding of the trip relay R2425. After the elapse of a predetermined time interval, for example, an hour, the dater timer 2391 removes the ground potential from the conductor 2391A in order to interrupt the initial operating circuit for the transfer relay R2440. Normally, the transfer relay R2440 will again restore to normal unless the codexer 2300B is being used to process the translation of a registered called office code. In the latter event, the relay R2440 will remain in its energized position over the locking circuit including its upper winding and it will restore to normal as soon as the translation in progress through the codexer 2300B has been completed. When this occurs, ground potential is removed from the conductor 2307UH to permit the transfer relay R2440 to restore. Incident to the restoration of the relay R2440, at its contacts 2442, it will interrupt the above mentioned series circuit for the upper winding of the transfer control relay R2430 and the winding of the trip relay R2425. These relays now restore to normal to again prepare the circuits whereby the control relay R2435 and the transfer control relay R2430 may be reoperated upon the next operation of the transfer relay R2440. The restoration of the transfer control relay R2430, at its contacts 2431 and 2432, will now transfer the holding circuit for the connect relay R2310 to the circuit for reoperating the connect relay R2330. In other words, the codexer 2300A is again placed in service whereas the codexer 2300B is disconnected from service under control of the connect relays R2330 and R2310. The cyclic operation of the codexer transfer and test circuit 2401 to alternately connect and disconnect the codexers 2300A and 2300B into and out of service will be repeated every 24 hours. It should be appreciated by those skilled in the art that the automatic transfer of the two codexers in and out of service may be made at any desired time interval.

If necessary, the automatic transfer arrangement described above may be disabled by merely operating the transfer cut-off key to open the key contacts 2470 and 2471 and to close the key contacts 2472. Accordingly, at the key contacts 2470 the circuit including the conductor 2391A from the dater timer 2391 is disconnected and the ground potential at the key contacts 2471 is disconnected from the previously traced circuits for controlling the various relays R2425, R2430 and R2435. Finally, the key contacts 2472 will complete an obvious circuit for illuminating the automatic cut-off lamp 2373 to signal the exchange attendant that the automatic transfer control of the codexer transfer and test circuit 2401 has been disconnected.

In addition to the foregoing, a manual transfer operation may be employed to manually control the selection of the different codexers 2300A and 2300B. In other words, the manual transfer key may be actuated to close its key contacts 2465 and then subsequently released to open the key contacts 2465 to perform the same selective control of the relays R2425, R2430 and R2435 by manual manipulation of the key contacts 2465 as is automatically performed by the transfer relay R2440 under control of the dater timer 2391. In other words, the manually controlled key contacts 2465 will control the relays R2425, R2430 and R2435 in exactly the same manner as the contacts 2442 control these relays. Thus, the transfer control relay R2430 will alternately complete the circuits for the connect relays R2310 and R2330 to alternately connect the codexer 2300B and 2300A either by manual manipulation of the key contact 2465 or by automatic operation of the relay R2430 by the dater timer 2391.

As previously noted, the battery supply circuit for the codexer 2300A continuously maintains the operating circuit for the battery supply relay R2460. Also, the battery supply circuit for the codexer 2300B continuously operates the battery supply relay R2455. Whenever the battery supply circuit for either the two codexers noted above fails for any reason whatsoever, the corresponding battery supply relay R2455 or R2460 will restore to normal. If, for example, the codexer 2300A is in service and the battery supply relay R2460 is restored to normal because of the failure of the battery supply circuit, at its contacts 2461 and 2462, it will automatically transfer the holding ground potential at the key contacts 2468 from the circuit for maintaining the connect relay R2330 in its operated position to the circuit for operating the connect relay R2310. Thus, the connect relay R2330 will be restored to normal and will, as previously described, restore the holding relay R2445. Consequently, the operating ground potential at the test key 2468 will be extended by way of the contacts 2432, 2448, 2461, conductor 2382 extending to Fig. 23 and the winding of the connect relay R2310 to battery. The latter relay upon operating will place the codexer 2300B for service, as previously noted, and the contacts 2 on the relay will complete the previously traced circuit for operating the hold relay R2445.

As a further result of the restoration of the battery supply relay R2460, at its contacts 2463, it will complete an obvious circuit for operating the schematically illustrated alarm 2466. The alarm 2466 may be a common exchange alarm which will call the exchange attendant's attention to the fact that a fault has occurred in the codexer 2300A. In view of the foregoing, it will be appreciated that the codexer 2300A is automatically removed from service when the battery supply therefor has been interrupted and the codexer 2300B is automatically cut into service.

In the event that the battery supply for the codexer 2300A is reestablished, the battery supply relay R2460 will again operate to interrupt, at its contacts 2461, the above traced circuit for the connect relay R2310. This relay will now restore to disconnect the codexer 2300B and it will cause the restoration of the hold relay R2445 in the manner previously noted. As a result of the restoration of the hold relay R2445, the contacts 2448 will again close to permit the operating circuit to be completed for the connect relay R2330. The latter relay will replace the codexer 2300A in service and it will again complete the circuit for operating the hold relay R2445.

In case the battery supply to the codexer 2300B should fail at the time that the codexer is in service, the battery supply relay R2455 will restore to normal and it will perform the same operations as described above to disconnect the codexer 2300B from service and to cut into service the codexer 2300A. The remaining operations performed by the battery supply relay R2455 are exactly the same as the above described sequence of operation as the battery supply relay R2460.

It should be noted that the battery supply relays R2455 and R2460 are provided with contacts 2459 and 2464 for preparing a series circuit for grounding the conductor 2309MER which terminates in the contact 8 on the director codexer connect relay R2370. If the battery supply for the two codexers 2300A and 2300B should both fail, the conductor 2309MER will be grounded and thus will complete a circuit including the conductor 517ER extending to Fig. 5, contacts 526, conductor 505TT extending to Fig. 18 in order to complete the operation of the translation failure relay R1850TT. This relay, as previously noted, will perform the same controls to be described hereinafter whereby predetermined routing digits will be registered in the route registers of the coder 1800 so that the associated director will route the particular call to an intercept operator position. Thus, if both codexers 2300A and 2300B fail, the director will be controlled to automatically route the calling subscriber to an intercept operator position. All subsequent calls established from any calling subscriber line to any director in the system will automatically be routed to the intercept operator position until the battery supply for at least one of the codexers is reestablished.

The codexer transfer and test circuit 2401 is also provided with a test key which may be manually operated by the exchange attendant so that a check may be made for any permanent ground potentials on any of the conductors in the cable 2303 (Fig. 23) and the conductor 2307UH.

In this connection it should be understood that the conductors in the cable 2303 which are connected to the contacts 6 to 23, inclusive, on the director codexer connect relay R2370 individual to the particular illustrated director are multipled to the corresponding contacts on all of the director codexer connect relays, such as R2370, individual to each of the remaining directors in the exchange. In addition to the foregoing, all of the conductors in the cable 2303 are multiply connected to contacts on the connect relay R2310 to contacts on the connect relay R2330 and to contacts on the test relay R2350. The conductor 2307UH is multiply connected between corresponding contacts on the connect relay R2310, the connect relay R2330 and the test relay R2350 and also to the codexer transfer and test circuit 2401 (Fig. 24) and and to the winding of the codexer relay R2910 (Fig. 29). When a check is made to determine whether any of the above mentioned conductors has a false ground thereon which would interfere with the normal operation of the equipment or which could cause the false registration of three digit codes in the hundreds, tens and units registers 2505, 2506 and 2507 of the codexer 2300A or 2300B, the test key (Fig. 24) may be manually operated to close the key contacts 2467 and 2469 and to open the key contacts 2468.

At the key contacts 2468 ground potential is removed from one of the circuits for operating either the connect relay R2310 or R2330 depending upon which one of the two codexers 2300A or 2300B is in service. The operated connect relay, such as R2330, will restore to normal when this circuit is interrupted to disconnect the codexer 2300A from service. The restoration of the connect relays R2330 will disassociate all of the conductors extending to the codexer 2300A from all of the conductors 2303 and from the conductor 2307UH. At its contacts 1 the connect relay R2330 will interrupt the circuit to the supervisory 1 lamp 2331 and, at its contacts 2, it will interrupt the circuit including the conductor 2308 extending to Fig. 24 in order to restore the hold relay R2445. As a further result of the operation of the test key, the key contacts 2469 will apply ground potential to the conductor 2307UH extending to Fig. 29 in order to operate the codexer relay R2910 and thus mark the director translator assigner 2800A busy. This will prevent the director translator assigner 2800A from operating to assign a codexer and the translator 2700 for the use of any calling director.

At the key contact 2467, ground potential is extended over a circuit including the contacts 2446 and conductor 2383 extending to Fig. 23 in order to operate the test relay R2350. This relay is of the multicontact type similar to the connect relays R2310 and R2330 and, at its various contacts, connects all of the conductors in the cable 2303 as well as the conductor 2307UH to individual lamps designated to identify the corresponding conductors.

Inasmuch as no director can be associated with any codexer by the operation of a director codexer connect relay, such as R2370, the operation of the test relay R2350 will connect all of the above mentioned conductors to the lamps associated with the multicontacts on the test relay R2350. If any one or more of the above mentioned conductors is falsely grounded at this time, the corresponding lamp, such as W21 or MER, will be illuminated to indicate the defective condition on the associated conductor.

In addition to the foregoing, it should be noted that the actuation of the test key to close the key 2469 will apply ground potential to the conductor 2307UH extending to Fig. 23. Inasmuch as the test relay R2350 is operated, the UH lamp (not shown) connected to the contacts 18 on the relay R2350 will be illuminated. Ordinarily, the illumination of any lamp connected to any one of the contacts on the test relay R2350 will be an indication of a fault condition. However, the conductor 2307UH is selectively grounded by the actuation of the test key contacts 2469 in order to complete the illuminating circuit including the conductor 2307UH for the corresponding lamp (not shown). If all of the lamps associated with the test relay R2350 fail to illuminate except the lamp associated with the contacts 18, the exchange attendant will be informed that no ground fault condition exists on any of the inter-connecting conductors in the cable 2303. The exchange attendant can, therefore, restore the test key to normal. If one or more of the lamps associated with the test relay R2350 is illuminated, the exchange attendant must take the necessary action to have the faulty condition corrected before the codexer 2300A or 2300B is again cut into service by the restoration of the test key.

As soon as the test key is restored to normal, the key contacts 2467 will interrupt the circuit for the test relay R2350 which will now restore to normal; the key contacts 2469 will remove the ground potential from the conductor 2307UH extending to Fig. 29 in order to restore the codexer relay R2930 and thus remove the busy marking condition on the director translator assigner 2800A; and, finally, at the key contacts 2468, the circuit is established for reoperating the connect relay R2310 or R2330 of the particular codexer that is to be cut into service.

The fuse failure relay R2450 in the codexer transfer and test circuit 2401 is normally held operated as long as the battery supply is retained to this circuit. If the fuse 2453 fails for any reason whatsoever, the fuse failure relay R2450 will restore to normal to complete, at its contacts 2451, the previously described circuit for operating the common alarm 2466. Also, at its contacts 2452, the relay R2450 completes the previously traced circuit, including the conductor 2309MER in the cable 2303, to operate the translation failure relay R1850TT in the coder 1800 portion of the director. The last mentioned relay, as previously indicated, will register appropriate routing digits in the route registers (Fig. 17) so that the director will route the call in question to an intercept operator position.

A description will now be given of the coder 1800 portion of the director shown in Figs. 17 and 18. At the outset it should be noted that the WXYZ11 to WXYZ16, inclusive, registers schematically illustrated in Fig. 17 are the route registers of the coder 1800 and that they are selectively operated to store the particular route digits that have been determined by the translator 2700. The route relays are substantially the same as the corresponding relays shown in Fig. 18 in the previously noted Ostline Patent No. 2,678,353. In addition to the foregoing, the TA, TB, TC and TD control relays R1860TA to R1860TD, inclusive, are substantially the same as the corresponding relays R1890, R1885, R1880 and R1875 shown in Fig. 18 in the above Ostline patent.

The WXYZ11 to WXYZ16 route register relays are arranged to receive and store one to six routing digits. The registration of at least one digit in the WXYZ11 route register relays will apply ground potential to the conductor 705CO extending to Fig. 7 in order to operate the translation complete relay R710 in the controller 400 portion of the director. Additional digits registered in the route registers WXYZ12 to WXYZ16, inclusive, will disconnect the corresponding skip conductor, such as SK12 to SK16, inclusive, extending to Fig. 14 from the skip common conductor 1203SKC extending to Fig. 16. The foregoing circuit facilities, including the skip conductors noted above, are provided so that the sender 1400 portion of the director will automatically skip any route register in the coder 1800 portion of the director when no routing digit has been registered in the corresponding route register.

The coder 1800 portion of the director is also arranged so that it can be selectively operated to control the director to automatically route a particular connection to an 0 operator position whenever the relay R1850TZ is operated; or to route a particular connection to an intercept operator position whenever the relay R1850TT is operated; and also to automatically route a call to an intercepting operator whenever a calling subscriber fails to dial the director or dials an incomplete office code; by operating the relay R1850TY. Each of the foregoing relays is provided with the necesary contacts to selectively mark the marking conductors WXYZ11 to WXYZ14, inclusive, to register a minimum of 1 and a maximum of 4 routing digits in the route registers of Fig. 17.

It will now be assumed that the call that has been initiated by the calling subscriber has controlled the codexer to select a particular translate relay in the translator 2700 and that as a result thereof the translate relay has registered appropriate routing digits in the route registers of Fig. 17 and has caused the operation of the control relay R1860TA. In addition to the foregoing, it will be assumed that the ABT conductor (Fig. 17) has been grounded by the selected translate relay, such as R2701, and that this ground potential is extended by way of the contacts 1822, conductor 1801ABT extending to Fig. 20 in order to operate the AB toll relay R2010 in the call recorder 2000 portion of the director. The operation of the latter relay is an indication that the particular call in question is one that requires the recording of all of the items of information pertaining to the connection and that a detector will also be required to ascertain the directory number of the particular calling subscriber. It may be well to mention at this time that as soon as the AB toll relay R2010 operates, it locks itself by way of the contacts 2012' to the conductor 605CR29 extending to Fig. 6 to ground at contacts 642'.

In Fig. 18, the control relay R1860TA will lock itself by way of its contact 1 to the conductor 1826 which is grounded over a circuit including the contacts 1812, conductor 615LGC extending to Fig. 6 and the contacts 641' on the operated seizure relay R640. Operation of the control relay R1860TA will interrupt, at its contacts 2, 3 and 4 points in the circuit including the skip conductors SK21 to SK23, inclusive, extending to Fig. 14 so that the sender 1400 portion of the director will, at the proper time, transmit impulses corresponding to the office code digits that are registered respectively in the first, second and third registers 1020, 1030 and 1040. In other words, the operation of the relay R1860TA will disconnect the skip common conductor 1203SKC from the above mentioned grounded skip conductors. If these conductors are grounded, the corresponding first, second and third registers noted above will be skipped by the sender 1400 when the time comes during its cycle of operation to send these registered digits.

Referring again to the route registers WXYZ11 to WXYZ16, inclusive, which are shown in block diagram form in Fig. 17, it should be understood that the first route register WXYZ11 will register the first of the routing digits transferred thereto from the selected translate relay in the translator 2700 and the operated WXYZ11 relays will lock in their operated positions to the grounded conductor 1826. It should be understood, however, that the WXYZ11 relays will be operated in the code combinations to register any one of ten digits in accordance with the previously described code combination. Also, the locking ground on the conductor 1826 will be extended by way of the contacts on the operated ones of the WXYZ register relays to mark the corresponding conductors in the cable 1827 extending to Fig. 14 where they terminate respectively in the contacts 1 accessible to the wipers 1404, 1405, 1406 and 1407. Thus, the above noted contacts accessible to the wipers on the send sequence switch 1420 (Fig. 14) will be marked in code form in accordance with the particular digit that has been registered in the WXYZ11 route register of the coder 1800 portion of the director. A total number of as many as six digits may be registered in the WXYZ11 to WXYZ16 route registers and each operated relay in each of the registers will be locked to the grounded conductor 1826 and each register will mark the associated marking conductors in the cable 1827 extending to Fig. 14 so that the contacts accessible to the wipers 1404 to 1407, inclusive, on the send sequence switch 1420 will be marked in code form in accordance with the corresponding digits registered in the corresponding route registers.

Inasmuch as the WXYZ11 route register will always be operated when at least one routing digit is to be registered, each of the four register relays is provided with a set of make contacts so that ground potential may be applied to the conductor 705CO when any one or any combination of the WXYZ11 relays is operated. This will constitute a signal to the director that the routing digits have been registered in the coder 1800 portion of the director since all route registers are simultaneously operated when the route digits are transferred thereto from the selected translate relay R2701 or when any digits are transferred thereto from the route relays, such as R1850TZ, R1850TT, R1850TY or R1830.

In view of the foregoing, it is never necessary to provide any means for controlling the sender 1400 to skip the route register WXYZ11 when the sender is being operated to transmit impulses corresponding to registered digits. It is necessary, however, to make some provision in the route registers WXYZ12 to WXYZ16, inclusive, to indicate to the sender 1400 that it may skip any one of these registers when no digit is registered therein. This is accomplished by providing each of the four register relays in each of the route registers WXYZ12 to WXYZ16, inclusive, with break contacts that are connected in series so that when none of the relays in any particular register is operated, the ground potential will be connected to the skip common conductor 1203SKC when the corresponding skip conductors SK12 to SK16 are grounded.

In the present disclosure, the series contacts on the respective route registers are schematically illustrated by means of the respective contacts 1721 to 1725, inclusive. Thus when any digit is registered, for example, in the WXYZ12 route register, it will be assumed that the contacts 1721 will be opened to indicate that a digit has been registered in the associated register. Ground potential will not be connected to the skip common conductor 1203SKC when the skip SK12 conductor is grounded by the sender 1400.

As soon as the conductor 705CO is grounded by the registration of a route digit in the WXYZ11 route register, the translation complete relay R710 in the controller 400 portion of the director will operate. This will control the director so that it will start sending impulses corresponding to the digits registered in the route registers WXYZ11 to WXYZ16, inclusive, and to send the digits registered respectively in the different digit registers in the call register 900 and in the digit register 1200 as determined by the operation of the control relays R1860TA to R1860TD, inclusive.

Referring now to the relay R710 (Fig. 7), it will be seen that at its contacts 711, it removes ground potential from the conductor 702BR extending respectively to Figs. 17 and 23 thereby to restore the director translator connect relay R1710 (Fig. 17) and the director codexer connect relay R2370 (Fig. 23). In this manner the director will disconnect the coder 1800 portion thereof from the translator 2700 and it will disconnect the codexer 2300A from the controller 400 portion thereof as soon as the route digits are registered at the route registers of the coder 1800. Thus, the codexer 2300A and the translator 2700 are rendered available for use by other calling directors.

As a further result of the operation of the translation complete relay R710 it interrupts, at its contacts 713, a point in the circuit for the assigner start relay R550 which will now restore to normal. Attention is directed to the fact that the restoration of the assigner start relay R550, however, is governed by both the contacts 713 and by ground potential applied to the conductor 706SA by the director codexer connect relay R2370. The restoration of the latter relay will remove ground potential from the conductor 706SA to permit the assigner start relay R550 to restore if the contacts 713 on the relay R710 have been opened.

At the contacts 715, the relay R710 disconnects the translation assignment failure relay R480 from the conductor 401MS2 so that the timer 490 will not control the relay R480 after a translation has been completed. Finally, at the contacts 716, the translation complete relay R710 removes ground potential from the conductor 704TR extending to Fig. 23. This action by the relay R710 is of no particular importance at this time inasmuch as the diretcor codexer connect relay R2370 has been restored and has disconnected the conductor 704TR from the conductor 2309MTR.

Returning to the codexer 2300A (Figs. 23 to 26, inclusive) it should be noted that the restoration of the relay R2370 opens the initial operating circuits for the various WXYZS21 to WXYZS23 register relays in the registers 2505 to 2507, inclusive. Consequently, these relays should restore to normal. However, the operated ones of the relays in the hundreds register 2505 are locked in their operated position to the ground potential at the contact 2511 on the check relay R2510. The removal of ground potential from the conductor 704TR by the operation of the translation complete relay R710 or the removal of ground potential from the conductor 2309MTR by the restoration of the relay R2370 will interrupt the circuit for the check relay R2510 to permit the latter relay to restore. At its contacts 2511, the relay R2510 will interrupt the holding circuit for any operated ones of the relays in the hundreds register 2505 and, at its contacts 2512, it will interrupt the locking circuit for the start relay R2420 so that the latter relay can restore to normal. Thus, the codexer 2300A will fully restore to normal so that it is available for use by another director.

Returning to the controller 400 portion of the director, it will be seen that the assigner start relay R550 restores to normal as soon as the translation complete relay R710 opens its contacts 713 and also as soon as ground potential is removed from the conductor 706SA by the release of the director codexer connect relay R2370. At the contacts 551, the relay R550 removes ground potential from the conductor 514TENS extending to Fig. 29 so as to remove the tens marking of the particular calling director from the director translator assigner 2800A. Also, at its contacts 552, the relay R550 disconnects the test relay R560 from the conductor 513CPR. The cross-point return conductor 513CPR is individual to the particular calling director and is indicative of its units number. Consequently, the corresponding relay in the director translator assigner 2800A that is individual to the particular units digit (1) identifying the particular calling director (01) will now restore to normal. Further description of the restoration of the director translator assigner 2800A will be described hereinafter.

As a further result of the restoration of the relay R550, at its contacts 558, it will remove ground potential at the contacts 506ST extending to Fig. 15 in order to interrupt the energizing circuit for the lower winding of the start relay R1540 in the sender 1400. In this connection it should be noted that the ground is applied to this conductor when the assigner start relay R550 initially operated to cause the assignment of the particular calling director to the common equipment including the codexer 2300A and the translator 2700. It should also be noted that the ground potential is removed from the conductor 506ST as soon as the relay R550 restores to normal to indicate the fact that an assignment has been completed and that a translation has been obtained of the called office code digits that have been dialed by the calling subscriber. In the sender 1400, the start relay R1540 operates over the circuit including its lower winding when ground potential is applied to the conductor 506ST. At its contacts 1544, the start relay R1540 locks itself over a separate circuit including its upper winding to the conductor 605CR29 extending to Fig. 6 and ground potential at the contact 642′ on the operated seizure relay R640.

In view of the foregoing, it will be appreciated that when the relay R550 in the controller 400 portion of the director restores to normal after a translation has been completed, it removes ground potential at its contacts 558 from the conductors 506ST to open the initial operating circuit for the lower winding of the start relay R1540 but the latter relay remains locked in its operated position over the circuit including its upper winding.

In addition to the foregoing, the restoration of the relay R550, at its contacts 553, connects the grounded conductor 512SCG to a circuit including the winding of the send call relay R810 so that the latter relay will operate. This circuit may best be traced from battery by way of the winding of the relay R810, contacts 721, 712, 553, conductor 512SCG extending to Fig. 18 and contacts 1832 to ground. The relay R810 operates over the above traced circuit and, at its contacts 811, locks itself to ground at contacts 642 on the operated seizure relay R640. This ground potential in addition to holding the relay R810 in its operated position, is further extended by way of the contacts 543, conductor 869TGL extending to Fig. 18 or via the contacts 831, conductor 870TG extending to Fig. 18, contacts 3 on the control relay R1860TC (if necessary) conductor 870TG extending to Fig. 15, contacts 1522, 1663, 1514 and the winding of the auxiliary start relay R1530 to battery. The operation of the latter relay, at its contacts 1534 will lock itself over the above traced circuit over a path that is now independent of the contacts 1514. Further controls of the sender 1400 will be described subsequently.

Referring again to the send call relay R810 (Fig. 8) it should be noted that at its contacts 814 it interrupts a point in an incomplete circuit including the conductor 809TY extending to Fig. 9, contacts 931, conductor 901TYO extending to Fig. 18 in order to prevent the operation of the fault seizure intercept relay R1850TY in the coder 1800. At its contacts 812, the relay R810 completes the circuit for illuminating the send call lamp 824 to indicate that the sender is now in condition to send the call that has been registered in the director to the appropriate destination. At the contacts 813, the relay R810 prepares a point in the circuit for illuminating the fault seizure lamp 825 in the event that the timer 490 completes the operating circuit for the fault seizure relay R660.

*Release of the director translator assigner 2800A*

In the above description it was pointed out that as a result of the completion of a translation and the registration of the routing digits in the coder 1800 portion of the director, the translation complete relay R710 was operated. This relay in turn, at its contacts 713, interrupted the circuit for the assigner start relay R550. As soon as the relay R550 restores to normal, it interrupts, at its contacts 551 a circuit whereby ground potential is applied to the tens conductors 514TENS extending to Fig. 29 in order to restore 0 tens relay R2800T and the common relay R2830 in the director translator assigner 2800A. Thus the marking on the conductor 514TENS is removed by the 01 director. Other directors having the digit 0 as the tens digit may have the corresponding conductor grounded if any other of such directors have their assigner start relay in an operated position. In the latter event, the relays R2800T and R2830 in the director translator assigner 2800A will remain in their operated positions.

As a further result of the restoration of the assigner start relay R550 at the contacts 552, the circuit including the test relay R560 and the conductor 513CPR extending to Fig. 28 is interrupted. The conductor 513CPR is individual to the director 01 and identifies the units digit 1. The last-mentioned conductor is included in the circuit which may be traced to the contacts TS1 on the operated relay R2800TS (Fig. 28), contacts U2 on the operated relays R2801U, contacts 2814 on the operated relay R2810, resistor 2818, contacts 2931′ to ground at contacts 2911 or to ground on the conductor 2302UL. The latter conductor will be grounded from the contacts 1 on the director codexer connect relay R2370 as long as the latter relay is operated to associate the codexer 2300A with the director 01.

In the above traced circuit, the contacts TS1 on the relay R2800TS are assumed to be in a closed position but it should be understood that the relay R2800TS will restore to normal when the contacts T2 are opened by the relay R2800T. In addition to the foregoing, as soon as the relay R2830 restores it recompletes, at its contacts 2832, the obvious circuit for operating the relay R2820 and the latter relay interrupts, at its contacts 2824, the circuit for the relay R2800TS. Thus, the relay R2800TS may be restored to normal under control of either one of the above mentioned two circuits. Also, when the contacts TS1 are open or when the contacts 552 are opened to disconnect the test relay R560, the control relay R2801S will restore to normal to interrupt at its contacts S3 the locking circuit that includes the winding of the relay R2801U, X contacts U1 and the winding of the relay R2815 so that the latter relays restore to normal and place the units relays of the director translator assigner 2800A in the condition illustrated in the drawings. The director translator assigner 2800A is now placed in an idle condition with its relays R2810 and R2820 in an operated condition. The operation of the director translator assigner 2800A under control of other directors is the same as described above for the director 01 except that the tens relay, such as the relay R2800T and the tens slave relay, such as the relay R2800TS, the units relay R2801U and the units slave relay R2801S corresponding to the number of the specific director in use will be operated. It should be further understood, however, that the director translator assigner 2800B operates in the same manner as the associated director translator assigner 2800A.

The operation of the translator assigner 2800A is substantially the same as described above under all conditions except that during the heavy traffic periods, a plurality of directors in different tens groups may simultaneously call for the use of a codexer 2300A and the translator 2700. When this occurs, a gating process takes place in which those directors that require a routing translation are accepted by the assigner 2800A and locked-in, but other directors that subsequently call for the use of the assigner 2800A will be locked-out until the locked-in directors have been taken care of. All of the lock-in directors will be handled on the basis of the lowest numbered tens group in the sequence starting with the lowest number director in which the digit 0 is considered as 10 and not zero. The next lowest tens group will then be assigned to the translator and so on until all directors in all of the tens groups that have been locked-in to the translator assigner 2800A have received their specific routing translations.

In order to illustrate the foregoing operations, it will be assumed that the directors 11, 12, 21, 20, 01 and 02 simultaneously require routing translations. When this occurs, the tens leads TM1, TM2 and TM0 will be grounded by the directors in the corresponding tens groups that require the use of the director translator assigner 2800A and will complete circuits by way of the corresponding tens relays R2801T, R2802T and R2800T and the winding of the relay R2830. All of the foregoing relays will now operate and immediately lock themselves by way of their associated X contacts T1, T3 and T6 to the circuit including the winding of relay R2830. It will be appreciated that any other tens relay can also be operated if a director in the same group requires the use of the translator 2700. However, immediately upon the operation of the relay R2830, the relay R2820 restores to interrupt the circuits including any other tens relays of the assigner 2800A to lock out all of the tens groups of the directors that have not operated one of the tens relays R2801T to R2800T, inclusive. The cross-point return conductors in the cable 2903 that are individual to each of the directors noted above will have battery potential thereon through the winding of the test relay, such as R560 of the corresponding director. Thus, in the present example, the conductors CP11, CP12, CP21, CP20, CP01 (513CPR) and CP02 will have battery potential applied thereto as noted above.

When the relay R2830 operates in series with the different tens relays, noted above, at its contacts 2831 it completes a circuit for illuminating the No. 1 assigner lamp L2974 to indicate that the No. 1 assigner 2800A is in use. Also, at its contacts 2832, it interrupts the circuit for operating the relay R2820 to disconnect all other tens relays from the circuit of relay R2830. At its contacts 2824, the relay R2820 now attempts to complete the chain circuits for individually operating the different slave relays of the corresponding tens relays. The illustrated tens relays R2801T, R2802T, R2800T are all operated to close the respective contacts T7, T4 and T2. Thus, the ground potential at the contacts 2824 will complete the circuit including the contacts T7 to operate the slave relay R2801TS. This relay is provided with ten make contacts including the contacts TS1 to TS0, inclusive, in order to connect the ten cross-point conductors CP10 to CP19, inclusive, of the ten directors in the first tens group to the corresponding units relays R2801S to R2800S, inclusive. In the present example, the conductor CP11 and CP12 have battery potential applied thereto from the windings of the test relays in the respective directors 11 and 12. Consequently, the units relays R2801S and R2802S will now operate. These relays in turn at their respective contacts S3 and S2 will complete obvious circuits for simultaneously operating the first and second units relay R2801U and R2802U in series with the relay R2815.

In view of the foregoing, it will be appreciated that the operation of the relay R2830 has locked the gate so that only the directors in the tens group TM1, TM2 and TM0 will be picked up and associated with the translator 2700. The slave relay R2801TS upon operating will connect the ten directors in the first tens group to the units relays, as noted above, and as soon as the relays R2801S and R2802S operate, they will complete the circuits to the corresponding units relays R2801U and R2802U in series with the controlling relay R2815. The latter relay, at its contacts 2817 will again interrupt the circuit for the relay R2810 in order to close the gate to any additional directors in the first tens groups having units digits other than 1 and 2 corresponding to the relay R2801S and R2802S. Until the relay R2810 restores to normal, additional directors in the first tens group may be accepted by one or more of the ten units relays.

As a result of the restoration of the relay R2810, the contacts 2814 will be closed so that resistance ground through the resistor 2818 will be connected by way of the contacts U2 on the operated relay R2801U, contacts TS1 on the operated tens relay R2801TS to the conductor CP11 in order to control the corresponding director 11 to receive the routing translation from the translator 2700. As soon as the translation cycle is completed in the manner to be described hereinbefore, the conductors TM1 and CP11 from the director 11 will be disconnected. The relay R2801T will remain in its operated position from the ground on the TM1 conductor from the director 12. The units relays R2801S and R2801U, however, will restore to normal whereupon the resistance ground potential through the contacts 2814 will now be extended by way of the contacts U3 on the restored units 2801U, contacts U2 on the operated units relays R2802U, TS2 conductor on the operated tens slave relay R2801TS to the cross-point conductor CP12 individual to the director 12. This will permit the director 12 to be interconnected with the translator 2700 whereupon the routing translation will be made and registered in the coder portion of the director 12. As soon as this information is received by the director 12, the units relays R2802S and R2802U will restore to normal. Inasmuch as the two locked-in directors 11 and 12 have been connected to the translator 2700 and have received the appropriate translations, the tens relays R2801T and R2801TS in the first tens group will now restore to normal.

As soon as the relay R2801T restores, it transfers the chain circuit from the contacts 2824 by way of the contacts T8 and T4 to the winding of the second tens group slave relay R2802TS to operate the latter relay. The relay R2802TS, at its ten make contacts TS0 to TS9, inclusive, will connect the ten cross-point conductors CP20 to CP29, inclusive, individual to the correspondingly numbered directors to the correspondingly numbered units relay R2800S to R2809S, inclusive. The same cyclic operation described above in connection with the first tens group of directors will now take place in connection with the selection of each of the directors in the second tens group. Thereafter, the chain circuit will be transferred to the next tens group and so on until all of the directors in all of the tens group that have been locked in have been connected to the translator 2700 and have received the routing translations corresponding to the first three digits that have been registered in the corresponding directors. As soon as the last director in the 0 tens group receives its translation, all of the relays in the director translator assigner 2800A will restore to normal and will thereby cause the relays R2810 and R2820 to reoperate. Reoperation of the last mentioned relays will again open the gate circuits of the director translator assigner 2800A to all directors in the exchange that have grounded the corresponding TM1 to TM9 and TM0 conductors. Another group of directors will thereby be locked in the director translator assigner 2800A and all other directors will be temporarily locked out until the director translator assigner 2800A has assigned each of the locked in directors to the translator 2700. The operation of the translator assigner 2800B is exactly the same as the assigner 2800A.

Automatic transfer facilities are available in order to transfer the assignment of the codexer 2300A and the translator 2700 from the control of the director translator assigner 2800A to the control of the director translator assigner 2800B. As is illustrated in Fig. 29, the transfer relay R2930 is normally in its operated position to connect up the ten marking conductors TM0 to TM9, inclusive, in the cable 2902 from the director translator assigner 2800A to the corresponding conductors in the cable 2903 extending to the different tens groups of the directors.

By referring to Fig. 4 it will be seen that the translation assignment failure relay R480 in the controller 400 portion of the director 01 is provided with contacts 482 for grounding the conductor 501AT extending to Fig. 29. Actually, this conductor is common to all of the directors in the exchange and as is illustrated in the drawings, to at least 100 directors. Each director is provided with a translation assignment failure relay, such as the relay R480. This relay will be operated in the event that there is a failure in the complete operation of a translation cycle to cause the operation of the translation complete relay, such as R710, within a predetermined elapsed time interval.

In view of the foregoing, it will be appreciated that whenever the conductor 501AT is grounded by one of the directors, a circuit will be completed in Fig. 29 by way of the contacts 2955, 2965, contacts 4 on the manual transfer key K2980 and the winding of the relay R2960 to battery. The relay R2960 will immediately operate and, at its contacts 2964, will lock itself to the contacts of the reset key K2970. As a further result of the operation of the relay R2960, at its contacts 2965, it interrupts its initial operating circuit. Also, at its contacts 2963, the relay R2960 interrupts the obvious circuit for normally retaining the transfer relay R2960 in its operated position. The relay R2930 now restores to normal to disconnect the conductors in the cable 2902 from the corresponding marking conductors in the cable 2903. Also, at its contacts 2931′, the relay R2930 interrupts a point in the circuit for applying ground potential to the resistor 2818 in the assigner 2800A. As a further result of the operation of relay R2960, at its contacts 2961, it completes a circuit for illuminating the assigner No. 1 failure lamp L2972 to indicate that the assigner 2800A has failed to operate satisfactorily. The alarm relay R2940 operates in series with the lamp L2972 and completes a circuit including its contacts 2941 for actuating the associated alarm and thus give a general alarm signal to the exchange attendant who will ascertain from the illuminated condition of the lamp L2972 that the No. 1 assigner 2800A has failed.

Finally, at the contacts 2962, the relay R2960 completes an obvious circuit for operating the transfer relay R2920 to connect up the assigner 2900B. More specifically, at the contacts 2920 to 2929, inclusive, the relay R2920 will connect the ten marking conductors on the cable 2903 to the corresponding ten marking conductors in the cable 2904 extending to the second director translator assigner 2800B. Also, at the contacts 2921′, the relay R2920 completes a circuit for applying ground potential to the resistor similar to the resistor 2818 provided in the assigner 2800B.

After the exchange attendant has corrected the fault that may have occurred in the translator assigner 2800A, it can be reinstated into service by momentarily operating the reset key K2970. When the key K2970 is momentarily operated, the locking circuit for the relay R2960 will be interrupted and the relay will restore to normal. As a result thereof, the previously described circuits controlled by the various contacts on the relay will be altered so that the transfer relay R2920 will restore and the transfer relay R2930 will operate. Thus, the assigner 2800A will be reinstated in service.

Under certain conditions it may be desirable to have the relay R2920 instead of the relay R2930 normally operated so that the second assigner 2800B will normally be connected up for service. This can be accomplished by operating the manual transfer key K2980. At the contacts 2, the key K2980 will interrupt the circuit for the transfer relay R2930 whereas at the contacts 1, the key will complete the circuit for operating the transfer relay R2920. With the key K2980 left in its actuated position, the contacts 4 thereof will be opened to disconnect the circuit for the relay R2960 and the contact 3 thereof will be closed to complete the circuit for the relay R2950. Under the foregoing conditions, if the conductor 501AT is grounded as a result of a translation assignment fault encountered by any director, the relay R2950 will be operated to transfer the circuit controls from the assigner 2800B to the assigner 2800A in substantially the same manner as has been described above in connection with the operation of the relay R2960 under a fault condition.

*Operation of the sender 1400*

Referring now to the sender 1400 portion of the director shown in Figs. 14 to 16, inclusive, it will first be recalled that the control relay R1670 operated over a circuit including the contact 1664 when the conductor 605CR29 was grounded upon the seizure of the controller 400 portion of the director. The relay R1670, at its contacts 1674, interrupts a point in the incomplete circuit including the conductor 1072TZ extending to Fig. 18 in order to prevent operation of the 0 operator relay R1850TZ in the coder 1800 portion of the director. Also, at the contacts 1671, the relay R1670 prepares a point in the incomplete circuit including the conductor 1602BA extending to Fig. 20 in order to prevent the call recorder 2000 portion of the director, as shown in Figs. 19 to 21, inclusive, from being operated until after a predetermined number of digits have been transmitted by the sender 1400.

It will also be recalled that as soon as at least three digits have been registered in the call register 900 portion of the director, the director translator assigner 2800A, the codexer 2300A and the translator 2700 were controlled to register routing digits in the route registers of the coder 1800 portion of the director. The route digits registered in the coder will be a translation of the first three digits that have been registered in the call register 900 portion of the director and that will be transmitted by the sender in order to control the switching apparatus to route the call in the direction of the destination determined by the digits dialed by the calling subscriber.

When the assignment start relay R550 was initially operated to cause the assignment of the codexer 2300A and the translator 2700 to the particular calling director, the relay completed, at its contacts 558, a circuit including the conductor 506ST extending to Fig. 15 in order to operate the start relay R1540 in the sender 1400 portion of the director.

Finally, when the route digits have been registered in the coder 1800 portion of the director by the translator 2700, the translation complete relay R710 operated to indicate that the translation has been completed and that the director translator assigner 2800A, the codexer 2300A and the translator 2700 should be disconnected from the calling director. During the sequence of the foregoing operations, the conductor 870TG is grounded and completes the previously described circuit for operating the auxiliary start relay R1530 in the sender 1400 portion of the director.

Referring now to the start relay R1540 (Fig. 15) it will be seen that as soon as the relay operates over the circuit including its lower winding, it immediately locks itself over a circuit including its upper winding and contacts 1544 to the grounded conductor 605CR19. At its contacts 1547, the relay R1540 completes a circuit from battery to the motor start conductor 1508 to start the schematically illustrated pulse generator 1509. This generator is arranged so that it will transmit pulses over a pulse conductor 1507 at the rate of approximately ten pulses per second to control the pulse relay R1570 when the circuit thereto is completed at the contacts 1545. As a further result of the operation of the start relay R1540, at its contacts 1542, it completes a circuit by way of the off normal contacts 1423 on the send sequence switch 1420 and the interrupting springs 1422 in order to operate the magnet M1421 on the send sequence switch 1420. The remaining circuits controlled by other contacts on the start relay R1540 are of no particular importance at the present time but it should be noted that the pulse relay R1570 will operate and restore under control of the ten pulses per second transmitted over the pulse conductor 1507 by the pulse generator 1509.

As soon as the above mentioned circuit is completed for the magnet M1421, the magnet operates and immediately interrupts its own circuit by opening its contacts 1422. As soon as the circuit for the magnet is interrupted, its wipers 1401 to 1407, inclusive, are advanced one step from the normal resting position shown in the drawing into engagement with the contacts 1 in the associated contact banks.

In illustrating the wipers and associated bank contacts of the send sequence switch 1420 (Fig. 14) the wipers are illustrated as though they would be moving downwardly to engage the successive contacts 1 to 25 each time the magnet M1421 is restored to normal. However, the actual construction of the send sequence switch 1420 is in the form of the conventional rotary stepping mechanism in which the bank contacts are in the form of an arc and the wipers are rotated by a shaft on the switching unit so that the wiper will engage the successive contacts as they are stepped in a rotary direction.

As soon as the wipers 1401 to 1407, inclusive, of the send sequence switch 1420 have been advanced one step from the illustrated off normal positions into engagement with the contacts 1, the off normal contacts 1423 will be opened to interrupt the above mentioned initial operating circuit for the magnet M1421 and the off normal contacts 1424 will be closed to prepare a point in the incomplete circuit for subsequently controlling the magnet M1421 to restore the wipers of the send sequence switch 1420 to their normal resting positions.

As soon as the wiper 1401 engages the contact 1 in the associated contact bank, it merely prepares a circuit which will subsequently be described, whereas the wiper 1402 in engaging the contact 1 connects ground potential over a circuit including the contacts 1681 for operating certain of the relays used in the digit sending operations of the sender 1420.

When the wipers 1404 to 1407, inclusive, engage the contact 1, the associated WXYZ11 marking conductors from the WXYZ11 route register in the coder 1800 portion of the director are connected by way of the conductors 1425 to 1428, inclusive, to the bank contacts on the send switch 1580. The send switch 1580 may now be operated to determine the code marking on the respective WXYZ conductors 1425 to 1428, inclusive, and thus determine, in accordance with the code markings, the numerical value of the particular digit that is registered in the WXYZ11 route register.

In the foregoing discussion, it was noted that the auxiliary start relay R1530 in the sender 1400 operated as a result of the registration of the route digits in the route registers of the coder 1800 portion of the director. The relay R1530 locks itself in its operated position over a circuit including its contacts 1534; at its contacts 1535, it completes the operating circuit for the pulse control relay R1510; and, at its contacts 1536, it completes a circuit for preenergizing the left-hand winding of the digit stop relay R1560. As a further result of the operation of the auxiliary start relay R1530, at its contacts 1531 and 1532, it prepares circuits for respectively connecting resistance battery and resistance ground potentials to the circuit including the right-hand winding of the digits stop relay R1560.

At the present time, ground potential is connected by way of the associated resistor and contacts 1532 through the right-hand winding of the digit stop relay R1560, then by way of the contacts 1622 and 1623 to the conductor 269R extending to Fig. 9. This particular circuit is of importance because it is the circuit over which impulses will be transmitted for controlling the setting up of the connection through the switching apparatus of the present exchange. Accordingly, it should be noted that the circuit is further extended through Fig. 9 over a conductor 269R to Fig. 2, then by way of the wiper 254, conductor 303R, contacts 312 and 321 and the upper winding of the relay R330 to battery. Accordingly, the line relay R330 in the primary selector 300 operate to prepare the selector to receive the impulses of the first digit registered in the route register WXYZ11 in the coder 1800 portion of the director. Although the right-hand winding of the digit stop relay R1650 is included in the above traced circuit for controlling the line relay R330 in the primary selector 300, the relay R1560 does not operate at the present time. In the present circuits for the relay R1560, the left-hand winding is in opposition to the right-hand winding so the relay will not operate.

Due to the fact that the pulse control relay R1510 is of the slow-to-release type, it is somewhat delayed in its operation after the contacts 1535 have been closed by the relay R1530. After a short delay, the relay R1510 operates and, at its contacts 1511, applies ground potential to the conductor 502DBC extending to Fig. 5 in order to retain the director busy relay R510 in the controller 400 portion of the director in its operated position. At its contacts 1512 and 1513, the relay R1510 prepares points in circuits to be described hereinafter. The circuit including the contacts 1513 may be considered a basic circuit in that it provides the operating ground potential for controlling the pulsing circuit of the director to subsequent switches in the switchtrain. At the contacts 1514, the relay R1510 interrupts a point in the initial operating circuit for the auxiliary start relay R1530 but the latter relay remains in its operated position over the locking circuit including its contacts 1534. Finally, at the contacts 1515 and 1516, the relay R1510 closes multiple circuits for respectively connecting the pulsing conductor 1507 to the pulse relay R1570 and the motor start conductor 1508 connected to battery potential.

At the present time, the sender 1400 is in condition to begin to transmit pulses for controlling the line relay R330 of the primary selector 300 in accordance with the first route digit registered in the WXYZ11 route register of the coder 1800 portion of the director. Accordingly, the relays R1670, R1540, R1530 and R1510 are in their operated positions, the send sequence switch 1420 has all of its wipers in engagement with the contacts 1 in the associated bank contacts, and the relay R1570 is pulsing under control of the pulse generator 1509.

The first time that the relay R1570 restores to normal after the pulse control relay R1510 operates, a circuit will be completed for operating the pick-up relay R1630. This circuit may best be traced from battery through the winding of the relay R1630, contacts 11 normally engaged by the wiper 1691 of the digit space switch 1690, contacts 1625, 1546, 1572, 1653, 1513, 1533 and 1681, wiper 1402 and ground potential connected to the engaged contact 1 in the associated contact bank. The relay R1630 upon operating at its contacts 1632 prepares a circuit for operating the pulse transmission relay R1620. The latter relay is at the present time short-circuited as long as the contact 1572 on the pulse relay R1570 remains closed. As a further result of the operation of relay R1630, at its contacts 1633, it removes ground potential from the circuits for subsequently restoring the digit space switch 1690 and the send switch 1580 to normal.

In response to the next pulse transmitted by the pulse generator 1509 over the pulse conductor 1507, the pulse relay R1570 operates to close its contacts 1571 and to open its contacts 1572. The opening of the contact 1572 removes the short-circuit from around the winding of the pulse transmission relay R1620 so that the latter relay now operates in series with the pick-up relay R1630 over a circuit which may be traced from battery, winding of the relay R1630, wiper 1691, contacts 1632, winding of the pulse relay R1620, contacts 1653, and then over the previously traced circuit to ground at the wiper 1402. The relay R1620 now operates and, at its contacts 1624, locks itself in series with the relay R1630 over a circuit which is independent of the contacts 1653. At its contacts 1625, the relay R1620 disconnects the initial operating circuit for the pick-up relay R1630 and, at its contacts 1626, it prepares a point in the circuit for operating the magnet M1583 of the send switch 1580 each time the pulse relay R1570 restores. Finally, at its contacts 1621 and 1623 the pulse conductor 269R extending to the line relay R330 of the primary selector 300 is now transferred through the contacts 1571 on the pulse relay R1570 to ground at the wiper 1402. It should be noted that the ground potential extended over the conductor 269R was initially supplied through the right-hand winding of the digit stop relay R1560 and resistance ground potential at contacts 1532. The transfer circuit for applying ground potential to the conductor 269R may best be traced from ground at the wiper 1402 in engagement with the contact 1 and then by way of the contacts 1681, 1533, 1513, 1624, 1571 (the pulse relay R1570 operated) contacts 1652 and 1621, and resistor 1627 to the conductor 269R.

The transfer of the above circuit from resistance ground at the contacts 1532 to ground potential at the wiper 1402 is made without removing the potential from the conductor 269R so that the line relay R330 in the primary selector 300 is retained in its operated position. Subsequent pulsing of the contacts 1571 and 1572 under control of the pulse relay R1570 will now transmit switch setting impulses to the line relay R330 over the circuit including the conductor 269R and it will simultaneously transmit pulses to the magnet M1583 so that the wipers 1581 and 1582 of the send sequence switch 1580 will be advanced step-by-step as each impulse is transmitted. It will be apparent from the subsequent description that the send sequence switch 1580 will connect the send stop relay R1550 to the WXYZ marking conductors 1425 to 1428, inclusive, to determine the digit that has been marked thereon in code by the particular register that is selected by the wipers 1404 to 1407, inclusive, on the send sequence switch 1420. As soon as the value of the digit has been determined by the send switch 1580, the send stop relay R1550 will operate to terminate the transmission of the pulses over the conductor 269R.

In order to describe the foregoing impulse transmission by the pulse relay R1570, it will be noted that upon each restoration of the pulse relay R1570 after the pulse transfer relay R1620 has operated will interrupt the circuit, at its contacts 1571, to remove ground potential at the wiper 1402 from the impulsing conductor 269R. Also, the contacts 1572 will be closed so that the ground potential at the wiper 1402 will now be extended over a circuit including the contacts 1681, 1533, 1513, 1624, 1572, 1546, 1626 and 1614 to operate the magnet M1583.

At the end of the transmission of the first pulse, the pulse relay R1570 will reoperate and interrupt at its contacts 1572 the above described circuit for the magnet M1583. The magnet immediately restores to normal and in so doing, advances its wipers 1581 and 1582 one step in a counterclockwise direction from the normal illustrated position of the wipers into engagement with the contacts 1. It should be noted that as soon as the wipers are moved from the normal illustrated positions, the rotary off-normal contacts 1586 will be opened and the off-normal contacts 1585 will be closed.

At the contacts 1571, the pulse relay R1570 will again complete the circuit for transmitting ground potential over a conductor 269R and it will thereby reoperate the line relay R330 in the primary selector 300. The restoration and reoperation of the line relay R330 will terminate the first pulse to the primary selector 300.

In view of the foregoing, it should be understood that upon each restoration of the pulse relay R1570 after the operation of relay R1620, the contacts 1571 will open the circuit including the pulse conductor 269R to terminate the transmission of another impulse to the primary selector 300. Also, each time the pulse relay R1570 opens its contacts 1572, it will terminate the transmission of a pulse to the magnet M1583 on the send switch 1580. Consequently, the send switch 1580 will take one step after the impulse transmitted over the conductor 269R. In this manner, the send switch 1580 can test the associated WXYZ marking conductors 1425 to 1428, inclusive, after each impulse is transmitted over the conductor 269R and determine whether or not the number of transmitted impulses corresponds with the value of the digit marked in code form on the marking conductors 1425 to 1428, inclusive.

In this connection it should be noted that the left-hand winding of the send stop relay R1550 is connected by way of the wiper 1581 to circuits including respectively the WXYZ conductors 1425 to 1428, inclusive. As the wiper 1581 successively engages the different contacts, a test will be made for ground potential on the associated marking conductor. Also, the right-hand winding of the send stop relay R1550 is connected by way of the wiper 1582 to the successive contacts to determine whether or not ground potential is applied to the marking conductors 1425 to 1428, inclusive, connected to the associated contact banks.

It will be recalled from the previously illustrated table that the WXYZ marking conductors will be grounded in accordance with the predetermined code so that whenever a digit is marked on the conductors corresponding to the number of steps taken by the wipers 1581 and 1582, the ground potential on the marking conductors will simultaneously complete circuits for energizing both the left and right-hand windings of the send stop relay R1550. Unless both windings are energized in the same direction and at the same time, the relay R1550 will not operate. Inasmuch as the digits 7, 8, 9 and 0 are respectively marked by grounding the W conductor 1425, the X conductor 1426, the Y conductor 1427 and the Z conductor 1428, it is necessary to permanently mark the bank contacts 7, 8, 9 and 10 accessible to the wiper 1582 so that energizing circuits will be completed for the two windings of the relay R1550 whenever the digit 7, 8, 9 or 0 have been marked on the respective conductors.

Before describing the operations resulting from the energization of the send stop relay R1550, it should be noted that as soon as the off-normal contacts 1585 are closed a circuit is completed for operating the digit step relay R1640. This circuit may best be traced from ground at contacts 1537 on the operated auxiliary start relay R1530, off-normal contacts 1585 and the upper winding of the digit step relay R1640 to battery. This relay upon operating immediately locks itself over the circuit including its upper winding, contacts 1655, 1643 and 1631 to ground so that the relay is retained in its operated position during the transmission of the impulses corresponding to the first digit and also during the interdigital pause between the transmission of successive digits. The only other operation performed by the relay R1640 that is of importance at the present time includes the contacts 1641 that completes an operating circuit for the magnet M1421 on the send sequence switch 1420. The magnet M1421, however, will be retained in its operated position until after the impulses of the digit of the present sending cycle have been transmitted.

As soon as the wipers 1581 and 1582 simultaneously encounter grounded bank contacts, the send stop relay R1550 will operate and complete, at its contacts 1552, an obvious circuit for operating the stop send relay R1610. The latter relay, at its contacts 1613, will immediately lock itself to ground potential at the contacts 1644 on the operated digit step relay R1640. As a further result of the operation of the send stop relay R1550, at its contacts 1551, it completes a circuit for connecting resistance ground potential at the contacts 1532 to the pulsing conductor 269R in order to terminate further transmission of switch controlling impulses over this conductor. The last-mentioned circuit may be traced from ground by way of resistance 1626, contacts 1532, the right-hand winding of the digit stop relay R1560, contacts 1551 and conductor 269R. This circuit obviously will prevent further impulses transmitted by the contacts 1571 from being sent over the conductor 269R.

As soon as the stop send relay R1610 operates and locks itself as noted above, it also completes at its contacts 1611 a circuit that is in parallel with the contacts 1551 to further prevent transmission of additional pulses over the conductor 269R even though the send stop relay R1550 should restore to normal. As a further result of the operation of the relay R1610, at its contacts 1612, it completes the operating circuit for the delay pulsing relay R1650; at its contacts 1614, it disconnects the pulsing circuit to the magnet M1583 so that the send switch 1580 cannot be controlled by additional pulses; and, at its contacts 1615, it connects the previously described pulsing circuit to the winding of the magnet M1692 on the digit space switch 1690.

The sender 1400 is now in condition to determine the interdigital pause between the transmission of successive digits. When the delay pulsing relay R1650 operates under control of the stop send relay R1610, at its contacts 1652 it opens a point in the previously described pulsing circuit to the conductor 269R. At its contacts 1651, the relay R1650 connects battery potential through the resistor 1625, contacts 1531, 1651 and the winding of the digit stop relay R1560. In other words, both ground and battery potential are connected through the respective resistors 1625 and 1626 to the right-hand winding of the digit stop relay R1560 to prepare an operating circuit for the latter relay if ground potential is returned over the conductor 269R from the primary selector 300 or any other subsequent switch in the switch train including the selector 300. This circuit will be traced in greater detail hereinafter.

As a further result of the operation of relay R1650, at its contacts 1654, it interrupts a point in the circuit including the conductor 507SN extending to Fig. 5 to prevent operation of the send failure relay R540 in the controller 400 portion of the director. At its contacts 1655, the relay R1650 interrupts a point in the locking circuit for the digit step relay R1640 but the latter relay remains in its operated position under control of its initial operating circuit from ground at contacts 1537. At its contacts 1666, the relay R1650 interrupts a point in the incomplete circuit for controlling the magnet M1583 in order to prevent the restoration of the wipers of the send switch 1580 to normal. Also, at its contacts 1657, the relay R1650 prepares a point in the circuit for controlling the restoration of the wipers of the send switch 1580. Finally, at its contacts 1653, the relay R1650 interrupts a point in the initial operating circuit for the relays R1620 and R1630.

In the above mentioned description it was pointed out that the right-hand winding of the digit stop relay is now included in the circuit from battery through the resistor 1625, 1531, 1651, right-hand winding of the relay R1560, contacts 1551 and 1611 in multiple and the conductor 269R extending to the circuit including the upper winding of the line relay R330. This circuit will be retained during the interdigital pause series in the sending cycle in order to receive a stop dial supervision if such supervision is returned from the primary selector 300 or any other subsequent switch in the switch train.

By referring to Fig. 3, it will be noted that as long as the line relay R330 is connected to the conductor 303R, resistance battery potential through the upper winding of the line relay will be returned over the conductor 269R. With resistance ground potential connected to the right-hand winding of the stop relay R1560, the digit stop relay cannot operate but during the interdigital pause between the transmission of impulses of successive digits the sender 1400 functions to connect resistance battery potential to the winding of the digit stop relay R1560 to condition the relay so that it will operate by substitution of ground potential on the conductor 269R. In other words, during the interdigital pause, the primary selector 300 may in responding to the first digit, raise its wipers 363 to 365, inclusive, to a level corresponding to the value of the number of impulses received and will then automatically rotate its wipers over the selected level to search for an additional trunk. When a delay is required for other switching equipment to prepare itself to receive the impulses of the next digit transmitted by the sender 1400 or when a busy path is encountered during the normal switching operations, a reverse battery stop dial supervision will be returned over the conductors 303R and 304T from the primary selector 300. The reverse battery supervisory signal consists of forwarding ground potential over the conductor 303R instead of the normal resistance battery potential. Consequently, in the sender 1400 the conductor 269R will receive the ground potential to complete the operating circuit for the right-hand winding of the digit stop relay R1560. The relay R1560 will upon operating complete, at its contacts 1561, a circuit for locking the stop send relay R1610 in its operated position over a circuit including its lower winding. The latter relay will thereby prevent the sender 1400 from transmitting impulses of the next digit until the digit stop relay R1560 restores to normal as an indication that the reverse battery stop dial supervision has been removed from the conductor 269R. As a further result of the operation of relay R1560, at its contacts 1561, it extends ground potential by way of a circuit including thermistor 1517 in multiple with the variable resistor 1518, contacts 1524 and the upper and lower windings of the relay R1520 to battery. The thermistor 1517 has a negative temperature coefficient of resistance which causes the current flow to the winding of the relay R1520 to increase as the thermistor 1317 is heated. The thermistor 1517 and the parallel resistor 1518 are adjusted so that they will delay the operation of the timer relay R1520 for approximately 5 seconds.

If the reverse battery stop dial is removed so that resistance battery potential is again substituted for the ground potential on the conductor 269R within the 5 seconds before the primary relay R1520 operates, then the relay R1560 will restore to normal to release the stop send relay R1610 and to open the timing circuit for operating the timer relay R1520. Consequently, the sender 1400 may now proceed to send the remaining digits as will be described hereinafter.

In the event that the reverse battery stop dial supervision retains the digit stop relay R1560 operated for a period greater than approximately 5 seconds, the timer relay R1520 will operate as described above. Upon operating, the relay R1520 will lock itself over a circuit including its upper winding and contacts 1523 to the grounded conductor 605CR29. Also, at the contacts 1521, the relay R1520 applies ground potential to the conductor 418KG extending to Fig. 4 in order to operate the fault seizure relay R660 in the controller 400 portion of the director. Operation of the latter relay will transmit a busy tone signal from the busy tone conductor 717 to the calling subscriber and it will cause the illumination of the fault seizure lamp L825 to indicate to the exchange attendant that the present call through the director can not be completed. At the contacts 1522, the relay R1520 disconnects the circuit including the conductor 870TG from the previously described circuit for the auxiliary start relay R1530 in order to restore the latter relay. The relay R1530 in turn, at its contacts 1535, releases the pulse control relay R1510 so that the sender 1400 will stop sending impulses and the circuit, including the conductor 269R, will be disconnected from the sender 1400.

More particularly, the pulse control relay R1510, at its contacts 1513, will open the circuit including the conductor 269R and will thereby cause the associated primary selector 300 or any other switching mechanism in the associated switch train to restore to normal. The busy tone signal transmitted from the controller 400 portion of the director will signal the calling subscriber to indicate a busy condition. The subscriber will now release the connection in the usual way.

In the event that the reverse battery stop dial supervision signal is not received by the digit stop relay R1560, the relay will remain in its restored position during the interdigital pause. The pulse relay R1570, however, will continue to pulse under control of the pulse generator 1509 in the manner previously described and will now cause the magnet M1692 to step the wipers 1691 of the digit space switch 1690 over the contacts of the associated contact banks. This circuit may best be traced from battery through the winding of the magnet M1692, contacts 1615, 1626, 1546, 1572, 1624, 1513, 1533 and 1681, wiper 1402 and ground potential on the engaged contact 1 on the associated contact bank of the sender sequence switch 1420. Each time the pulse relay R1570 closes its contacts 1572, the above mentioned circuit is completed for the magnet M1692 and each time the contacts are open by the relay R1570 the magnet M1692 restores. It should be noted, however, that the circuit completed and interrupted by the contacts 1571 on the pulse relay R1570 is ineffective at the present time to transmit corresponding pulses over the conductor 269R inasmuch as the contacts 1652 have been opened by the delay pulsing relay R1650. The magnet M1692 operates each time the circuit is completed and it restores each time the circuit is interrupted by the contacts 1572. Upon each restoration of the magnet M1692, the wiper 1691 will be advanced one step in a counter-clockwise direction. On the first step of the wiper 1691 from engagement with the normal contact into engagement with the contact 1, the rotary off normal contacts 1694 and 1695 will be closed. These contacts will remain in their closed position as the wipers are advanced over the contacts 1 to 10, inclusive, and they will be opened each time the wiper 1691 engages the eleventh or normal contact in the associated contact bank. As soon as the off-normal contacts 1695 are closed, a circuit is completed for the lower winding of the digit step relay R1640 in order to retain the relay in its operated position even though the circuit for the upper winding of relay is interrupted.

As a further result of the advancement of the wiper 1691 into engagement with the contact 1, the off-normal contact 1694 will be closed to prepare a self-interrupting circuit for the magnet M1692 which becomes effective when the pick-up relay R1630 restores to normal. Finally, the ground potential at the off-normal contacts 1695 is also extended by way of the contacts 1657, the off-normal contacts 1587 and the contacts 1584 for operating the magnet M1583.

The magnet M1583 operates and restores under control of the self-interrupting contacts 1584. Each time the magnet restores to normal, the wipers 1581 and 1582 are advanced an additional step in the counter-clockwise direction until the wipers are stepped from the tenth contacts into engagement with the eleventh or normal contacts in the associated contact bank. When this position is reached by the wipers of the send switch 1580, the off-normal contacts 1585 and 1587 are opened and the contacts 1586 are closed. The opening of the off-normal contacts 1587 will interrupt the above traced self-interrupting circuit for the magnet M1583 to terminate further stepping of the wipers 1581 and 1582. Also, it should be noted that as soon as the wipers 1581 and 1582 are advanced from the engaged contacts over which circuits were completed for both windings of the send stop relay R1550, the relay will immediately restore to normal and open its contacts 1551 and 1552. However, these contacts perform no circuit controls at the present time due to the fact that the stop send relay R1610 is retained locked in its operated position from ground at contacts 1644 on the operated digit step relay R1640.

The digit space switch 1690 will continue to advance its wipers 1691 step-by-step over the associated contacts until the circuit to the pick-up relay R1630 is interrupted. It should be noted that the contacts 1 to 6, inclusive, are strapped together and included in the circuit for the pick-up relay R1630 so that the relay circuit is retained as the wiper is stepped over the contacts 1 to 6. With the contacts 1 to 6 strapped together in the manner illustrated, six pulses will be transmitted to the magnet M1692 by the contacts 1572 on the pulse relay R1570 before the wiper 1691 will be stepped to the seventh contact position. As soon as the wipers 1691 leaves the sixth contact position, the circuit for the pick-up relay R1630 will be interrupted. Since the pick-up relay R1630 and the pulse transfer relay R1620 are locked in their operated positions over a series circuit both relays will restore to normal as soon as the wiper 1691 leaves the sixth contact position.

In the present system, the pulse relay R1570 will take approximately 0.6 second to advance the wipers 1691 over the first six contacts in the associated contact banks. It will be seen from the subsequent description of operation that the interdigital pause between the transmission of successive digits therefor will be approximately 0.6 second. This interval of time may be increased or decreased by merely adjusting the strapping between the successive contacts accessible to the wiper 1691. In other words, if the interdigital pause should be increased to approximately 0.7 second, the first seven contacts accessible to the wiper 1691 should be strapped together.

In the above description, it was pointed out that the pulse transfer relay R1620 in the pick-up relay R1630 both restore to normal as soon as the wiper 1691 registers the sixth contact in the associated contact bank. The restoration of relay R1620 at the contacts 1622 and 1623 transfers the conductor 269R to the circuit including the right-hand winding of the digit stop relay R1560 and resistance ground potential at the contacts 1532. Also, at its contacts 1625, the relay R1620 reestablishes a point in the previously traced initial operating circuit for the pick-up relay R1630. However, the last mentioned circuit includes the wiper 1691 and, consequently, the relay R1630 can not be operated until the wiper engages the normal contact and also until the delay pulsing relay R1650 restores and closes its contacts 1653.

As a result of the restoration of the pick-up relay R1630, at its contacts 1631, it opens an additional point in the initial energizing circuit for the upper winding of the digit relay R1640 but the latter relay is retained operated over a circuit including its lower winding and the off-normal contacts 1695. Also, at its contacts 1632, the relay R1630 interrupts a further point in the previously described circuit for locking the pick-up relay R1630 in series with the pulse transfer relay R1620. This circuit will be reestablished during the cycle of operation of the sender 1400 that transmits the impulses of the next digit. Finally, at the contacts 1633, the relay R1630 completes a circuit including the off-normal contacts 1694 and the self-interrupting contacts 1693 for controlling the magnet M1692. In other words, the contacts 1693 will interrupt the circuit for the magnet M1692 each time the circuit is completed and it will thereby cause the magnet to operate and restore until the wiper 1691 is advanced step-by-step in a counter-clockwise direction into engagement with the eleventh or normal contact position. As soon as the wiper engages this position, the off-normal contacts 1694 will be opened to interrupt the circuit for the magnet M1692 and terminate the stepping of the wiper 1691 in engagement with the eleventh or normal contact position. Also, the off-normal contacts 1695 will be opened in order to interrupt the energizing circuit for the lower winding of the digit step relay R1640.

Since the send switch 1580 and the digit space relay R1640 have now restored to normal, the digit step relay R1640 has lost its last holding circuit and it will also restore to normal. As soon as the relay R1640 restores, it interrupts at its contacts 1641 the circuit for the magnet M1421. This magnet now restores to normal and advances all of its wipers 1401 to 1407, inclusive, an additional step into engagement with the contact 2 in the associated contact banks. At the contacts 1642, the relay R1640 again interrupts a point in the circuit including the conductor 507SN. At the contacts 1644, the relay R1640 interrupts the locking circuit for the stop send relay R1610 to permit the latter relay to restore to its initial position.

The restoration of the stop send relay R1610 opens, at its contacts 1612, the circuit for the delay pulsing relay R1650. At its contacts 1614, the relay R1610 prepares a point in the circuit for again controlling the magnet M1583 of the send switch 1580.

As soon as the relay R1650 restores to normal, as noted above, it reestablishes at its contacts 1652 and 1653 the previously described circuits whereby the ground potential on the wiper 1402 will be transmitted to the pick-up relay R1630 and then to the magnet of the send switch 1580.

The advancement of all of the wipers of the send sequence switch 1420 from engagement with the contacts 1 into engagement with the contacts 2 will disconnect the markings from the WXYZ11 marking conductors and will connect the WXYZ12 marking conductors extending to the corresponding route registers in the coder 1800 portion of the director. These conductors will now be connected by way of the wipers 1404 to 1407, inclusive, to the bank contacts accessible to the wipers 1581 and 1582 on the send switch 1580 so that a test can now be made as the wipers are now rotated over the associated contact banks to determine the value of the digit registered in the second route register, WXYZ12, of the coder 1800. It should be noted, however, that the wiper 1403 applies ground potential to the skip conductor SK12 extending to Fig. 17 to determine whether or not any digit has been registered in the WXYZ12 route register. By referring to Fig. 17, it will be noted that the schematically illustrated contact 1721, associated with the WXYZ12 route registers, will be in the closed position, if no digit is registered in the associated register, and will be opened if a digit has been registered in the associated registers.

It will first be assumed that no digit is registered in the WXYZ12 route register and, therefore, the ground potential connected to the skip conductor SK12 will now be extended by way of the contacts 1721, conductor 1203SKC extending to Fig. 16 in order to operate the skip relay R1680, in the sender 1400. Operation of the skip relay R1680, at its contacts 1682, connects the ground potential on the conductor 1203SKC to the circuit including the self-interrupting contact 1422 and the winding of the magnet M1421 to battery. This will cause the magnet M1421 to operate and open its contacts 1422 whereupon the magnet will restore to normal and advance its wipers into engagement with the next set of contacts. If a number of the route registers, for example, the route registers WXYZ13, WXYZ14, WXYZ15 and WXYZ16 are to be skipped, the ground potential at the wiper 1403 will be successively connected to the skip conductors SK13 to SK16, inclusive, as the wiper 1403 is skipped over the contacts 3 to 6, inclusive. Therefore, the skip relay R1680 will be retained in its operated position as the magnet M1421 is self-interruptedly operated to advance the wipers of the send sequence switch 1420 over the contacts 3 to 6, inclusive. In this manner, the send sequence switch 1420 will be controlled to skip the various route registers that do not have digits registered therein. Substantially the same circuits will be completed when the wiper 1403 engages the contacts 7 to 13, inclusive, if the corresponding skip conductors SK21 to SK27, inclusive, complete circuits to the skip common conductor 1203SKC and thereby complete the circuit for operating the skip relay R1680.

If it is assumed that a digit has been registered in the second route register WXYZ12, the above described circuit, including the skip conductor SK12 can not be completed inasmuch as the contacts 1721 will be open to prevent the operation of the skip relay R1680. Since a digit has been registered in the second route register WXYZ12, it will now be marked on the corresponding marking conductors terminating in the contacts 2 accessible respectively to the wipers 1404 to 1407, inclusive, on the send sequence switch 1420.

The ground potential now applied to the wiper 1402 at the engaged contact 2 will complete the previously described circuit including the contacts 1681, 1533, 1513, 1653, 1572 (upon the next restoration of the pulse relay R1570), 1546 and 1625, wiper 1691 in engagement with the eleventh or normal contact and the winding of the pickup relay R1630 to battery. This pulse initiates the second transmitting cycle of the sender 1400 to transmit impulses corresponding to the second digit registered in the second route register WXYZ12. More specifically, impulses corresponding to the value of the digit registered in the second route register will be transmitted over the conductor 269R to the primary selector 300 and since that switch has been operated and cut through to the next switching unit in the switch train, the impulses will be forwarded to control the next switching unit. As the above pulses are transmitted to the conductor 269R, a corresponding number of pulses will also be transmitted to the magnet M1583 on the send switch 1580. This will make the previously described test of the marking conductor 1425 to 1428, inclusive, whereby the send stop relay R1550 will be operated to terminate further transmission of impulses when the number of transmitted impulses correspond to the value of the digit that has been registered in the second route register WXYZ12. The interdigital pause between the transmission of successive digits will be governed by the digit space switch 1690, as previously described, and upon the completion of the interdigital pause, the magnet M1421 of the send sequence switch 1420 will be advanced an additional step to transmit the digit registered in the third route register WXYZ13 or to skip that register if no digit is registered therein.

The foregoing cycle of operation of the sender 1400 will be repeated for each of the digits to be transmitted and the send sequence switch 1420 will be automatically controlled to advance the wipers 1401 to 1407, inclusive, step-by-step after each digit is transmitted or whenever a register is to be skipped by the sender 1400. As the wipers of the send sequence switch 1420 successively engage the contacts 1 to 6, inclusive, the digit registered in the respective route register WXYZ11 to WXYZ16 will be transmitted over the conductor 269R to the primary selector 300 and subsequent switches in the switch train. As soon as the wipers 1404 to 1407, inclusive, of the send sequence switch 1420 engage the contacts 7, the sender 1400 will be controlled to transmit the digit registered in the first digit register 1020 of the call register 900.

Referring now to the call register 900, it will be seen that the WXYZ21 to WXYZ23 marking conductors in the cable 1101 will be marked in accordance with the digits registered respectively in the first, second and third digit registers 1020, 1030 and 1040. These are the first three digits that have been dialed by the calling subscriber. It should also be noted that when the send sequence switch 1420 positions its wipers 1404 to 1407, inclusive, into engagement with the contacts 7, the wiper 1403 simultaneously engages the contact 7 in the associated contact bank terminating the skip conductor SK21. Thus, ground potential is applied to this conductor by the wiper 1403 to ascertain whether or not the TA control relay R1860TA in the coder 1800 has been registered. The operations that now take place will depend upon the operated conditions of the control relays R1860TA, R1860TB, R1860TC and R1860TD in the coder 1800.

The foregoing control relays will be selectively operated by the translate relay, such as R2701, that has been selected as a result of the registration of the first three digits of the call register 900. Consequently, the selected translate relay will be prewired to operate the particular one of the control relays of the coder 1800 that will cause the director to transmit impulses corresponding to only certain of the digits that have been dialed by the calling subscriber.

If it is assumed that the TA control relay R1860TA has been operated by the particular translate relay that has been selected as a result of the registration of the first three digits in the call register 900, it will immediately lock itself in its operated position over a circuit including its contact 1, conductor 1826, contacts 1812 and the locking conductor 615LGC which has been grounded at the contacts 641' by the seizure relay R640. At the contacts 2, 3 and 4 the relay R1860TA will disconnect the skip conductors SK21, SK22 and SK23 from the skip common conductor 1203SKC extending to Fig. 16 in order to prevent operation of the skip relay R1680.

Thus it will be seen that when the wiper 1403 of the send sequence switch 1420 applies ground potential to the skip conductor SK21 extending to Fig. 18, the operated condition of the TA control relay R1860TA will prevent application of ground potential to the skip common conductor 1203SKC extending to Fig. 16. At the contacts 3 and 4, the relay R1860TA will also interrupt points in the circuit including the skip conductors SK22 and SK23. Since the skip common conductor 1203SKC is not connected to ground during the time that the wiper 1403 engages the seventh, eighth and ninth contacts in the associated contact banks, the sender 1400 will be able to transmit impulses corresponding to the digits marked on the marking conductors WXYZ21, WXYZ22 and WXYZ23 by the first, second and third digit registers 1020, 1030 and 1040. During the sending cycle, impulses corresponding to the digit registered on the respective WXYZ marking conductors will be transmitted by the sender 1400. When the number of impulses corresponds to the value of the digit registered on the particular WXYZ marking conductors, the send stop relay R1550 will operate to terminate the sending cycle. Thereafter the magnet M1421 of the send sequence switch 1420 will be operated to advance its wipers an additional step into engagement with the next contact in the associated contact banks.

In the particular illustration described above, the TA control relay R1860TA in its operated position will control the sender 1400 to transmit one after another, all of the digits that have been registered in the seven digit registers of the call register 900 and then the digits registered respectively in the eighth to the eleventh digit registers in the digit register 1200. The latter registers, however, are only used in the event that the particular call being handled by the director is a national toll call requiring the dialing and registration of ten or eleven digits.

Under certain conditions, the selected translate relay in the translator 2700 may be prewired so that it will operate the TB control relay R1860TB instead of the TA control relay R1860TA. When this occurs, the relay R1860TB will lock itself by way of its contacts 1 over the previously described circuit to the grounded locking conductor 615LGC. Also, at its contacts 2, the relay R1860TB will disconnect the skip conductor SK23 from the skip common conductor 1203SKC in the same manner as the contacts 4 on the control relay R1860TA. However, since the control relay R1860TA remains in its restored position, the contacts 2 and 3 thereof will remain closed so that the skip conductors SK21 and SK22 will be connected to the skip common conductor 1203SKC. Under this condition the send sequence switch 1420 will be controlled when the wiper 1403 thereof engages the contacts 7, 8 and 9 in the associated contact banks to skip the digits registered in the corresponding digit registers 1020 and 1030 and to transmit the digit registered in the third digit register 1040. In other words, as the wiper 1403 of the send sequence switch 1420 applies ground potential to the skip conductors SK21 and SK22, the ground potential will be extended by way of the skip common conductor 1203SKC to operate the skip relay R1680 which in turn will control the magnet M1421 of the send sequence switch 1420 to advance its wipers over the contacts 7 and 8 without transmitting impulses corresponding to the digits marked on the corresponding WXYZ21 and WXYZ22 marking conductors. When the wipers engage the contacts 9, however, the corresponding skip conductor SK23 will be disconnected from the skip common conductor 1203SKC by the operated TB control relay R1860TB to permit the sender 1400 to transmit impulses corresponding to the digit marked on the WXYZ23 marking conductors by the third digit register 1040.

From the foregoing, it will be understood that the operation of the control relay R1860TB will control the sender 1400 so that it will skip the transmission of the first and second digits registered in the first and second digits 1020 and 1030 and it will permit the sender 1400 to then transmit all of the remaining digits registered in the digit registers of the call registers 900 and 1200.

Certain of the exchanges in the telephone system may be identified by the two digit office code and will include four digits identifying the particular called subscriber line. In other words, the subscriber is identified by a six digit number instead of the usual seven digit number. When this condition exists, the first and second digit register 1020 and 1030 will register respectively the called office code digits dialed by the calling subscriber and the third, fourth, fifth and sixth digit registers 1040, 1110, 1120 and 1130 will register respectively the four numerical digits identifying the called line. The first three digits in this case will include the two digits of the called office code followed by the thousand digits of the four numerical digits identifying the called line. These three digits will normally indicate that the number being dialed by the calling subscriber is a six digit number but under certain conditions a seventh digit may be dialed. The latter condition exists when an exchange having the two digit office code includes mixed six and seven digit numbers and the seven digit number has the same first three digits as a six digit number. In any event, when the first three digits of the six digit number is registered in the call register 900, the translator 2700 will be controlled in the manner previously described to select a particular translate relay which will register the appropriate route digits in the route register in the coder 1800 and it will also select the control relay R1860TC. The relay R1860TC upon operating, will lock itself by way of its contacts 1 to the conductor 868TCL extending to Fig. 8, then by way of the contacts 854, conductor 867LLC extending to Fig. 18, conductor 1826, contacts 1812 and the locking ground conductor 615LGC. It should be noted that the locking circuit for the relay R1860TC includes contacts 854 on the fourth numerical send relay R850 so that in the event that a seventh digit is dialed by the calling subscriber and registered in the seventh digit register 1140, the receive sequence switch 1010 will complete the operating circuit by way of its wiper 1015 and the conductor 804SGO to operate the fourth numerical send relay R850. If the seventh digit is dialed after a code indicative of a six digit number has been registered, the operation of the fourth numerical send relay R850 will interrupt at the contacts 854 the locking circuit for the control relay R1860TC.

If it is assumed that the control relay R1860TC remains locked over the above mentioned locking circuit, it will close its contacts 2 so that the skip common conductor 1203SKC will be grounded by way of the skip conductor SK27 when the wiper 1403 engages the contact 13 in the associated contact bank. This will cause the sender 1400 to skip the seventh digit register 1140 in substantially the same manner as has been described previously. As a further result of the operation of the TC control relay R1860TC, at its contacts 4, it applies ground potential to the conductor 1802–6P extending to Fig. 20 in order to operate the six pull relay R2020 in the call recorder 2000. This will indicate to the call recorder 2000 that the particular called office code that has been dialed by the calling subscriber and this is subsequently to be recorded is one having only six digits instead of the usual seven digits. Also, at its contacts 5, the relay R1860TC prepares a circuit for operating the TD control relay R1860TD.

In view of the latter circuit, it should be noted that during the operation of the sender 1400 to transmit the different registered digits, the first three digits registered in the first, second and third digit registers 1020, 1030 and 1040 will normally be skipped if the control relays R1860TA and R1860TB remain in their restored positions. If one or more of the first three digits dialed by the calling subscriber are to be transmitted by the sender 1400, then it is necessary to arrange the selected translate relay in the translator 2700 so that it will operate, for example, the TA or the TB control relays R1860TA or R1860TB at the same time it operates the control relay R1860TC. Operated condition of either the control relay R1860TA or R1860TB will control the send sequence switch 1420 of the sender 1400 in the manner described above.

As the wipers of the send sequence switch 1420 are advancing step-by-step over the contacts 7, 8 and 9, the corresponding digits marked on the WXYZ21, WXYZ22 and WXYZ23 code marking conductors may be transmitted or skipped depending upon the operated conditions of the control relay R1860TA and R1860TB. The send sequence switch will then advance its wipers step-by-step over the contacts 10 and 11 to transmit the hundreds and tens units registered respectively in the fourth and fifth digit registers 1010 and 1020 and marked the WXYZ24 and WXYZ25 marking conductors. As soon as the sender 1400 has transmitted the fifth digit registered in the fifth digit register 1120 and marked on the WXYZ25 marking conductors, the send sequence switch 1420 will advance its wipers an additional step into engagement with the contacts 12 in associated contact banks. In this position, the wipers 1404 to 1407 of the send sequence switch 1420 will mark the sixth digit on the WXYZ26 code marking conductors in the banks of the send switch 1580. Also, the advancement of the wiper 1403 into engagement with the twelfth contact will extend ground potential over the skip conductor SK26 extending to Fig. 18, then by way of the contact 5 on the operated relay R1860TC to operate the relay R1860TD. The relay R1860TD will now lock itself over a circuit including the contacts 1815, its own contacts 3, conductor 1826, contacts 1812 and the grounded locking conductor 615LGC. The sender 1400 will now transmit impulses corresponding to the sixth digit as registered in the sixth digit register 1130 and marked on the WXYZ26 code marking conductors.

However, in view of the fact that the control relay R1860TD has operated, it performs various controls, some of which are of no importance at the present time. The principal control exercised by the relay R1860TD when it is operated under control of the relay R1860TC is that the contacts 5 thereon completes a locking circuit for the relay R1860TC which is independent of the contacts 854 on the relay R850. The latter relay is only operated in the event that a seventh digit has been registered in the register 1140. Consequently, when the sender 1400 is in condition to transmit the sixth digit registered in the digit register 1130, the relay R1860TD is operated to lock the relay R1860TC in its operated position. If a seventh digit is now dialed by the calling subscriber, it will automatically be skipped by the sender 1400. On the other hand, if the seventh digit is dialed and registered in the seventh digit register 1140 to cause the operation of the fourth numerical send relay R850 prior to the transmission of the sixth digit by the sender 1400, then the contacts 854 will be opened to restore the control relay R1860TC so that the seventh digit may be transmitted.

In view of the foregoing, it will be understood that the relay R1860TC is operated under control of a translator whenever a six digit number is dialed by a calling subscriber and also when an office code identifying an exchange having mixed six and seven digit subscriber numbers is dialed. This relay can be operated in combination with either the control relay R1860TA or R1860TB which will control the sender 1400 in the manner previously described. However, if the control relay R1860TC is operated to indicate a six digit called number the control relay R1860TD will operate after the sixth digit is transmitted by the sender 1400 to prevent restoration of relay R1860TC if a seventh digit is thereafter dialed by the calling subscriber. If the seventh digit is dialed before the sender transmits the impulses of the sixth digit, then the control relay R1860TC will automatically be restored to normal as pointed out above by the operation of relay R850 and the call will be handled in the usual manner as a seven digit number.

Certain other conditions exist when it is necessary to operate the control delay R1860TD without operating any of the other control relays. This condition exists when certain predetermined three digit special service code numbers are registered respectively in the first three digit registers 1020, 1030 and 1040. Also, the TD control relay may be selectively operated by the 0 operator relay R1850TZ, the translation failure relay R1850TT and the fault seizure intercept relay R1850TY.

In the event that the three digit special code number is registered in the first three digit registers 1020, 1030 and 1040, the translator 2700 will be selected in the same manner as though these three digits identify a called office code and the selected translate relay in the translator 2700 will register whatever route digits are necessary to route the call to the special service telephone in the exchange in the WXYZ11 to WXYZ16 route registers and it will selectively control the operation of the control relay R1860TD.

When the TD control relay is operated, it will complete, at its contacts 6, a circuit including the conductor 506ST extending to Fig. 5, then by way of the conductor 506ST extending to Fig. 15 in order to control the operation of the start relay R1540 in the sender 1400. The last-mentioned circuit, however, is normally controlled from the contacts 558 on the assigner start relay 550 when the translator 2700 is involved in establishing the routing digits for the call. However, if the control relay R1860TD is operated by one of the relays R1850TZ, R1850TT or R1850TY without requiring the use of the translator, then it is necessary to start the sender 1400 from the contacts 6 on the operated control relay R1860TD. As a further result of the operation of relay R1860TD, at its contacts 3, it completes a locking circuit for itself which includes the winding of the relay, contacts 1815, its own contacts 3, conductor 1826, contacts 1812 and the locking ground conductor 615LGC. At its contacts 1, 2 and 4, it prepares circuits for connecting the skip conductors SK24, SK26 and SK 27 to the skip common conductor 1203SKC. Inasmuch as the control relay R1860TA is assumed to be in its restored position, the skip conductors SK21, SK22 and SK23 are also connected to the skip common conductor 1203SKC.

Under the foregoing conditions, the sender 1400 will transmit whatever digits are registered respectively in the WYZ11 to WYZ16 route registers (Fig. 17) and skip any of those registers that have no digits registered therein. Also, the wiper 1403 of the send sequence switch 1420 in advancing over the contacts 7 to 13, inclusive, will apply ground potential to the skip conductor SK21 to SK24 and SK26 and SK27. In this connection, it should be noted that the tenth and eleventh contacts accessible to the wiper 1403 are both connected to the skip conductor SK24 so that in both of the above positions, the wiper 1403 will transmit the skip controlling ground potential over the skip conductor SK24. This will permit the send sequence switch 1420 to skip all of the digit registers 1020, 1030, 1040, 1110, 1120, 1130 and 1140 having respectively the marking conductors WXYZ21 to WXYZ27, inclusive.

Referring to the send sequence switch 1420, it will be seen that when the wiper 1401 engages the contact 5, the position in which the sender transmits the route digit that may be registered in the fifth route register WXYZ15, it applies ground potential by way of the contacts 1671 on the operated control relay R1670 to the conductor 1602BA extending to Fig. 20 in order to prepare one point in the circuit for operating the code send relay R2040 in the call recorder 2000.

The above mentioned circuit, which is prepared at the contact 5 accessible to the wiper 1401 on the send sequence switch 1420, is arbitrarily selected inasmuch as after four digits have been transmitted by the sender 1400 a toll ticket repeater, such as the repeater X2300 (Fig. 1) will be included in the connection established through the primary selector 300. The inclusion of the ticket repeater X2300 will return a signal to the call recorder 2000 to indicate that the latter circuit may begin to transmit various items of information which are to be recorded in connection with the present telephone call. The operation of the call recorder 2000 is thus delayed until after the fourth digit has been transmitted by the sender 1400 in the establishment of a connection and guarantees that sufficient switch apparatus in the switch train has been included in the connection to select a toll ticket repeater, such as X2300. The foregoing circuit for applying ground potential to the conductor 1602BA is retained as the wiper 1401 is advanced over the contacts 5 to 20, inclusive, in the associated contact bank.

In addition to the foregoing, it should be noted that the send sequence switch 1420 is arranged so that the wiper 1402 will encounter ground potential as the wipers of the switch are advanced over the contacts 1 to 9, inclusive. Thus, the ground potential at the contacts 1402 will control the previously described circuit for the pick-up relay R1630 as the wipers of the send sequence switch 1420 are advanced over the contacts 1 to 9, inclusive. During this time, the send sequence switch 1420 will transmit, or skip, each of the five route registers WXYZ11 to WXYZ16, inclusive. Also, the send sequence switch 1420 will then transmit or skip, as necessary, the digits marked on the WXYZ21, WXYZ22 or WXYZ23 marking conductors by the first, second and third registers 1020, 1030 and 1040. When the wiper 1402 of the send sequence switch 1420 engages contact 10, a test is made to determine whether or not the sender 1400 has reached a point in the transmission of the impulses corresponding to the digits registered in the call register 900 which correspond to a numerical register that is being controlled from the calling subscriber dial.

In other words, if the calling subscriber should register the first three digits identifying a particular called office code and should then delay in dialing the thousands digit of the numerical portion of the called subscriber number, it is possible for the sender 1400 to transmit all of the route digits that have been registered as a result of the transmission of a called office code followed by the three digits of the registered called office code. The sender then attempts to send out the digit registered in the first numerical register 1110 at a time when the register has not been operated by the calling subscriber. When this condition exists, the send sequence switch 1420 will prevent operation of the pick-up relay R1630 until the subscriber dials and registers the thousands digit of the called subscriber number in the first numerical register 1110. It may be well to mention, however, that if the subscriber delays in the dialing of any of the digits for more than a predetermined length of time as determined by the timer 490, the director is arranged so that it will automatically route the call to an intercept operator position.

When the send sequence switch 1420 advances its wipers into engagement with the contact 10, the wiper 1402 will engage the conductor 861CR6 extending to Fig. 8 to determine whether or not a digit has been registered in the first numerical register 1110. In Fig. 8, it will be seen that the conductor 861CR6 is connected to contacts 823 on the first numerical send relay R820 and unless this contact is closed, the associated conductor cannot be grounded.

Referring now to the call register 900 (Figs. 9 to 11, inclusive) it will be seen that during the time the calling subscriber is dialing the fourth digit, the receive sequence switch 1010 will have its wipers in engagement with the contacts 4 to complete the circuit for the magnet M1111. At the end of the digit, the receive sequence switch 1010 advances its wipers from engagement with the contact 4 into engagement with the contacts 5 in order to prepare circuits to register the fifth dialed digit in the fifth digit register 1120. As soon as the wiper 1015 engages the contact 5, in the associated contact bank, a circuit is completed from the grounded conductor 871LGR, wiper 1015, conductor 801SDO extending to Fig. 8 in order to operate the first numerical send relay R820. This relay operates and, at its contacts 821, locks itself to a circuit including contacts 647 and 666 to ground. In other words, as soon as a digit has been registered in the fourth digit register 1120, the receive sequence switch 1010 advances an additional step to complete the above mentioned circuit for operating the first numerical send relay R820. This will indicate to the controller 400 portion of the director that the fourth digit has been registered and may now be transmitted by the sender switch 1400. As a further result of the operation of the relay R820, it applies ground potential at its contacts 823 to the conductor 861CR6 extending to Fig. 14 and then by way of the wiper 1402 to control the sender 1400 to transmit the digit registered in the fourth digit register 1110.

Finally, at the contacts 822, the relay R820 applies ground potential to the conductor 805SD extending to Fig. 19 in order to ground the bank contacts 1 to 4, inclusive, accessible to the wiper 1951 on the code send switch 1950. This will signal the call recorder 2000 that a digit has been registered in the fourth digit register 1110 in the call register 900 portion of the director.

Before proceeding with the description of the operation which occurs to send out the digit registered in the fourth register 1110, it should be understood that the second, third and fourth numerical send relays R830, R840 and R850 are successively operated over circuits that are substantially identical to the circuit described above for operating the first numerical send relay R820. These relays are successively operated as the wiper 1015 of the send sequence switch 1010 engages the contacts 6, 7 and 8 after the registration of the fifth, sixth and seventh digits in the registers 1120, 1130 and 1140. Each of the above mentioned relays will be locked in the operated position over the same circuit which locks relay R1820 and each of the relays will complete circuits at their contacts 833, 842 and 855 for grounding the respective conductors 806SE, 807SF and 808SG extending to Fig. 19 to indicate to the call recorder 2000 that the fifth, sixth and seventh digits have been registered in the call register 900.

The contacts 834 on the second numerical send relay R830 will apply ground potential to the conductor 862CR7 extending to Fig. 14 to mark the eleventh contact in the bank accessible to the wiper 1402. The eighth and ninth contacts terminate the conductors 863CR8 and 864CR9 which are connected to the contacts 843 and 853 on the respective third and fourth numerical send relays R840 and R850. The above mentioned contacts connect the conductors 863CR8 and 864CR9 to the conductors 865CG1 extending to Fig. 20 and 866CG2 extending to Fig. 19.

In Figs. 19 and 20 it will be seen that these conductors will normally be grounded at the contacts 2022 and 2013 if the relays R2020 and R2010 remain in their restored positions. Normally, however, the AB toll relay R2010 will be operated whenever a recording is to be made of a telephone call and removes ground potential from the conductor 866CG2. Also, the relay R2020 will be operated whenever the called office code registered in the call register 900 indicates that the subscriber number is a six digit number instead of the usual seven digit number. The ground potential for the conductors 865CG1 and 866CG2 will be supplied from the wiper 1952 when the relays R2010 and R2020 are operated.

In view of the foregoing, it will be appreciated that as the wiper 1402 of the send sequence switch 1420 engages the contacts 10, 11, 12 and 13, the sender 1400 will not attempt to transmit any switch controlling impulses unless the conductors terminating the above mentioned contacts have been grounded in the manner described above.

Since the conductors 863CR8 and 864CR9 are grounded under control of the circuits in the call recorder 2000 (Figs. 19 to 21, inclusive) the sender 1400 cannot send out the last two digits registered in the sixth and seventh digit registers 1130 and 1140 until the call recorder 2000 has performed all of its operations.

Returning again to the sender 1400 portion of the director, it will now be assumed that seven digits have been dialed by the calling subscriber and it will also be assumed that the call recorder 2000 portion of the director has performed all of its operations in transmitting items of record information to the toll ticket repeater X2300 (Fig. 1) so that the sender is able to send out all of the impulses of the different digits registered in the digit registers of the call register 900. It should be understood, however, that certain of the digits as registered in the digit register 900 may have been skipped during the transmission period of the sender 1400 depending upon the operated conditions of the various control relays R1860TA to R1860TD, inclusive. In any event, as soon as the wiper 1403 of the send sequence switch 1420 in the sender 1400 engages the associated bank contact 14, ground potential is extended by way of the conductor 1441Y extending to Fig. 16, contacts 1661, conductor 1601CR31, contacts 2011 (relay R2010 having been restored to normal), conductor 701CR22 extending to Fig. 9, conductor 701CR22 extending to Fig. 7 and the winding of the director release relay R680 to battery. Operation of the director release relay R680 in the controller 400 portion of the director will control the restoration of the director in the manner to be described hereinafter.

It may be well to mention at this time that when the call register 1200 (Figs. 12 and 13) is utilized in conjunction with the call register 900 in order to register respectively the eighth, ninth and tenth and possibly the eleventh digit dialed by a calling subscriber who desires a national toll connection, the above traced circuit for operating the director release relay R680 will not be completed until the wiper 1403 of the send sequence switch 1420 is finally stepped into engagement with the contact 18. In the latter event, the ground potential on the wiper 1403 is directly connected to the conductor 701CR22 extending to Fig. 9 to complete the operating circuit for the director release relay R680.

During the period of time when the wipers 1404 to 1407 of the send sequence switch 1420 successively engage the contacts 14 to 17, inclusive, the digits marked in code form on the WXYZ28 to WXYZ31 code marking conductors by the registers 1310, 1320, 1330 and 1340 will be transmitted by the sender 1400 in the manner previously described. In order to retain the wiper 1402 of the send sequence switch 1420 grounded as it steps over the contacts 14 to 17, inclusive, the conductor 1442CG3 will be grounded from the contacts 2133 on the wiper switching relay R2130 in the call recorder 2000.

Before discussing the above mentioned operation of the sender 1400 to transmit the digits registered in the digit register 1200 (Figs. 12 and 13) the operations of the call recorder 2000 that must be performed before the release of the director will now be described.

*Operation of the call recorder 2000*

A description will now be given of the mode of operation of the call recorder 2000 illustrated in Figs. 19 to 21, inclusive. Before proceeding with this description, it should be noted, however, that in Fig. 19, the detector 1900 and the detector assigner 1910 have been illustrated in block diagram form since they are shown and described in detail in the previously mentioned Coleman patent.

Reference should be made to the above mentioned Coleman patent for a detailed description of the operation of the detector 1900 and the detector assigner 1910. It should be understood, however, that any well known type of detector may be employed to detect the identity of a calling subscriber line and to register the directory number of such a line in the call recorder 2000 so that the information concerning the identity of the calling subscriber substation may subsequently be recorded on the toll ticket that is automatically produced of each telephone connection. Such a detector may, for example, be of the type disclosed in the Ostline Patent No. 2,639,330, granted May 19, 1953. Regardless of the type of the detector that is employed in the present system, it will be appreciated that it is first necessary to associate the common detector with the particular director that is calling for the identity of the particular calling subscriber substation. It is for this purpose that the detector assigner 1900 is provided.

In the above mentioned Coleman patent, the detector assigner 1910 is an all-relay type assigner that will be controlled from the call recorder 2000 portion of a calling director to cause the detector assigner 1910 to associate the detector 1900, when it becomes available, to the exclusive use of the call recorder 2000. When this association is made, the detector 1900 will identify the numerical portion of the directory number of the calling subscriber substation on a terminal per station basis. Identification of a calling subscriber on a terminal per station basis means that each subscriber substation on a party line is identified by a different directory number and is selected as a called station from different terminals in the banks of the connectors having access to the subscriber lines. The numerical portion of the directory number of the calling subscriber line will be registered respectively on the code storage relay WXYZ1 to WXYZ5, inclusive. These registers are shown in block diagram form in Fig. 19 and each register includes four relays which are selectively operated over four WXYZ conductors in various combinations or individually to register any one of the digits 1 to 9 and 0 in the manner described hereinbefore. It may be well to mention at this time that the WXYZ1 register will register the exchange number corresponding to the third digit of the called subscriber directory number. For example, if the calling subscriber line has the directory number FL31234 corresponding to the FLorida 3 exchange, the digit 3 will be automatically registered in the WXYZ1 register and the digits 1234 identifying the numerical portion of the calling subscriber directory number will be registered respectively in the WXYZ2 to WXYZ5, inclusive, registers in Fig. 19.

The call recorder 2000 is also provided with a code send switch 1950 which is arranged to transmit in code form to the toll ticketing repeater that has been included in the connection, various items of information which have been stored either in the call recorder 2000 or which have been stored in the call registers 900 and 1200.

Continuing now with the operation of the call recorder 2000, it will be recalled that the translator 2700 operated to register appropriate route digits in the route registers of the coder 1800. Also, the translator 2700 applied ground potential to certain of the TA, TB, TC, TD and ABT control conductors in the cable 1701 whereby the corresponding control relays in the coder 1800 operated to govern the sending operation of the director. The application of ground potential to the ABT conductor, extending to the coder 1800, completed the previously described circuit for operating the AB toll relay R2010 in the recorder 2000. This relay is operated whenever the translator 2700 determines that the call recorder 2000 is required in conjunction with making a permanent record of the items of information pertaining to a telephone connection. The relay R2010 upon operating, at its contacts 2012′, locks itself to the grounded locking conductor 605CR29 extending to Fig. 6.

If the particular called exchange dialed by the calling subscriber is a six digit exchange, the relay R2020 will be operated over the six pull conductor 1802–6P by the control relay R1860TC in the coder 1800. Operations controlled by the six pull relay R2020 will be explained in further detail hereinafter.

As soon as the AB toll relay R2010 operates in the manner described above, it closes its contacts 2019 to complete an obvious circuit for operating the relay R2150. At its contacts 2014 it completes an obvious circuit for illuminating the ABT lamp L2025 to indicate that an AB toll call is being handled by the particular director. At its contacts 2013, the relay R2010 removes ground potential from the conductor 856CG2 extending to the controller 400 portion of the director (Fig. 8) and, at its contacts 2016, it prepares a point in the circuit for sending coded information corresponding to the various items of information over the conductor 271T to the particular toll ticket repeater that is included in the established connection.

At the contacts 2015 and 2017, the relay R2010 prepares circuits for controlling the detector assigner 1910 whereby the common detector 1900 will be connected to the call recorder 2000. In this connection it should be noted that at the contacts 2015, ground potential at the contacts 2161 will be extended by way of the contacts 2062 and 2015 to ground the tens conductor C2026 extending to the detector assigner 1900 to mark the 0 tens group of directors as calling to the director assigner 1910. The ten directors in the exchange having the tens digit 0 will thus be marked as calling. At the contacts 2017, the relay R2010 connects the winding of the marginal detector test relay R2180 by way of the contacts 2162, 2065 and 2017 to the cross-point return conductor C2027 extending to the detector assigner 1910. The application of the resistance battery potential through the winding of the relay R2180 to the cross-point return conductor C2027 will selectively mark the units digit 1 of the particular calling director 01 to the detector assigner 1910. Thus the assigner 1910 has been informed that the "01" director in the exchange is the only calling director that should now be connected to the common detector 1900.

In the above mentioned circuits controlled by the AB tool relay R2010, it was pointed out that it caused the operation of relay R2150. This relay, at its contacts 2151, interrupts a point in the pulsing circuit for the pulse relay R2050 to prevent premature pulsing by this relay at the contacts 2052, over the conductor 271T. Also, at the contacts 2152, the relay R2150 prepares a point in the circuit including the conductor 444MS4 for forcibly controlling the operation of the code send relay R2040 if the relay R2150 has not been released within a predetermined interval of time.

The detector assigner 1900 will now control the connection of the call recorder 2000 portion of the calling director (01) to the detector 1900. As soon as the detector is available, a circuit will be completed from the detector assigner 1910 over the above cross-point return conductor C2027 to complete the above mentioned circuit for operating the marginal detector test relay R2180. Operation of the relay R2180 completes, at its contacts 2181 a circuit including the contacts 2061, the conductor 513PM extending to Fig. 5, conductor 513PM extending to Fig. 18 and then by way of contacts on operated ones of the party station relays shown in Fig. 18 to one of the conductors 1891P1 to 1896POX extending to Fig. 19 to mark one of these conductors to the detector 1900. The marking potential on one of the above mentioned conductors will indicate to the detector 1900 the particular class of the calling subscriber station that has been registered in the party station relays of Fig. 18.

As a further result of the operation of relay R2180, at its contacts 2185, it completes a circuit including ground at contacts 2063 and the conductor 1963BR3 extending to Fig. 19 in order to operate the director detector connect relay R1910. This relay is a multi-contact relay that is individual to the call recorder 2000 portion of the calling director "01" and when it is operated, it connects all of the conductors of the call recorder 2000 to the corresponding conductors extending to the detector 1900. It should be understood, however, that all of the conductors extending to the detector 1900 are multiply connected to all of the corresponding contacts on the detector connect relays of each of the directors in the system. The particular connect relay R1910 is operated due to the fact that the detector assigner 1910 (Fig. 19) has completed circuits therethrough (not shown) whereby the marginal detector test relay R2180 is operated. As long as the relay R2180 is directly controlled by the detector assigner 1910, no other director detector connect relay, such as R1910, can be operated by the detector assigner 1910 to connect another director to the detector 1900.

As a further result of the operation of relay R2180, at its contacts 2184, it completes a circuit including the winding of the detector signal relay R2170, contacts 2067 and ground at contacts 2011' on the operated AB toll relay R2010. Finally, at its contacts 2182 and 2183, the relay R2180 disconnects the circuit for the relay R2190 from the conductor 443MS3 extending to Fig. 4 and instead connects the above mentioned conductor to the circuit including the winding of the detector failure relay R2160.

At the present time, the director detector connect relay R1910 is operated to interconnect the detector 1900 to the call recorder 2000 and the latter circuit is arranged so that it will respond to and register the code signals corresponding to the identity of the calling subscriber line registered in the WXYZ1 to WXYZ5 registers. If the present call originated on a party line, the identity of the position of the station on that line is registered in the party station relays of Fig. 18. These relays will mark certain of the conductors 1891P1 to 1896POX extending to the detector 1900 so that the detector will operate to identify the numerical portion of the directory number of only the particular calling station on the party line.

As soon as the detector signal relay R2170 operates, it disconnects the ground potential at the contacts 2172 from the conductor 272LS extending to Fig. 2. It was previously pointed out that the ground potential applied to this conductor is extended by way of the wiper 257 of the director hunter 250 (Fig. 2) conductor 305LS, contacts 317 and 309, conductor C246 through the line finder 240 in order to retain the latter switch in its operated position and also by way of the wiper 236 and conductor C232 to retain the line circuit 205 in its operated position and then by way of the C conductor in the cable 204 to the bank contacts of the connectors having access to the particular calling party line to busy the same and prevent other calls from being extended thereto. As soon as the contacts 2173 are closed, the 90 volt positive potential booster battery is extended over the above traced circuits in order to retain the line finder 240 and the line circuit 205 in its operated position and to retain the busy marking conductor in the C conductor in the cable 204. Also, this positive 90 volt booster battery potential is extended over the "S" lead individual to the particular calling subscriber line to the detector 1900, schematically illustrated in block diagram form in Fig. 19.

The above mentioned positive 90 volt booster battery potential in addition to the negative 50 volt regular exchange battery potential giving a total differential of plus 140 volt D.C. causes the detector to identify the particular numerical portion of the director number of the calling subscriber line. The detailed operations of the detector to determine the directory number of the particular calling subscriber station on a party line or any other class of line is described in detail in the above mentioned copending Coleman patent, as well as in the above mentioned Ostline Patent No. 2,639,330, granted May 19, 1953. Actually, the detector 1900 is selectively controlled by the positive booster battery potential applied to the particular calling subscriber line and will transfer in code form the digital values of the thousands, hundreds, tens and units digits of the numerical portion of the calling subscriber directory number to the WXYZ2 to WXYZ5 registers schematically illustrated in Fig. 19. The digit corresponding to the numerical identification of the particular exchange in which the calling subscriber is terminated (the third digit of the calling exchange code) is prewired in the detector 1900 and is registered in the WXYZ1 register in Fig. 19. It should be understood that it is not necessary to identify the first two digits corresponding to the calling exchange name inasmuch as this information is prewired in the toll ticketing apparatus that is installed in the corresponding exchange.

When the detector 1900 has completed the identification of the numerical portion of the calling subscriber directory number, it applies ground potential to the conductor 1961EB extending to Fig. 20 to cause the operation of the detection complete relay R2060. Thus, an indication is given that the detection operation by the detector 1900 has been completed. In response to the operation of relay R2060, at its contacts 2068, it completes an obvious circuit including its upper winding whereby the relay is locked in its operated position to ground potential at the contacts 2011'.

At the contacts 2067, the relay R2060 interrupts the above mentioned circuit for the detector signal relay R2170 in order to restore the latter relay. Also, at its contacts 2065, the relay R2060 interrupts a point in the previously described circuit for the marginal detector test relay R2180 thereby to cause the restoration of the latter relay. At its contacts 2061, the relay R2060 interrupts a point in the previously described circuit including the conductor 513PM extending to Fig. 5 in order to remove the marking ground potential from the contacts of the operated party station relays in Fig. 18. At its contacts 2062, the relay R2060 removes ground potential from the conductor C2026TENS extending to Fig. 19 thereby to release the detector assigner 1910 so that it can now be utilized by the call recorder portion of any other director in the exchange. At the contacts 2063, the relay R2060 removes ground potential from the conductor 1963BR3 extending to Fig. 19 in order now to restore the director detector connect relay R1910 individual to the call recorder 2000 portion of the director. Restoration of the relay R1910 automatically disconnects all of the conductors in the call recorder 2000 from the corresponding conductors extending to the detector 1900. Finally, at its contacts 2064, the relay R2060 connects a circuit including the upper winding of the code send relay R2040 to the conductor 271T extending to Fig. 2.

Referring now to Fig. 2, it will be seen that the conductor 271T is further extended by way of the wiper 256, conductor 304T, contacts 315 and 324, wiper 364, conductor 2301T in the cable C2302 extending to the toll ticket repeater X2300 in the AB toll equipment of Fig. 22. The amove mentioned circuit is prepared at this time so that coded signals corresponding to the items of information stored in the call recorder 2000 and in other parts of the calling director may be transmitted by the call recorder 2000 to the ticket repeater X2300. Before describing these operations, however, it will first be necessary to note the controls exercised by the restoration of the detector signal relay R2170 and the detector test relay R2180.

Referring now to the detector signal relay R2170, it is apparent that as soon as it restores to normal, it interrupts the circuits including its contacts 2173 and 2174 in order to remove the positive 90 volt booster battery detection signal from the conductor 272LS and to reestablish the direct ground potential at the contacts 2172 on the conductor 272LS. As soon as the relay R2180 restores to normal it interrupts, at its contacts 2185, a further point in the previously described circuit including the conductor 1963BR3 extending to Fig. 19 and, at its contacts 2181, it interrupts a further point in the previously described circuit including the conductor 513PM extending to Fig. 5. The detection cycle whereby the detector 1900 is connected to the called recorder 2000, detects the identity of the calling subscriber directory number and registers the same in the call recorder 2000 is now completed and the detector 1900 rendered available for use by other call recorders.

Before leaving the description of operation of the detector 1900, it should be noted that the conductor 1962INC terminating in one of the contacts on the director detector connect relay R1910 is provided so that the detector 1900 can signal the call recorder 2000 whenever the detector fails to complete the detection of the calling subscriber directory number. This operation is described in detail in the above mentioned Coleman patent and it is also included in the description of the operation of the detector shown in the Ostline Patent No. 2,639,330. It should therefore be understood that upon the failure of the detector to detect the calling subscriber, it will apply ground potential to the conductor 1962INC extending to Fig. 21 in order to operate the detector failure relay R2160. As soon as the relay R2160 is operated in the manner described above or, for example, by a ground potential applied to the conductor 443MS3 by the timer 490 (Fig. 4) it immediately locks itself over a circuit including its contacts 2165 and ground potential at the contacts 2011'. It will be apparent from the foregoing description that if the relay R2160 is operated, as noted, the detection complete relay R2060 cannot possibly be operated. Consequently, the relay R2160 is provided with the contacts 2161 and 2162 which will perform the same controls as those previously described in conjunction with the contacts 2062 and 2065 on the relay R2060. Thus, the detection failure relay R2160 will control the detector 1900 to disconnect the call recorder 2000 from the detector assigner 1910. Also, at its contacts 2163, it opens a circuit including the conductor 443MS3 in order to prevent the timer 490 from controlling certain relays in the call recorder 2000. At its contacts 2164, the relay R2160 will apply the ground potential on the conductor 605CR29 to the conductor 1207DR extending to Fig. 16 thereby to operate the incomplete detection relay R1660 in the sender 1400. The operation of the latter relay as will be subsequently described causes the director to release whatever connection it has established through the primary selector 300 and, subsequent switches in the switch train, and to reestablish a new connection to an operator position under control of routing digits that are preregistered in the coder 1800. As a further result of the operation of the relay R2160, at its contacts 2166, it completes a circuit including the contacts 2113 for operating the no detection alarm relay R2110. The relay R2110 in turn locks itself by way of its X contacts 2111 to ground potential at the no detection reset key K2116. At its contacts 2119, the relay R2110 now completes an obvious circuit for illuminating the no detection alarm lamp L2117 thereby to indicate that a no detection condition has been encountered by the call recorder 2000.

Finally, at its contacts 2114, the relay R2110 completes a circuit including the resistor 2115 for dimly illuminating the lamp L2118 to indicate the fact that the call recorder 2000 is involved in a detection failure condition.

*Transfer of the items of information from the call recorder 2000 to the toll ticket repeater*

In the foregoing description of the operation of the director, it will be recalled that the call recorder 2000 was operated to cause the detection of the calling subscriber directory number as soon as a translation is made by the translator 2700 of the first three digits dialed by the calling subscriber. The various routing digits that have been determined by the selection of a particular translate relay in the translator 2700 have been registered in the route registers (Fig. 17) of the coder 1800 portion of the director. These route digits are then transmitted one at a time by the send sequence switch 1420 of the sender 1400. It should be apparent from the foregoing that the call recorder 2000 and the detector 1900 are functioning to identify the directory number of the calling subscriber line at substantially the same time that the send sequence switch 1420 of the sender 1400 is transmitting the first four digits including the routing digits registered in the coder 1800 and any additional digits that may be registered in the call register 900. It will also be appreciated that the calling subscriber may still be dialing some of the digits of the call subscriber directory number into the numerical registers of the call register 900 and the numerical registers of the call register 1200. In any event, when the call sender 1400 under control of the send sequence switch 1420 has completed the sending of the fourth digit, the wiper 1401 of the send sequence switch 1420 will engage the contact 5 in the associated contact bank (Fig. 14) and apply ground potential to a circuit including the contacts 1671 of the operated control relay R1670, conductor 1602BA extending to Fig. 20, upper winding of the code send relay R2040, contacts 2043, 2064 and 2016 to the conductor 271T in order to control the ticket repeater X2300 that has been included in the connection thus far established by the digits transmitted by the sender 1400.

As soon as the ticket repeater X2300 included in the connection is available to receive the items of information that have been stored in the director in conjunction with the present connection, a low resistance battery potential is returned over the above mentioned circuit to the conductor 271T thereby to complete an operating circuit for the upper winding of the code send relay R2040. Ground potential is retained on the conductor 1602BA as the wiper 1401 of the send sequence switch 1420 is advanced step-by-step over the contacts 5 to 20, inclusive, in the associated contact bank. In other words, all of the digits that can be possibly stored in the director in use will be transmitted before ground is removed from the conductor 1602BA.

The battery potential returned over the conductor 271T by the connected toll ticket repeater X2300 will operate the code send relay R2040, as noted above. As soon as the relay R2040 operates, it closes its X contacts 2042 before it interrupts its contacts 2043 in order to complete the operating circuit for the lower winding of the relay. This locking circuit includes the ground potential at the contacts 2011′ on the operated AB toll relay R2010. Operation of the relay R2040 over its lower winding will interrupt at the contacts 2043 its initial operating circuit. At the contacts 2041, the relay R2040 prepares a point in the incomplete circuit for controlling the pulse relay R2050.

Finally, at its contacts 2044, a circuit is completed for controlling the magnet M1957 of the code send switch 1950 to advance the wipers 1951 to 1955, inclusive, one step in a counter-clockwise direction from the normal home contact position into engagement with the contacts 1 in the associated contact banks. This circuit may be traced by way of battery to the winding of the magnet M1957, contacts 1958, 2044, 2035 and off-normal contacts 1959B. The magnet M1957 now operates and immediately opens its own circuit, at its contacts 1958, to restore to normal and advance its wipers one step in the counter-clockwise direction. As soon as the wipers 1951 to 1955, inclusive, have been advanced from the normal home contact position (contact 26 of the banks accessible respectively to the wipers 1951 and 1952) the off-normal contacts 1959B will be opened and the off-normal contacts 1959A will be closed. The latter contacts will now remain in the closed position until the wipers are again rotated into engagement with the home contact position in the associated contact banks. When this occurs, the off-normal contacts 1959B will again be closed and the contacts 1959A will be opened.

As soon as the off-normal contacts 1959A are closed, ground potential is extended by way of the contacts 2013′ and 2032 to complete the operating circuit for the pulse start relay R2030. The relay R2030 immediately locks itself by way of its contacts 2033 to ground potential at the contacts 2011′. It should be noted, however, that the operation of the relay R2030 completes a circuit at its contacts 2034 whereby the initial operating ground potential for the relay R2030 is further extended over a circuit including the contacts 2084 in order to operate the relay R2070. As long as the initial operating ground potential is retained on the circuit for the relay R2070, the locking circuit for the relay including the relay R2080 is temporarily short-circuited. Thus, the first wiper switching circuit R2080 can not immediately operate.

Referring again to the pulse start relay R2030, it will be noted that at its contacts 2035 it interrupts a further point in the initial operating circuit for the magnet M1957 and, at its contacts 2031, it completes a circuit for energizing the lower winding of the control relay R2150. This relay is also energized at this particular time over a circuit including its upper winding from ground at contacts 2019. The relay R2150 is differentially wound so that the upper and lower windings oppose one another and will operate or be retained in its operated position only when an energizing circuit is completed for one of its windings. At the present time, however, the energizing circuits simultaneously completed for both windings of the relay will oppose one another and, accordingly, cause the relay to restore its contacts 2151 and 2152 to the position illustrated in the drawings. The closing of the contacts 2151 by the restoration of the relay R2150 now completes a circuit for operating the self-interrupted pulse generating relay R2050. This circuit includes battery, lower winding of the relay, self-interrupting contacts 2051, contacts 2131, 2151 and 2041 to ground. The relay is also provided with an upper winding that is included in a circuit of an adjustable condenser to ground. This condenser is schematically illustrated and has sufficient capacity to cause the pulsing relay R2050 to operate and restore at approximately 13 to 15 pulses per second to provide a 65 to 75% pulse at the contacts 2052. The discharge condenser associated with the upper winding of the relay R2050 will govern the pulsing rate of the relay and it will be understood by those skilled in the art that if the capacity of the condenser is increased, the pulsing rate of the relay will be reduced and if the capacity of the condenser is decreased, it will increase the pulsing rate of the relay.

Each time the pulse relay R2050 operates, it closes its contacts 2053 in order to complete an obvious circuit for operating the magnet M1957 on the code send switch 1950. Each time the above mentioned relay restores to normal, the contacts 2053 will be opened in order to interrupt the circuit of the magnet M1957 whereupon the magnet will advance its wipers 1951 to 1955 an additional step in the counter-clockwise direction. Also, at the contacts 2052, the relay R2050 will connect resistance ground potential through the resistor 2142 or direct ground potential through the contacts 2141 to the conductor 271T extending to Fig. 2. It should be noted that the mark relay R2140 will close its contacts 2141 to apply the direct ground potential to the above mentioned conductor and simultaneously it short-circuits the resistor 2142. The operated or unoperated condition of the mark relay R2140 will be governed by the ground or absence of ground potential encountered by the wipers 1953, 1954 or 1955 as they successively become effective during rotation over the associated contact banks. Markings on the associated conductors will be governed in accordance with the particular item of information that is to be transmitted to the toll ticket repeater as the wipers of the code send switch 1955 are advanced over the associated contact banks. It should be noted that each time the contacts 2052 are opened, the ground or resistance ground potential will be removed from the conductor 271T.

When the wipers 1951 to 1955, inclusive, of the code send switch 1950 engage the contacts 1 in the associated contact banks, the mark relay R2140 will be operated if the corresponding contact in the bank accessible to the wiper 1953 is grounded. At this point, it will be noted that the WXYZ6, WXYZ7 and WXYZ8 code marking conductors terminate respectively in the contacts 1 to 12, inclusive, accessible to the wiper 1953. These conductors are also connected at the opposite ends to terminals provided on the terminal block TB1953 and will be jumpered to the ground terminal thereon in accordance with a three digit number identifying the particular call recorder 2000 that is now being used. In the previous description, it was pointed out that the director being used is the "01" director, for the purpose of describing the operations involving the translator assigner 2800. It will be assumed that this director is identified on the terminal block TB1953 as the "001" director, but it should be noted that the first 0 of the three digit number may be omitted, if desired. The above mentioned WXYZ6 to WXYZ8 code marking conductors will be marked in code form in accordance with the previously described WXYZ marking code. Thus, the first digit 0 will be marked on the WXYZ6 marking conductors by grounding only the conductor Z6. The second 0 will be marked on the WXYZ7 marking conductors by grounding only the conductor Z7 and the digit 1 will be marked on the WXYZ8 code marking conductors by grounding the conductors W8 and X8. Consequently, as the wiper 1953 is advanced step-by-step over the contacts 1 to 12, inclusive, it will operate the mark relay R2140 when the wiper 1953 engages the bank contact terminating the grounded W6, the grounded W7 and the grounded W8 and X8 code marking conductors. This will cause the contacts 2141 to transmit a direct ground pulse over the conductor 271T. In the other positions, the wiper 1953 will engage ungrounded contacts during the stepping action and will consequently transmit the ground potential through the resistor 2142 to the conductor 271T.

In view of the foregoing, it will be understood that upon each operation of the code pulse relay R2050, the magnet M1957 will be operated and restored to advance its wipers step-by-step and depending upon the operated or restored relay R2140, either a ground or a resistance ground pulse will be transmitted over the conductor 271T extending to Fig. 2. This conductor, as previously described, completes a circuit through the director hunter 250, the primary selector 300 by way of its wiper 364 and the conductor 2301T to the toll ticket repeater X2300 schematically illustrated in Fig. 22.

The above mentioned toll ticket repeater and associated switching apparatus including the toll ticket repeater selector X2700 and other record producing equipment schematically illustrated in Fig. 22 is shown and described in detail, for example, in the Ostline Patent No. 2,678,353. It may be well to mention, however, that as the relay R2050 pulses its contacts 2052 to transmit either the resistance ground or direct ground pulses over the conductor 271T to the connected toll ticket repeater X2300, a receiving switch in that repeater is stepped in unison with the code sequence switch 1950. Each direct ground pulse transmitted over the circuit to the toll ticket repeater X2300 will cause the registration circuits in the ticket repeater to register a corresponding indication on the associate code registers. On the other hand, each time the resistance ground potential through the resistor 2142 (1000 ohms) is transmitted, no registration will be made in associate code registers. In view of the foregoing, it will be appreciated that the WXYZ code markings on each of the different sets of code marking conductors accessible to the wipers of the code send switch 1950 will be transferred by means of the direct ground and resistance ground pulses to the associated toll ticketing repeater X2300 and registered therein.

The wiper 1953 of the code send switch 1950 will be advanced step-by-step over the associated contacts 1 to 25, inclusive, to transmit in code form the items of information registered on the associated WXYZ markings, as follows:

| Contact Position | Code Marking | Information Transmitted |
|---|---|---|
| 1 | W6 | Director Identity (Hundreds Digit). |
| 2 | X6 | |
| 3 | Y6 | |
| 4 | Z6 | |
| 5 | W7 | Director Identity (Tens Digit). |
| 6 | X7 | |
| 7 | Y7 | |
| 8 | Z7 | |
| 9 | W8 | Director Identity (Units Digit). |
| 10 | X8 | |
| 11 | Y8 | |
| 12 | Z8 | |
| 13 | ---------- | Not Used. |
| 14 | W21 | Called Number, First Digit (Called Office or National Toll Code). |
| 15 | X21 | |
| 16 | Y21 | |
| 17 | Z21 | |
| 18 | W22 | Called Number, Second Digit (Called Office or National Toll Code). |
| 19 | X22 | |
| 20 | Y22 | |
| 21 | Z22 | |
| 22 | W23 | Called Number, Third Digit (Called Office or National Toll Code). |
| 23 | X23 | |
| 24 | Y23 | |
| 25 | Z23 | |
| 26 | ---------- | Stepping Pulse. |

From the above mentioned table, it will be understood that the identity of the calling director as marked on the terminal block TB1953 will first be transmitted to the associated toll ticket repeater and, thereafter, the code markings on the WXYZ21, WXYZ22 and WXYZ23 conductors as marked thereon by the first, second and third digit registers 1020, 1030 and 1040 will be transmitted to the ticket repeater. As previously described, these three digits of the called number may either be the first three digits of a called office code or the first three digits of a national toll code.

After the wipers 1951 to 1955, inclusive, engage the contact 26 position in the associated contact banks, the off-normal contact 1959A will be open and the off-normal contact 1959B will be closed. When this occurs, the ground potential will be removed from the above described circuit including the contacts 1959A, 2013', 2034, 2084 and the winding of the relay R2070 in order to permit the above mentioned relay to lock itself over the circuit including the contacts 2071, winding of the first wiper switching relay R2080 and ground at contacts 2011'. In other words, the relay R2080 is permitted to operate in series with the relay R2070 as soon as the ground potential is removed at the contacts 1959A. The closing of the off-normal contacts 1959B performs no control at the present time.

Referring now to the relay R2080, it will be seen that at its contacts 2081 and 2082, it transfers the circuit for the mark relay R2140 from the wiper 1953 to the wiper 1954 of the code send switch 1950. The latter circuit may be traced from the winding of the relay R2140, contacts 2082 and 2134 to the wiper 1954. As a further result of the operation of the first wiper switching relay R2080, at its contacts 2084, it interrupts a point in the previously described initial operating circuit for the relay R2070 and, at its contacts 2083, it prepares a point in the circuit for operating the relay R2120 as soon as the off-normal contacts 1959A are again closed.

Inasmuch as the pulse relay R2050 continues to operate and restore in the cyclic manner previously described, it will control its contacts 2052 and 2053 to continue to transmit either direct ground or resistance ground pulses over the conductor 271T and to transmit pulses to control the operation and restoration of the magnet M1957. Consequently, during the time the wipers 1951 to 1955, inclusive, are rotating during the first stepping cycle, the wiper 1953 is effective to control the transmission of the direct ground or resistance ground pulses over the conductor 271T. However, as soon as the wipers reach the 26th contact position, the first wiper switching relay R2080 is operated so that the wiper 1954 will be effective during the second stepping cycle.

The next time the pulse relay R2050 restores and interrupts the circuit, at its contacts 2053, for the magnet M1957, the wipers 1951 to 1955, inclusive, will be advanced into engagement with the contacts 1 in the associated contact banks. As a result thereof, the off-normal contacts 1959A will again be closed to complete a circuit including the contacts 2013', 2034, 2083 and 2136 for operating the relay R2120. For this purpose, a point in the circuit, including the contacts 2121, is completed whereby the second wiper switching relay R2130 may be operated at the completion of the second stepping cycle of the code send switch 1950.

The wipers 1951 to 1955, inclusive, will now be advanced step-by-step over the contacts in the associated contact banks but only the wiper 1954 will be effective to control the mark relay R2140 in accordance with the code markings on the associated bank contacts. In this connection, it will be recalled that the WXYZ1 to WXYZ5 registers have been controlled respectively to register the third, fourth, fifth, sixth and seventh digits of the directory number of a calling subscriber line. The four relays (not shown) of each of the above noted registers are arranged to be operated in code form in the manner previously described and operated ones of the relays will be locked in their operated position to ground potential at the contact 2011'. Also, ground potential will be applied to the different WXYZ1 to WXYZ5 code marking conductors in accordance with the respective digits that have been registered.

In view of the foregoing, it will be understood that the various items of information stored in the registers WXYZ1 to WXYZ5 will be transmitted to the associated toll ticket repeater X2300 as the wiper 1954 advances over its associated contacts in the following manner:

| Contact Position | Code Marking | Information Transmitted |
|---|---|---|
| 1 | | Not Used. |
| 2 | | |
| 3 | | |
| 4 | | |
| 5 | W1 | Calling Station Directory No. (Third Office Code Digit). |
| 6 | X1 | |
| 7 | Y1 | |
| 8 | Z1 | |
| 9 | W2 | Calling Station Directory No. (Thousands Digit). |
| 10 | X2 | |
| 11 | Y2 | |
| 12 | Z2 | |
| 13 | W3 | Calling Station Directory No. (Hundreds Digit). |
| 14 | X3 | |
| 15 | Y3 | |
| 16 | Z3 | |
| 17 | W4 | Calling Station Directory No. (Tens Digit). |
| 18 | X4 | |
| 19 | Y4 | |
| 20 | Z4 | |
| 21 | W5 | Calling Station Directory No. (Units Digit). |
| 22 | X5 | |
| 23 | Y5 | |
| 24 | Z5 | |
| 25 | | Not Used. |
| 26 | | Not Used. |

In view of the foregoing table, it will be appreciated that during the second stepping cycle of the wipers of the code send switch 1950, the third digit of the calling office code and the four digits of the numerical portion of the directory number of the calling station will be transferred from the registers in the call recorder 2000 to corresponding registers provided in the associated toll ticket repeater X2300.

At the end of the second stepping cycle of the wipers 1951 to 1955, inclusive, the off-normal contacts 1959A on the code send switch 1950 will again be open. As a result thereof, the short-circuit around the second wiper switching relay R2130 will be removed therefrom so that a circuit is now completed from the winding of the relay R2120, contacts 2121, second wiper switching relay R2130 and ground at contacts 2011' so that the relay R2130 will operate in series with the relay R2120. At this time the relay R2130 disconnects the circuit of the mark relay R2140 from the wiper 1954, at its contacts 2134, and at its contacts 2135 the mark relay R2140 is connected to the wiper 1955 of the code send switch. Also, at its contacts 2133, the relay R2130 applies a controlled ground potential to the wiper 1952. At its contacts 2131 the relay R2130 disconnects the operating ground potential at the contacts 2041 from the pulse relay R2150 and, at its contacts 2132, it connects the pulse relay R2050 to a circuit including the wiper 1951. The latter circuit is arranged so that the pulse relay R2050 can not be self-interruptedly operated unless the wiper 1951 supplies the operating ground potential from conductors terminating in associated bank contacts. As a final result of the operation of relay R2130 it interrupts, at its contacts 2136, the initial energizing circuit for the relay R2120. However, the latter relay remains in its operated position in series with the relay R2130.

Since the wipers 1951 to 1955, inclusive, are in engagement with the contact 26 position in the associated contact banks, the wiper 1951 will not supply ground potential for reoperating the pulse relay R2050 unless the conductor 805SD is grounded. This conductor is multiply connected to the contacts 1 to 4 and 26 in the associated contact bank so that it will govern the pulsing of the relay R2050 as the wipers of the switch advance step-by-step over these contacts. During this particular cycle of operation of the code send switch 1950, only the wipers 1951, 1952 and 1955 will be effective.

Referring now to the controller 400 (Figs. 4 to 8, inclusive) it will be recalled that the first numerical send relay R820 is operated as soon as a digit is registered in the fourth digit register 1120. Also, the remaining numerical send relays R830, R840 and R850 are sequentially operated if each digit is registered respectively in the fifth, sixth and seventh digit registers 1120, 1130 and 1140. At the respective contacts 822, 833, 842 and 852, these relays will apply ground potential to the conductors 805SD, 806SE, 807SF and 808SG extending to Fig. 19 thereby to apply ground potential to predetermined contacts accessible to the wiper 1951 on the code send switch 1950. Thus if a digit has not been registered in the fourth register 1110, the pulse relay R2050 cannot continue to pulse. Consequently, the call recorder 2000 will withhold transmission of information in code form to the toll ticket repeater X2300 until a digit has been registered in the fourth digit register 1110. This withholding action to prevent operation of the pulse relay R2050 will also be effective for each of the remaining digits to be registered in the fifth, sixth and seventh digit registers 1120, 1130 and 1140.

In Fig. 19, it will be seen that as soon as the conductor 805SD is grounded in the manner noted above, the wiper 1951 in engagement with the contacts 26 will complete a circuit including the contacts 2132 and 2051 for again operating the pulse relay R2050. As a result of the foregoing, the wipers of the code send switch 1950 will be advanced into engagement with the contacts 1 in the associated contact banks in the same manner as has been described previously. As soon as these wipers leave the contacts 26 and engage the contact 1, the off-normal contacts 1959A are again closed but no circuit is completed at this time due to the fact that the last wiper switching relay R2130 in the previously described circuit chain has been operated. The circuit for continuing the operation of the pulse relay R2050 is controlled by the ground potential on the conductor 805SD as the wipers of the code send switch 1950 are stepped over the contacts 1 to 4, inclusive. It will be apparent from the above description that as the wipers engage the contacts 5 to 8, 9 to 12 and 13 to 16 during the stepping action of the code send switch 1950, the continuous operation of the pulse relay R2050 will be governed by the ground potential applied respectively to the conductors 806SE, 807SF and 808SG as previously described.

During the third rotary stepping cycle of the code send switch 1950, the wiper 1955 will cooperate with the WXYZ24, WXYZ25, WXYZ26 and WXYZ27 code marking conductors extending to the fourth, fifth, sixth and seventh digit registers 1110, 1120, 1130 and 1140 to transmit the digits registered therein in code form over the previously described circuit including the conductor 271T to the connected toll ticket repeater X2300.

In view of the foregoing, it will be understood that the various items of information stored in the fourth, fifth, sixth and seventh digit registers 1110, 1120, 1130 and 1140 will be transmitted to the associated toll ticket repeater X2300 as the wiper 1955 advances over its associated bank contacts in the following manner:

| Contact Position | Code Marking | Information Transmitted |
|---|---|---|
| 1 | W24 | Called Number Fourth Digit (First Called Office Code Digit or First Numerical Digit). |
| 2 | X24 | |
| 3 | Y24 | |
| 4 | Z24 | |
| 5 | W25 | Called Number Fifth Digit (Second Called Office Code Digit or Second Numerical Digit). |
| 6 | X25 | |
| 7 | Y25 | |
| 8 | Z25 | |
| 9 | W26 | Called Number Sixth Digit (Third Called Office Code Digit or Third Numerical Digit). |
| 10 | Y26 | |
| 11 | Y26 | |
| 12 | Z26 | |
| 13 | W27 | Called Number Seventh Digit (First Numerical or Fourth Numerical Digit). |
| 14 | X27 | |
| 15 | Y27 | |
| 16 | X27 | |
| 17 | | Sixth Digit Called Number, If Grounded, and Seventh Digit Number If Not Grounded. |
| 18 | | Not Used. |
| 19 | | |
| 20 | | |
| 21 | | |
| 22 | | |
| 23 | | |
| 24 | | |
| 25 | | |
| 26 | | |

In the subsequent description, it will be seen that the contacts 1 to 16, inclusive, are utilized during the third stepping cycle of the code send switch 1950 to transmit the items of information marked on the WXYZ24 to WXYZ27 code marking conductors by the registers 1110, 1120, 1130 and 1140 and that during a fourth stepping cycle of the code send switch 1950, the items of information marked in code form on the WXYZ28 to WXYZ31 code marking conductors by the eighth, ninth, tenth and eleventh digit registers 1310, 1320, 1330 and 1340 will be transmitted to the selected toll ticket repeater. This is controlled in the present system by applying the marking ground potential through the particular registers 1110 to 1140, inclusive, during the third stepping cycle of the code send switch 1950 and then subsequently applying the marking ground potentials to these conductors through the wipers of the registers 1310 to 1340, inclusive. Of course, if the national toll facilities are not required in an exchange, the digit register 1200 (Figs. 12 and 13) including the relays and separate registers therein need not be provided. In the latter case, the marking ground potential will be directly applied to the wipers of the registers 1120 to 1140.

Referring now to Fig. 11, it will be seen that the wipers 1114 and 1115 of the fourth digit register 1110 may be directly connected to ground potential, as noted above, by connecting the dotted strap A and disconnecting the strap B. The same facilities are provided for the wipers 1124—1125, 1134—1135 and 1144—1145 of the fifth, sixth and seventh digit registers 1120, 1130 and 1140. However, the present system is arranged so that ground potential will be applied to these wipers at selected times, first during the third stepping cycle of the code send switch 1950 and will be applied to the wipers of the different registers in the digit register 1200 during the fourth stepping cycle of the code send switch 1950. This is accomplished by means of the contacts on the relays R1230 and R1240 provided in the digit register 1200. Thus ground potential at the contacts 1233, 1243, 1235, 1245, 1237, 1247, 1239 and 1249 is connected to the conductors 1101CW4 to 1108BW7 in order to apply ground potential by way of the B straps to the different wipers of the registers 1110 to 1140, inclusive. Thus, the position of the wipers in these registers will extend the ground potential to the different code marking conductors WXYZ24 to WXYZ27 in the cable 1101 extending to Fig. 14 so that the wipers 1955 in stepping over the contacts in the associated contact banks will control the mark relay R2140 in the previously described manner. The digits registered in the fourth, fifth, sixth and seventh digit registers 1110 to 1140, inclusive, will be transmitted in code form to the toll ticket repeater X2300 and registered therein.

As soon as the wiper 1955 engages the contact 17, it will complete the operating circuit for the mark relay R2140 if the sixth pull relay R2020 has been operated to close its contacts 2024. As previously noted, the sixth pull relay R2020 is operated if the called subscriber is a six digit number but it will not be operated if the called subscriber number is a seven digit number or is a national toll code number.

In view of the foregoing, it will be understood that the mark relay will transmit a direct ground pulse over the conductor 271T if the call is a six digit number and it will transmit a resistance ground pulse if the call is a seven digit number. The indication as to the number of digits in the called number will consequently be registered in the connected toll ticket repeater X2300.

As noted above, the wiper 1955 in engagement with the contact 17 determines whether or not the six digit indication should be transmitted to the connected toll ticket repeater X2300. At this time, the wiper 1952 is also in engagement with the contact 17 and applies the ground potential at the contacts 2133 to the conductor 866CG2 extending to Fig. 8. In Fig. 8, this conductor is connected by way of the contacts 853 (if the fourth digit has been registered by the calling subscriber to operate relay R850) to the conductor 864CR9 extending to Fig. 14 to permit the sender 1400 to transmit the digit that is registered in the seventh digit register 1140. Thus, the wiper 1402 on the send sequence switch 1420 in the sender 1400, when engaging the contact 13 in the associated contact bank will only encounter a ground potential on the conductor 864CR9 if a digit has been registered in the seventh digit register 1140. The sender can now transmit the last digit of a seven digit called subscriber number.

In passing, it may be well to note at this time that the conductors 861CR6, 862CR7 and 863CR8 terminating in the contacts 10, 11 and 12 accessible to the wiper 1402 of the send sequence switch 1420 will be grounded to permit the sender 1400 to send the corresponding digit only in the event that the respective digits are registered in the call register 900. The sender 1400 will now control the send sequence switch 1420 to advance its wipers into engagement with the contacts 14 in the associated contact banks. Consequently, the wiper 1403 will apply ground potential to the conductor 1441Y extending to Fig. 16, then by way of the contacts 1661, conductor 1601CR31 extending to Fig. 20, contacts 2012 to contact 18 accessible to the wiper 1951 and in multiple therewith by way of the contacts 1923 to contacts 17 accessible to the wiper 1951. Inasmuch as the wiper 1951 is in engagement with the contacts 17 at this particular moment, the operating ground potential will again be extended to the pulse relay R2050. Thus, the pulse relay R2050 will control the magnet M1957 to advance the wipers of the code send switch 1950 into engagement with the contact 18. In this position, ground potential will again be encountered by the wiper 1951 to cause the pulse relay R2050 to advance the wipers an additional step into engagement with the contact 19.

The wiper 1952 in engagement with the contact 19 in the associated contact bank now extends the ground potential at the contacts 2133 to complete the operating circuit for national test relay R1930. The operations which now occur will depend on whether or not the call being handled by the director is a national toll call in which ten or eleven digits have been dialed by the calling subscriber.

As soon as the relay R1930 operates, as noted above, it closes its contacts 1934 in order to lock the relay R1930 in its operated position if ground potential is encountered by the conductor 1201LHL extending to Fig. 12. This conductor is only grounded in the event that a national toll code has been dialed by the calling subscriber. At the present moment, it will be assumed that no ground potential is applied to the conductor 1201LHL because no national toll code has been dialed. As a further result of the operation of relay R1930, at its contacts 1935, it completes an obvious operating circuit for the relay R1920 and, at its contacts 1932 and 1933 it disconnects the conductor 701CR22 which extends to the winding of the director release relay R680 (Fig. 6) from the contact 20 to the contact 18 accessible to the wiper 1952.

As soon as the relay R1920 operates it closes its contacts 1925 to extend the ground potential on the conductor 1601CR31 by way of a circuit including the contacts 2012 and 1925 to the contact 19 engaged by the wiper 1951, contacts 2132 and 2051 to the winding of the pulse relay R2050. This will control the pulse relay in order to advance the wipers of the code send switch 1950 an additional step into engagement with the contacts 20 in the associated contact banks. When this occurs, the wiper 1952 will disengage itself from the associated contact 19 and thus interrupt the circuit of the national test relay R1930. This relay will immediately restore to normal and open the circuit of the relay R1920 which also restores to normal. As a further result of the restoration of the relay R1930 it disconnects the conductor 701CR22 from the bank contact 18 accessible to the wiper 1952, at its contacts 1933 and, at its contacts 1932, it connects the conductor 701CR22 to the contact 20 accessible to the wiper 1952. This completes a circuit from ground at contacts 2133 by way of the wiper 1952, engaged contact 20, contacts 1932, conductor 701CR22 extending to Fig. 9, conductor 701CR22 extending to Fig. 7 and the winding of the director release relay R680 to battery. The latter relay now operates and, at its contacts 687, locks itself to a circuit including ground potential at contacts 649 on the operated seizure relay R640 in the controller 400 portion of the director. The operation of relay R680 will initiate the release of the director in the manner to be described hereinafter as a result of the dialing of a seven digit number by the calling subscriber.

It is convenient at this time to discuss the operation of the call recorder 2000 when it has been controlled by a selected translate relay to indicate that the call being handled is of the six digit variety instead of the seven called number. Under these conditions, the relay R2020 is in its operated position. Normally, the relay R2020, at the contacts 2022, applies ground potential to the conductor 865CG1 extending to Fig. 8. If a sixth digit of a subscriber number is then registered, the ground potential will be further extended by way of the contacts 843 on the operated third numerical send relay R840 and conductor 863CR8 extending to Fig. 14 to apply ground potential to the twelfth contact in the bank accessible to the wiper 1402 on the send sequence switch 1420. In other words, the sender 1400 will be controlled to continue the sending operation when it reaches a point in the transmission of digits corresponding to the third numerical digit. If this digit is registered, then the above mentioned circuit will be completed so that the sender 1400 can transmit the next digit. If, however, the sixth pull relay R2020 is operated indicating that the particular call in question is to a station having a six digit directory number, the contact 2023 will connect the conductor 865CG1 to the contacts 17 accessible to the wiper 1952 on the code send switch 1950.

At its contacts 2021, the contacts 13 to 16, inclusive, accessible to the wiper 1951, are connected by way of the contacts 1921, conductor 808SG and contacts 2021 to the skip SK26 conductor extending to Fig. 14. In Fig. 14, the skip SK26 conductor terminates in contacts 12 accessible to the wiper 1403 on the send sequence switch 1420. Finally, at the contacts 2024, the relay R2020 applies ground potential to the contacts 17 accessible to the wiper 1955 so that the code send switch 1950 during the third stepping cycle of operation will transmit the sixth digit indication to the connected toll ticket repeater X2300.

In the above description it was noted that the skip conductor SK26 terminated in contact 12 accessible to the wiper 1403 on the sender sequence switch 1420. This position is reached by the above noted switch when it is in a position to start impulse transmission corresponding to the sixth digit dialed by the calling subscriber which is registered in the sixth digit register 1130. Also, the call recorder 2000, by means of its code send switch 1950, will not be able to transmit the information corresponding to the sixth digit during its third stepping cycle unless ground potential is applied to the conductor 807SF.

If it is assumed that the subscriber has dialed the sixth digit and it has been registered in the sixth digit register 1130, the third numerical send relay R840 will be in its operated position. If it is also assumed that the send sequence switch 1420 has transmitted the information corresponding to the fifth digit, the wipers 1401 to 1407 of the switch will then advance into engagement with the contacts 12 in the associated contact bank. In other words, after the fifth digit has been sent by the director, the wiper 1403 of the send sequence switch 1420 will apply ground potential to the skip conductor SK26 extending to Fig. 19 and then by way of the contacts 2021 and 1921 to contacts 13 to 16, inclusive, accessible to the wiper 1951. Inasmuch as the third numerical send relay R840 is operated, it applies ground potential, at its contacts 842, to the conductor 807SF extending to Fig. 19. This will ground the contacts 9 to 12, inclusive, accessible to the wiper 1951 so that the pulse relay R2050 will be operated in the manner previously described. In other words, the grounding of the conductor 807SF will cause the pulse relay R2050 to advance the wipers of the code send switch 1950 over the contacts 9 to 12, inclusive, to transmit, in code form, the sixth digit marked on the WXYZ26 code marking conductors. Therefore, the call recorder 2000 will transmit the sixth digit of a called subscriber number to store the same in the toll ticket repeater X2300 before the sender 1400 is controlled to transmit switch controlling impulses to the switching apparatus in accordance with the sixth digit.

As soon as the wiper 1951 engages the contacts 13, it will encounter the grounded skip conductor SK26 which will now control the pulse relay R2050 as the wipers of the code send switch are advanced over the contacts 13 to 16, inclusive. Since it is assumed that no seventh digit has been dialed by the calling subscriber, the wiper 1955 of the code send switch 1950 will not encounter any marking potentials on the WXYZ27 code marking conductors. This fact will be indicated to the connected toll ticket repeater X2300 by the transmission of resistance ground pulses over the conductor 271T.

When the wiper 1952 engages the contacts 17, ground at contacts 2033 is extended by way of the contacts 2023, conductor 865CG1 extending to Fig. 8, contacts 843 on the operated third numerical send relay R840, conductor 863CR8 extending to Fig. 14 where it terminates in the contacts 12 accessible to the wiper 1402 on the send sequence switch 1420. At this time, the wiper 1402 is in engagement with the above mentioned contact so that the sender 1400 is controlled to now transmit the sixth digit registered in the sixth digit register 1130 in the manner previously described.

As soon as the sender 1400 has transmitted the sixth digit, it will immediately advance the wipers of the send sequence switch 1420 an additional step into engagement with the contacts 13 in the associated contact banks thereby to attempt in a normal manner to transmit a seventh digit registered in the seventh digit register 1140. However, since the present call is assumed to be a sixth digit instead of a seven digit call, the control relay R1860TC in the coder 1800 portion of the director is operated. Therefore, when the wiper 1403 of the send sequence switch 1420 engages contact 13, ground potential is applied by way of the skip conductor SK27 extending to Fig. 18, contacts 2 on the operated control relay R1860TC, conductor 1203SKC extending to Fig. 16 to operate the skip relay R1680. This relay, as previously described, will automatically control the magnet M1421 so that the send sequence switch 1420 will advance its wipers an additional step into engagement with the contacts 14. In this position, the wiper 1402 applies ground potential by way of the conductor 1441Y extending to Fig. 16, contacts 1661, conductor 1601CR31 extending to Fig. 20, contacts 2012 and 1923, contacts 17 engaged by the wiper 1951, contacts 2132 and 2051 and the winding of the pulse relay R2050 to battery. The pulse relay R2050 will now advance the wipers of the code send switch 1950 an additional step into engagement with the contacts 18 and in doing so will have transmitted the sixth digit called number indication over the conductor 271T to the connected toll ticket repeater X2300.

As soon as the wiper 1951 engages the contact 18, it again encounters the grounded conductor 1601CR31 to cause the pulse relay R2050 to control the code send switch 1950 to advance its wipers into an additional step into engagement with the contacts 19. At this time, the wiper 1952 completes the operating circuit for the national test relay R1930. The latter relay performs the same functions, as previously described, inasmuch as the subcriber has not dialed a national toll code whereupon the relay R1920 will operate and connect the grounded conductor 1601CR31 by way of the contacts 1925 to the bank contact 19 engaged by the wiper 1951. This will cause the wipers of the code send switch 1950 to advance an additional step into engagement with the contacts 20 to restore both the relays R1930 and R1920 in the order named and to extend the ground potential on the wiper 1952 by way of the contacts 1932 and conductor 701CR22 extending to Figs. 9 and 7. This will cause the operation of the director release relay R680, as previously described.

From the foregoing description, it will be apparent that when a sixth digit instead of a seventh digit directory number is dialed by a calling subcriber, the call recorder 2000 will transfer the items of information in code form to the connected toll ticket repeater X2300 in the same manner as has been previously described. The principal difference in operation occurs, however, when the sender 1400 and its associated send sequence switch 1420 are in a position to start the transmission of the fifth dialed digit. Also, the fact that a six digit number has been dialed is recorded in the call recorder 2000 by the operated condition of the six pull relay R2020. This will alter the control of the code send switch 1950 so that it will complete the transmission of all six digits dialed by the called subscriber, it will then skip the seventh register which would normally register a seventh dialed digit and it then transmits an indication to the connected toll ticket repeater X2300 to indicate that the particular call in question is to a subscriber having a six digit number instead of a seven digit number. Thereafter, the call recorder 2000 will control the national test relays R1930 and R1920, in the order named, to make the usual test to see whether or not a national toll code has been dialed. Obviously, in the case of a six digit called subscriber number no national toll code will be dialed, but nevertheless these relays R1930 and R1920 must perform their operating cycle to control the advancement of the wipers of the code send switch 1950 to the twentieth bank contact accessible to the wiper 1952 and thereby send the necessary signal to the controller 400 portion of the director to cause it to release in a normal manner.

In the above discussion of the operation of the call recorder 2000, a description was first given of its operation when a seven digit number was dialed and registered in the call register 900 and an additional description was given regarding its operation as the result of dialing and registration of a six digit number in the call register 900. The operation of the call recorder 2000 when a national toll call is registered, will now be described. All of the operations of the call recorder 2000 and the code send switch 1950 are exactly the same as has been previously described in that the wiper 1953 will be effective during the first stepping cycle, the wiper 1954 will be effective during the second stepping cycle and the wiper 1955 will be effective during the third stepping cycle of the code send switch 1950. All other operations are the same as though a seven digit number has been dialed.

When the wipers of the send switch during the third stepping cycle engage the contact 17 in the associated contact banks, the ground potential at the contacts 2133 will be extended by way of the wiper 1952, conductor 866CG2 extending to Fig. 8, contacts 853 on the operated fourth numerical send relay R850, conductor 864CR9 extending to Fig. 14 and terminating in the contact 13 accessible to the wiper 1402. The send sequence switch 1420 in this position will cause the sender 1400 to transmit the seventh digit registered in the register 1140 in the usual manner described hereinbefore whereupon the wipers 1401 to 1407, inclusive, will then be stepped into engagement with the contacts 14. In position 14, the wiper 1402 of the send sequence switch 1420 will not encounter ground potential on the conductor 1442CG3 until the latter conductor is subsequently grounded by the wiper 1952 on the code send switch 1950. Accordingly, the sender 1400 is now prevented from transmitting any of the digits registered in the registers 1310 to 1340, inclusive (Fig. 13) of the digit register 1200. This delay in the sending operation of the sender 1400 to transmit the last four possible digits of a national toll call is retained until after the call recorder 2000 has transmitted these digits to the connected toll ticket repeater X2300 for recording purposes.

The wiper 1403 of the send sequence switch 1420 in engagement with the contacts 14 extends ground potential by way of the conductor 1441Y, contacts 1661, conductor 1601CR31 extending to Fig. 20, contacts 2012 on the operated AB toll relay R2010, contacts 1923, bank contacts 17 engaged by wiper 1951 in order to complete the previously described circuit for operating the pulse relay R2050. The relay R2050 in turn will cause the code send switch 1950 to advance its wipers into engagement with the contacts 18 in the manner previously described. In this position, the wiper 1951 will again encounter the ground potential, conductor 1601CR31 and will, accordingly, reoperate the pulse relay R2050 so that the wipers of the code send switch 1950 will automatically advance into engagement with the contacts 19.

As soon as the wiper 1952 engages contact 19, the previously described circuit is completed for operating the national test relay R1930. In the present example, it is assumed that the national toll code has been dialed by the calling subscriber and, consequently, the relay R1930 upon operating will lock itself over a circuit including its contacts 1934, conductor 1201LHL extending to Fig. 12 to ground at contacts 1226. As a further result of the operation of relay R1930, at its contacts 1932, it disconnects the director release control conductor 701CR22 from the contacts 20 accessible to the wiper 1952. Also, at its contacts 1935, an obvious circuit is completed for operating the relay R1920. At the contacts 1926, the relay R1920 applies ground potential to the conductor 1205LHC extending to Fig. 12 and then by way of the contacts 1228 and the windings of the relay R1230 and R1240 in series to battery. These relays now operate to disconnect ground potential from the various conductors 1101CW4 to 1108BW7 extending to the wipers of the registers 1110 to 1140, inclusive, in the call register 900. The digits registered on these registers have both been transmitted by the sender 1400 portion of the director to a next switching point that has been established through the operation of the automatic switching apparatus provided in the present exchange and these digits have also been transmitted by the code send switch 1950 to the toll ticket repeater X2300 included in the connection and stored therein for recording purposes. The relays R1230 and R1240 also apply ground potential to the various wipers of the eighth, ninth, tenth and eleventh digit registers 1310 to 1340, inclusive.

Referring now to the digit register 1200 (Figs. 12 and 13) it will be noted that at the contacts 1232 and 1242, the relays R1230 and R1240 will apply ground potential to the wipers 1314 and 1315 of the eighth digit register 1310. These wipers will be positioned in accordance with the digit dialed into the eighth digit register 1310 so that the marking conductors WXYZ28 will be marked in code form in accordance with the registered digit. The remaining contacts 1234, 1236, 1238, 1244, 1246 and 1248 on the relays R1230 and R1240 apply ground potential to the corresponding wipers of the ninth, tenth and eleventh digit registers 1320, 1330 and 1340 so that the associated marking conductors WXYZ29, WXYZ30 and WXYZ31 are also marked in code form in accordance with the respective digits registered in these registers. The WXYZ28 to WXYZ31 code marking conductors extend to Fig. 14 where they terminate respectively in the contacts 14 to 17, inclusive, accessible to the wipers 1404 to 1407, inclusive, on the send sequence switch 1420. Thus, the digits registered in the digit register 1200 are now marked in code form in the bank contacts accessible to the wiper of the send sequence switch 1420.

The above mentioned WXYZ28 to WXYZ31 code marking conductors are also multiply connected to the bank contacts accessible to the wiper 1955 on the code send switch 1950. Thus, the code marking conductors WXYZ24 to WXYZ27, inclusive, and WXYZ28 to WXYZ31, inclusive, terminate respectively on the same bank contacts 1 to 16, inclusive, accessible to the wiper 1955 on the code send switch 1950. As pointed out previously, however, only one set of the above mentioned conductors will be effective at any particular time.

As a further result of the operation of relay R1920, at its contacts 1925, it connects the circuit including the grounded conductor 1601CR31 by way of the contacts 1925, bank contact 19 engaged by the wiper 1951 in order again to control the pulse relay R2050. As a result thereof, the wipers of the code send switch 1950 are advanced from engagement with the contacts 19 into engagement with the contacts 20.

In the previous description it was noted that when a call was not a national toll call, the wiper 1952, in leaving the contact 19, interrupted the circuit of the relay R1930. This relay restored to normal so that when the wiper 1952 engaged the contact 20, ground potential was extended by way of the contacts 1932 to the director release conductor 701CR22. However, on a national toll call the relay R1930 remains in its operated position over the previously traced locking circuit, including the conductor 1201LHL, after the wiper 1952 leaves the contact 19. Consequently, bank contact 20 is ineffective when the wiper 1952 is in engagement therewith. The wipers 1951 to 1955, inclusive, of the code send switch 1950 will remain in engagement with the contacts 20 until ground potential is applied to the conductor 1206LHS multiply connected to the bank contacts 20 to 25, inclusive, accessible to the wiper 1951.

In order to understand the operation whereby ground potential is applied to the conductor 1206LHS by the digit register 1200, it will be recalled that the receive sequence switch 1010 in engagement with the contacts 8, 9, 10 and 11, will successively transmit the dialed impulses to the magnets of the eighth, ninth, tenth and eleventh digit registers 1310, 1320, 1330 and 1340 over the respective conductors 1062 to 1065, inclusive. Under certain conditions only ten instead of eleven digits may be dialed by the calling subscriber because the called subscriber directory number on the national toll code includes the three digits identifying the national code zone, followed by the called office code comprising two letters and a digit and then followed by the four numerical digits of the subscriber line number in the particular called exchange. This makes a total of ten instead of eleven digits.

In some exchange, however, still in use, the eleventh or fifth numerical digit of a called subscriber directory number must be utilized to determine the particular ringing signal that is to be utilized to signal the particular called subscriber substation. Accordingly, it will be understood that when the wipers 1013 to 1017, inclusive, of the receive sequence switch 1010 are in engagement with the contacts 10 in the associated contact banks, the tenth dialed digit will be transmitted to the tenth digit register 1320 by way of the wiper 1014. As soon as this transmission is completed, the wipers of the receive sequence switch 1010 will be advanced into engagement with the contact 11 so that the eleventh dialed digit may be received and registered in the eleventh digit register 1340. At the same time, ground potential on the conductor 871LGR connected to the wiper 1015 is now extended over the conductor 1071LHE to Fig. 12 and then by way of the contacts 1227 in order to operate the relay R1250 in the digit register 1200. This relay will operate and immediately lock itself by way of its contacts 1252 to the conductor 605CR29 which is grounded at the contacts 642' on the seizure relay R640 (Fig. 6). Also, at the contacts 1251, the relay R1250 connects the grounded conductor 605CR29 to the conductor 1204SAL in multiple with the contacts 1212. The multiple circuits are provided to apply ground potential on the conductor 1204SAL extending to Fig. 18 in order to retain the operated ones of the particular party station relays R1870, etc., in their operated positions. If the eleventh digit is dialed and, consequently, registered in the eleventh digit register 1340, the wipers of the receive sequence switch 1010 will be advanced from engagement with the contacts 11 into engagement with the contact 1.

In position 1, the wiper 1017 of the receive sequence switch 1010 will again complete a circuit including the wipers 1037 and 1028 (a national toll code having been previously registered), conductor 1069LHA extending to Fig. 12 in order again to operate the long haul relay R1210. This relay, at its contacts 1211, will now open the circuit including the conductors 1202SK and 1203SKC so that the sender will not automatically skip the transmission of the eleventh digit registered in the eleventh digit register 1340. If the relay R1210 is not operated to indicate the fact that the send sequence switch 1010 has not received the impulses corresponding to the eleventh digit of a number, the sender 1400 will automatically skip the eleventh digit register 1340.

As soon as the relay R1250 in the digit register 1200 operates, it also completes, at its contacts 1253, a circuit including the contacts 1241 and 1231 for applying ground potential by way of the conductor 1206LHS extending to Fig. 19 to the contacts 20 to 25, inclusive, accessible to the wiper 1951 on the code send switch 1950. Ground potential on this conductor will automatically control the pulse relay R2050 in the manner previously explained so that the magnet M1957 will automatically advance its wipers step-by-step over the contacts 20 to 25, inclusive, and into engagement with the contacts 26 without performing any additional controls in the call recorder 2000. However, as soon as the wiper 1951 engages the contact 26, it will also encounter ground potential that has been previously applied to the conductor 805SD and control the pulse relay R2050 in the usual manner. Now the wipers of the code send switch 1950 will automatically advance into engagement with the contacts 1. It should be noted that the off-normal contacts 1959A and 1959B will open and close in the manner previously explained but at this stage in the cyclic stepping of the wipers of the code send switch 1950, they perform no controls. The code send switch 1950 is now in condition to start the fourth stepping cycle of its operation thereby to transmit impulses in code form corresponding to the digits that have been marked on the WXYZ28 to WXYZ31 code marking conductors by the eighth, ninth, tenth and eleventh digit registers 1310 to 1340, inclusive.

The ground potential for controlling the pulsing action of the pulse relay R2050 so that the wipers of the code send switch 1950 are advanced step-by-step over the contacts 1 to 16, inclusive, is controlled from the corresponding contacts accessible to the wiper 1951. Thus, the conductors 805SD, 806SE and 807SF which were previously grounded by operation of the relays R820, R830 and R840 in the controller 400 portion of the director will maintain the pulsing relay R2050 operated as the wiper 1951 is advanced over the contacts 1 to 12, inclusive. As soon as the wiper 1951 engages the contacts 13, 14, 15 and 16, the circuit for controlling the relay R2050 is again completed if the conductor SK26 is grounded by the wiper 1403 on the send sequence switch 1420 (Fig. 14). At the present time, the wipers 1401 to 1407, inclusive, of the send sequence switch 1420 are in engagement with the contacts 14 to delay the sending by the sender 1400 of switch controlling impulses corresponding to the digits registered in the eighth, ninth, tenth and eleventh digit registers 1310 to 1340, inclusive. Therefore, at the present moment the conductor SK26 is not grounded. As a further result of the wipers of the send sequence switch 1950 engaging the contacts 13, the wiper 1952 thereof will apply ground potential at the contacts 2133 to a circuit including the contacts 1931 and the conductor 1442CG3 extending to Fig. 14. In Fig. 14 the conductor 1442CG3 terminates in the bank contacts 14 to 17, inclusive, accessible to the wiper 1402. Since the wiper 1402 is in engagement with the contacts 14, the pulsing controls of the sender 1400 is reinitiated so that it will transmit in numerical form the pulses corresponding to the digit registered in the eighth digit register 1310 and marked in code form on the WXYZ28 code marking conductors accessible to the wipers 1404 to 1407, inclusive.

As soon as the impulses corresponding to the digit registered in the eighth digit register 1310 have been sent by the sender 1400 over the selected switching paths to the next switching center, the wipers 1401 to 1407, inclusive, of the send sequence switch 1420 will be automatically controlled to advance an additional step into engagement with the contacts 15. Ground potential is still retained on the conductor 1442CG3 so that the sender 1400 will transmit switch controlling impulses in accordance with the ninth digit registered in the digit register 1320 and marked in code form on the WXYZ29 code marking conductors terminating in the contacts 15 accessible to the wipers 1404 to 1407, inclusive. When this digit is transmitted, the send sequence switch 1420 will again be controlled to advance its wipers into engagement with the contacts 16 in the associated contact banks. In this position, the sender 1400 will now transmit numerical impulses in the manner previously explained corresponding to the digit that is registered in the tenth digit register 1330 and marked in code form on the WXYZ30 code marking conductors terminating in the contacts 16 accessible to the wipers 1404 to 1407, inclusive.

As soon as the foregoing operation is performed by the sender 1400, the send sequence switch is again controlled to advance its wipers an additional step into engagement with the contacts 17 in the associated contact banks. At this time a test is made to determine whether or not the conductors WXYZ31 individual to the eleventh digit register 1340 must be skipped because no digit has been registered in this particular register or whether or not the digit is registered therein and must be transmitted. For this purpose the wiper 1403 in engaging the contact 17 in the associated contact bank applies ground potential to the conductor 1202SK extending to Fig. 12 to the contacts 1211 in the digit register 1200.

As previously pointed out, the long haul relay R1210 will be operated if a digit has been transmitted to and registered in the eleventh digit register 1340 but this relay will be in its restored position if the eleventh digit has not been dialed by the called subscriber. In the latter case, the ground potential on the conductor 1202SK is further extended by the contacts 1211, conductor 1203SKC extending to Fig. 16 in order to operate the skip relay R1680 in the sender 1400. This relay, as previously noted, at its contacts 1681 will interrupt the circuit including the wiper 1402 so that the ground potential applied to the conductor 1442CG3 can not cause the sender 1400 to start an additional impulsing cycle. Also, the ground potential applied to the conductor 1203SKC will be extended by way of the contacts 1682 and 1422 to operate and restore the magnet M1421 whereby the wipers of the send sequence switch 1420 will advance an additional step into engagement with the contacts 18 in the associated contact banks. The advancement of the wiper 1403 from contact 17 will remove ground potential from the conductor 1202SK and thereby cause the restoration of the skip relay R1680. As a result of the advancement of the wiper 1403 into engagement with the contacts 18, the ground potential is now applied to the skip conductor SK26 extending to Fig. 19, then by way of the contacts 1922 to the bank contacts 13 to 16, inclusive, accessible to the wiper 1951 on the code send switch 1950. This conditions the call recorder 2000 so that it can advance the wipers of the code send switch 1950 over the contacts 13 to 16, inclusive, in the manner previously described.

As the wiper 1955 passes over the contacts 13 to 16, inclusive, code markings on the WXYZ31 code marking conductors will be extended to the mark relay R2140 in the usual manner. Thus, the contacts 2141 in conjunction with the contacts 2052 on the pulse relay R2050 will transmit direct ground or resistance ground pulses over the conductor 271T in the manner previously described. In other words, the eleventh digit registered in the eleventh digit register 1340 and marked on the code marking conductors WXYZ31 will be transferred to the connected toll ticket repeater X2300 and stored therein for recording purposes.

After the wipers 1951 to 1955, inclusive, of the code send switch 1950 are advanced step-by-step over the contacts 13 to 16, inclusive, during the fourth stepping cycle, the wipers will then engage the contacts 17 in the associated contact banks. In this position, the wiper 1952 will again apply ground potential to the conductors 865CG1 and 866CG2 extending to Fig. 8 in the same manner that occurred during the third stepping cycle. At the present time, this control performs no function in the send sequence switch 1420 associated with the sender 1400. When the wiper 1951 engages the contacts 17 during the fourth stepping cycle, the ground potential applied to the skip conductor SK26 by way of the contacts 1924 will control the pulse relay R2050 so that the code send switch 1950 will advance its wipers into engagement with the contacts 18.

When the wiper 1952 of the code send switch 1950 engages the contacts 18, ground potential at the contacts 2133 is extended by way of the contacts 1933, conductor 701CR22 extending to Fig. 9 and to Fig. 7 in order to operate the director release relay R680 in the controller 400 portion of the director. This will initiate the release of the director in the manner to be described hereinafter. At the same time that the above mentioned circuit is completed by way of the wiper 1952 in engagement with the contact 18, the wiper 1951 also engages its associated contact 18. However, ground potential will not be encountered by the wiper 1951 to control the pulse relay R2050. Accordingly, the wipers are brought to rest in engagement with the contact 18. In this connection, it should be noted that the contacts 1923 on the relay R1920 are open, the contacts 1925 are closed but this has no effect on the application of ground potential to the contacts 18 accessible to the wiper 1951. Another circuit including the contacts 2012 and conductor 1601CR31 is also connected to the contact 18 accessible to the wiper 1951 but this conductor is not grounded at this time because the wiper 1403 of the send sequence switch 1420 is at the present time standing in engagement with the contact 18 in the associated contact banks. Until the director release relay R680 is operated and the seizure relay R640 is restored in the controller 400 portion of the director, the above named wipers or both the code send switch 1950 and the send sequence switch 1420 will remain in engagement with the contacts 18 in the associated contact banks.

In view of the foregoing description of the operation of the call recorder 2000, it will be understood that during the third stepping cycle of the wipers of the code send switch 1950 a test is made through the wipers 1951 and 1952 to ascertain whether or not the digit register 1200 has been employed to handle a national toll call involving ten or eleven digits. If it is determined that ten or eleven digits of a national toll code has been dialed by the calling subscriber, the code send switch 1950 is controlled as described above to advance its wipers through a fourth stepping cycle.

In view of the foregoing, it will be understood that during the fourth stepping cycle of the code send switch 1950, the various items of information stored in the eighth, ninth, tenth and eleventh digit registers 1310, 1320, 1330 and 1340 will be transmitted to the associated toll ticketing repeater X2300 as the wiper 1955 advances over its associated bank contacts in the following manner:

| Contact Position | Code Marking | Information Transmitted |
|---|---|---|
| 1 | W28 | Called Number Eighth Digit (Second Numerical). |
| 2 | X28 | |
| 3 | Y28 | |
| 4 | Z28 | |
| 5 | W29 | Called Number Ninth Digit (Third Numerical). |
| 6 | X29 | |
| 7 | Y29 | |
| 8 | Z29 | |
| 9 | W30 | Called Number Tenth Digit (Fourth Numerical). |
| 10 | X30 | |
| 11 | Y30 | |
| 12 | Z30 | |
| 13 | W31 | Called Number Eleventh Digit (Fifth Numerical, If Used). |
| 14 | X31 | |
| 15 | Y31 | |
| 16 | Z31 | |
| 17 to 26 | ---------- | Not Used. |

It may be well to mention at this time that when the relay R680 in the controller 400 portion is operated in the manner described above, it will ultimately cause the seizure relay R640 to restore and thereby remove the holding ground potential from the conductor 605CR29 extending to the call recorder 2000. As a result thereof, the AB toll relay R2010 restores to normal and interrupts holding circuits for all other relays in the call recorder 2000 so that such relays will now release. The releasing circuit for the code send switch 1950 may be traced from the winding of the magnet M1957, self-interrupting contacts 1958, contacts 2014' (closed when the relay R2010 restores to normal incident to the release of the call recorder 2000) and ground at the off-normal contacts 1959A. Thus, the self-interrupting circuit for the magnet M1957 is completed thereby the magnet intermittently operates and restores to advance its wipers 1951 to 1955, inclusive, step-by-step until the bank contact position 26 is reached. When this occurs, the off-normal contacts 1959A are opened to terminate further stepping of the wipers 1951 to 1955, inclusive, in engagement with the contacts 26 in the associated contact banks. The code send switch 1950 of the call recorder 2000 is now in the original starting position so that it can be used in a subsequent call involving the associated director.

*Incomplete detection*

In the previous description of the operation of the call recorder 2000 in conjunction with the operation of the detector 1900, it was noted that if the detector 1900 failed for some reason or other to complete the detection of the calling subscriber line, it applied ground potential to the conductor 1962INC extending to Fig. 21 in order to operate the detection failure relay R2160. This relay, at its contacts 2164, completed a circuit including the conductor 1207DR extending to Fig. 16 to operate the incomplete detection relay R1660 in the sender 1400 portion of the director. This relay is operated at this time to cause the particular connection that has thus far been established by the impulses transmitted by the sender 1400 portion of the director to be released and to control the sender to transmit new impulses in accordance with digits preregistered in the coder 1800 portion of the director so that the particular call is now routed to an operator position.

Referring now to the sender 1400 (Figs. 14 to 16) it will be seen that as soon as the relay R1660 operates, at its contacts 1664, it interrupts the circuit for the control relay R1670 which slowly restores to normal. Also, at its contacts 1665, it connects the bank contacts 1 to 4, inclusive, accessible to the wiper 1401 of the send sequence switch 1420 to the circuit including the winding of the skip relay R1680. At its contacts 1666 and 1667, ground potential is applied to the conductor 1603GC extending to Fig. 18 in order to operate the control relay R1840 in the coder 1800. Also, at the contacts 1668, the relay R1660 applies ground potential to the conductor 1604GB extending to Fig. 18 in order to complete the operating circuits for the relays R1810 and R1830 in the coder 1800 portion of the director. At its contacts 1663, the relay R1660 disconnects the circuit including the conductor 870TG from the circuit from the winding of the auxiliary start relay R1530 and, at its contacts 1662, it connects the circuit for the winding of the auxiliary start relay R1530 to the contacts 21 to 25, inclusive, accessible to the wiper 1401 on the send sequence switch 1420. At its contacts 1661, the relay R1660 interrupts a point in the circuit including the conductor 1601CR31 in order to prevent a premature release of the director.

After a short delay, the control relay R1670 restores to normal and, at its contacts 1672, connects the bank contacts 5 to 20, inclusive, accessible to the wiper 1401 of the send sequence 1420 to the circuit including the winding of the skip relay R1680. Finally, at its contacts 1674, the relay R1670 applies the ground potential at the contacts 1667 to the conductor 1072TZ extending to Fig. 18. in order to operate the 0 operator relay R1850.

The operation of the incomplete detection relay R1660 followed by the restoration of the control relay R1670 and the operation of the skip relay R1680 functions to control the send sequence switch 1420 so that it will skip over any and all contacts 1 to 20 in the associated contact banks without controlling the sender 1400 to send digits that have been registered on the code marking conductors on the corresponding bank contacts. In this connection, it will be recalled that during the operation of the director, the registration of a three digit called office code (or national toll code) in the call register 900 caused the selection of a particular translate relay in the translator 2700. This translate relay in turn was prewired so that it registered a translation which comprises the routing digits necessary to route the call in the route registers WXYZ11 to WXYZ16, inclusive, associated with the coder 1800. These digits are automatically transmitted by the sender 1400 as the send sequence switch 1420 advanced step-by-step over the contacts 1 to 6, inclusive. The number of routing digits, of course, is determined by the particular trunking layout and the number of digits that must be transmitted to control the various switches in establishing or routing the connection. After all of the routing digits have been transmitted, the sender 1400, in conjunction with the send sequence switch 1420, starts to transmit certain of the digits that have been registered in the call registers 900 and 1200.

During the period of time that the sender is performing the above sending operation, the detector 1900 is automatically controlled to search for and register the directory number of the calling subscriber line in appropriate registers in the call recorder 2000 portion of the director. If the calling subscriber directory number is not found, a detection failure signal is transmitted to the call recorder 2000 and to the sender 1400 in the manner described above. This signal can occur any time during the operation of the sender to transmit impulses corresponding to the routing digits and other switch controlling digits. During the setting-up of the connection under control of the sender 1400 a toll ticket repeater, such as X2300, is included in the connection. The sender, in addition to transmitting the switch controlling impulses, also starts to transmit impulses corresponding to the items of information that are temporarily stored in the director. The directory number of the calling subscriber line is normally included as part of the information to be transmitted to the toll ticket repeater X2300 but it is assumed that this information has not been found by the detector 1900. Under this condition, it is contemplated that the director will be controlled so that it will release whatever connection it has partially established and then automatically set-up a new connection in accordance with a new series of routing digits registered in the route registers WXYZ11 to WXYZ16, inclusive. The sender will send the impulses of the new routing digits so that the call under discussion is automatically routed to an operating position for completion instead of to the desired called destination. The operator will then ascertain the directory numbers of both the calling and called subscribers so that an appropriate charge may be made for the connection established by the operator.

In order to accomplish the foregoing, the sender 1400 in response to the operation of the relay R1660, the restoration of the relay R1670 and the operation of the skip relay R1680 will control the circuit to the magnet M1421 so that it will automatically advance its wipers 1401 to 1407, inclusive, from whatever bank contact it is in engagement with at the time the incomplete detection is encountered to the contacts 21. In other words, if the wiper 1401 of the send sequence switch 1420 is in engagement with any one of the contacts 1 to 4 at the time an incomplete detection is encountered, the ground potential will be extended over the circuit including the contacts 1672, 1665 and the winding of the skip relay R1680 to battery. This relay, at its contacts 1681, interrupts a point in the previously traced circuit for the pulse transmission relay R1620 so that the sender is prevented from transmitting further pulses over the conductor 269R to control subsequent switches in the switch train. The ground potential over the above traced circuit for operating the skip relay R1680 is also extended by way of the contacts 1682 and 1422 to the winding of the magnet M1421 on the send sequence switch 1420. As long as the ground potential is retained on this circuit, the magnet M1421 will operate and restore under control of its self-interrupting contacts 1422 to advance the wipers 1401 to 1407 step-by-step over the associated contact banks. When the wiper 1401 advances from contact 4 into engagement with contact 5, the circuit for retaining the skip relay R1680 operated and for retaining the stepping circuit for the magnet M1421 is transferred from the previously mentioned circuit to a circuit that now includes the contacts 1672, 1665 and 1682. Thus, the magnet M1421 of the send sequence switch 1420 will self-interruptedly advance its wipers over the contacts 1 to 20, inclusive, without transmitting any of the information encountered as the wipers advance over these contacts.

When the wiper 1401 leaves the contact 20, it interrupts the circuit for the skip relay R1680 and it terminates the self-interrupting circuit for the magnet M1421. Restoration of the skip relay R1680 will again complete, at its contacts 1681, the circuit for the pulse transmission relay R1620 from ground potential encountered by the wiper 1402 in engagement with the contact 21.

As the wipers of the send sequence switch 1420 are advanced over the contacts 21 to 25, inclusive, the digits now registered in the route registers WXYZ11 to WXYZ16, inclusive, will again be transmitted. In other words, the route digits originally registered in the route registers WXYZ11 to WXYZ16, inclusive, based on the operation of a selected translate relay in the translator 2700 will be discarded from said route registers and new routing digits will be reregistered therein in order to route the connection to the operator position.

In the above description it was pointed out that in response to the operation of the incomplete detection relay R1660 the contacts 1663 were opened in order to restore the pulse control relay R1510 and the auxiliary start relay R1530 to their normal positions. Therefore, these relays remain in the restored positions as the wipers 1401 to 1407, inclusive, of the send sequence switch 1420 are automatically advanced over the different contacts in the associated contact banks to engagement with the contacts 21. When this occurs, the ground potential on the wiper 1401 is extended over a circuit including the contacts 1662 and 1514 in order to reoperate the auxiliary start relay R1530. This relay in turn performs the same controls previously described and thereby, at its contacts 1535, reoperates the pulse control relay R1510. During the restoring period of the relays D1530 and R1510, the sender 1400 is prevented from sending additional switch controlling impulses over the conductor 269R by removing the resistance ground at the contacts 1532. The removal of the ground potential from the conductor 269R extending to Fig. 9 will cause the operated switches in the switch train to restore to normal. This restoration operation may best be illustrated by describing the circuit for controlling the winding of the line relay R330 in the primary selector 300. In other words, the ground potential through the resistor 1626, contacts 1532, right-hand winding of the digit stop relay R1560, contacts 1632 and 1623, conductor 269R extending to Fig. 9 and then by way of conductor 269R to Fig. 2, wiper 254 of the director hunter 250, conductor 303R extending to Fig. 3, contacts 312 and 321 and the upper winding of the line relay R330 to battery. As long as the above mentioned circuit is completed for the line relay R330 or to a corresponding line relay in some subsequent switch or repeater, the line relay and the corresponding switch will remain in its operated position. However, when this circuit is interrupted by the restoration of the auxiliary start relay R1530 in the sender 1400 all operated switches beyond the primary selector 300 as well as the primary selector 300 will restore to normal to prevent the establishment of a connection. However, the primary selector 300 is retained connected to the director over circuits including the wipers of the director hunter 250 so that it may be reoperated under control of the director in accordance with the new set of routing digits registered in the WXYZ11 to WXYZ16, inclusive, route registers.

Referring now to the coder 1800 portion of the director, it will be recalled that in response to the operation of the incomplete detection relay R1660, circuits were completed for operating the relays R1810, R1830, R1840 and R1850TZ. Operation of the relay R1810, at its contacts 1811, locks the relay to the grounded conductor 615LGC which is grounded at the contacts 641' on the operated seizure relay R640 (Fig. 6). This ground potential also retains the relay R1830 in its operated position. As a further result of the operation of relay R1810, at its contacts 1812, it disconnects the ground potential on the conductor 615LGC from the locking circuit including the conductor 1826. At this instant, all of the operated relays in the routs registers WXYZ11 to WXYZ16, inclusive will restore to normal to erase the registration of any routing digits therein.

Operation of the relay R1830 in the coder 1800 portion of the director is of no importance at the present time even though it closes various contacts. However, the circuits that are completed by these contacts are opened at various contacts controlled by the control relay R1840 which is also operated at this time. However, the 0 operator relay R1850TZ, at its upper make contacts, applies ground potential to the terminals 1 to 4 on the terminal block TB1851. These terminals may be cross-connected in the manner illustrated to register in code form appropriate digits on the WXYZ11 to WXYZ14 code marking conductors in the cable 1826 extending to Fig. 17. These conductors are shown in the drawings terminate respectively in the WXYZ11 to WXYZ14 route register relays (Fig. 17) where appropriate digits will be registered which would control the primary selector 300, for example, to raise its wipers to the level 5 to select an idle special selector, such as X340 (Fig. 1 or 22) and another digit, for example, the digit 5 which would control the special selector X340 to select an idle trunk to the 0 operator position. With the assumed arrangement described above, the WXYZ11 and WXYZ12 route registers would be controlled over the marking conductors to register respectively the digit 5. The remaining route registers WXYZ13 to WXYZ16 would not be operated.

At the inner upper make contacts, the 0 operator relay R1850TZ will complete an operating circuit for the control relay R1860TD. The relay R1860TD may also be operated under control of the contacts 1814 on the operated control relay R1810. In other words, the ground potential on the conductor 615LGC as well as the ground potential at the inner make contact on the operated relay R1850TZ will complete the circuit for the relay R1860TD. This is of no particular importance at this time since the relay R1860TD is arranged to control the skipping of the transmission of the last four digits of a seven digit number registered in the call register 900. In other words, the relay R1860TD, at its various contacts, will apply ground potential to the skip conductors SK24, SK26 and SK27 terminating in the bank contacts accessible to the wiper 1403 of the send sequence switch 1420. The application of ground potential to these conductors by the wiper 1403 will normally cause the operation of the skip common relay R1680 whereby the send sequence switch 1420 is automatically operated to skip the corresponding contacts in the associated contact banks. In the present operation in which the call is to be automatically routed to the 0 operator position because of the incomplete detection by the detector 1900, the wipers of the send sequence switch 1420 will automatically be stepped to the contacts 21 in the associated contact banks regardless of the markings on the skip conductors accessible to the wiper 1403.

It will be assumed that the 0 operator relay R1850TZ, at its upper four make contacts, has marked the WXYZ11 and WXYZ12 code marking conductors extending to the corresponding route registers to register therein the number 55. The remaining route registers WXYZ13 to WXYZ16, inclusive, will remain in their restored positions. These registers, as previously noted, will apply code markings to the WXYZ11 and WXYZ12 code marking conductors terminating in the bank contacts accessible to the wipers 1404 to 1407, inclusive, of the send sequence switch 1420. In this connection, it is to be noted by referring to Fig. 14 that the WXYZ11, WXYZ12, WXYZ13 and WXYZ14 code marking conductors terminate respectively in the contacts 1 to 4 and also in the contacts 21 to 24. Accordingly, when the wipers of the send sequence switch 1420 engage the contacts 21, the digit 5 registered in the WXYZ11 route register will be marked in code form in the bank contacts accessible to the send switch 1580. Also, the digit 5 will be marked in the WXYZ12 code marking conductors terminating in the contacts 22 accessible to the wipers 1404 to 1407, inclusive. When the latter wipers subsequently engage the contacts 22, the digit 5 will again be marked in the bank contacts accessible to the send switch 1580. These digits, one after the other, will be transmitted in numerical pulse form over the conductor 269R in the manner previously described to control the primary selector 300 and then the special selector X340 to route the call to the 0 operator position. The manner in which the impulses are transmitted in accordance with the markings applied to the wipers 1581 and 1582 as the wipers are stepped over the associated bank contacts has been previously described.

When the wipers 1401 to 1407, inclusive, engage the contacts 23, the digit registered in the WXYZ13 route registers may be transmitted. Since no digit is registered in the WXYZ13 route registers, the contacts 1722 are closed indicating this fact. Consequently, the wiper 1403 in applying ground potential to its associated bank contact 23 will extend ground potential by way of the skip conductor SK13 extending to Fig. 17, then by way of the contacts 1722, the skip common conductor 1203SKC extending to Fig. 16 and the winding of the skip relay R1680 to battery. The latter relay will operate in the usual manner and, at its contacts 1682, will complete the previously described circuit for self-interruptedly controlling the magnet M1421. The magnet M1421 will operate and restore in the usual manner and advance its wipers an additional step to skip the contacts 23. The same operation takes place when the wipers engage the contacts 24 inasmuch as no digit has been registered in the WXYZ14 route registers. This will cause the wipers of the send sequence switch 1420 now to engage the contacts 25 in the associated contact banks. When this occurs, the ground potential at the wiper 1403 will complete a circuit including the conductor 701CR22 extending to Fig. 9 and then by way of the corresponding conductor extending to Fig. 7 to operate the director release relay R680 in the controller 400 portion of the director. As previously described, operation of the latter relay will control the release of the director and the various operated relays and apparatus forming the director.

In view of the foregoing description of the operation of the director in response to the encountering of an incomplete detection signal from the detector 1900, it will be appreciated that the director will automatically release whatever portion of the established connection has been completed, it will automatically register predetermined routing digits in the route registers of the coder 1800, it will then transmit these digits to the primary selector 300 and subsequent switches in the switch train to route the call to the 0 operator position. Thereafter, the associated director will be automatically released from the connection that it has now established to the 0 operator position and thereby complete the connection between the calling subscriber station and the connected position. The operations whereby the director will release will be described hereinafter.

*Routing falsely grounded line to intercept*

In the previous description of the operation of the controller 400 portion of the director, it was pointed out that a false ground test was made of the calling line as soon at it is connected to the director. When the resistance of the ground leak on a calling line is below approximately 10,000 ohms, the line test relay R440 is operated. This relay, at its contacts 441, momentarily applies ground potential by way of the contacts 426 and the conductor 415GA extending to Fig. 18 in order to operate the grounded line register relay R1820. This operation has been previously described and it may be well to mention at this time that the registration is retained in the relay R1820 until a determination is made that the call is one that is to be recorded. In other words, if it is a call which does not require a record to be made thereof, then there is no need to intercept the same. However, if it is later determined that a record is to be made of the call, then it is intercepted in order to prevent a record from being made of the call. If the ground leak (false ground) on a calling line is sufficient to operate the relay R440, it would also be sufficient to interfere with the transmission of the calling station identifying ground pulses that are transmitted to and registered in the party station relays R1870P1 to R1870P5, inclusive, in Fig. 18. Accordingly, a false identification may be registered so that a charge would incorrectly be made against a station other than the calling station. To prevent such a fault from occurring, the call will automatically be routed to an intercept operator position, if it is subsequently determined that it is to be routed as a toll or national toll recorded call.

Referring now to Fig. 18, it will be seen that when the grounded register relay R1820 is operated in the manner noted above, it immediately locks itself by way of its contacts 1824 and the contacts 1812 to the grounded conductor 615LGC. At its contacts 1825, the relay R1820 completes an obvious circuit for operating the control relay R1840 and it prepares, at its contacts 1823, a point in the circuit for operating the relays R1810 and R1830 over a circuit including the conductor ABT which will be grounded by a selected translate relay in the translator 2700 in the event that the call is one that is to be recorded. The only purpose of operating the control relay R1840 at the present time is to interrupt points in circuits including its lower set of four break contacts in order to prevent premature grounding of said marking conductors terminating in the terminal block TB1851. These conductors would otherwise be marked if the relay R1830 operates.

The above mentioned relays in the coder 1800 will remain in the condition described above until the calling subscriber has dialed sufficient digits into the call register 900 portion of the director to control the translator 2700 in the manner previously described. Thus, if it is determined that the present call is one that does not require the use of the call recorder 2000 in connection with producing a record of the call, the ABT conductor noted above will not be grounded and consequently the relays R1810 and R1830 will remain in their restored positions. No further operations will occur in the director except to permit the calling subscriber to complete his connection by the dialing of the remaining digits.

If the call is not a call that is to be recorded, the normal functions of the coder 1800 is not interfered with and the relays R1820 and R1840 will automatically be released under control of the director during the completion of the call.

If the call described above is an AB toll call or a national toll code call in which a record is to be made of the particular connection, the ground potential applied to the conductor ABT by the translator 2700 will be extended through the contacts 1823 on the operated relay R1820 in order to complete multiple operating circuits for the relay R1810 and the relay R1830. When the relay R1810 operates, it also completes a locking circuit, at its contacts 1811, for locking the relays R1810 and R1830 in their operated positions to the grounded conductor 615LGC. As a further result of the operation of relay R1810, at its contacts 1812, it disconnects the grounded conductor 615LGC from the previously described locking circuit for the relay R1820 in order now to restore the latter relay. Also, the disconnection of the holding ground from the conductor 1826 will restore the operated relays in the route registers WXYZ11 to WXYZ16, inclusive, that are locked to this conductor and it will cause the restoration of any other relays in the coder 1800 that are locked to this conductor. As soon as the relay R1820 restores to normal it interrupts, at its contacts 1825, a point in the circuit for the control relay R1840 so that the latter relay can now restore to normal.

Incident to the restoration of the relay R1840, circuits are completed at the contacts 1813 on the operated relay R1810 and at the contacts 1833, 1834 and 1835 on the operated relay R1830 to apply ground potentials to the terminals 1 to 4, inclusive, on the terminal block TB1851. These terminals may be cross-connected in the manner described hereinbefore to the various WXYZ11 to WXYZ14 code marking conductors extending to the route registers WXYZ11 and WXYZ14, inclusive (Fig. 17).

In other words, 1, 2, 3 or 4 route digits may be marked in code form in the above mentioned route registers for the purpose of automatically controlling the director so that it will route the particular call from the calling subscriber station to an intercept operator position instead of to the desired called destination. In this connection, it should be remembered that the translation of the particular called office code that was registered in the route registers WXYZ11 to WXYZ16, inclusive, is canceled by automatically interrupting the holding circuit for the operated ones of the register relays and then subsequently reoperating necessary ones of the route registers to again register therein appropriate digits whereby the director will route the call to the intercept operator position. The digits that are utilized for routing the call are arbitrary and will correspond to the routing path necessary to extend the connection to the intercept position. In the present trunking diagram shown in Fig. 1, the digits, for example 50, can be used as routing digits to respectively control the primary selector 300 to select a special selector X340 and then to control the latter selector to select an idle trunk extending to the intercept operator position.

As a further result of the operation of the relay R1810, ground potential at the contacts 1816 is applied to the conductor 705C0 extending to Fig. 7 in order to retain the translation complete relay R710 in its operated position when the routing digit registered in the WXYZ11 route register is canceled therefrom. Grounding of this conductor, as previously described, will control the director to initiate its sending operation whereby switch controlling impulses will be transmitted by the director to the primary selector 300 and then to the special selector X340 in substantially the same manner as has been described previously.

As a further result of the restoration of the control relay R1840, it completes a circuit including the contacts 1842 and 1831 for applying ground potential to the conductor 512SCG extending to Fig. 5 to control the initiation of the operation of the sender in the amnenr previously described. Also, as a result of the closing of the contacts 1814, the relay R1810 applies the ground potential on the conductor 615LGC to the circuit of the control relay R1860TD which now operates. Operation of the relay R1860TD with the remaining control relays R1860TA, R1860TB and R1860TC in their restored position, the skip conductors except the skip conductor SK12 will be grounded in the bank contacts accessible to the wiper 1403 of the send sequence switch 1420 so that the sender will only send the digits that have been marked by the route registers WXYZ11 and WXYZ12 and will skip all digits that have been dialed and registered in the call register 900 by the calling subscriber.

In view of the foregoing, it will be appreciated that a calling line having false ground thereon that is sufficient to cause the operation of the line test relay R440 will automatically control the director so that it will route the call to the intercept operator position when the call is one that would normally be recorded. The operator will recognize the call as coming to the position as a result of the a false ground on the particular calling line and can, after ascertaining the number of the calling subscriber, have the connection completed to the desired called line in order to prevent the loss of a toll call. Also, the operator will make a record of the faulty condition of the particular calling subscriber line so that steps may be taken to correct the fault.

*Operation of the timer 490 in the director*

The timer 490 shown in Fig. 4 forms a part of the controller 400 portion of the director and is arranged so that it is operated step-by-step by two second pulses to perform certain tests at predetermined elapsed time intervals. More particularly, when the controller 400 portion of the director is seized at the time that the director is connected to a calling subscriber line, the seizure relay R640 is operated in the manner previously described to connect the two second pulse conductor C656 to the winding of the magnet M491 through contacts 415. The magnet M491 operates as soon as the pulse appears on the above mentioned conductor and when the pulse is removed from the conductor the magnet restores to normal to advance the wipers 493 to 496, inclusive, of the timer 490, one step in a clockwise direction. It should be noted, however, that the four wipers noted above of the timer 490 are not in exact alignment with one another on the associated shaft. The wipers 493 and 494, as shown in the drawing, normally engage a home contact position; the wiper 495 is positioned so that it will engage the contact 1 in the associated bank after the wipers 493 and 494 have taken eleven steps and the wiper 496 will engage the contact 1 in the associated contact banks after the wipers 493 and 494 have taken twenty-one steps. In this connection, it should be understood that the off-normal contacts ON497 are closed only when the wipers 493 and 494 are in engagement with the illustrated home contact positions and are opened in all other positions of the wiper while the off-normal contacts ON498 are open when the wipers 493 and 494 are in engagement with the illustrated home contact position and are closed whenever these wipers are in any other position.

In view of the foregoing, it will be apparent that after the initial seizure of the 400 portion of the director, the two second pulses will control the magnet M491 so that the wipers of the timer are advanced one step every two seconds. After the wiper 494 engages the contact 6, approximately ten to twelve seconds after seizure of the controller 400, ground potential is applied to the conductor 401MS to test whether or not the calling subscriber has dialed the first digit of the directory number. If the first digit of the directory number is dialed before the conductor 401MS is grounded by the wiper 494, the tone control relay R530 will be operated at the time the ground potential is applied to the above mentioned conductor. At the contacts 531, the relay R530 will prevent the ground potential on the conductor 401MS from completing the operating circuit for the fault seizure relay R660. On the other hand, if the first digit has not been dialed within the time interval of ten to twelve seconds, the relay R530 will remain in its restored position so that the ground potential on the conductor 401MS will operate the fault seizure relay R660. The latter relay will immediately lock itself by way of its contacts 661 to ground at contacts 642. Further operations controlled by the fault seizure relay R660 will be described hereinafter.

If it is assumed that the first digit is dialed within the time interval permitted, the grounding of the conductor 401MS will not operate the fault seizure relay R660. Therefore, the magnet M491 will continue to operate under control of the two second pulses and after twenty to twenty-two seconds, the wiper 494 will engage the contact 11 in the associated contact bank to determine whether or not the assigner start relay R550 has been operated within twenty to twenty-two seconds after the controller 400 portion of the director is seized.

With regard to the latter test, it will be recalled that when the third digit of a directory number is dialed by the calling subscriber, a circuit is normally completed for operating the assigner start relay R550 in the manner previously described. If this relay is operated before ground potential is applied to the conductor 401MS1, contacts 557 will be closed so that the ground potential on the wiper 493 will complete a circuit for operating the relay R410. This relay will open its contacts 411 in order to disconnect the conductor 401MS1 from the above described circuit for operating the fault seizure relay R660. In other words, the effect of the twenty to twenty-two second timing period by the timer 419 will be canceled by operation of the relay R410. As a further result of the operation of relay R410, at its contacts 412, it locks itself in its operated position to the multiply connected contacts 1 to 11, engaged by the grounded wiper 493 on the timer 490. Also, at its contacts 413, the relay R410 connects the circuit including the grounded wiper 493 by way of the self-interrupting contacts 492 and the winding of the magnet M491 in order to cause the magnet to step the wipers of the timer 490 until the wiper 493 steps off of the contact 11 and the wiper 495 steps into engagement with the contact 1 in the associated contact banks. As soon as the wiper 493 reaches the contact 11, ground potential will be removed from the locking circuit for the relay R410 and from the self-interrupting circuit for the magnet M491. At this time, the relay R410 will restore to normal and the wiper 495 will become effective during the next ten steps of the wipers of the timer 490. The foregoing operations will prevent the test over the conductor 401MS1 from being made.

In the event that the third digit has not been dialed by the calling subscriber before the conductor 401MS1 is grounded, the assigner start relay R550 will be in its restored position and will consequently prevent the operation of relay R410. Therefore, when the wiper 494 engages its contact 11, after the elapse of twenty to twenty-two seconds from the time the 400 portion of the director is initially seized, a circuit will be completed by way of the contacts 411 for operating the fault seizure relay R660. As previously noted, the controls exercised in response to the operation of the fault seizure relay R660 will be described hereinafter.

If it is assumed that the assigner start relay R550 is operated before the conductor 401MS1 is grounded by the wiper 494, a new period of timing will begin from the time of the operation of relay R550 due to the fact that the wipers of the timer 490 will be self-interruptedly advanced until the wiper 493 is stepped from the contact 11. Thereafter, the two second time pulses received over the conductor C656 will again control the magnet M491 to again step the wipers at two second intervals. During this cycle, of operation, the wiper 495 effectively engages its associated bank contacts. Within eight to ten seconds after the wiper 495 is in engagement with its contact 1, it applies ground potential to the conductor 401MS2 in order to test whether or not the translator 2700 has been seized and whether or not the coder 1800 portion of the director has received the routing digits from the operated translate relay in the translator assigner 2800 and the translator 2700 have been released.

Under normal operating conditions, the conductor 401MS2 will not be grounded by the wiper 495 until after the assigner start relay has been operated and restored and the translation complete relay R710 has been operated to indicate that a translation of the first three digits of a called number has been completed and the digits of the translation have been stored in the route registers of the coder 1800. If the assigner start relay R550 has operated and then restored before the conductor 401MS2 is grounded, the contacts 556 will be opened to prevent operation of the codexer failure relay R520 and to prevent operation of the translation assignment failure relay R480. The above mentioned relays will consequently remain in their restored position during the subsequent test by the timer 490.

If it is assumed, however, that there is a failure in the assignment of the translator 2700 to the use of the calling director, the relay R550 will be in its operated position so that the grounding of the conductor 401MS2 will complete a circuit including the contacts 556 and 523 for operating the relay R520 and in multiple therewith a circuit will be completed by way of the contacts 715 and 562 for operating the transmission assignment failure relay R480. The relay R520 upon operating, locks itself by way of its contacts 524 to ground at the release key contacts 475. The relay R480, at its contacts 482, applies ground potential to the conductor 501AT extending to Fig. 29 in order to control the relays in the transfer circuit 2901 whereby a second director translator assigner 2800B will be brought into use and the first translator assigner 2800A will be disconnected from service until the cause of the failure is determined and corrected. Thus, the second director translator assigner 2800B will attempt to associate the calling director with the translator 2700. This operation has been described hereinbefore with the operations of the director translator assigner 2800A.

Referring now to the relay R520, it will be seen that at its contacts 521, it applies ground potential to the conductor 503TDA extending to Fig. 21 in order to illuminate the lamp L2118 to indicate the fault condition. At the contacts 525, the relay R520 connects the grounded conductor 401MS2 to a circuit including the conductor 505TT extending to Fig. 18 thereby to operate the translation failure relay R1850TT in the coder 1800.

The operations resulting by the closing of the various contacts on the relay R1850TT have been described in connection with the similar operations that take place under control of the relay R1850TZ. Broadly stated, the operation of the relay R1850TT, at its four upper make contacts, will ground terminals 1 to 4 in the terminal block TB1851. These terminals may be cross-connected in the manner previously described to the various WXYZ11 to WXYZ14 code marking conductors in order to store appropriate routing digits in the route registers WXYZ11 to WXYZ14 (Fig. 17) so that the director will automatically route the particular call, because of the fault condition, to an intercept operator position. At the additional make contact shown immediately above the relay R1850TT a circuit is completed for operating the control relay R1860TD so that the director will prevent the transmission of any impulses corresponding to the digits that have been dialed by the calling subscriber.

Referring again to the controller 400 portion of the director, it will be understood that the relay R520 will remain in its locked position until the release key is actuated to open the contacts 475. However, the translation assignment failure relay R480 will restore to normal as soon as the translation complete relay R710 is operated as a result of the registration of a digit in the route register WXYZ11 under control of the translation failure relay R1850TT.

In the above description, it was assumed that the translator assigner 2800A and the translator 2700 were not released and that the translation complete relay R710 was not operated before the ground potential was applied to the conductor 401MS2 by the timer 490. This constitutes two possible faults, one being the failure of the translator assigner to release within a predetermined elapsed time interval and also the failure of the coder 1800 to receive the route registrations from the translator 2700. Within four to six seconds after the wiper 495 applies ground potential to the conductor 401MS2, the timer 490 will advance its wipers into engagement with the contacts 6 so that the wiper 495 will apply ground potential to the conductor 443MS3 extending to Fig. 20. In other words, ground potential will be applied to the last-mentioned conductor within twelve to fourteen seconds after the assigner start relay R550 operates. Ground potential is applied to the conductor 443MS3 to test whether or not the detection cycle of the detector 1900 has started.

Referring now to the call recorder 2000 (Figs. 19 to 21, inclusive) it will be seen that the conductor 443MS3 is connected by way of the contacts 2018, 2066, 2163, 2182 and 2193 and the winding of relay R2190 to battery. If the ground pulse applied to the conductor 443MS3 by the timer 490 occurs after the AB toll relay R2010 has operated but before the marginal relay R2180 has been operated, the above traced circuit will be completed for the relay R2190. In this connection, it should be recalled at this time that the detector test relay R2180 will operate in the event that the detector assigner 1910 has associated the detector 1900 with the call recorder 2000. If the above association fails to occur before the ground potential on the conductor 443MS3, the relay R2190 will operate and immediately lock itself to the conductor 445RK extending to Fig. 4 and ground potential at the contacts 475 on the release key.

As a further result of the operation of relay R2190, at its contacts 2191, it connects the ground potential on the conductor 443MS3 to the circuit of relay R2160. The detection failure relay R2160 will immediately operate and lock itself by way of its X contacts 2165 to ground at contacts 2011'. In addition to the foregoing, the detection failure relay R2160 performs the various controls described hereinbefore whereby the connection that has been built up under control of the director is released and a new connection is established to an operator position.

As a further result of the operation of relay R2190, at its contacts 2195, it completes an obvious circuit for illuminating the signal lamp L2118 to indicate a fault condition and, at its contacts 2192, it applies ground potential to the conductor C2122DAL extending to Fig. 19 in order to control the detector assigner 1910 so that it will be replaced by a stand-by detector assigner for subsequent detection operations by the detector 1900.

In view of the foregoing description of operation which occurs as a result of the grounding of the conductor 443MS3 before the detector assigner 1910 has associated the detector 1900 with the call recorder 2000, the call being established by the director will be released and it will instead be rerouted to an operator position. Also, the call recorder 2000 will automatically control the detector assigner 1910 to connect up a standby assigner for use in subsequent calls.

Referring again to the timer 490 (Fig. 4) it will be seen that within four seconds after the wiper 495 applies ground to the conductor 443MS3, the wiper will engage the contact 8 in the associated contact bank to apply ground potential to the conductor 444MS4 extending to Fig. 21. If the timer 490 should control its wipers and apply ground potential to the conductor 444MS4 before the call recorder 2000 portion of the associated director has started to send code signals corresponding to the registered items of ticketing information, the code send relay R2040 will be forcibly operated in order to clear out the call recorder. In other words, the call recorder will automatically attempt to send its stored information just as though a toll ticketing repeater called for the information within the normal elapsed time interval. In this regard, it should be understood that the call recorder 2000 will normally start to send code pulses corresponding to the items of information that are stored therein to an associated toll ticket repeater as soon as the wiper 1401 of the send sequence switch 1420 engages contact 5. When this occurs, the sender 1400 portion of the director will normally have sent sufficient routing digits to include a toll ticket repeater in the connection. If a defective toll ticket repeater is included in the connection or if the primary selector 300 should encounter an all-trunks-busy condition in the level to which it has been operated, then no circuit will be completed for the upper winding of the code send relay R2040. Consequently, the call recorder 2000 cannot under either of these conditions, start sending the code pulses corresponding to the information registered in the director. After the delay of from 34 to 36 seconds following the operation of the assigner start relay R550, the timer 490 will cause the wiper 495 to ground the conductor 444MS4 extending to Fig. 21 in the manner described above.

In Fig. 21 it will be seen that the conductor 444MS4 terminates in contacts 2152 on the control relay R2150. This relay, as previously noted, is a two winding relay in which the two windings oppose each other when they are both energized. Normally, the relay is operated when the contacts 2019 on the AB toll relay R2010 are closed and it is restored to normal by its differential action when the pulse start relay R2030 initially operates to close its contacts 2031. However, the latter relay cannot operate until at least one impulse has been transmitted to the magnet M1957 of the code send switch 1950. Since it is assumed that the code send relay R2040 has failed to operate, no pulse will be transmitted to the code send switch 1950 and the relay R2150 will be in its operated position.

In view of the foregoing, it will be understod that the ground potential applied to the conductor 444MS4 by the wiper 495 on the timer 490 will be extended by way of the contacts 2152 to complete the operating circuit for the lower winding of the code send relay R2040. This operation of the relay R2040 will simulate its normal operation whereby the call recorder 2000 portion of the director will clear itself out by transmitting all of the code signals corresponding to all of the items of information that have been marked in code form on the bank contacts accessible to the wipers 1953 to 1955, inclusive. In clearing out the items of information, the call recorder 2000 will merely step through its cyclic operation without transmitting the information to a ticket repeater. After all of the information has been transmitted by the call recorder 2000, it will cause the operation of the director release relay R680 in the usual manner. Release of the director, in the manner described hereinafter, will cause the calling subscriber line to be connected to the primary selector 300 so that the latter circuit can transmit an all-trunks-busy signal in the event that condition is encountered or the connection will be established to the defective toll ticket repeater which will also transmit a fault signal to the calling subscriber.

The above described arrangement whereby the call recorder 2000 portion of the director will automatically clear itself out in the event that an all-trunks-busy condition is encountered by the primary selector 300 or in the event that a defective toll ticket repeater is selected, will prevent a director from being held by a calling subscriber line for a period greater than the predetermined time interval established by the timer 490.

Referring again to the timer 490, it will be seen that within 34 to 36 seconds after the assigner start relay R550 has operated or within 16 to eighteen seconds after the conductor 444MS4 is grounded by the wiper 495, the wiper 496 will apply ground potential to the conductor 401MS5. Grounding of the last-mentioned conductor will control the controller 400 portion of the director to indicate that the circuit has been held by the calling subscriber for a period of time that exceeds the normal allotted time for the director to complete its operations. Therefore, when the conductor 401MS5 is grounded, a circuit is completed for operating the fault seizure relay R660 which immediately locks itself by way of its contacts 661 to ground at contacts 642. The latter contacts are closed as long as the seizure relay R640 is held operated from the calling subscriber line. It should be understood, however, that the elapsed time necessary for the timer 490 to rotate the wiper 496 to ground the conductor 401MS5 is of sufficient length to normally permit the various parts of the director including the controller 400 to process a call and disconnect itself from the calling line. In the event the fault seizure relay R660 is operated, it will automatically control the director so that it will route the call to an operator position.

In the above description regarding the various controls exercised by the timer 490 at different timed intervals, it was pointed out that the conductor 401MS1, 401MS and 401MS5 completed circuits for operating the relay R660 when the corresponding fault condition is encountered at the time that the conductor is grounded. In response to the operation of the relay R660, it locks itself to the ground potential at contacts 642 on the seizure relay R640; at its contacts 662, it disconnects the impulsing circuit including the contacts 452 from the conductor 604CR19 so that any additional digits that are dialed by the calling subscriber cannot be registered in the director; and, at its contacts 666, it removes ground potential from the conductor 871LGR in order to restore the relays R820, R830, R840, R850 (if they are operated) and any other relays in the director that have been locked to the ground potential applied to this conductor.

As a further result of the operation of the fault seizure relay R660, at its contacts 664, it interrupts a point in the circuit whereby the dial tone signal on the conductor 527 is normally transmitted to the calling subscriber line. Also, at its contacts 663, it will connect the busy tone signal on the busy tone conductor 717 to the calling subscriber line in the event that the translation complete relay R710 has been operated. As a further result of the operation of relay R660 it prepares, at its contacts 667, a point in the circuit for operating the director release relay R680 in the event that the contacts 606 on the emergency release key are closed. Thus, the director R680 may be immediately operated under the direct control of the contacts 606 on the emergency release key whenever the fault seizure relay R660 is in its operated position. This will enable the exchange attendant to forcibly release the director without waiting for it to route the call to the operator position.

Finally, at its contacts 665, the relay R660 will complete a circuit for illuminating the fault seizure lamp L825 if the send call relay R810 is operated. Also, the relay R660, at its contacts 665, will complete a circuit including the contacts 814 if the send call relay R810 is restored for applying ground potential to the conductor 809TY extending to Fig. 9. In Fig. 9, the ground potential on the conductor 809TY is further extended by way of the contacts 931, conductor 901TYO extending to Fig. 18 in order to operate the fault intercept relay R1850TY.

By referring now to the fault seizure relay R1850TY in the coder 1800 (Fig. 18), it will be seen that it is provided with contacts that perform substantially the same functions as those performed by the corresponding contacts on the relays R1850TZ and R1850TT. In other words, the relay R1850TY by means of its various contacts can complete circuits by way of the terminals on the terminal block TB1851 for registering appropriate routing digits in the WXYZ11 to WXYZ14 route registers (Fig. 17) so that the director will automatically route the particular call in question to the intercept operator position 50 shown in Fig. 22. These operations have been described previously and need not be repeated at this time. After all of the operations of the director have been completed in order to transmit the switch controlling impulses to route the call to the operator position 50, the director release relay R680 will be operated in the usual manner. However, attention is again directed to the fact that the emergency release key contacts 606 (Fig. 6) may be actuated by the exchange attendant any time after the contact 667 on the fault seizure relay R660 are closed so that the director release relay R680 may be operated to release the director before it functions to route the call to the operator position.

*Defective sender 1400*

The manner in which the sender 1400 transmitted switch controlling impulses over the conductor 269R as the send switch 1580 ascertained the number of such impulses to be transmitted was previously described. In review, it may be well to mention at this time that as each impulse is transmitted over the conductor 269R, a corresponding pulse is transmitted to the magnet M1583 so that the wipers of the send switch 1580 will be advanced one step in a counter-clockwise direction. As each step is taken by the wipers 1581 and 1582, the send stop relay R1550 is connected to marking conductors. Both windings of the relay R1550 will be energized whenever the value of the digit marked on the associated marking conductors corresponds to the number of steps taken by the wipers. When this occurs, the relay R1550 will operate in order to stop transmission of additional impulses over the conductor 269R. Thereafter, the digit space switch 1690 will function in the manner previously described in order to introduce an appropriate interdigital pause between the transmission of impulses corresponding to successive digits that are transmitted by the sender 1400.

Under certain fault conditions, however, the send stop relay R1550 may fail to operate. Under this condition the pulse transmission relay R1620 will continue to transmit pulses over the conductor 269R. Also, the magnet M1583 will continue to step the wipers of the send switch 1580. When the wipers of the send switch 1580 leave the illustrated home contact position, the off-normal contacts 1585 are closed and the contacts 1586 are opened. As soon as the wipers return to the illustrated home contact position after ten impulses have been counted, the above mentioned off-normal contacts are returned to the illustrated positions. If the circuit for the send stop relay R1550 is completed in any of the first ten contact positions of the associated wipers of the send switch 1580, the stop send relay R1610 will operate and in turn, at its contacts 1612, operate the delay pulsing relay R1650. Thus, the relay R1650 will open its contacts 1654 to disconnect the circuit to the conductor 507SN. However, if the relay R1650 is not operated at this time, a circuit will be completed for the conductor 507SN when the off-normal contacts 1586 are closed at the end of eleven steps of the wipers on the send switch 1580. As a result thereof, ground potential at the contacts 1537 will be connected by way of the off-normal contacts 1586, contacts 1642 and 1654, conductor 507SN extending to Fig. 5 in order to operate the sender failure relay R540. In other words, the sender failure relay R540 is operated if more than ten impulses are transmitted in any given sequence by the sender 1400. A maximum of ten impulses for switch controlling purposes is normally transmitted by the sender 1400 and whenever it inadvertently transmits more than ten impulses, the above mentioned circuit is completed for operating the sender failure relay R540.

Referring now to the controller 400 portion of the director, it will be seen that as soon as the sender failure relay R540 operates, it immediately locks itself to ground at the release key contact 475. Also, at its contacts 544, it completes a circuit from the busy tone conductor 717 so that a busy tone signal is transmitted by way of the condenser 442 and contacts 421 to the conductor 268LR extending to the calling subscriber line. Thus, the calling subscriber will receive a busy tone signal and should replace the receiver on the switch hook of the associated telephone instrument to release the connection. Also, at its contacts 543, the relay R540 will interrupt a circuit including the conductor 870TG in order to terminate further operation of the sender 1400. In the sender 1400, the removal of ground potential from the conductor 870TG will cause the restoration of the auxiliary start relay R1530 and the pulse control relay R1510.

As a further result of the operation of the relay R540, at its contacts 547, it applies ground potential to the locking conductor 615LGC in order to prevent the release of certain of the operated relays and switches in the director. Also, at the contacts 541, the relay R540 retains a holding ground potential on the circuit of the director busy relay R510 in order to mark the present director busy to other calls. At the contacts 545, the relay R540 interrupts a point in the circuit for the release relay R670 so that relay cannot operate in the event that the seizure relay R640 should restore to normal. This will prevent the director from being released until the exchange attendant actuates the release key to open the contacts 475. As a further result of the operation of the sender failure relay R540, at its contacts 542, it completes a circuit to illuminate the sender failure lamp L534 in order to indicate to the exchange attendant the particular director that has encountered the sender failure condition.

The director will remain in a locked-up condition even though the calling station has abandoned the call until the release key contacts 475 are opened by the exchange attendant. This will cause the sender failure relay R540 to restore to normal and prepare, at its contacts 545, a circuit whereby the release relay R670 may be operated.

*Release of the director*

Referring now to the director release relay R680 (Fig. 6) it will be recalled that this relay may be operated at various times during the control of the director. It will be recalled that the relay R680 was operated when the digits dialed by the calling subscriber indicated that the call was a local call and did not require the full use of the director. The relay R680 may be operated in the middle of a call because a translated routing was not required or because the calling subscriber abandoned the connection before it is completed. Also, the relay R680 may be operated to release the director from the connection after it has transmitted the necessary impulses to complete a connection to a six digit called subscriber number, a seven digit called subscriber number and a national toll call involving either ten or eleven digits.

Referring now to the director release relay R680, as soon as it is operated, it completes a locking circuit including the contacts 687 either to ground at the contacts 649 on the seizure relay R640 or to ground at contacts 673 on the release relay R670. At its contacts 682, the relay R680 completes a circuit for retaining the busy director relay R510 in its operated position so that the instant director is marked busy until the releasing operations thereof have been completed. At its contacts 686, the relay R680 interrupts a point in the impulsing circuit including the conductor 604CR19 so that the subsequent release of the call registrations 900 and 1200 will not be interfered with. At its contacts 681, the relay R680 connects the grounded conductor 603KOC to the conductor 275S extending to Fig. 2. The latter conductor terminates in the bank contacts of the director hunter 250 and the ground potential thereon will be extended by way of the wiper 260, conductor 308S, contacts 314′ and 321′ to energize the winding of the magnet M251. Thus, the stepping magnet of the director hunter 250 is energized so that upon the subsequent interruption of the above traced circuit will cause the magnet to restore and automatically advance its wipers 253 to 260, inclusive, an additional step. This will cause the wipers to disconnect from the particular director that has been used in the present connection. As a further result of the operation of the relay R680, at its contacts 685, it applies direct ground potential to the grounded winding of the relay R720 thereby to cause the latter relay to slowly restore. It is the shunting action of the ground potential on the winding of the relay R720 that causes it to slowly restore to normal.

Referring again to the above traced circuit for energizing the magnet M251 of the director hunter 250 (Fig. 2) it will be seen that as soon as the magnet operates, it opens its contacts 252 to interrupt the locking circuit for the director test relay R310 in the primary selector 300. The director test relay R310 now restores to normal and performs a switch-over operation whereby the calling subscriber line is disconnected from the director and connected to the established connection set up under control of the director through the primary selector 300 and subsequent switches in the switch train. In this manner, the director is disconnected from the primary selector 300.

Referring now to the director test relay R310, it will be seen that when this relay restores to normal, the contacts 311, 312, 314, 315, 317, 312′ and 314′ are opened and the contacts 313, 316, 318 and 313′ are closed. Consequently, the conductors C244, C245 and C246 extending from the line finder 240 are disconnected from various conductors extending to the director by way of the director hunter 250 and are instead connected through the primary selector 300 to the subsequent switches in the switch train including the toll ticket repeater X2300 to the called destination. Thus, the connection between the calling and called subscriber is now established and the director is disconnected from the circuits including the primary selector 300.

As a further result of the restoration of the director test relay R310, it should be noted that at the contacts 314′, it interrupts a point in the above described circuit for operating the magnet M251. Consequently, the magnet M251 restores to normal to advance the wipers of the director hunter 250 an additional step. At this time, the director in use is disconnected from the circuit including the wipers of the director hunter 250. The above described step-ahead action of the director hunter 250 as a result of the operation of the director release relay R680 in the controller 400 portion of the director will automatically prevent reselection of the same director by the line finder 240 and primary selector 300. In other words, step-ahead action of the director hunter 250 will prevent the same line finder and primary selector 300 from being connected to a director that may be in faulty operating condition. Consequently, if repeated attempts are made to originate a call, the step-ahead action of the director hunter 250 will prevent a defective director from being reseized.

The hold relay R720 slowly restores to normal and, at its contacts 721, disconnects the grounded conductor 512SCG from the circuit for the call send relay R810 and from other circuits in the controller 400 portion of the director. Finally, at its contacts 722, the relay R720 disconnects ground potential from the conductor 273H extending to the bank contacts accessible to the wipers of the director hunter 250 (Fig. 2).

The advancement of the wipers of the director hunter 250, during the operation whereby the director is disconnected from the line finder 240 and the primary selector 300, interrupts the previously described circuit for the line relay R450 in the director controller 400. This relay is normally held in its operated position over the loop circuit including the calling subscriber line and is either released as a result of the above described step-ahead action of the director hunter 450 or as the direct result of the abandonment of a call by the calling subscriber. In either event the line relay R450 will restore to normal and interrupt at its contacts 451 the circuit for the hold relay R430 which also restores to normal. At the contacts 435, the restoration of the hold relay R430 opens the circuit for the seizure relay R640 which restores to normal to interrupt various locking circuits for certain of the relays in the director and to complete a circuit whereby the release relay R670 and the director release relay R680 are both held in their operated positions until the director has fully restored to normal. Consequently, various contacts on the seizure relay R640 will remove holding ground potentials from various locking conductors whereby the remaining operated relays and switches in the director will automatically restore to their normal positions.

More specifically, it will be seen that at the contacts 641, the relay R640 interrupts a point in one of the multiple circuits for holding the director busy relay R510 operated. This relay, however, will remain operated over circuits including ground potential controlled by contacts on the relays R670 and R680. Furthermore, at the contacts 642, the relay R640 removes ground potential from circuits for locking the relays R580 or R610 in their operated positions and for interrupting the circuit for the send call relay R810, the class control relay R650 and the fault seizure relay R660. Operated ones of the foregoing relays that have been locked to the ground potential at the contacts 642 will now restore to normal. At the contacts 643, the relay R640 opens the point in the locking circuit for the tone control relay R530 so that the latter relay can restore to normal if it is in its operated position. At the contacts 647, the relay R640 interrupts a point in the locking circuits for the operated ones of the relays R820, R830, R840 and R850 and simultaneously therewith, it removes ground potential from the conductor 871LGR extending to Fig. 10.

As a further result of the restoration of the seizure relay R640, at its contacts 643′, it disconnects the two second pulse conductor C656 from the previously described circuit for controlling the magnet M491 of the timer 490. At its contacts 648, the relay R640 completes a circuit including the ground potential at contacts 545, and the winding of the release relay R670 whereby the latter relay will operate and remain in its operated position until the timer 490 has restored to normal, the various registers in the call register 900, as well as the registers in the call register 1200 have all restored to their normal positions.

Finally, at its contacts 642′, the relay R640 removes ground potential from the conductor 605CR29 extending respectively to the digit register 1200 of Fig. 12, to the sender 1400 of Figs. 14 to 16, inclusive, and to the call recorder 2000 of Figs. 19 to 21, inclusive. All relays in the above mentioned portions of the director that are locked in their operated positions to the ground potential applied to the conductor 605CR29 will now restore to normal. It should be noted, however, that although no mention has been made of the circuit, including contacts 644, it should be understood that these contacts will open the circuit including the hold relay R720 to restore the latter relay when the call is abandoned by the calling subscriber at a time when the director is in its normal operating cycle.

In discussing the restoration of the seizure relay R640, it was pointed out that the contacts 648 completed a circuit for operating the relay R670 and that the latter relay remained in its operated position until all of the register switches restored to normal.

Starting with the contacts 545, a circuit is completed by way of the contacts 648, winding of the relay R670, off-normal contacts ON498, contacts 414 and 492 and the winding of the magnet M491 to battery. In this circuit, the relay R670 operates in series with the magnet M491 and the magnet interrupts its operating circuit at the contacts 492 so that the magnet is self-interruptedly operated to advance its wipers step-by-step in the clockwise direction until the wipers restore to the illustrated home contact positions. When this occurs, the off-normal contacts ON498 are opened to interrupt the self-interrupting circuit for the magnet M491 and the off-normal contacts ON497 are closed to transfer the above mentioned circuit for the relay R670 to the conductor 419CR20 extending to Fig. 11. In Fig. 11, the conductor 419CR20 terminates in the wiper 1143 of the seventh digit register 1140. If this wiper is in an off-normal position, the above described circuit, including the winding of the release relay R670 will be completed through the self-interrupting contacts 1142 and the winding of the magnet M1141 to battery. The magnet M1141 will be self-interruptedly operated to advance the wipers 1143 to 1145, inclusive, step-by-step in a counter-clockwise direction back to the illustrated home contact position. When the home contact position is reached, the circuit including the conductor 419CR20 is transferred by way of the wiper 1143 to the wiper 1133 and to the circuit including the winding of the magnet M1131 on the sixth digit register 1130. This magnet will accordingly be self-interruptedly operated until its wipers are restored to the illustrated home contact position and it will then transfer the restoring circuit to the wiper 1123 to control the self-interruptions of the magnet M1121 on the fifth digit register 1120. This magnet, in turn, will self-interruptedly operate and advance its wipers to the home contact position in order to transfer the restoring circuit to the magnet M1111 on the fourth digit register 1110. The wipers of the fourth digit register 1110 will be self-interruptedly restored to the illustrated home contact position under control of the magnet M1111 and when the home contact position is reached, the restoring circuit will be transferred to the conductor 1109 extending to Fig. 13.

In Fig. 13, the restoring circuit will sequentially control the self-interrupting action of the magnets on the respective eleventh digit register 1340, the tenth digit register 1330, the ninth digit register 1320 and the eighth digit register 1310 in the order named, so that the wipers of these switches are all restored to their illustrated home contact positions.

When the eighth digit register 1310 finally restores its wipers 1313 to 1315, inclusive, to the illustrated home contact positions, the restoring circuit, including the winding of the magnet M1311 and the winding of the release relay R670 is interrupted. All of the registers in the digit register 1200 (Figs. 12 and 13) and all of the digit registers shown in Fig. 11 of the call register 900 and the timer 490 (Fig. 4) will be in their restored positions. The release relay R670 would normally restore at this time but a multiple circuit may now be traced which includes ground at contacts 545 and 648, winding of the relay R670, contacts 646, conductor 601CR21 extending to Fig. 10 and the wiper 1043 on the third digit register 1040 (Fig. 10). As a result thereof, the relay R670 may still be held in its operated condition over the last-mentioned circuit to battery potential by way of one of the magnets of the registers 1040, 1030 or 1020 or the magnet M1011 of the receive sequence switch 1010. The magnets of the above noted registers will be self-interruptedly operated as long as the associated wipers are grounded and are in engagement with any contacts other than the illustrated home contact positions. Thus, the magnets of the above mentioned registers and the receive sequence switch 1010 will be self-interruptedly operated in the same manner as has been described previously to restore the associated wipers to their illustrated home contact positions. As soon as the wiper 1013 of the receive sequence switch 1010 restores to its home contact position, the restoring circuit, including the conductor 601CR21, is transferred to the conductor 1061 extending to Fig. 14 where it terminates in the off-normal contacts 1424 on the send sequence switch 1420 (Fig. 14). The send sequence switch will normally have its wipers in engagement with the contacts 25 if the sender 1400 has been operated to complete the connection to the called destination. However, if the call is abandoned or released prior to the time that the wipers of the send sequence switch 1420 are in engagement with the contacts 25, they will automatically be restored to the illustrated home positions under control of the magnet M1421.

More specifically, when the restoring circuit is completed to the conductor 1061, it will further be extended by way of the off-normal contacts 1424, contacts 1422 and the winding of the magnet M1421 to battery on the send sequence switch 1420. The magnets M1421 and the release relay R670 will cooperate in the same manner as has been described hereinbefore whereby the magnet M1421 is self-interruptedly operated until its wipers restore to the illustrated home contact position and thereby cause the off-normal contacts 1424 to open the restoring circuit. As soon as the off-normal contacts 1424 are opened, the stepping circuit for the magnet M1421 is interrupted and the release relay R670 will restore to normal.

In view of the two multiple circuits for progressively releasing the wipers of the different rotary switches included in the various portions of the director, it will be apparent that the relay R670 will be held in its operated position until the last one of the two multiple circuits is interrupted. When this occurs, the release relay R670 will restore to normal and interrupt, at its contacts 673, a point in a locking circuit for the director release relay R680. At its contacts 672, the relay R670 now interrupts the circuit for the release lamp L688 which is extinguished to indicate to the exchange attendant that the rotary stepping switches included in the director have fully restored to normal.

Finally, at its contacts 671, the relay R670 opens a multiple point in the circuit for holding the director busy relay R510 in its operated position.

In the above description it was noted that the contacts 673 will interrupt the locking circuit for the director release relay R680. This relay will normally restore to normal when the locking circuit is interrupted. However, the relay R680 may still be held in its operated position over the conductor 701CR22 extending to Fig. 9. This conductor will be grounded until the wiper 1403 is advanced from the contacts 25 during the restoring operation of the send sequence switch 1420. Also, the conductor 701CR22 will be grounded from the code send switch until the call recorder 2000 is fully restored to normal. Normally, however, the ground potential will be removed from the conductor 701CR22 before the release relay R670 has had sufficient time to restore to normal.

Referring to the call recorder 2000, it will be understood that the AB toll relay R2010 is locked in its operated position over a circuit including the contact 2012′ and the conductor 605CR29 which is grounded at the contacts 642′ while the seizure relay R640 remains in its operated position. This relay, as previously noted, will remove the ground potential as soon as the director is disconnected by the director hunter 250 or until the director is abandoned by the calling subscriber. As soon as the ground potential is removed from the conductor 605CR29, the AB toll relay R2010 will restore to normal and remove, at its contacts 2011', the locking circuit for the start pulse relay R2030, the code send relay R2040, the detection complete relay R2060 and all other relays that are locked to this conductor will be restored to normal. As soon as the relay R2130 restores, it will remove ground potential at the contacts 2133 from the wiper 1952. If the latter wiper is in engagement with the contact 20, then ground potential will be removed from the conductor 701CR22 to permit the director release relay R680 to restore to normal. As a result of the restoration of the AB toll relay R2010, at its contacts 2014', it completes a self-interrupting circuit for the magnet M1957 which includes the contacts 1958, 2014' and the off-normal contacts 1959A. Consequently, the magnet M1957 will be self-interruptedly operated to restore its wipers to the illustrated home contact positions whereat the off-normal contacts 1959A are opened to terminate further step of the wipers. The wipers of the code send switch 1950 will now be in the home contact position.

Referring to the director release relay R680 (Fig. 6) it will be seen that at the contacts 681, it disconnects the grounded conductor 603KOC from the conductor 275S extending to Fig. 2 so that another director hunter, such as 250, may now seize the director. Also, at the contacts 682, the relay R680 removes the last holding ground potential from the circuit of the directory busy relay R510 so that the latter relay can now restore to normal and remove the busy marking ground potential from the conductor 274G. Therefore, the director is now marked in the bank contacts on the director hunters, such as 250, having access thereto as an idle director which may be used in connection with another call.

In view of the foregoing description of the mode of operation of the releasing of the various portions of the director which has been utilized in the setting-up of the present connection, it should be understood that the director is now fully restored to its normal position and is available for use in a new call.

What is claimed is:

1. In a telephone system, a plurality of register senders, each of said register senders having a plurality of digit registers, each of said register senders being identified by a different plural character register sender designation individual thereto, a called exchange having an individual code designation comprising a plurality of digits, means for transmitting to one of said register senders a series of digits corresponding to the code designation of said called exchange, means for registering said digits in successive ones of said digit registers in said one register sender, a translator common to said plurality of register senders, digit register means in said translator, a translator assigner including a first group of relays and a second group of relays, means operated in response to the registration of said digits in said digit registers of said one register sender for controlling a selected relay in said first group of relays and for controlling a selected relay in said second group of relays, said relay in said first group of relays being common to a plurality of said register senders having the same first character as a part of the register sender designation thereof and said relay in said second group of relays being common to a plurality of said register senders having the same second character as a part of the register sender designation thereof, means jointly controlled by the operation of said selected relay in said first group of relays and said selected relay in said second group of relays for connecting said translator to said one register sender having the particular register sender designation corresponding to the operated relays in said first and said second groups of relays, a route register in said one register sender, means controlled in response to said connection of said translator and said one register sender for transferring said digits registered in said digit register of said one register sender to said translator digit register means, a plurality of translating means in said common translator, means controlled in accordance with the digits transferred to and registered in said translator digit register means for operating a particular one of said translating means, means controlled by said operated translating means for operating said route register in said one register sender to register therein routing digits corresponding to a particular route to said called exchange and for controlling said translator assigner to disconnect said translator from said one register sender, and means in said one register sender for transmitting said registering routing digits to extend said connection from said one register sender over said particular route.

2. In a telephone system, a plurality of register senders, each of said register senders having a plurality of digit registers, each of said register senders being identified by a different plural digit register sender designation individual thereto, a called exchange having an individual code designation comprising a plurality of digits, means for transmitting to one of said register senders a series of digits corresponding to the code designation of said called exchange, means for registering said digits in successive ones of said digit registers in said one register sender, a translator common to said plurality of register senders, digit register means in said translator, a translator assigner including ten first group relays and ten second group relays, means operated in response to the registration of said digits in said digit registers of said one register sender for operating a relay in said first group of relays corresponding to the tens digit of said one register sender designation, means controlled by said last mentioned relay for operating a relay in said second group of relays corresponding to the units digit of said one register sender designation, said relay in said first group of relays being common to a plurality of register senders having the same tens digit as a part of the register sender designation thereof and said relay in said second group of relays being common to a plurality of register senders having the same units digit as a part of the sender register designation thereof, means jointly controlled by the operation of said tens relay in said first group of relays and said units relay in said second group of relays for connecting said translator to said one register sender having the particular register sender designation corresponding to the operated tens and units relays in said first and said second groups of relays, a route register in said one register sender, means controlled in response to said connection of said translator and said one register sender for transferring said digits registered in said digit registers of said one register sender to said translator digit register means, a plurality of translating means in said common translator, means controlled in accordance with the digits transferred to and registered in said translator digit register means for operating a particular one of said translate means, means controlled by said operated translate means for operating said route register in said one register sender to register therein routing digits corresponding to a particular route to said called exchange and for controlling said translator assigner to disconnect said translator from said one register sender, and means in said one register sender for transmitting said registered routing digits to extend said connection from said one register sender over said particular route.

3. The telephone system set forth in claim 2, wherein said translator assigner includes means for preventing the subsequent operation of any other tens relay in said first group of relays as soon as one tens relay therein has been operated.

4. The telephone system set forth in claim 2, wherein said translator assigner includes means for preventing the subsequent operation of any other tens relay in said first group of relays that corresponds to the tens digit of another of said register senders as soon as one tens relay therein has been operated.

5. The telephone system set forth in claim 2, wherein said translator assigner includes means for preventing the subsequent operation of any other tens relay in said first group as soon as one tens relay therein has been operated and for preventing the subsequent operation of any other units relay in said second group as soon as one units relay therein has been operated.

6. In a telephone system, a switching apparatus, a calling station, a called station having a plural digit directory number comprising a called exchange code portion and a numerical portion, a plurality of register senders, each of said register senders being identified by a plural digit number individual thereto, means for selecting one of said register senders in response to a call at said calling station, a plural digit register in said one register sender operated under control of said calling station to register the digits of the directory number of said called station, a translator controller and a translator both common to said register senders, an assigner mechanism common to said register senders, means in said assigner selectively controlled in accordance with the plural digit number of said one register sender for connecting said one register sender to said translator controller and said translator, means in said translator controller controlled in response to said connection for registering therein the digits of the called exchange code portion of said called station directory number in order selectively to operate said translator to translate said called exchange code into appropriate routing digits, means in said one register sender for registering said routing digits and for controlling said assigner to disconnect said one register sender from said translator controller and said translator, and means in said one register sender for completing a connection from said calling station to said called station in accordance with said routing digits and said called station directory number.

7. In a telephone system, switching apparatus, calling stations, called destinations identified by destination codes individual thereto and comprising a plurality of digits, a plurality of register senders, each of said register senders being identified by a plural digit number individual thereto, means for selecting one of said register senders for use by each calling station initiating a call, a plural digit register in each of said register senders operated under control of the respective calling station to register the digits of a destination code, a translator controller and a translator both common to said register senders, a translator assigner common to said register senders for individually assigning said translator controller and said translator to the exclusive use of said register senders having called destination codes registered therein one at a given time, means in said assigner selectively controlled in accordance with the plural digit number of each of said register senders for selectively connecting each of said register senders to said translator controller and said translator one at a time, means in said translator controller controlled in response to the selective connection thereof with each of said register senders one at a time for registering therein the digits of the called destination code registered in the connected register sender in order selectively to operate said translator to translate said destination code into appropriate routing digits, means in each of said register senders for registering said routing digits as they are translated by said translator and for controlling said assigner to disconnect each of said register senders from said translator controller and said translator as soon as the translation of the destination code is registered in the connected register sender routing register, and means in each of said register senders for extending a connection from the connected calling station in the direction of the called destination identified by the destination code in accordance with said routing digits and said called destination code digits.

8. The telephone system set forth in claim 7, wherein said translator assigner includes a plurality of groups of relays, and means for operating at least one relay in each of said groups in accordance with at least one of the digits of the plural digit number identifying the register sender having registered therein a destination code and for connecting said register sender to said translator controller and said translator.

9. The telephone system set forth in claim 7, wherein said translator assigner includes a tens relay corresponding to the tens digit of the identity numbers of a plurality of said register senders, a plurality of units relays corresponding respectively to the different units digits in the different identity numbers of the different ones of said register senders having the same tens digit, means for operating said tens relay as soon as any one of said register senders registers a called destination code therein, means controlled by said operated tens relay for connecting all of the relays in said group of units relays individually to the register senders having the corresponding units digits, and means for operating the particular units relay corresponding to the units digit of the register sender registering a destination code therein in order selectively to connect said one register sender to said translator controller and said translator.

10. The telephone system set forth in claim 7, wherein said translator assigner includes a group of tens relays corresponding respectively to the tens digits in the plural digit identity numbers of said different groups of register senders, a group of units relays corresponding respectively to ten different units digits in the plural digit identity numbers of the different register senders in each of the different groups of said register senders having the different tens digits, means for operating the different ones of said tens relays corresponding respectively to the different tens digits of said register senders having called destination codes registered therein, connect means individual to each tens relays for connecting said relays in said group of units relays individually to the register senders in the corresponding tens group, means for selectively controlling each connect means one at a time so that said units relays are connected to each group of of register senders one at a time, means for operating the different ones of said units relays corresponding respectively to the different units digits of said register senders having called destination codes registered therein and having the same identifying tens digit as the operated tens relay, and means associated with said units relays and selectively controlled by operated ones of said units relays for selectively connecting one at a time the corresponding ones of said register senders having destination codes registered therein to said translator controller and said translator.

11. The telephone system set forth in claim 9, wherein two or more units relays in said group of units relays are operated by register senders identified by corresponding units digits and have called destination codes registered therein at the time said tens relay is operated, and means controlled by said operated units relays for selectively connecting the corresponding register senders one at a time to said translator controller and said translator.

12. The telephone system set forth in claim 9, and also including means responsive to the operation of said units relays for preventing subsequent operation of additional units relays until all of the register senders identified by numbers corresponding to the operated tens and units relays have been connected one at a time to said translator controller and said translator.

13. In a telephone system, a plurality of register senders respectively identified by different individual plural digit designations, each of said register senders having a plurality of digit registers, a plurality of called exchanges identified by different individual code designations each comprising a plurality of digits, means for transmitting to different ones of said register senders a plurality of series of digits respectively corresponding to the code designations of different ones of said called exchanges, means for registering the digits of each called exchange code designation in successive ones of said digit registers in each of said register senders, a translator common to said register senders, digit register means in said translator, a translator assigner including ten first group relays and ten second group relays, means operated in response to the registration of said digits of said called exchange codes in said digit registers of said register senders for simultaneously operating the relays in said first group of relays corresponding to the tens digit of each one of said register sender designations, means controlled by said last mentioned relays for operating one at a time the relays in said second group of relays corresponding to the units digit of each one of said register sender designations, said relays in said first group of relays corresponding respectively to each group of register senders having the same tens digit as a part of the register sender designation thereof and said relays in said second group of relays corresponding respectively to each register senders having the same units digit as a part of the register sender designation thereof, means controlled by the operation of each of said tens relays in said first group for connecting all of said units relays in said second group to the respective register senders in said first group having the same tens digit in the register sender designations thereof, means for operating the units relays in said second group of relays having the same units digits as the corresponding register senders in said first group of register senders having called office codes registered therein, means controlled by said operated units relays in said second group of relays for connecting the corresponding register senders to said translator one at a time, a route register in each of said register senders, means controlled in response to said connection of said translator and said register senders one at a time for transferring said digits registered in said digit register of the connected register sender to said translator digit register means, a plurality of translating means in said translator, means controlled in accordance with the digits transferred to and registered in said translator digit register means for operating a particular one of said translate means, means controlled by said operated translate means for operating said route register in the corresponding connected one register sender to register therein routing digits corresponding to a particular route to the called exchange code registered in the digit registers of said one register sender and for controlling said units relays in said translator assigner to disconnect said translator from said one register sender and for connecting said translator to another register sender having an operated units relay corresponding to the units digit of said other register sender so that the route register in the corresponding connected other register sender will be controlled by said translator to register therein routing digits corresponding to a particular route to the called exchange identified by the called exchange code registered in the digit registers of said other register sender, and means in each of said register senders for transmitting said registered routing digits to extend connections over the particular routes to the respective called exchanges identified by the called exchange codes respectively registered in the corresponding register senders.

14. In a telephone system, a plurality of register senders identified by different individual plural digit register sender designations, each of said register senders having a plurality of digit registers, a plurality of called destinations having different individual code designations each comprising a plurality of digits, said destination codes identifying called toll zones and called exchanges, means for transmitting to different ones of said register senders a plurality of series of digits corresponding to the destination codes of different ones of said called destinations, means for registering the digits of each called destination code in successive ones of said digit registers in each of said register senders, a translator common to said register senders, digit register means in said translator, a translator assigner including ten first group relays and ten second group relays, means operated in response to the substantially simultaneous registration of said called destination codes in said register senders for substantially simultaneously operating the relays in said first group of relays corresponding to the tens digit designations of the corresponding register senders, means controlled by said last mentioned means for effecting lock-in to said translator assigner of all of said register senders having called destination codes registered therein and for effecting lock-out of all other of said register senders, means controlled by operated ones of said first group relays for connecting all of the relays in said second group of relays to the respective register senders having the same tens digit in the register sender designations thereof one at a time and for operating only those relays in said second group of relays that correspond to the units digits of the register sender designations of the corresponding register senders having code destinations registered therein, each of said relays in said first group of relays corresponding respectively to a group of register senders having the same tens digit as part of the register sender designation thereof and each of said relays in said second group of relays being connectable to the register senders having the same tens digit in the register sender designation thereof one after the other to determine the units digit of the register sender designation of each register sender having destination code register therein, means for connecting said relays in said second group to register senders that have caused the operation of first group relays in order to determine the units digit of each register sender in each of the corresponding groups having destination codes registered therein, means for operating the relays in said second group of relays having the same units digits as the register senders having destination codes registered therein, and means controlled by the operated relays in said first and said second groups of relays for connecting the register senders having the corresponding tens and units digits in the register sender designations thereof to said translator one at a time in order to connect all of said locked-in register senders to said translator before another group of locked-out register can be locked-in to said translator assigner.

15. The telephone system set forth in claim 14, wherein the operated relays in said first and second groups are restored to normal to unlock said assigner as soon as the last locked-in register sender has been connected to said translator, thereby permitting an additional group of register senders having called destination codes registered therein to be locked into said translator assigner to the exclusion of all other register senders.

16. In a telephone system, a plurality of register senders identified by different individual plural digit register sender designations, each of said register senders having a plurality of digit registers, a plurality of called destinations having different individual code designations each comprising a plurality of digits, said destination codes identifying called toll zones and called exchanges, means for transmitting to different ones of said register senders a plurality of series of digits corresponding to the destination codes of different ones of said called destinations, means for registering the digits of each called destination code in successive ones of said digit registers in each of said register senders, a translator common to said register senders, digit register means in said translator, a translator assigner including ten first group relays and ten second group relays, means operated in response to the substantially simultaneous registration of said called destination codes in said register senders for substantially simultaneously operating the relays in said first group of relays corresponding to the tens digit designations of the corresponding register senders, means controlled by said last mentioned means for effecting lock-in to said translator assigner of all of said register senders having called destination codes registered therein and for effecting lock-out of all other of said register senders, means controlled by operated ones of said first group relays for connecting all of the relays in said second group of relays to the respective register senders having the same tens digit in the register sender designations thereof one at a time and for operating only those relays in said second group of relays that correspond to the units digits of the register sender designations of the corresponding register senders having code destinations registered therein, each of said relays in said first group of relays corresponding respectively to a group of register senders having the same tens digit as part of the register sender designation thereof and said relays in said second group of relays being connectable to the register senders having the same tens digit in the register sender designation thereof one after the other to determine the units digit of the register sender designation of each register sender having a destination code register therein, means for connecting said relays in said second group to register senders that have caused the operation of first group relays in order to determine the units digit of each register sender in each of the corresponding groups having destination codes registered therein, means for operating the relays in said second group of relays having the same units digits as the senders having destination codes registered therein, means controlled by the operated relays in said first and said second groups of relays for connecting the register senders having the corresponding tens and units digits in the register sender designations thereof to said translator one at a time, a route register in each of said register senders, means controlled in response to the connection of said register senders to said translator one at a time for transferring said digits of the destination code registered in the connected register sender to said translator digit register means, a plurality of translating means in said translator, means controlled in accordance with the digits transferred to and registered in said translator digit register means from the respective register senders for operating particular ones of said translate means, means controlled by each operated translate means for operating said route registers in the corresponding register sender to register therein routing digits corresponding to a particular route extending in the direction of the called destination identified by the destination code and for controlling the units relays in said translator assigner to disconnect said translator from one of said register senders and for connecting said translator to the next register sender having an operated units relay so that the associated route register therein will be controlled by said translator to register the routing digits corresponding to the route to the called destination identified by the destination code registered in the corresponding register sender, and means in said register senders for transmitting said routing digits to extend connections over particular routes toward the respective called destinations identified by the destination codes registered respectively in the corresponding register senders.

17. The telephone system set forth in claim 16, wherein said translator assigner is unlocked as soon as all locked-in register senders have been controlled by said translator, thereby permitting an additional group of said register senders having called destination codes registered therein to be locked into said translator assigner to the exclusion of all other of said register senders.

18. In a telephone system, a switching apparatus, a calling station, a called station having a plural digit directory number comprising a called exchange code portion and a numerical portion, a plurality of register senders, each of said register senders being identified by a plural digit number individual thereto, means for selecting one of said register senders in response to a call at said calling station, a plural digit register in said register sender operated under control of said calling station to register the digits of the directory number of said called station, a plurality of translator controllers and a translator both common to said register senders, transfer means associated with said translator controllers, time controlled means for selectively operating said transfer means to preselect each one of said translator controllers for use for a period of time, an assigner common to said register senders, means in said assigner selectively controlled in accordance with the plural digit number of said one register sender for connecting said one register sender to a preselected one of said translator controllers and to said translator, means in said preselected translator controller controlled in response to said connection for registering therein the digits of the called exchange code portion of said called station directory number in order selectively to operate said translator to translate the same into appropriate routing digits, means in said one register sender for registering said routing digits and for controlling said assigner to disconnect said one register sender from said preselected translator controller and said translator, and means in said one register sender for completing a connection from said calling station to said calling station in accordance with said routing digits and said called station directory number.

19. The telephone system set forth in claim 18, wherein said time controlled means is automatically controlled at predetermined intervals of time.

20. The telephone system set forth in claim 18, and further comprising manually operable means for controlling said transfer means as desired.

21. The telephone system set forth in claim 18, and further comprising manually operable means for disconnecting said time controlled means, and additional manually actuated means for selectively controlling said transfer means to preselect a different translator controller in response to each actuation thereof.

22. The telephone system set forth in claim 18, wherein said translator controllers and said register senders are individually connected by said assigner over a plurality of conductors that are common to and accessible to all register senders, and further comprising disconnect means for disconnecting said translator controllers from said conductors and for preventing any register sender from being connected to said conductors, and means controlled by said disconnect means for testing each of said conductors to determine if any one of said conductors is falsely grounded.

23. The telephone system set forth in claim 22, wherein said testing means simultaneously connects said plurality of conductors to a like plurality of signal lamps so that the lamp or lamps connected to falsely grounded ones of said conductors will be illuminated to identify the same.

24. In a telephone system, switching apparatus, calling stations, called destinations respectively identified by destination codes individual thereto and each comprising a plurality of digits, a plurality of register senders, each of said register senders being identified by a plural digit number individual thereto, means for selecting one of said register senders for use by each calling station initiating a call, a plural digit register in each of said register senders operated under control of the calling station to register the digits of a destination code, a plurality of translator controllers and a translator both common to said register senders, transfer means normally effective to preselect said translator controllers for use one after the other for predetermined periods of time, failure means automatically controlled in response to the failure of the corresponding translator controller for preventing preselection thereof, a translator assigner common to said register senders for individually assigning a preselected one of said translator controllers and said translator to the exclusive use of said register senders having called destination codes registered therein one at a time, means in said assigner selectively controlled in accordance with the plural digit identity number of each of said register senders for selectively connecting each of said register senders to said preselected translator controller and translator one at a time, means in said preselected translator controller controlled in response to the selective connection thereof with each of said register senders one at a time for registering therein the digits of the called destination code registered in the associated register sender in order selectively to operate said translator to translate said destination code into appropriate routing digits, means in each of said register senders for registering said routing digits as they are translated by said translator and for controlling said assigner to disconnect each of said register senders from said preselected translator controller and said translator as soon as the translation of the destination code is registered in the associated register sender routing register, and means in each of said register senders for completing a connection from the calling station connected in the direction of the called destination identified by the destination code in accordance with said routing digits and said called destination code digits.

25. The telephone system set forth in claim 24, and further comprising a failure alarm controlled by said failure means to transmit a signal of said failure of one of said translator controllers, and wherein said transfer means is automatically controlled at spaced intervals to preselect another translator controller of said plurality of translator controllers.

26. The telephone system set forth in claim 24, and further comprising a failure alarm controlled by said failure means of each of said translator controllers to transmit a signal of said failure of said translator controllers, means controlled in response to the simultaneous operation of said failure means corresponding to each of said translator controllers for automatically registering a special routing digit or digits in said route registers of said register sender independently of said translator.

27. The telephone system set forth in claim 26, and further comprising an operator position, and wherein said register sender controls said switching apparatus in response to the registration of said special routing digit or digits in said route register to complete a connection from said calling station to said operator position.

28. In a telephone system serving a territory divided into a plurality of toll areas assigned individual multi-digit toll area codes, each of said toll areas including a plurality of exchanges assigned individual multi-digit exchange codes, each of said exchanges including a plurality of subscriber lines assigned individual multi-digit line numbers, a register sender disposed in one of said exchanges in one of said toll areas, means for extending a connection from a calling one of the subscriber lines in said one exchange to said register sender, means included in said register sender for receiving over said one calling subscriber line either the individual digits of a toll code of a called distant toll area followed by the individual digits of the code of a called exchange therein followed by the individual digits of the number of a called line therein or the individual digits of the code of a called exchange in said one toll area followed by the individual digits of the number of a called line therein, means included in said register sender for registering the individual digits received over said one calling subscriber line, whereby the first code registered in said register sender may be either the toll area code of a called distant toll area or the exchange code of a called exchange in said one toll area, a translator, means responsive to the registration in said register sender as the first code therein of either the toll area code of another of said toll areas or the exchange code of another of said exchanges in said one toll area for connecting said translator to said register sender, means included in said translator and responsive to the connection thereof to said register sender for translating the toll area code registered as the first code in said register sender into toll area routing digits and for registering said toll area routing digits in said register sender, additional means included in said translator and responsive to the connection thereof to said register sender for translating the exchange code registered as the first code in said register sender into exchange routing digits and for registering said exchange routing digits in said register sender, and means included in said register sender for sending therefrom said registered toll area routing digits or said registered exchange routing digits and then for sending therefrom said registered digits received over said one calling subscriber line.

29. In a telephone system serving a territory divided into a plurality of toll areas assigned individual multi-digit toll area codes, each of said toll areas including a plurality of exchanges assigned individual multi-digit exchange codes, each of said exchanges including a plurality of subscriber lines assigned individual multi-digit line numbers, a register sender disposed in one of said exchanges in one of said toll areas, means for extending a connection from a calling one of the subscriber lines in said one exchange to said register sender, said register sender including a plurality of digit registers, means included in said register sender for receiving over said one calling subscriber line either the individual digits of a toll code of a called distant toll area followed by the individual digits of the code of a called exchange therein followed by the individual digits of the number of a called line therein or the individual digits of the code of a called exchange in said one toll area followed by the individual digits of the number of a called line therein, means included in said register sender for registering in said digit registers the individual digits received over said one calling subscriber line, a translator including a plurality of translate relays individually corresponding to translated toll area routing digits of the different toll area codes and to translated exchange routing digits of the different exchange codes in said one toll area, said register sender also including a route register, means responsive to the registering in said digit registers as the first code therein either one of said toll area codes or one of said exchange codes in said one toll area for connecting said translator to said register sender, means responsive to the connection of said translator to said register sender for operating the one of said translate relays corresponding to said first code registered in said digit registers, means responsive to the operation of the one of said translate relays corresponding to one of said toll area codes for registering the translated toll area routing digits thereof in said route register and responsive to the operation of the one of said translate relays corresponding to one of said exchange codes in said one toll area for registering the translated exchange routing digits thereof in said route register, and means included in said register sender for sending therefrom said routing digits registered in said route register followed by said individual digits registered in said digit registers.

30. In a telephone system serving a territory divided into a plurality of toll areas assigned individual multi-digit toll area codes, each of said toll areas including a plurality of exchanges assigned individual multi-digit exchange codes, each of said exchanges including a plurality of subscriber lines assigned individual multi-digit line numbers, a register sender disposed in one of said exchanges in one of said toll areas, means for extending a connection from a calling one of the subscriber lines in said one exchange to said register sender, said register sender including a plurality of digit registers, means included in said register sender for receiving over said one calling subscriber line either the individual digits of a toll code of a called distant toll area followed by the individual digits of the code of a called exchange therein followed by the individual digits of the number of a called line therein or the individual digits of the code of a called exchange in said one toll area followed by the individual digits of the number of a called line therein, means included in said register sender for registering in said digit registers the individual digits received over said one calling subscriber line, a translator including a plurality of translate relays individually corresponding to translated toll area routing digits of the different toll area codes and to translated exchange routing digits of the different exchange codes in said one toll area, said register sender also including a route register, means responsive to the registering in said register sender of the digits of a toll code of a called distant toll area and of at least one of the digits of the exchange code therein for connecting said translator to said register sender, means responsive to the registering in said register sender of the digits of an exchange code of a called exchange in said one toll area for connecting said translator to said register sender, means responsive to the connection of said translator to said register sender for operating the one of said translate relays corresponding to the toll code of the called distant toll area or the exchange code of the called exchange in said one toll area as registered in said digit registers, means responsive to the operation of the one of said translate relays corresponding to one of said toll area codes for registering the translated toll area routing digits thereof in said route register and responsive to the operation of the one of said translate relays corresponding to one of said exchange codes in said one toll area for registering the translated exchange routing digits thereof in said route register, and means included in said register sender for sending therefrom said routing digits registered in said route register followed by said individual digits registered in said digit registers.

31. In a telephone system serving a territory divided into a plurality of toll areas assigned individual 3-digit toll area codes, each of said toll areas including a plurality of exchanges assigned individual 3-digit exchange codes, each of said exchanges including a plurality of subscriber lines assigned individual 4-digit line numbers, a register sender disposed in one of said exchanges in one of said toll areas, means for extending a connection from a calling one of the subscriber lines in said one exchange to said register sender, said register sender including a plurality of digit registers, means included in said register sender for receiving over said one calling subscriber line either the individual digits of a toll code of a called distant toll area followed by the individual digits of the code of a called exchange therein followed by the individual digits of the number of a called line therein or the individual digits of the code of a called exchange in said one toll area followed by the individual digits of the number of a called line therein, means included in said register sender for registering in said digit registers the individual digits received over said one calling subscriber line, a translator including a plurality of translate relays individually corresponding to translated toll area routing digits of the different toll area codes and to translated exchange routing digits of the different exchange codes in said one toll area, said register sender also including a route register, means responsive to the registering in said digit registers as the first code therein of either one of said toll area codes or one of exchange codes in said one toll area for connecting said translator to said register sender, means responsive to the connection of said translator to said register sender for operating the one of said translate relays corresponding to said first code registered in said digit registers, means responsive to the operation of one of said translate relays corresponding to one of said toll area codes for registering the translated toll area routing digits thereof in said route register and responsive to the operation of one of said translate relays corresponding to one of said exchange codes in said one toll area for registering the translated exchange routing digits thereof in said route register, and means included in said register sender for sending therefrom said routing digits registered in said route register followed by said individual digits registered in said digit registers.

32. In a telephone system serving a territory divided into a plurality of toll areas assigned individual multi-digit toll area codes, each of said toll areas including a plurality of exchanges assigned individual multi-digit exchange codes, each of said exchanges including a plurality of subscriber lines assigned individual multi-digit line numbers, a register sender disposed in one of said exchanges in one of said toll areas, means for extending a connection from a calling one of the subscriber lines in said one exchange to said register sender, means included in said register sender for receiving over said one calling subscriber line either the individual digits of a toll code of a called distant toll area followed by the individual digits of the code of a called exchange therein followed by the individual digits of the number of a called line therein or the individual digits of the code of a called exchange in said one toll area followed by the individual digits of the number of a called line therein, means included in said register sender for registering the individual digits received over said one calling subscriber line, whereby the first code registered in said register sender may be either the toll area code of a called distant toll area or the exchange code of a called exchange in said one toll area, means responsive to the registration in said register sender of the exchange code of said one exchange for extending the connection from said one calling subscriber line independently of the control of said register sender, a translator, means responsive to the registration in said register sender as the first code therein of either the toll area code of another of said toll areas or the exchange code of another of said exchanges in said one toll area for connecting said translator to said register sender, means included in said translator and responsive to the connection thereof to said register sender for translating the toll area code registered as the first code in said register sender into toll area routing digits and for registering said toll area routing digits in said register sender, additional means included in said translator and responsive to the connection thereof to said register sender for translating the exchange code registered as the first code in said register sender into exchange routing digits and for registering said exchange routing digits in said register sender, and means included in said register sender for sending therefrom said registered toll area routing digits or said registered exchange routing digits and then for sending therefrom said registered digits received over said one calling subscriber line, thereby to extend the connection from said one calling subscriber line under the control of said register sender.

References Cited in the file of this patent

UNITED STATES PATENTS

| | | |
|---|---|---|
| 2,385,715 | Lomax et al. | Sept. 25, 1945 |
| 2,619,546 | Myers | Nov. 25, 1952 |
| 2,631,195 | Ostline | Mar. 10, 1953 |
| 2,635,148 | Shepherd | Apr. 14, 1953 |
| 2,680,155 | Molnar | June 1, 1954 |
| 2,708,690 | Mitchell | May 17, 1955 |
| 2,721,898 | Lomax | Oct. 25, 1955 |
| 2,727,092 | Cahill | Dec. 13, 1955 |